(12) United States Patent  
Derichs et al.

(10) Patent No.: US 12,175,039 B2  
(45) Date of Patent: Dec. 24, 2024

(54) TOUCH ICON OFFSET BASED ON TOUCH DATA SAMPLES

(71) Applicant: SigmaSense, LLC., Wilmington, DE (US)

(72) Inventors: Kevin Joseph Derichs, Buda, TX (US); Daniel Keith Van Ostrand, Leander, TX (US); Richard Stuart Seger, Jr., Belton, TX (US)

(73) Assignee: SIGMASENSE, LLC., Austin, TX (US)

( * ) Notice: Subject to any disclaimer, the term of this patent is extended or adjusted under 35 U.S.C. 154(b) by 0 days.

(21) Appl. No.: 17/864,273

(22) Filed: Jul. 13, 2022

(65) Prior Publication Data

US 2024/0019964 A1    Jan. 18, 2024

(51) Int. Cl.
| | |
|---|---|
| *G06F 3/041* | (2006.01) |
| *G06F 3/044* | (2006.01) |
| *G06F 3/0488* | (2022.01) |

(52) U.S. Cl.
CPC ........ *G06F 3/0418* (2013.01); *G06F 3/04166* (2019.05); *G06F 3/0488* (2013.01); *G06F 3/0446* (2019.05); *G06F 2203/04101* (2013.01)

(58) Field of Classification Search
CPC .. G06F 3/0418; G06F 3/04166; G06F 3/0488; G06F 3/0446; G06F 3/04883;
(Continued)

(56) References Cited

U.S. PATENT DOCUMENTS

| 5,437,178 A | 8/1995 | Esin et al. |
|---|---|---|
| 6,218,972 B1 | 4/2001 | Groshong |

(Continued)

FOREIGN PATENT DOCUMENTS

| CN | 103995626 A | 8/2014 |
|---|---|---|
| CN | 104182105 A | 12/2014 |

(Continued)

OTHER PUBLICATIONS

Baker; How delta-sigma ADCs work, Part 1; Analog Applications Journal; Oct. 1, 2011; 6 pgs.

(Continued)

*Primary Examiner* — Darlene M Ritchie  
(74) *Attorney, Agent, or Firm* — Garlick & Markison; Timothy W. Markison

(57) ABSTRACT

A method includes a processing module obtaining touch data at a touch data rate. The method further includes the processing module obtaining video data at a refresh rate, wherein the touch data rate is greater than the refresh rate. For a frame of the video data, the method further includes the processing module determining a touch movement trend based on the touch data. The method further includes the processing module determining a position offset for a graphical representation of the touch data based on the touch movement trend. When the position offset exceeds an offset threshold, the method further includes the processing module adjusting position of the graphical representation of the touch data within the frame of video data based on the position offset to produce an adjusted frame of video data.

14 Claims, 83 Drawing Sheets  
(6 of 83 Drawing Sheet(s) Filed in Color)

(58) Field of Classification Search
CPC .. G06F 3/0412; G06F 3/0416; G06F 3/04815; G06F 3/0484; G06F 3/011; G06F 3/017; G06F 3/0481; G06F 3/04847; G06F 3/0482; G06F 2203/04101
See application file for complete search history.

(56) References Cited

U.S. PATENT DOCUMENTS

| | | | |
|---|---|---|---|
| 6,665,013 | B1 | 12/2003 | Fossum et al. |
| 7,476,233 | B1 | 1/2009 | Wiener et al. |
| 7,528,755 | B2 | 5/2009 | Hammerschmidt |
| 8,031,094 | B2 | 10/2011 | Hotelling |
| 8,089,289 | B1 | 1/2012 | Kremin et al. |
| 8,279,180 | B2 | 10/2012 | Hotelling et al. |
| 8,537,110 | B2 | 9/2013 | Kruglick |
| 8,547,114 | B2 | 10/2013 | Kremin |
| 8,587,535 | B2 | 11/2013 | Oda et al. |
| 8,625,726 | B2 | 1/2014 | Kuan |
| 8,657,681 | B2 | 2/2014 | Kim |
| 8,966,400 | B2 | 2/2015 | Yeap |
| 8,982,097 | B1 | 3/2015 | Kuzo et al. |
| 9,081,437 | B2 | 7/2015 | Oda |
| 9,201,547 | B2 | 12/2015 | Elias |
| 10,007,335 | B2 | 6/2018 | Lee |
| 10,127,700 | B2 * | 11/2018 | Xiong ................ G06F 3/04883 |
| 11,823,498 | B1 * | 11/2023 | Wan ........................ G06N 3/09 |
| 2003/0052657 | A1 | 3/2003 | Koernle et al. |
| 2005/0235758 | A1 | 10/2005 | Kowal et al. |
| 2011/0063154 | A1 | 3/2011 | Hotelling et al. |
| 2011/0298745 | A1 | 12/2011 | Souchkov |
| 2012/0278031 | A1 | 11/2012 | Oda |
| 2013/0181908 | A1 * | 7/2013 | Santiago ............... G06F 3/0488 345/173 |
| 2013/0278447 | A1 | 10/2013 | Kremin |
| 2014/0327644 | A1 | 11/2014 | Mohindra |
| 2015/0091847 | A1 | 4/2015 | Chang |
| 2015/0346889 | A1 | 12/2015 | Chen |
| 2016/0188049 | A1 | 6/2016 | Yang et al. |
| 2017/0289762 | A1 * | 10/2017 | Cudalbu ............ G01C 21/3673 |
| 2018/0157354 | A1 | 6/2018 | Blondin et al. |
| 2018/0275824 | A1 | 9/2018 | Li |
| 2020/0218376 | A1 * | 7/2020 | Nilo ...................... G06F 3/0416 |

FOREIGN PATENT DOCUMENTS

| | | |
|---|---|---|
| CN | 104536627 A | 4/2015 |
| CN | 107771273 A | 3/2018 |
| EP | 2284637 A1 | 2/2011 |

OTHER PUBLICATIONS

Brian Pisani, Digital Filter Types in Delta-Sigma ADCs, Application Report SBAA230, May 2017, pp. 1-8, Texas Instruments Incorporated, Dallas, Texas.

European Patent Office; Extended European Search Report; Application No. 19853507.2; Jun. 13, 2023; 7 pgs.

* cited by examiner communication system 10 computing device 14 computing device 14 computing device 18 drive-sense circuit 28 display 83 with in-cell touch sensors transparent electrode (ITO) layer with thin film transistors

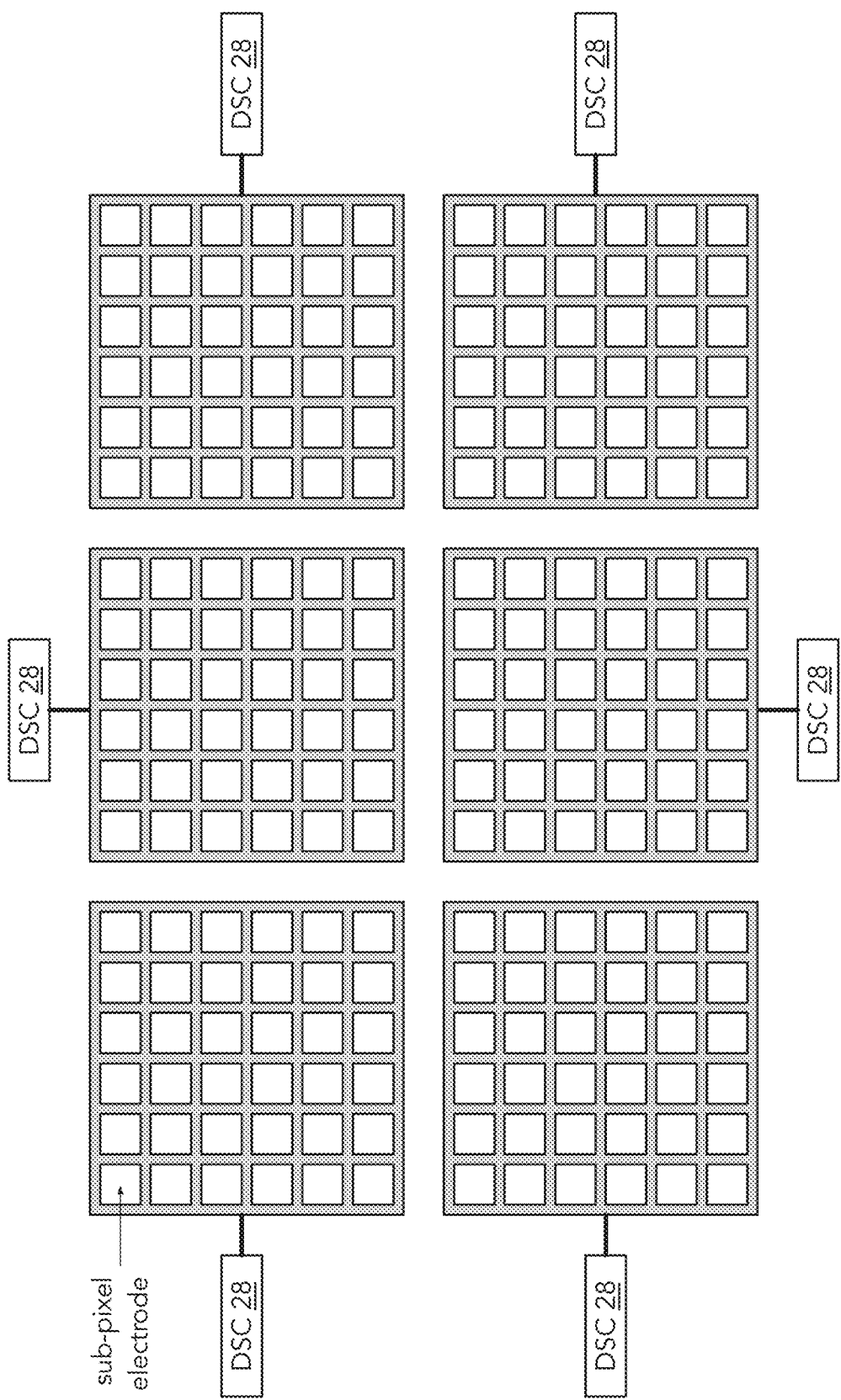
FIG. 9G1

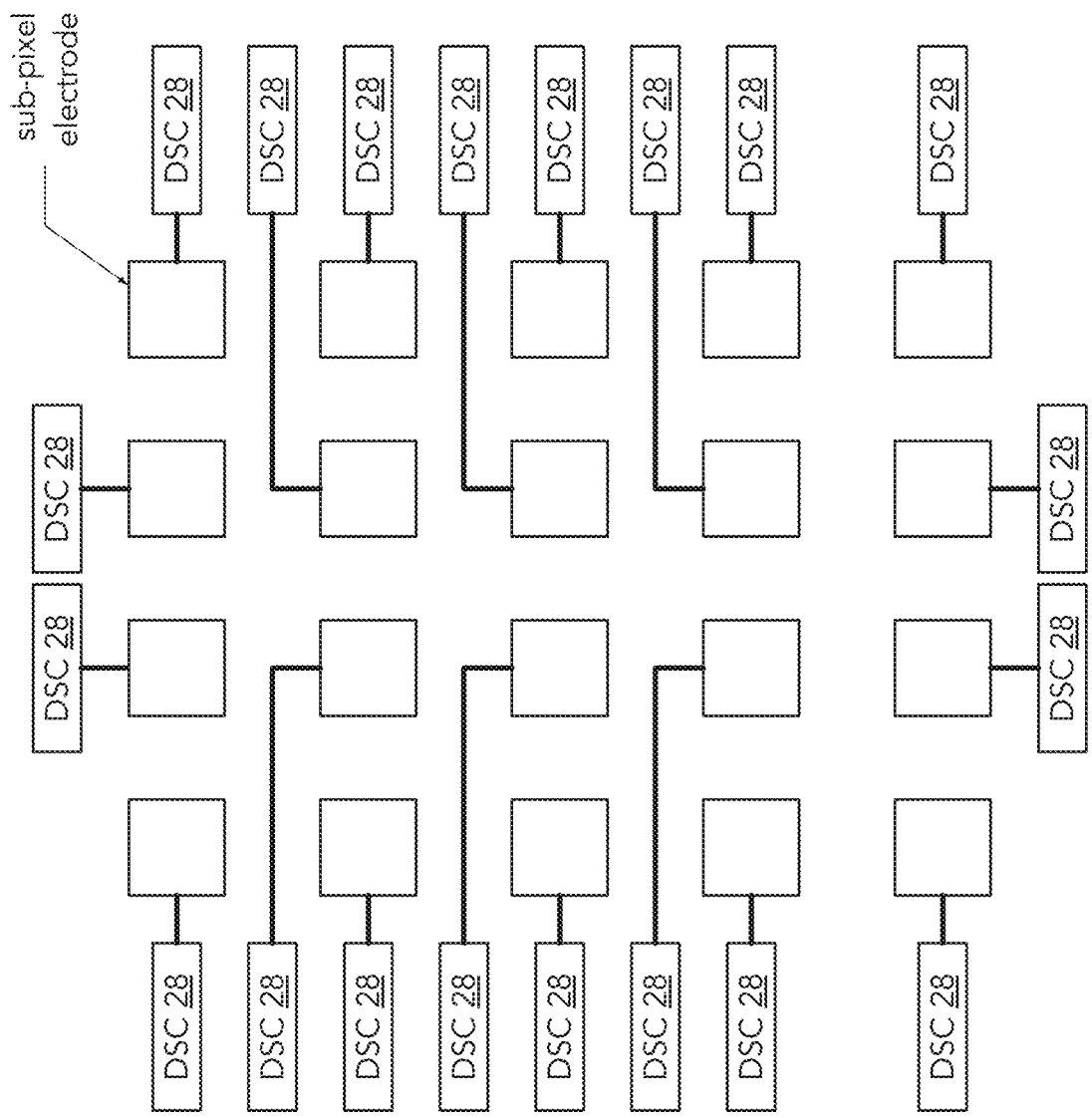
FIG. 9G2

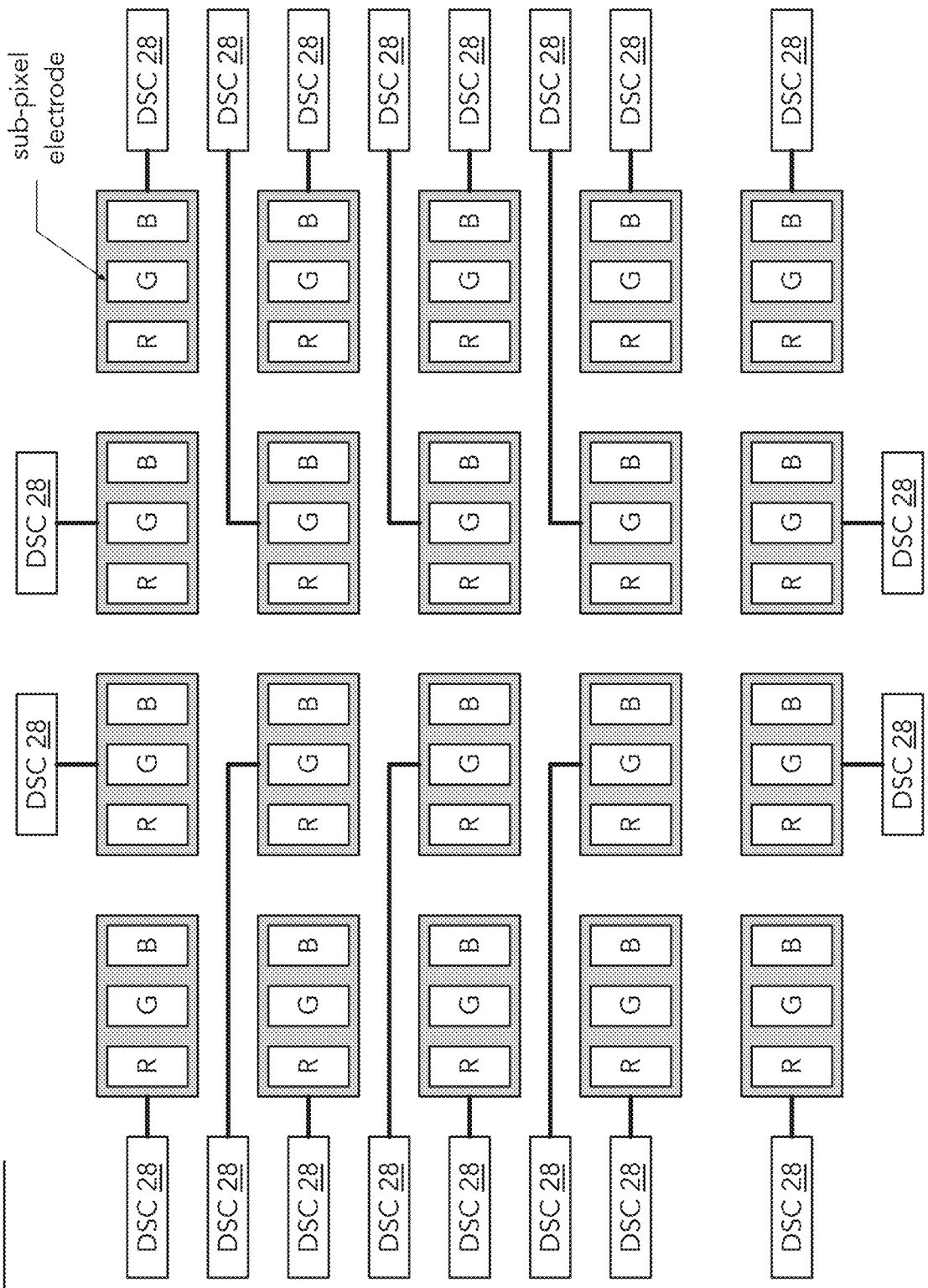

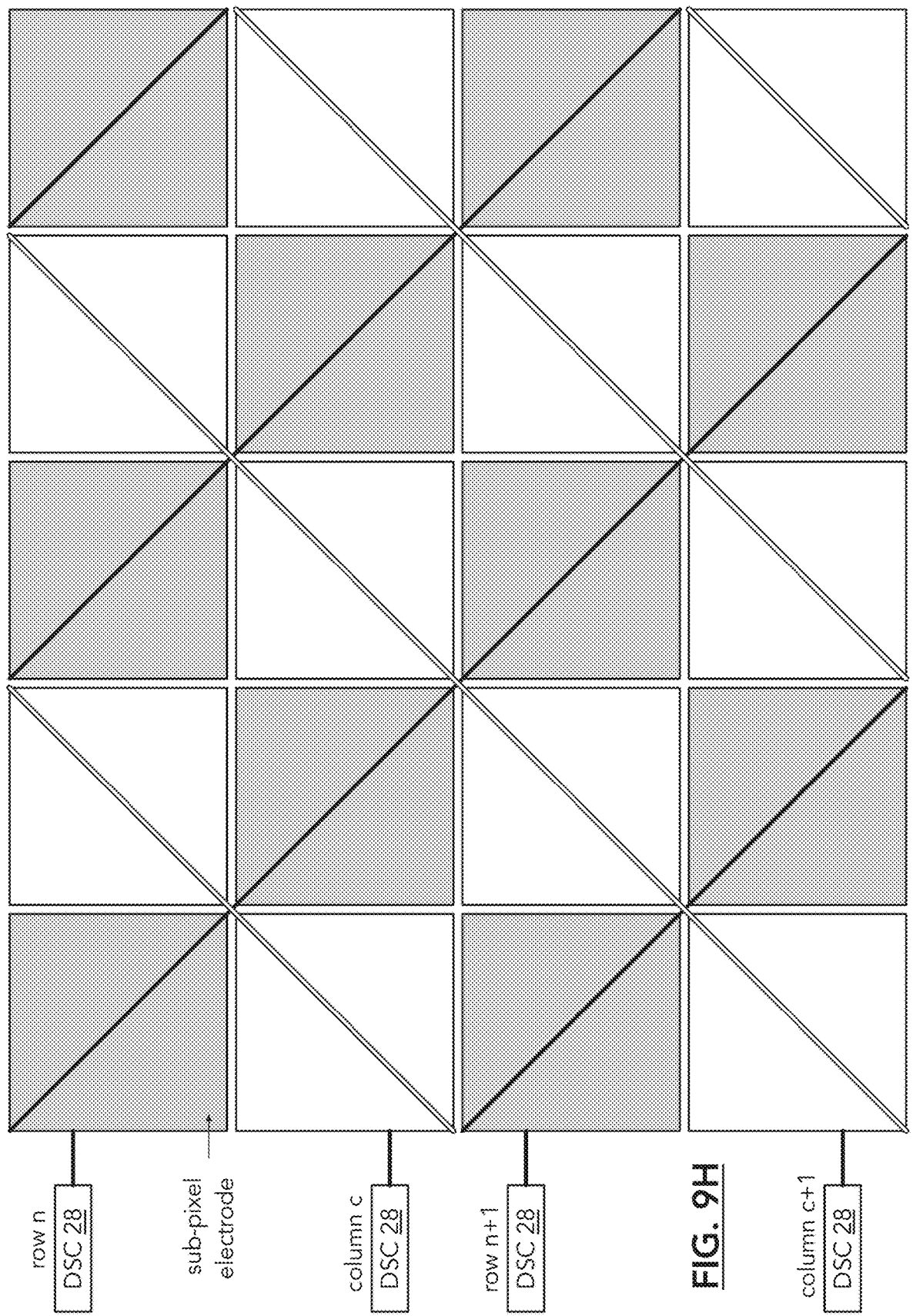

display 83-1 with on-cell touch sensors no touch touch

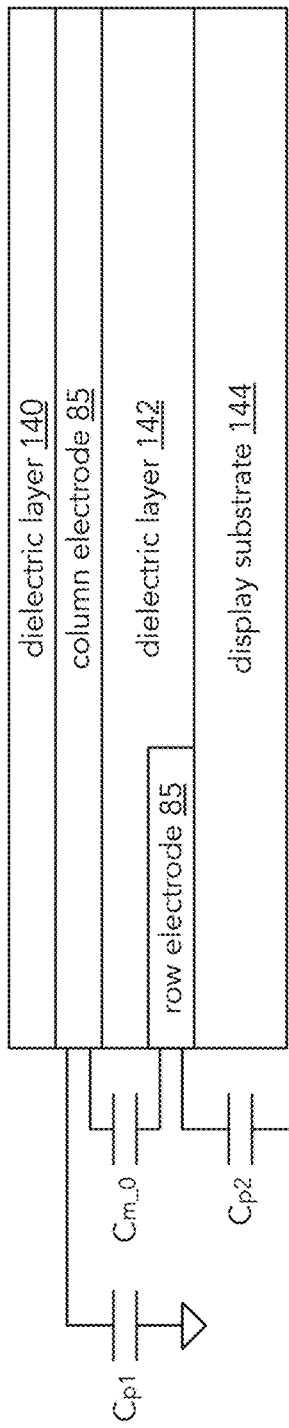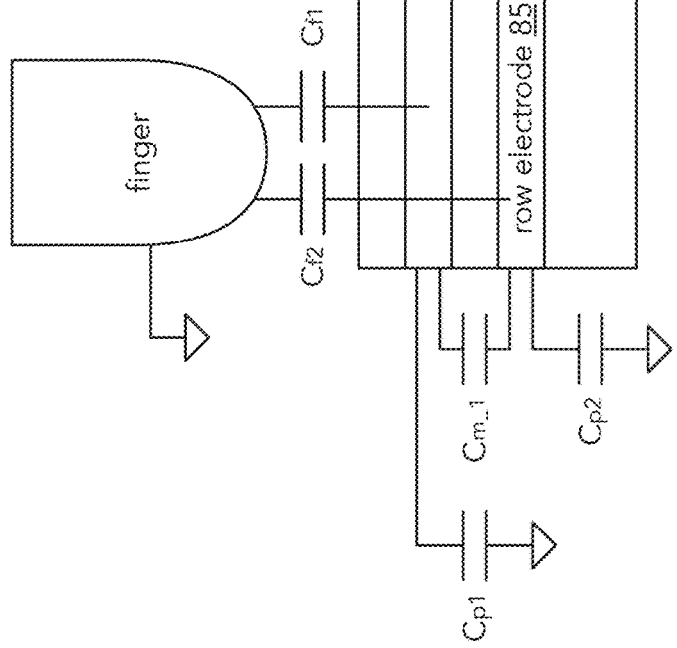

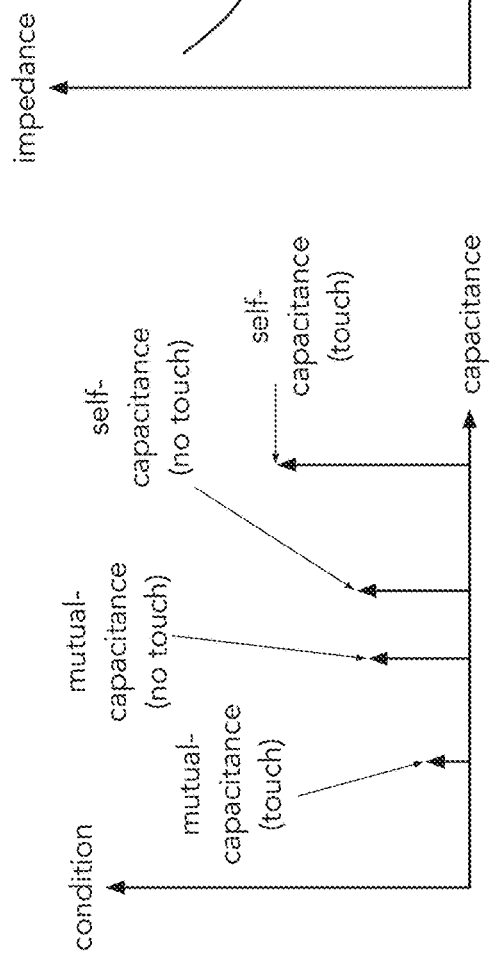
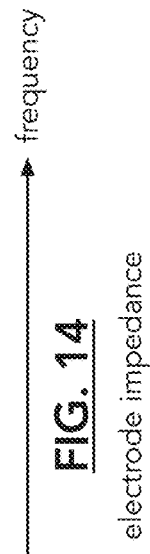
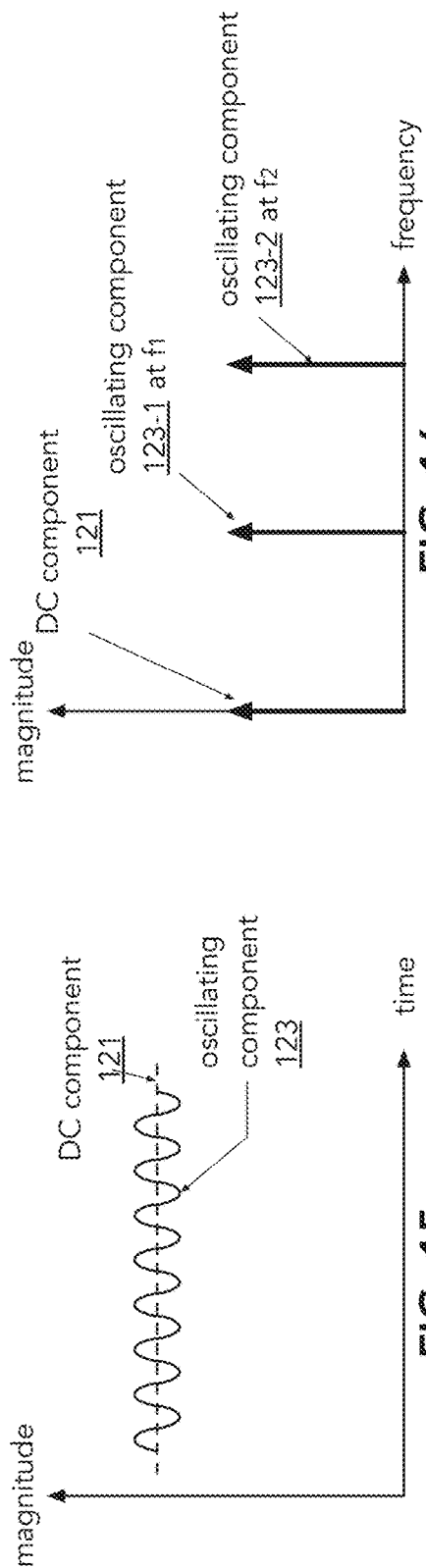
FIG. 13
FIG. 14
FIG. 15
FIG. 16 no touch with touch with touch

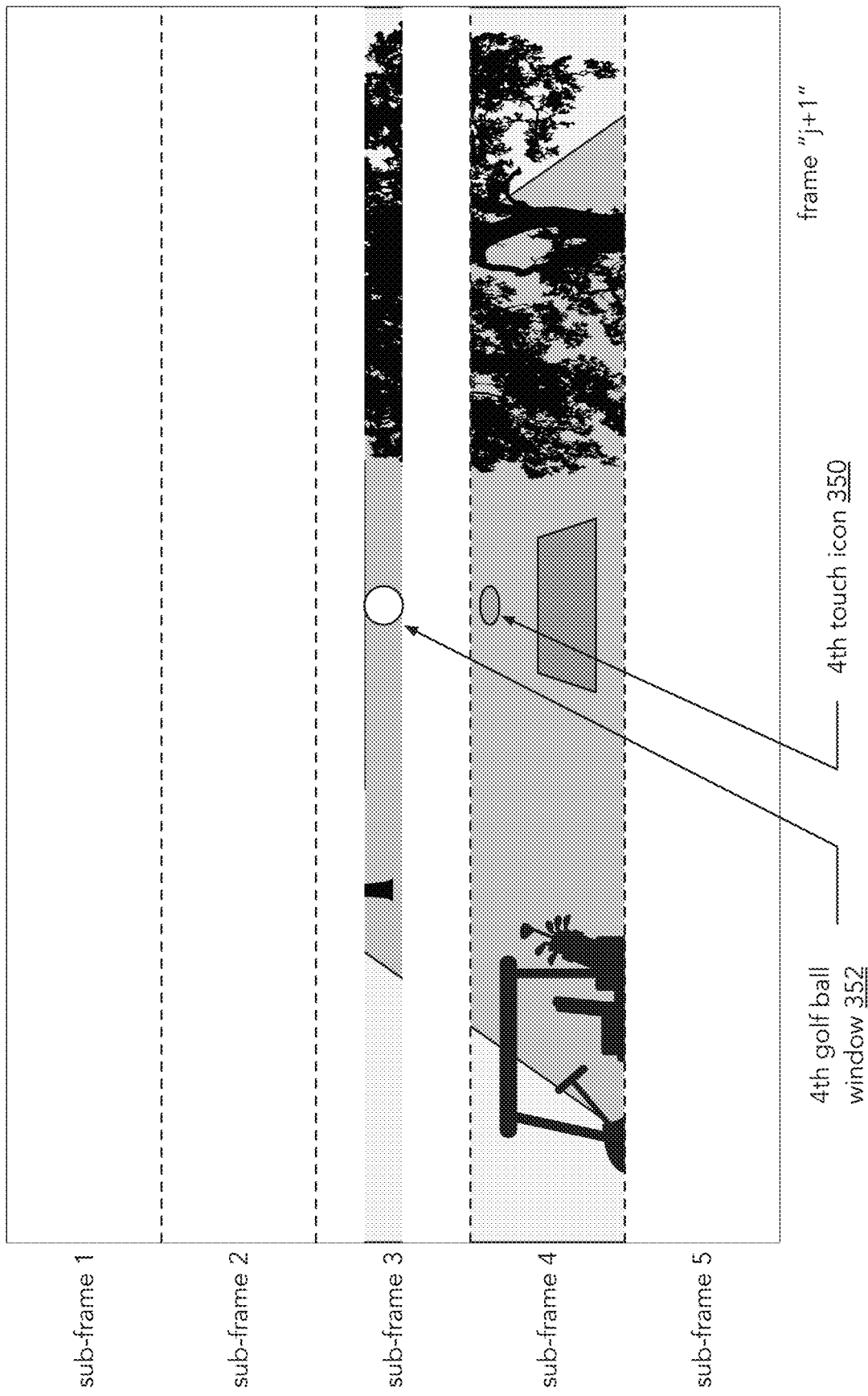

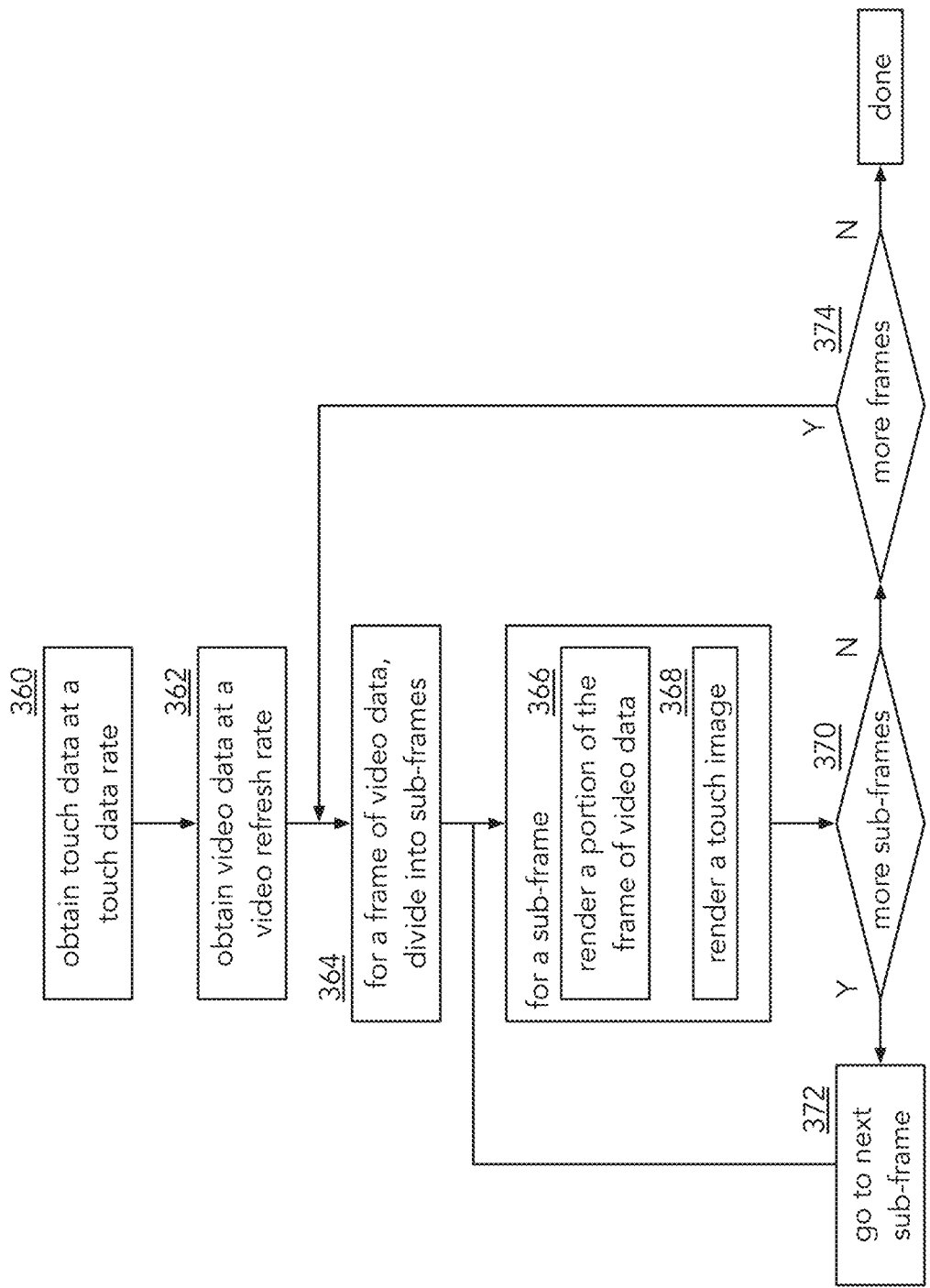

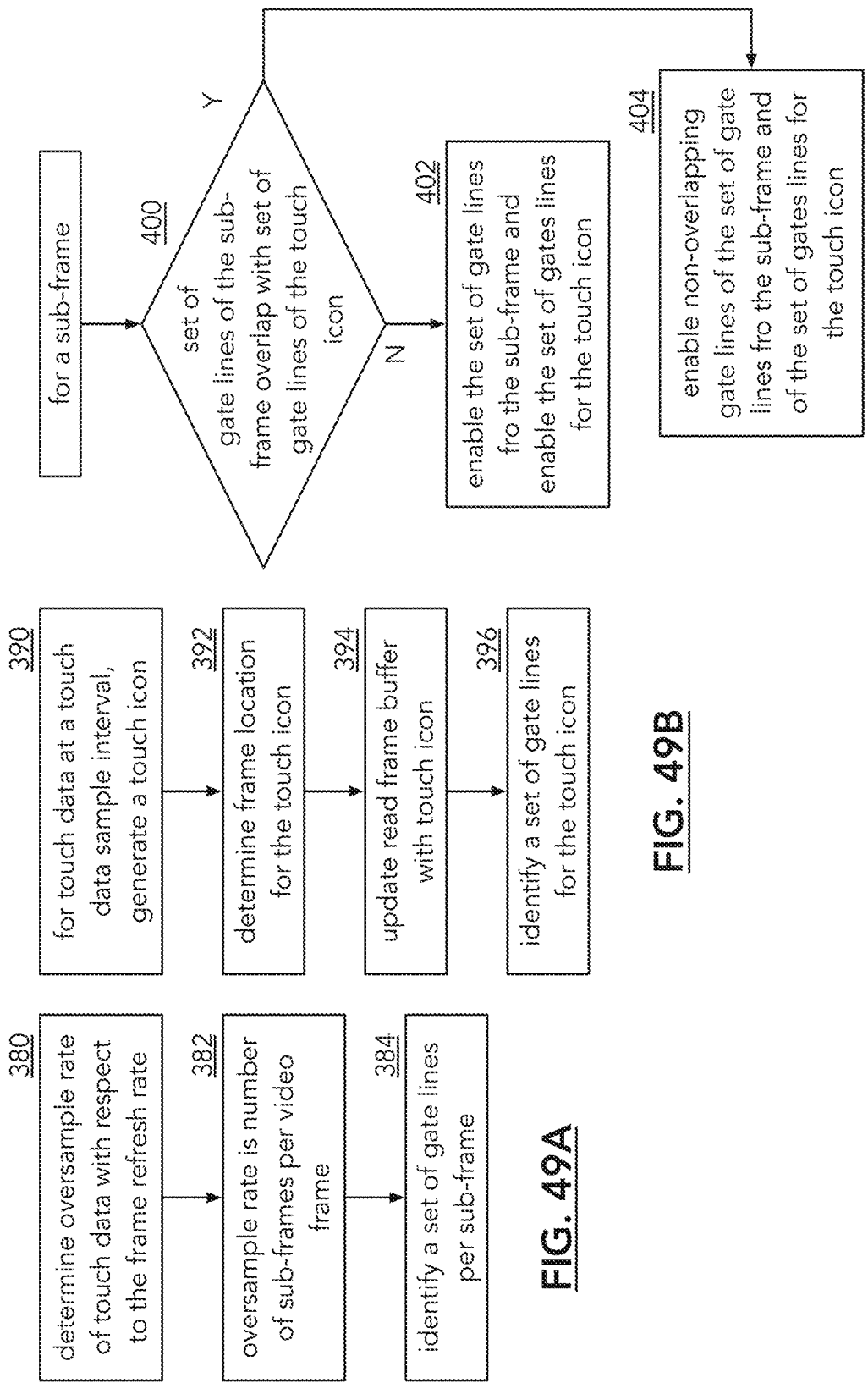

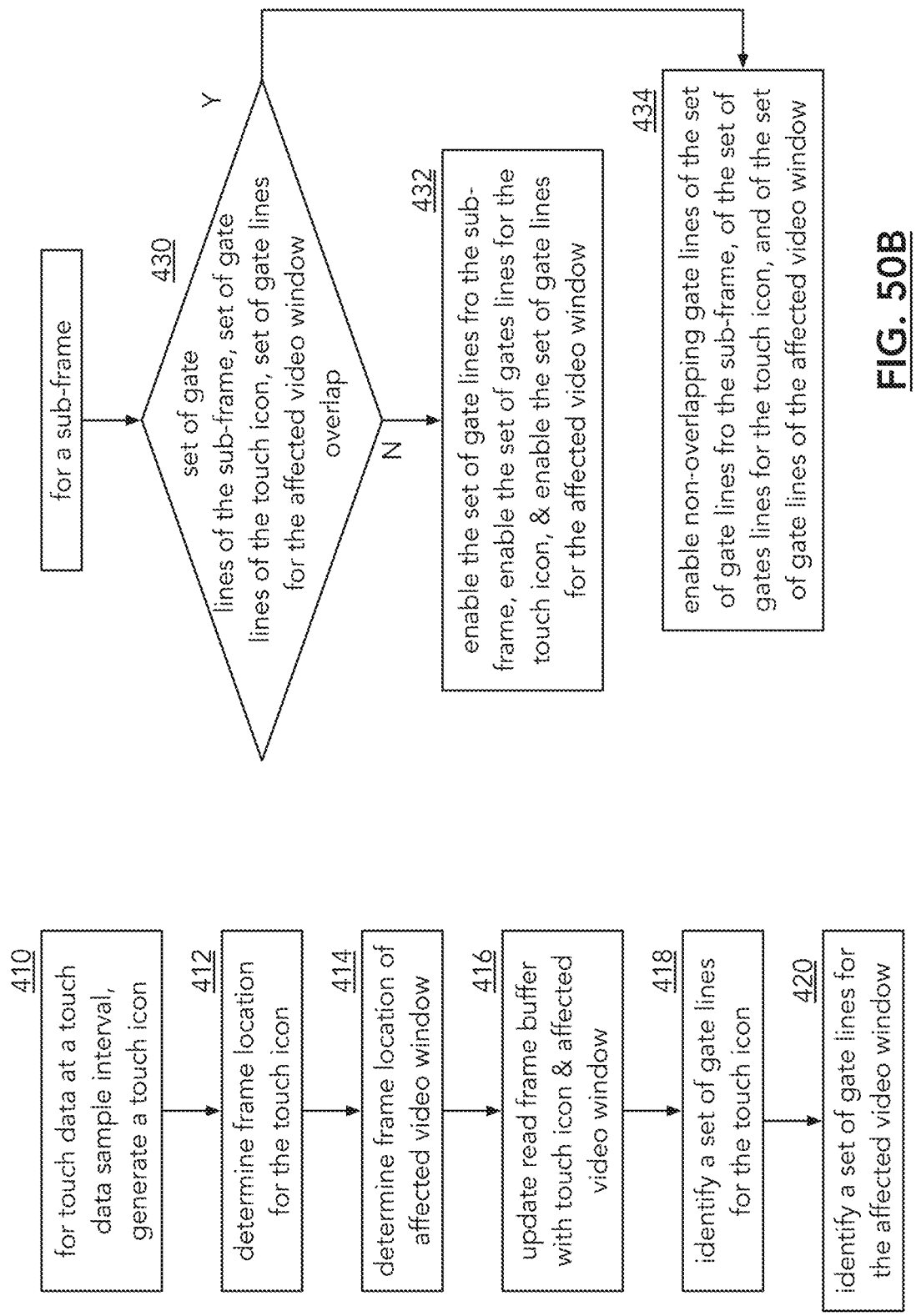

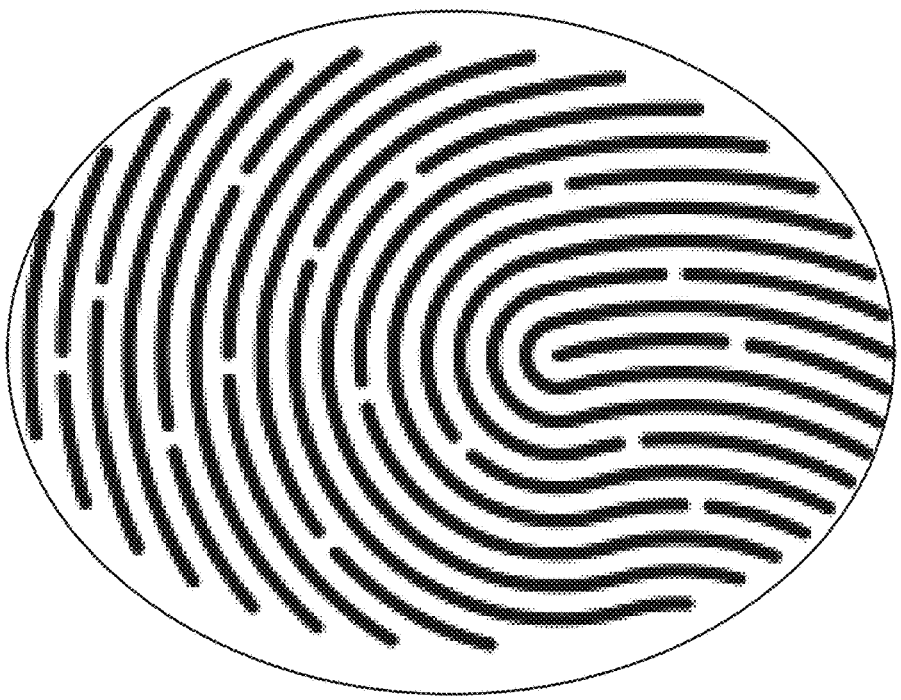
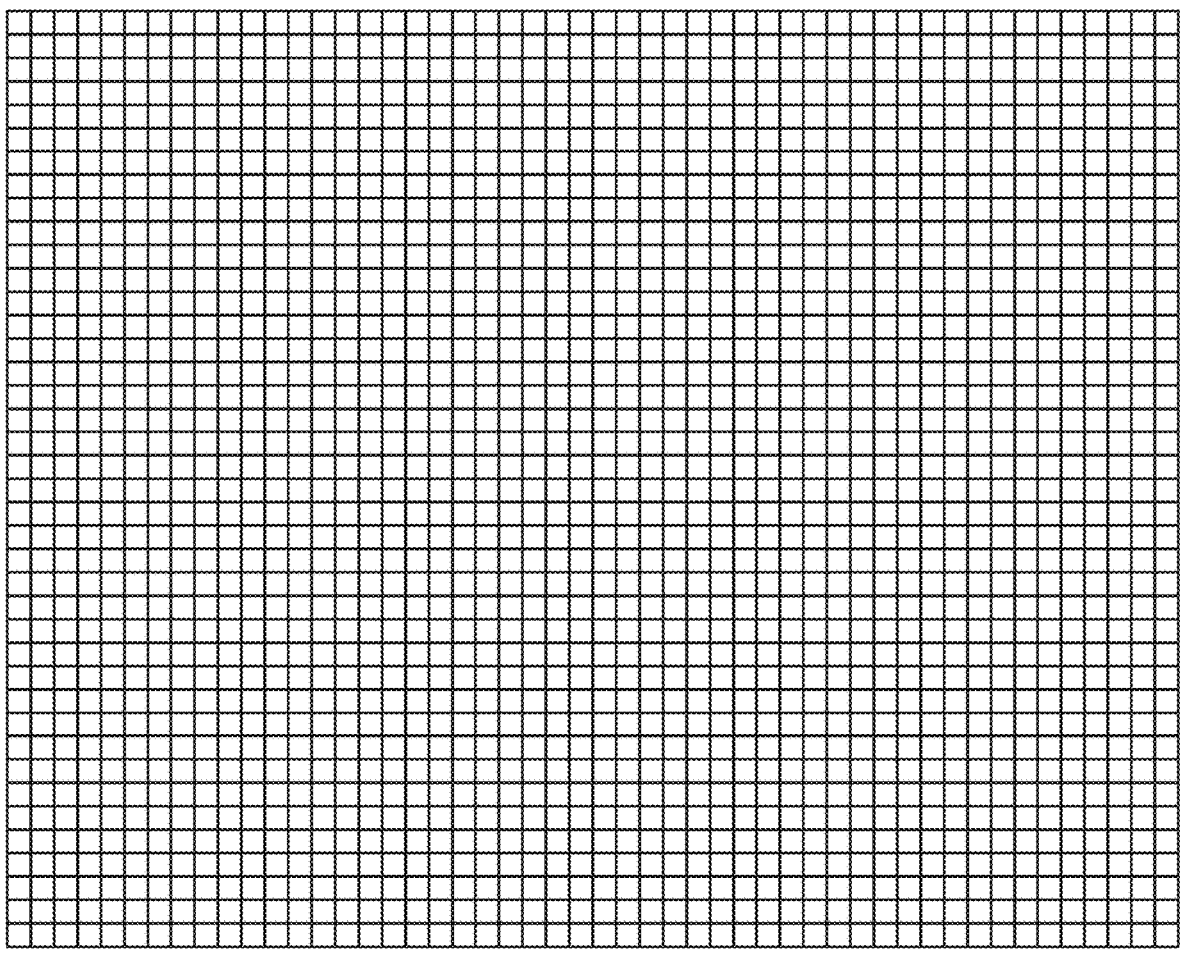
FIG. 57

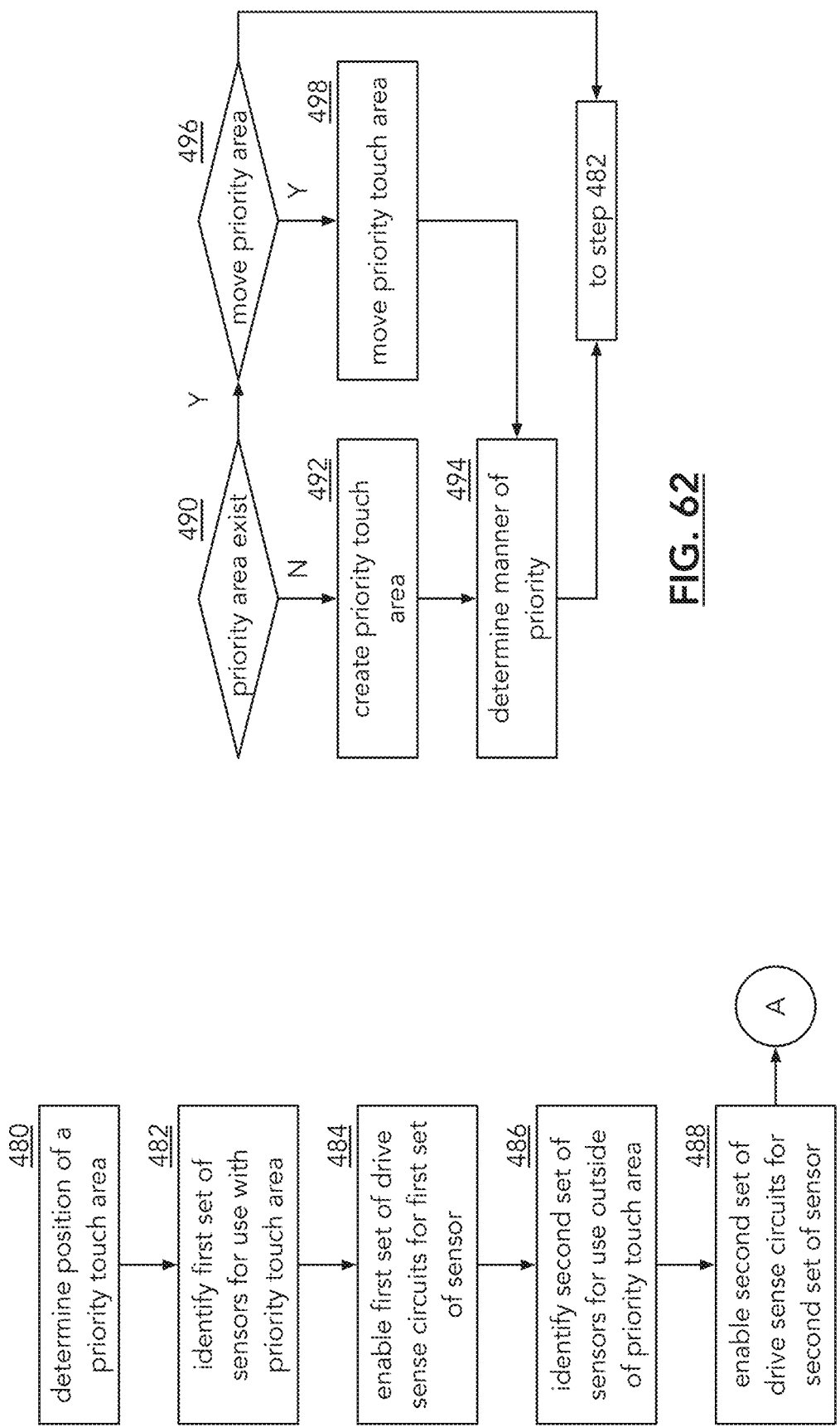

TOUCH ICON OFFSET BASED ON TOUCH DATA SAMPLES

CROSS-REFERENCE TO RELATED APPLICATIONS

Not Applicable.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

Technical Field of the Invention

This invention relates generally to data communication systems and more particularly to sensed data collection and/or communication.

Description of Related Art

Sensors are used in a wide variety of applications ranging from in-home automation to industrial systems, to health care, to transportation, and so on. For example, sensors are placed on bodies, automobiles, airplanes, boats, ships, trucks, motorcycles, cell phones, televisions, touch-screens, industrial plants, appliances, motors, checkout counters, etc. for a variety of applications.

In general, a sensor converts a physical quantity into an electrical or optical signal. For example, a sensor converts a physical phenomenon, such as a biological condition, a chemical condition, an electric condition, an electromagnetic condition, a temperature, a magnetic condition, mechanical motion (position, velocity, acceleration, force, pressure), an optical condition, and/or a radioactivity condition, into an electrical signal.

A sensor includes a transducer, which functions to convert one form of energy (e.g., force) into another form of energy (e.g., electrical signal). There are a variety of transducers to support the various applications of sensors. For example, a transducer is capacitor, a piezoelectric transducer, a piezoresistive transducer, a thermal transducer, a thermal-couple, a photoconductive transducer such as a photoresistor, a photodiode, and/or phototransistor.

A sensor circuit is coupled to a sensor to provide the sensor with power and to receive the signal representing the physical phenomenon from the sensor. The sensor circuit includes at least three electrical connections to the sensor: one for a power supply; another for a common voltage reference (e.g., ground); and a third for receiving the signal representing the physical phenomenon. The signal representing the physical phenomenon will vary from the power supply voltage to ground as the physical phenomenon changes from one extreme to another (for the range of sensing the physical phenomenon).

The sensor circuits provide the received sensor signals to one or more computing devices for processing. The computing device processes the sensor signals for a variety of applications. For example, the computing device processes sensor signals to determine temperatures of a variety of items in a refrigerated truck during transit. As another example, the computing device processes the sensor signals to determine a touch on a touch screen. As yet another example, the computing device processes the sensor signals to determine various data points in a production line of a product.

BRIEF DESCRIPTION OF THE SEVERAL VIEWS OF THE DRAWING(S)

The patent or application file contains at least one drawing executed in color. Copies of this patent or patent application publication with color drawing(s) will be provided by the Office upon request and payment of the necessary fee.

Figure 1:
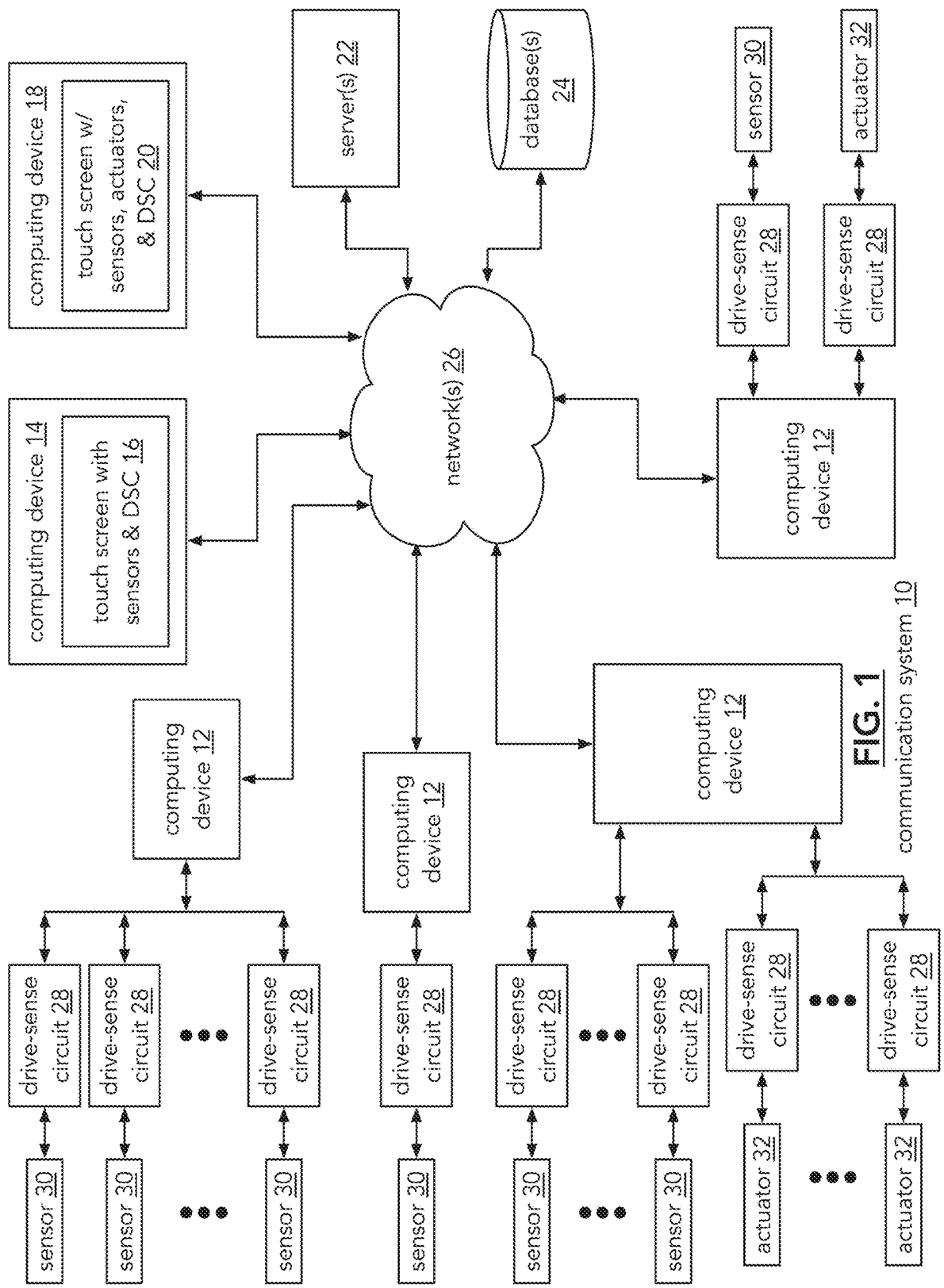
FIG. 1 is a schematic block diagram of an embodiment of a communication system.
Figure 2:
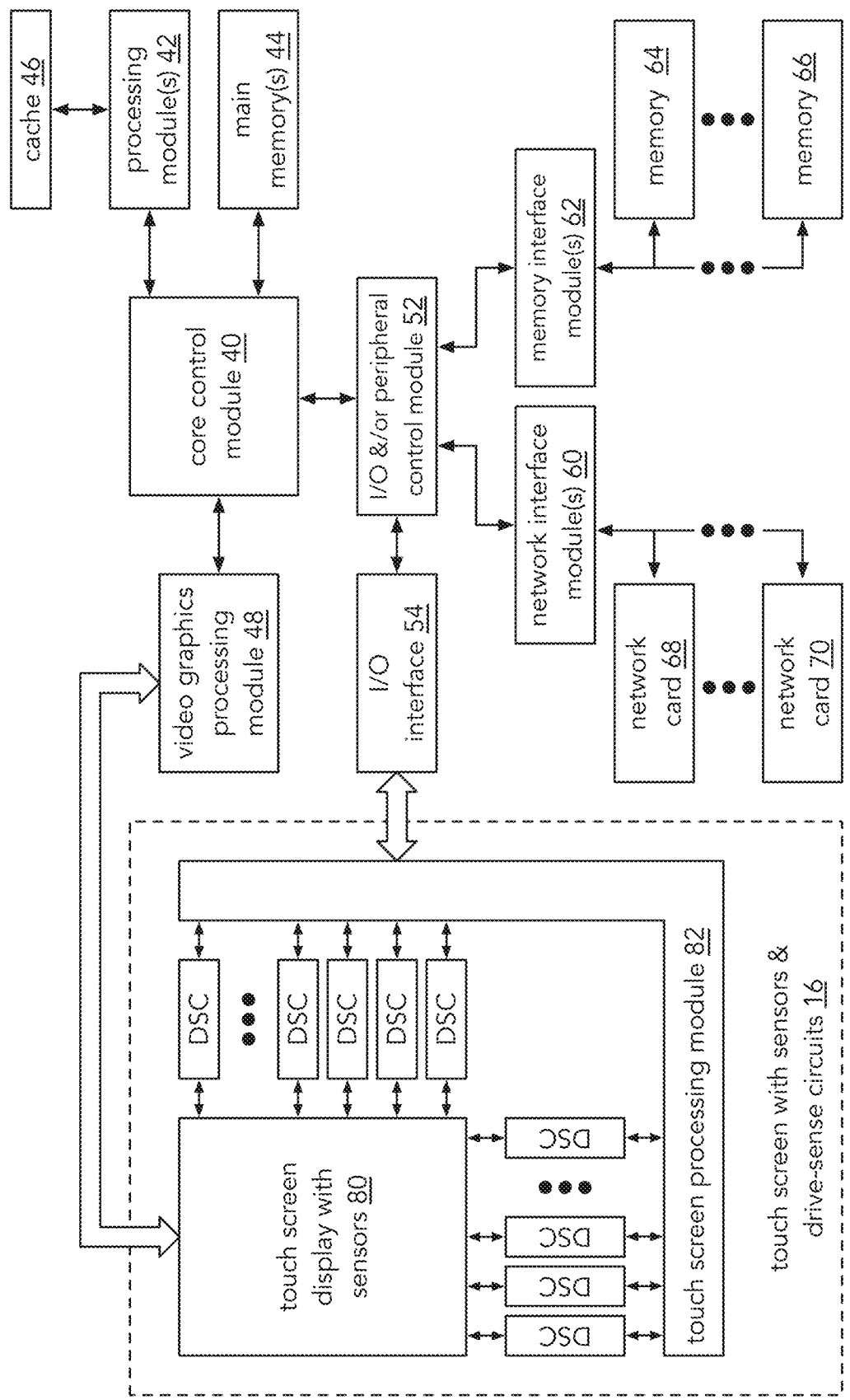
FIG. 2 and FIG. 2A are schematic block diagrams of an embodiment of a computing device.
Figure 3:
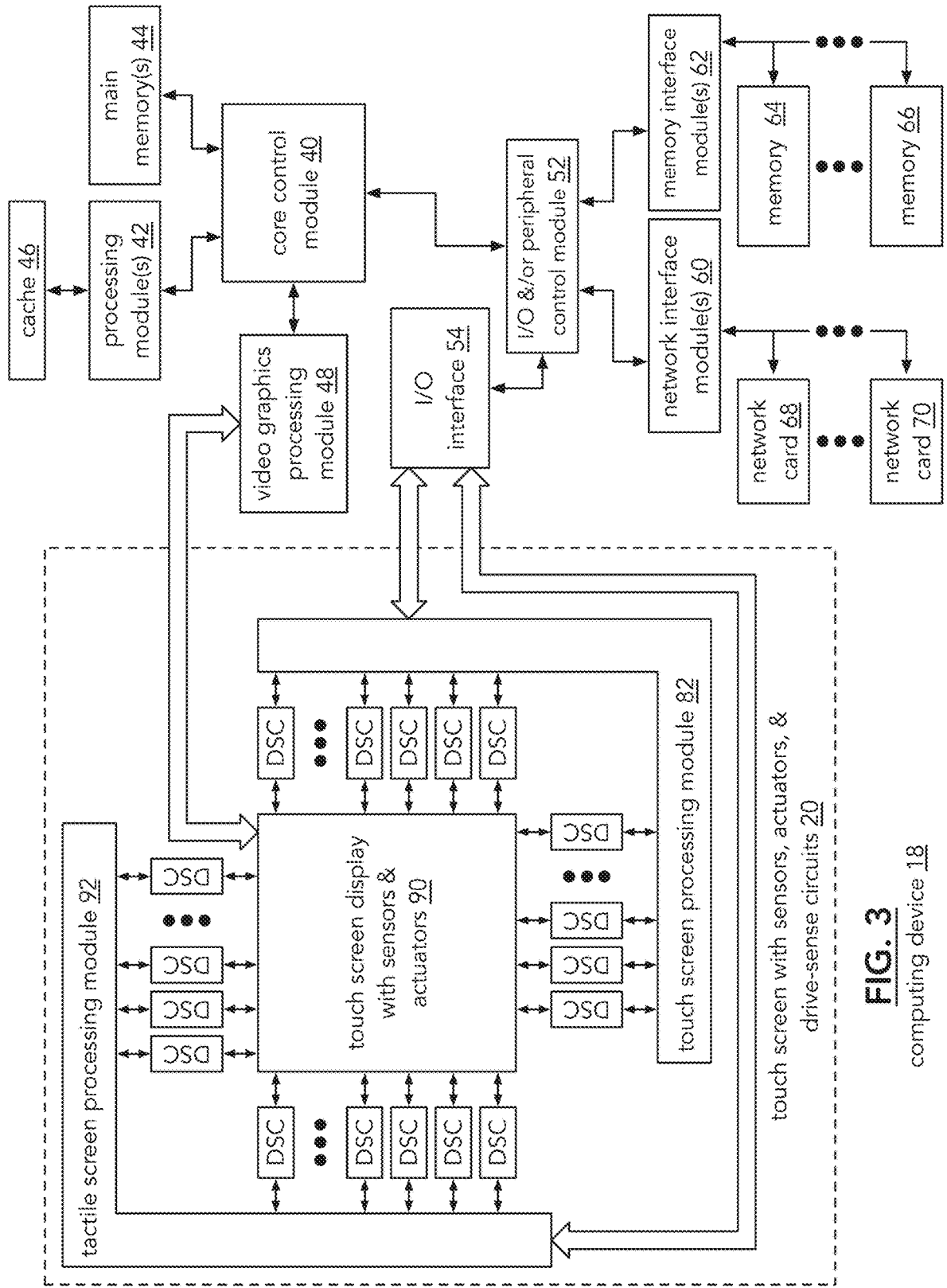
FIG. 3 is a schematic block diagram of another embodiment of a computing device.
Figure 9A:
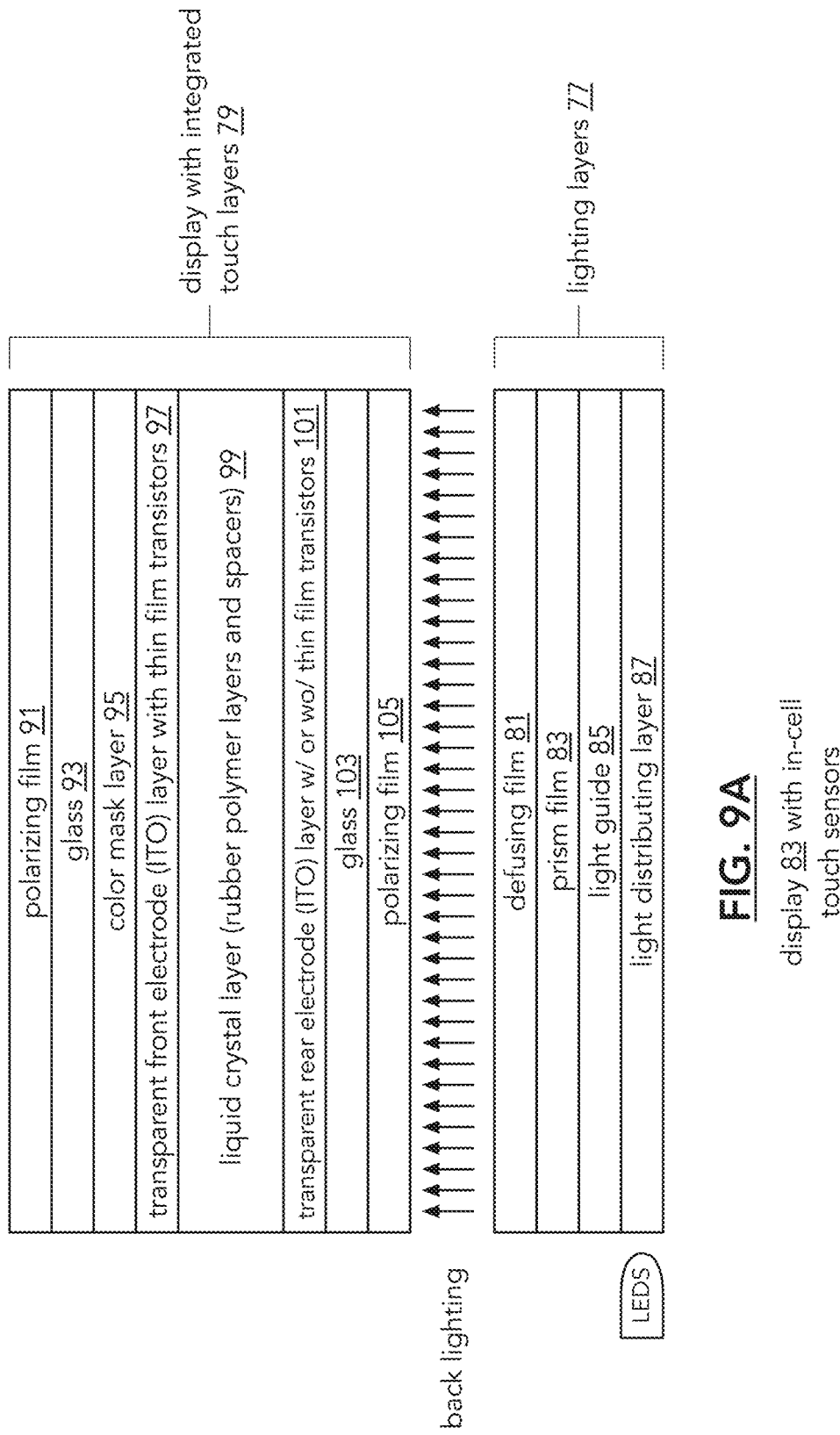
FIG. 9A is a cross section schematic block diagram of an example of a touch screen display with in-cell touch sensors.
Figure 9B:
FIG. 9B is a schematic block diagram of an example of a transparent electrode layer with thin film transistors.
Figure 9C:
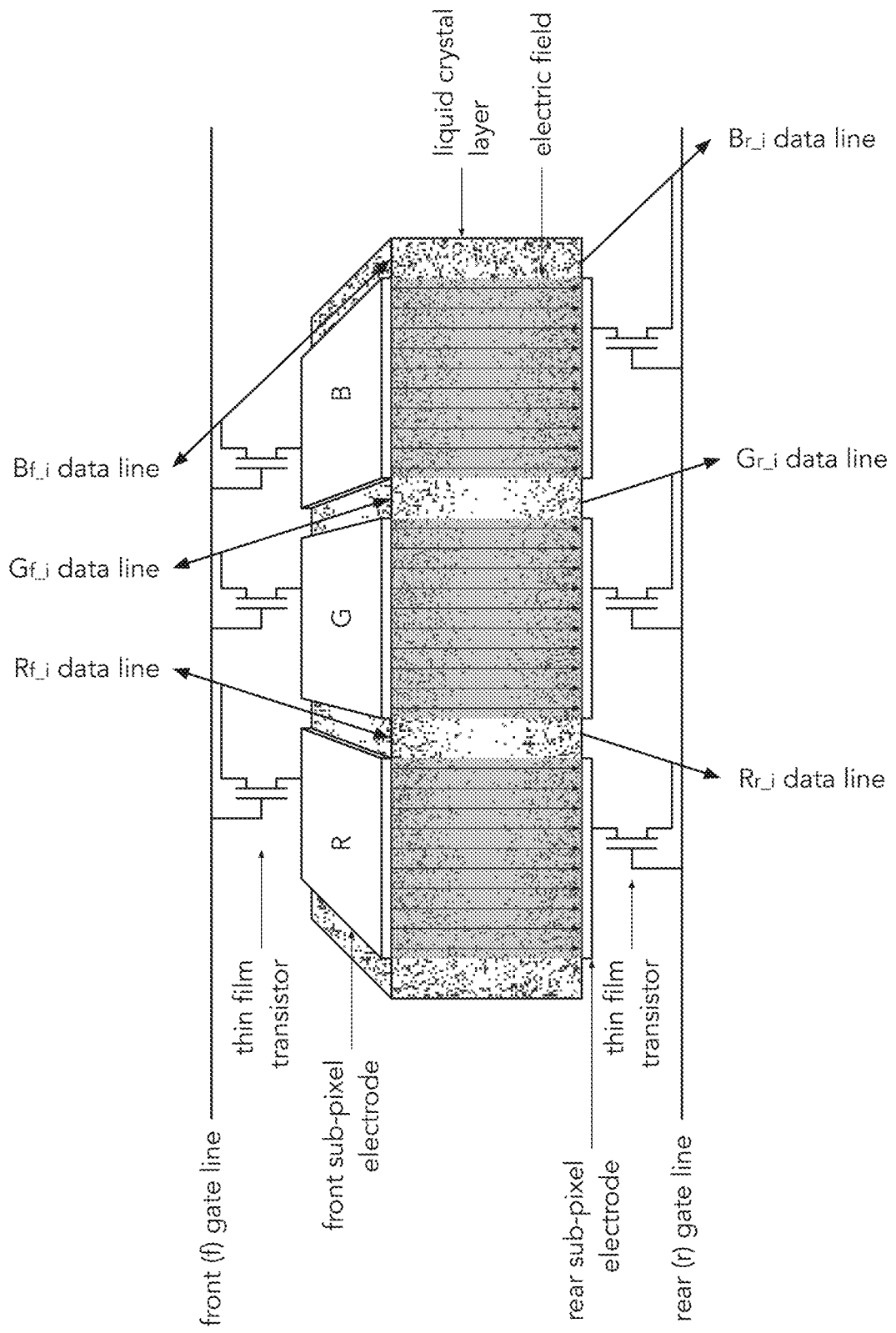
FIG. 9C is a schematic block diagram of an example of a pixel with three sub-pixels.
Figure 9D:
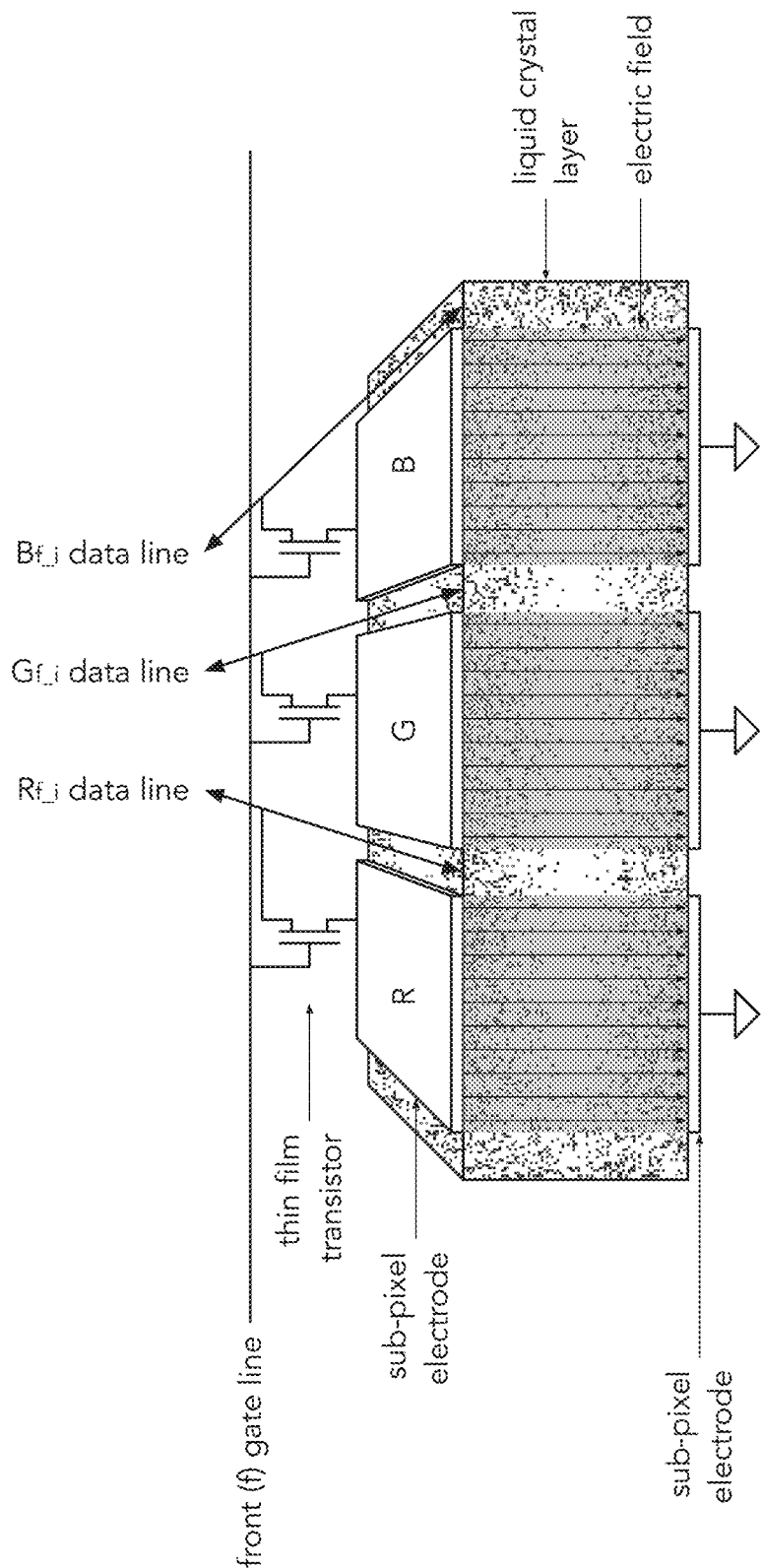
FIG. 9D is a schematic block diagram of another example of a pixel with three sub-pixels.
Figure 9E:
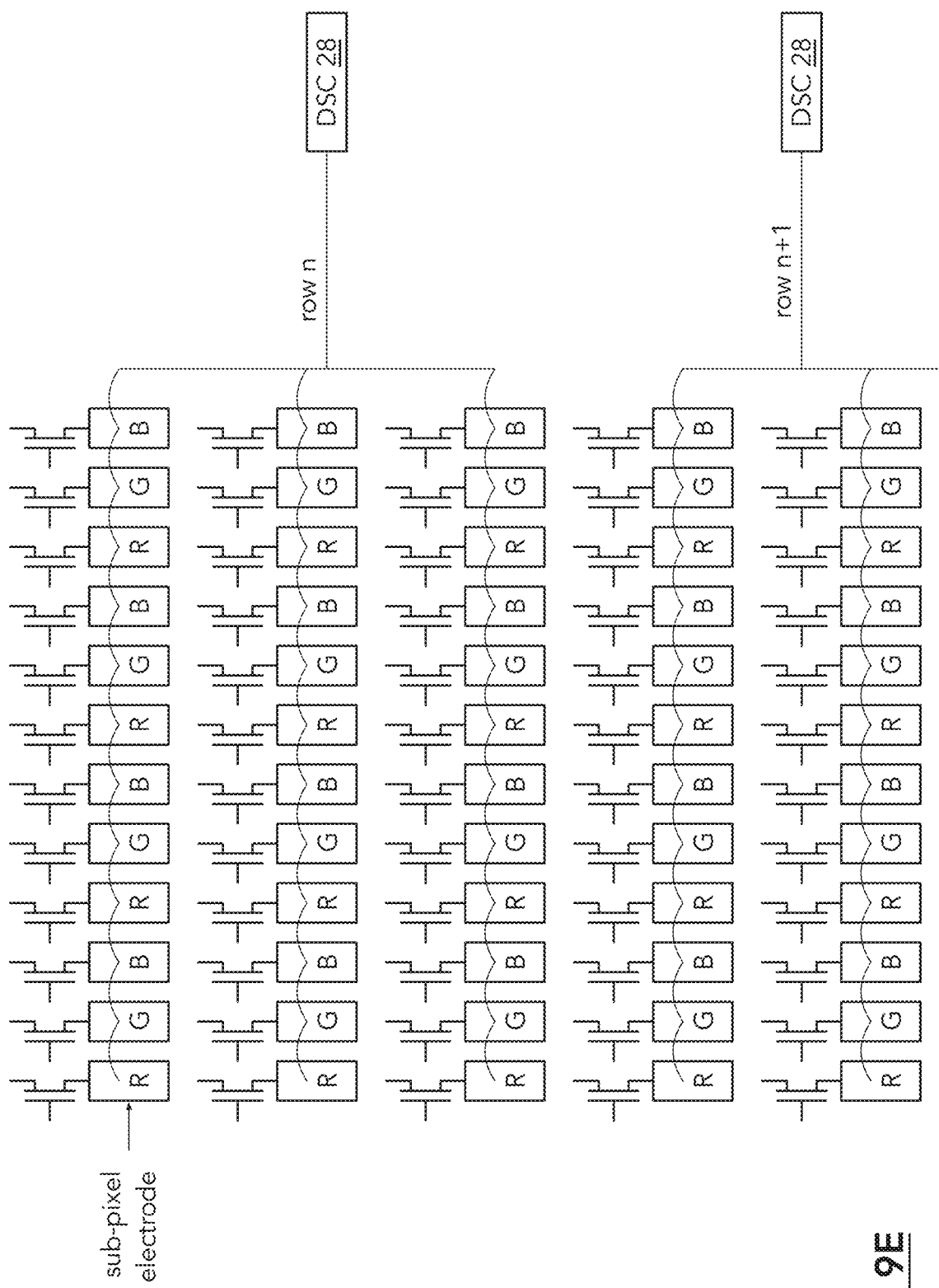
FIG. 9E is a schematic block diagram of an example of sub-pixel electrodes coupled together to form row electrodes of a touch screen sensor.
Figure 9F:
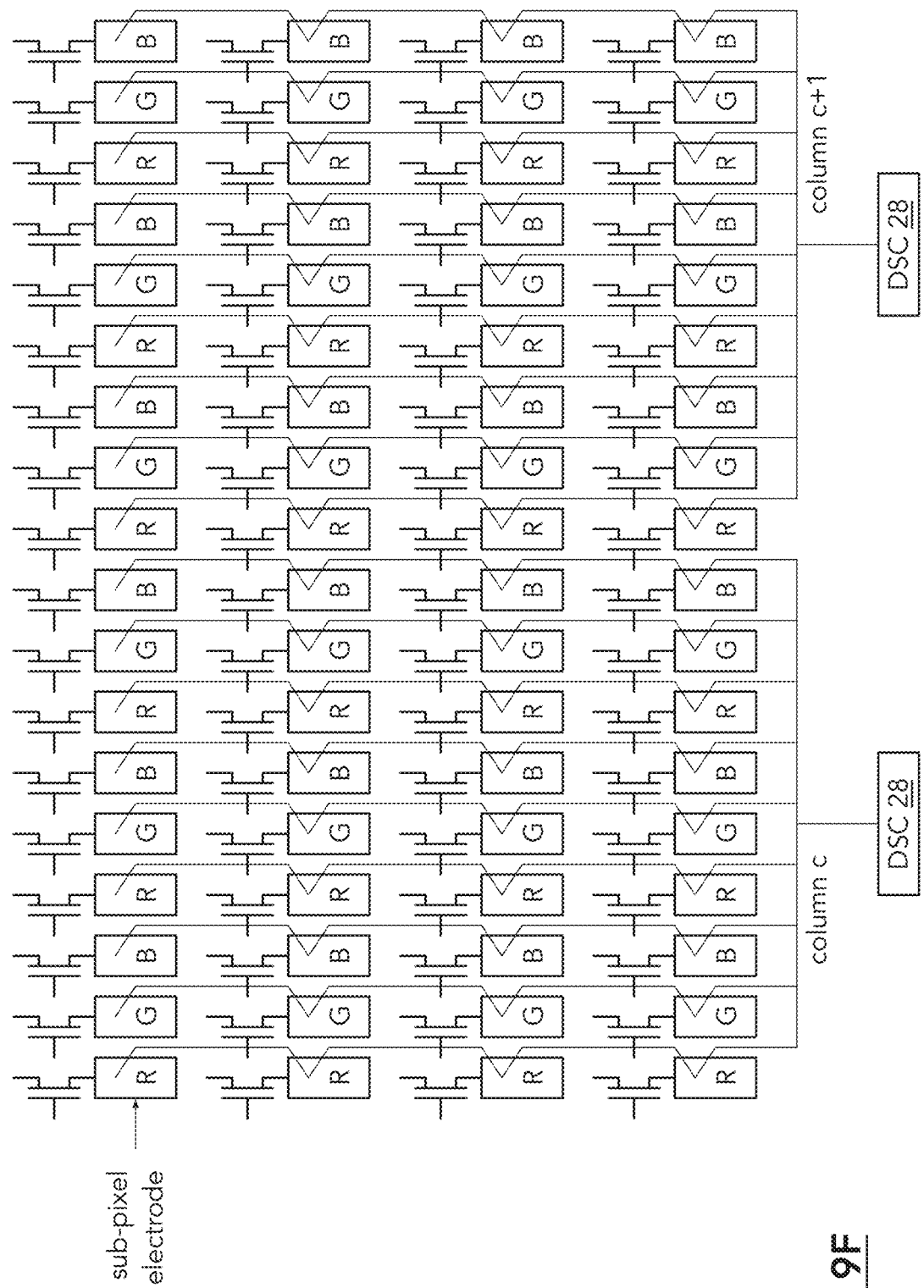
FIG. 9F is a schematic block diagram of an example of sub-pixel electrodes coupled together to form column electrodes of a touch screen sensor.
Figure 9G:
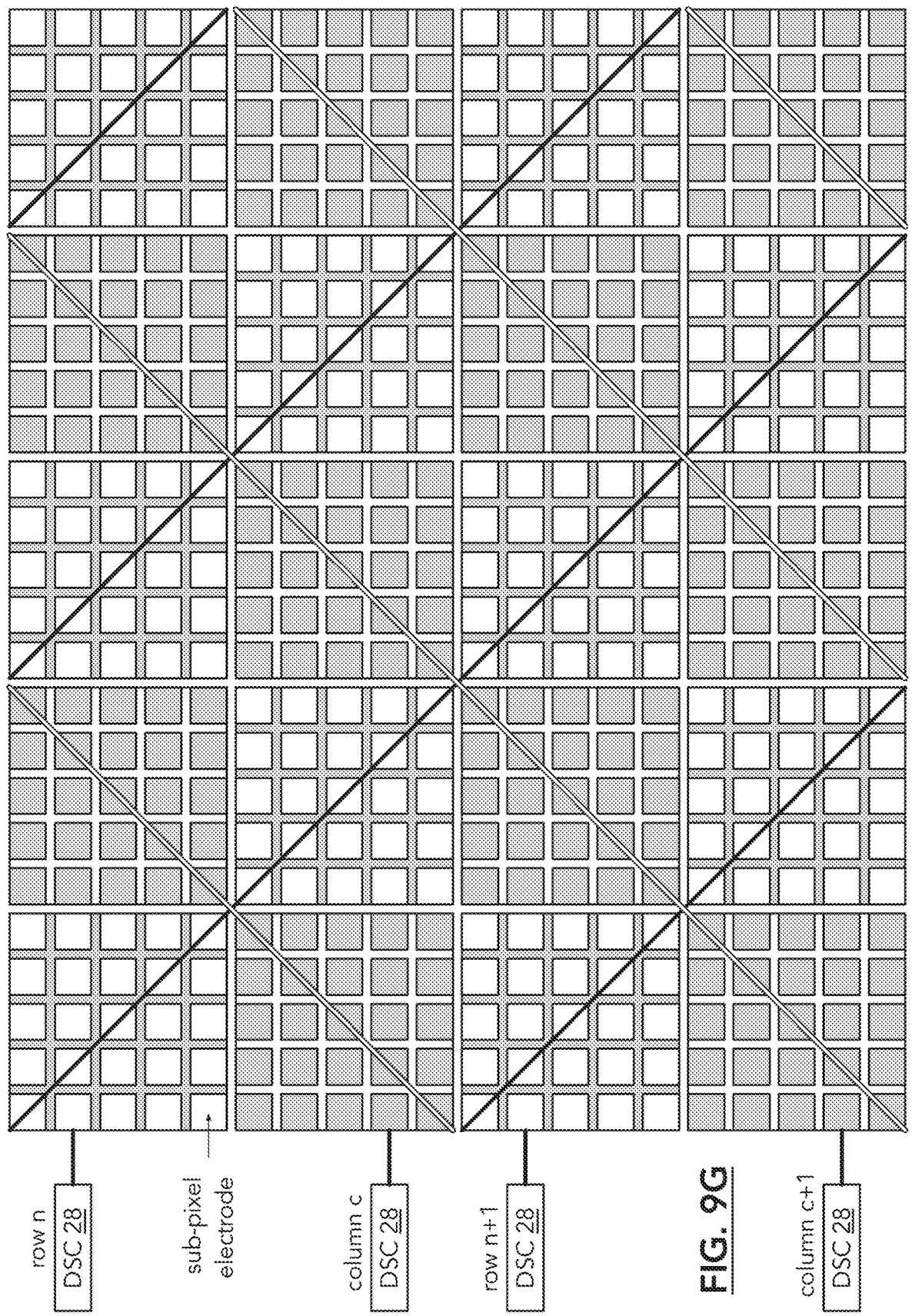
FIG. 9G is a schematic block diagram of an example of sub-pixel electrodes coupled together to form row electrodes and column electrodes of a touch screen sensor.
Figure 9I:
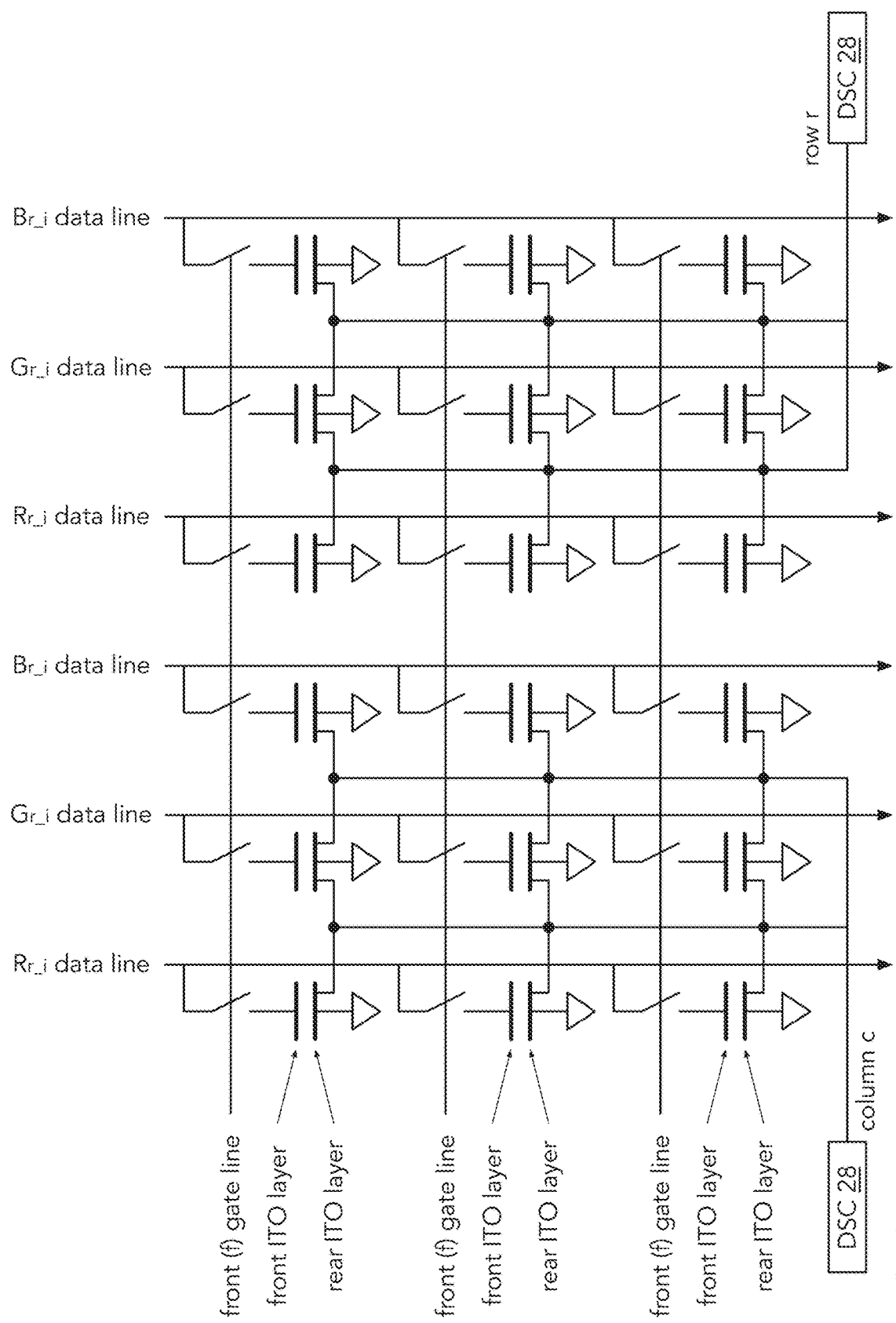
Figure 9J:
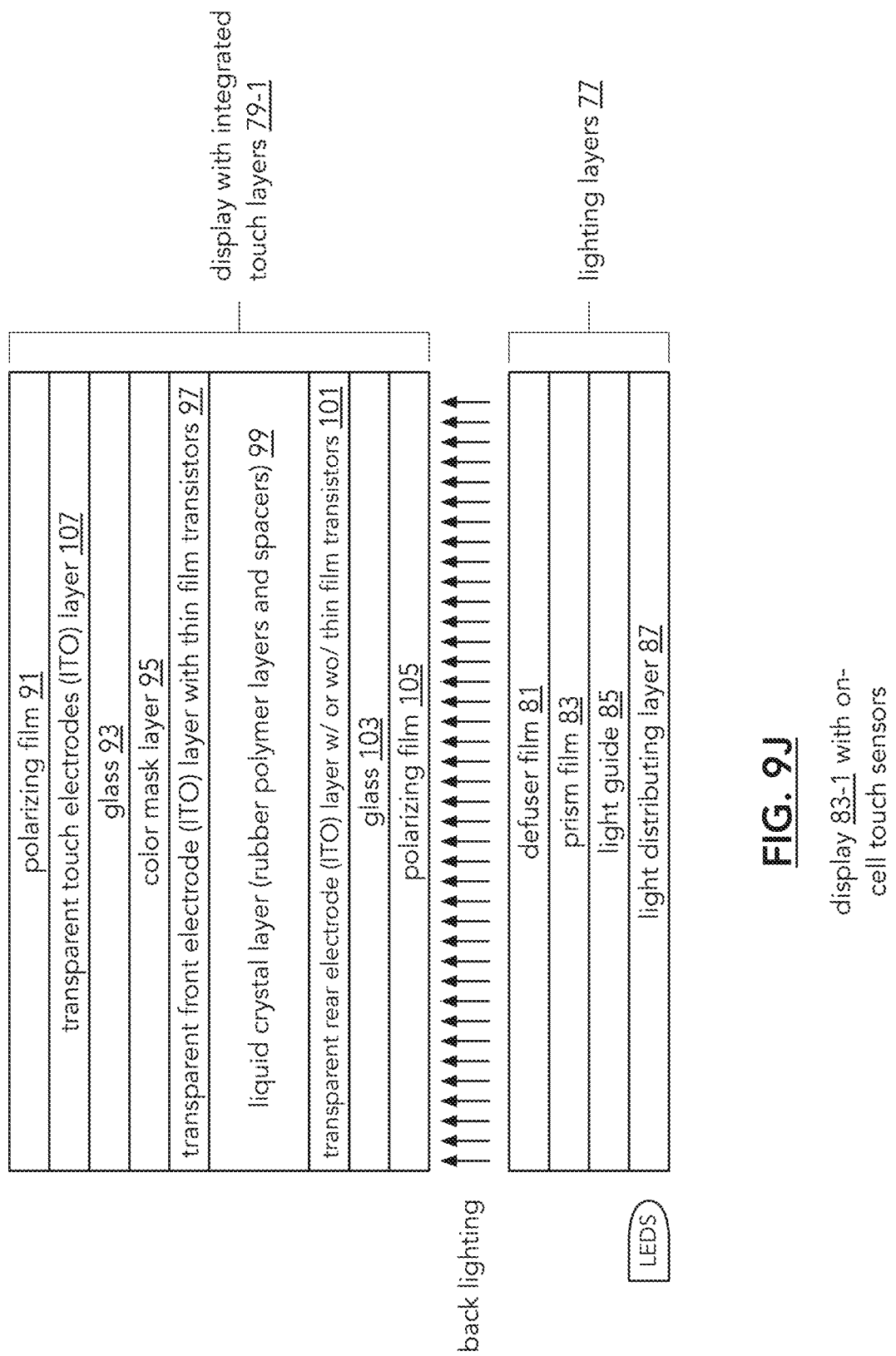
Figure 10A:
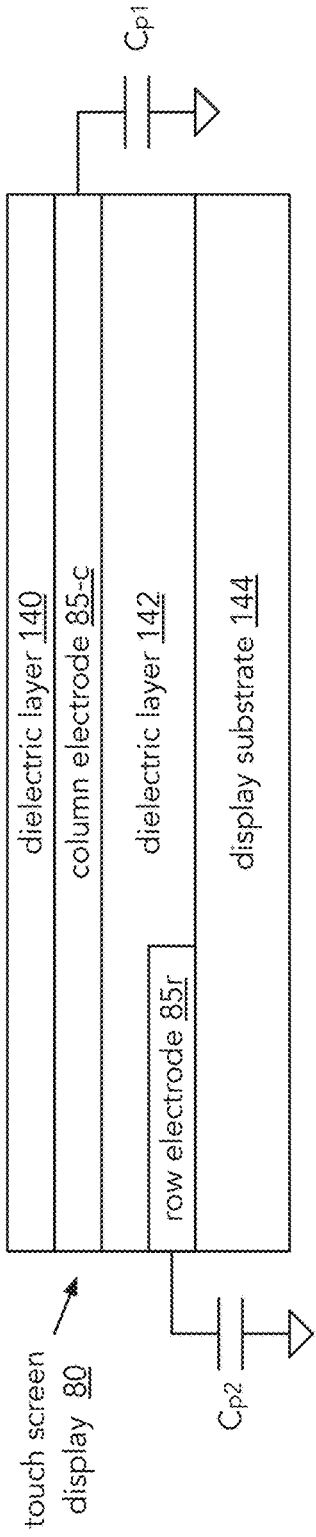
Figure 10B:
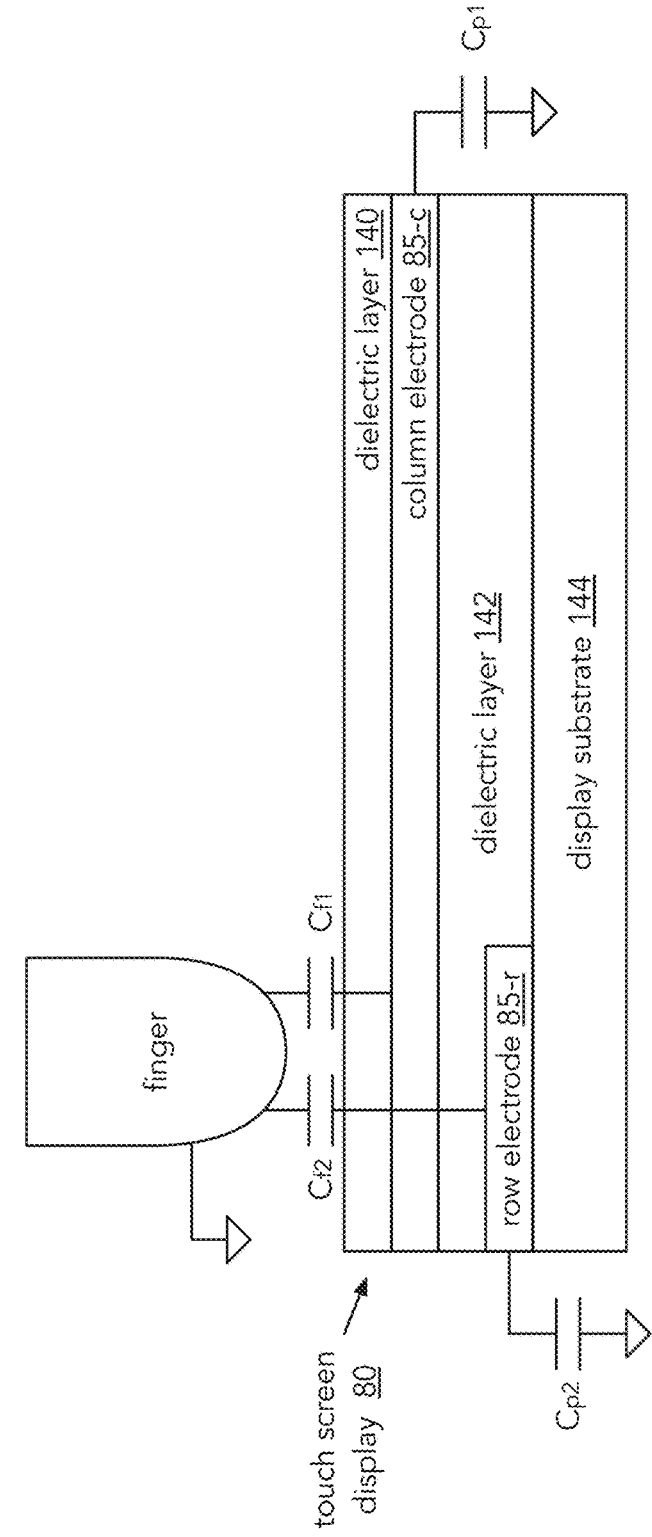
Figure 12:
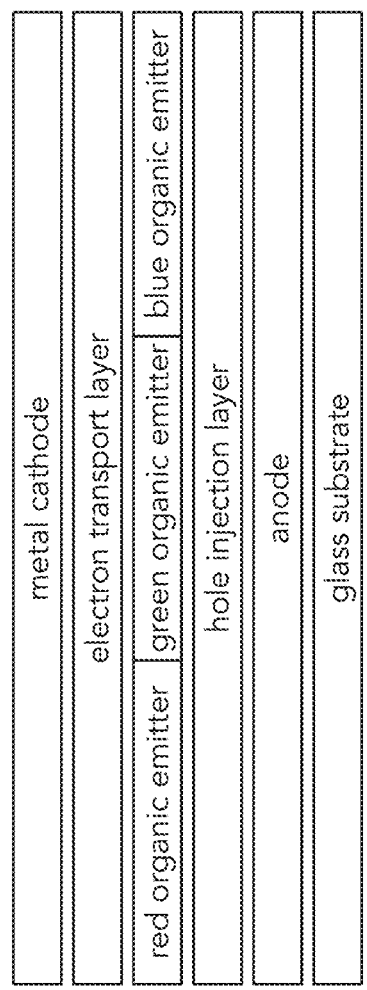
Figure 17:
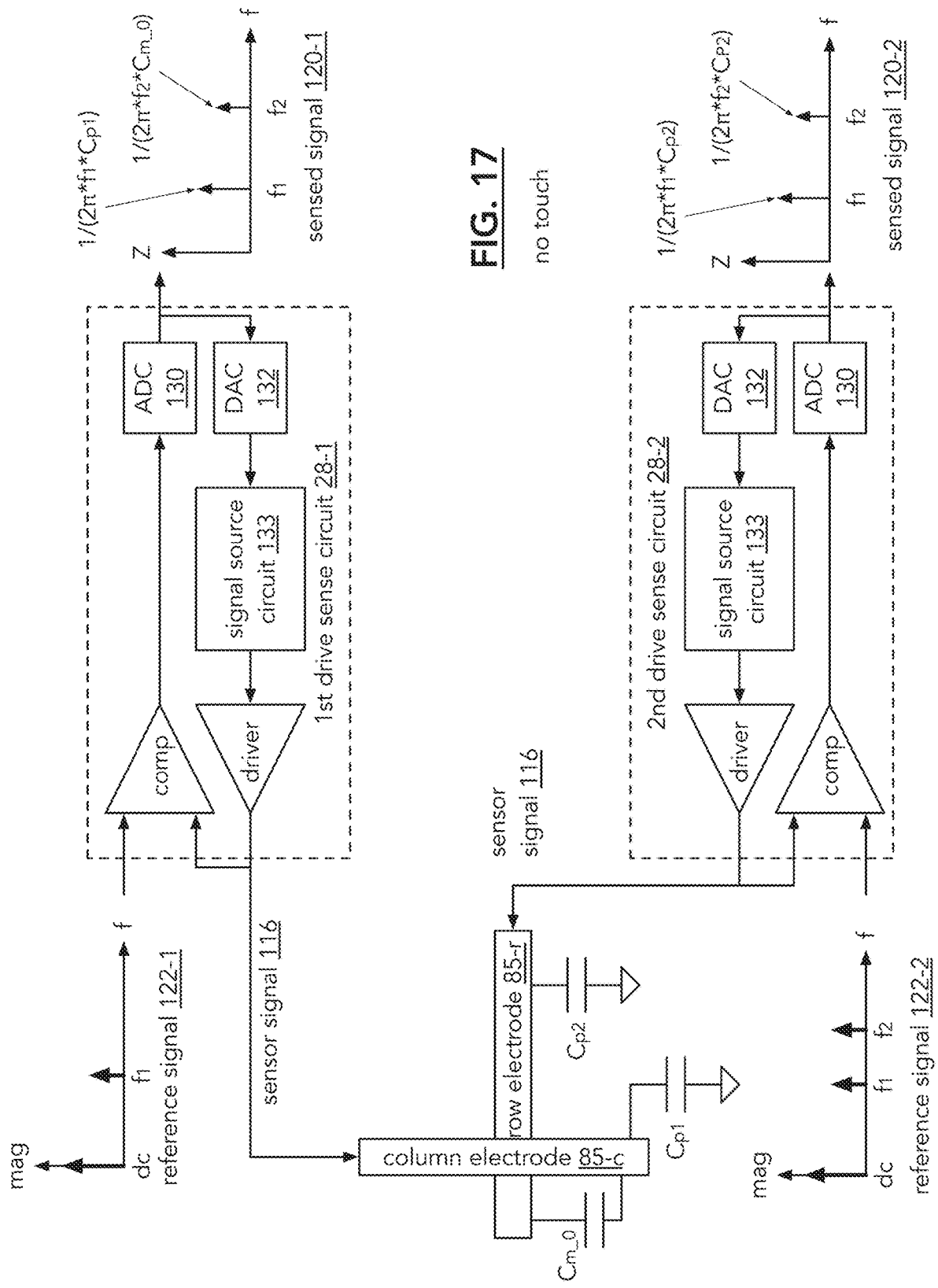
Figure 18:
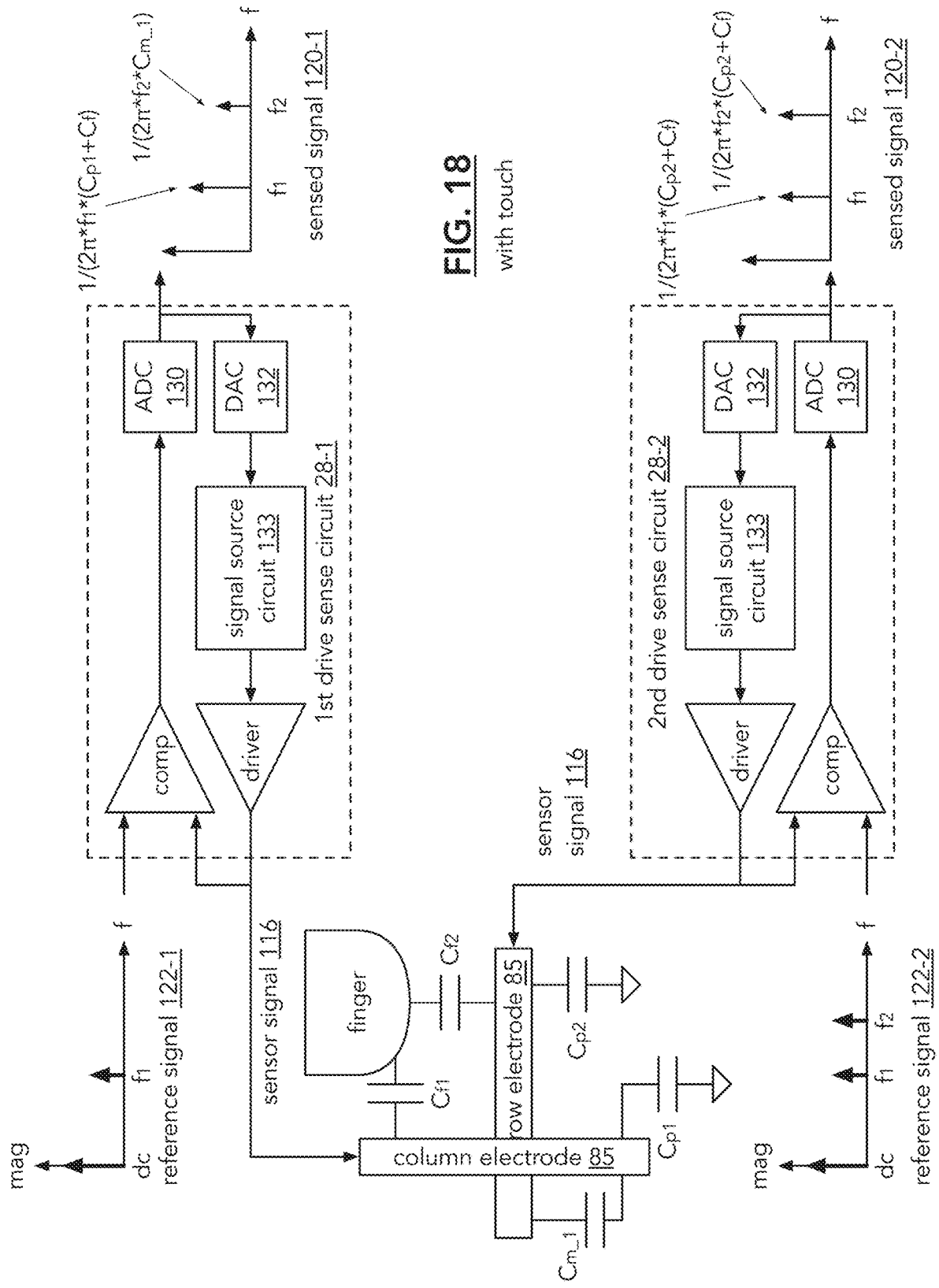
Figure 19:
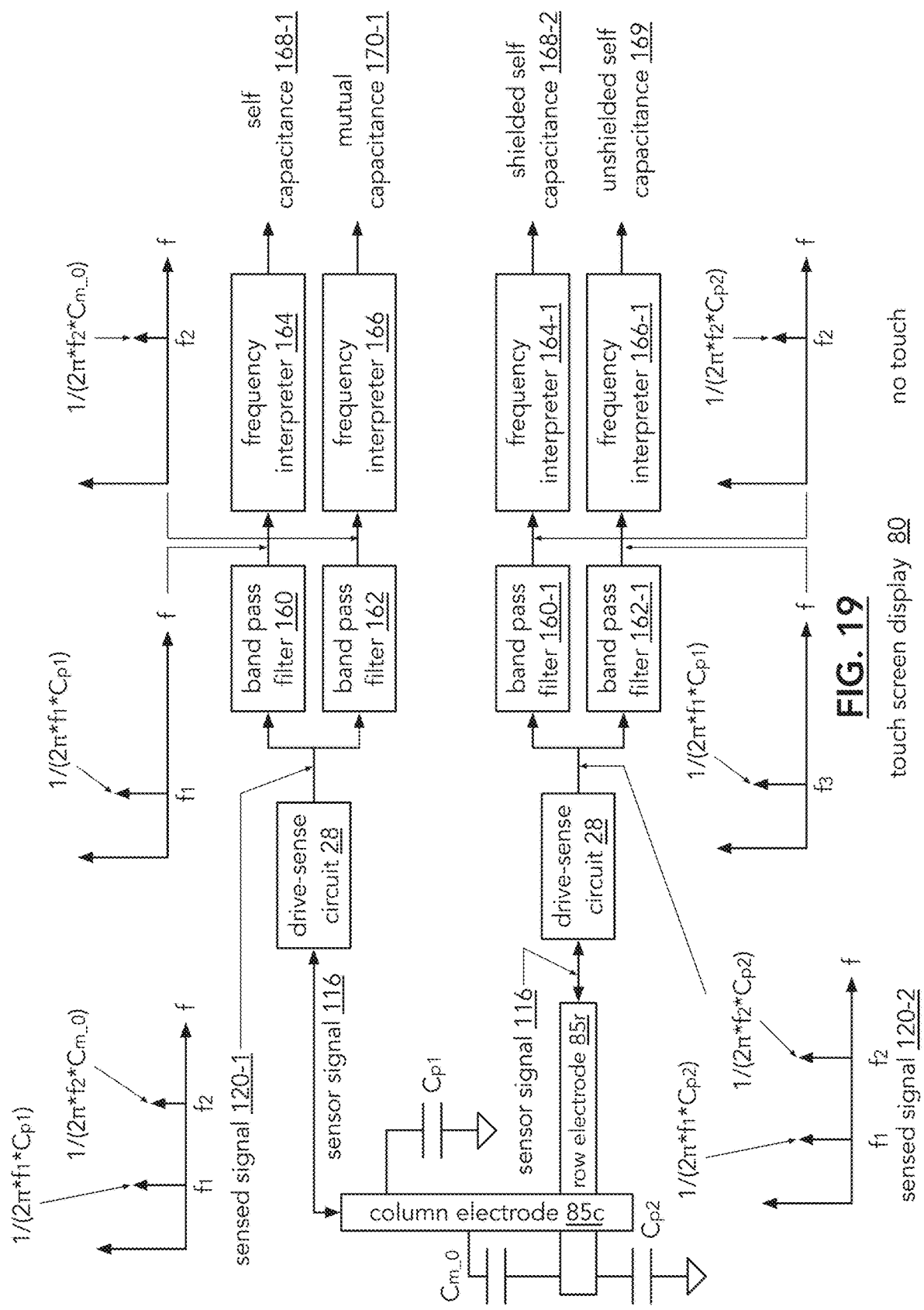
Figure 20:
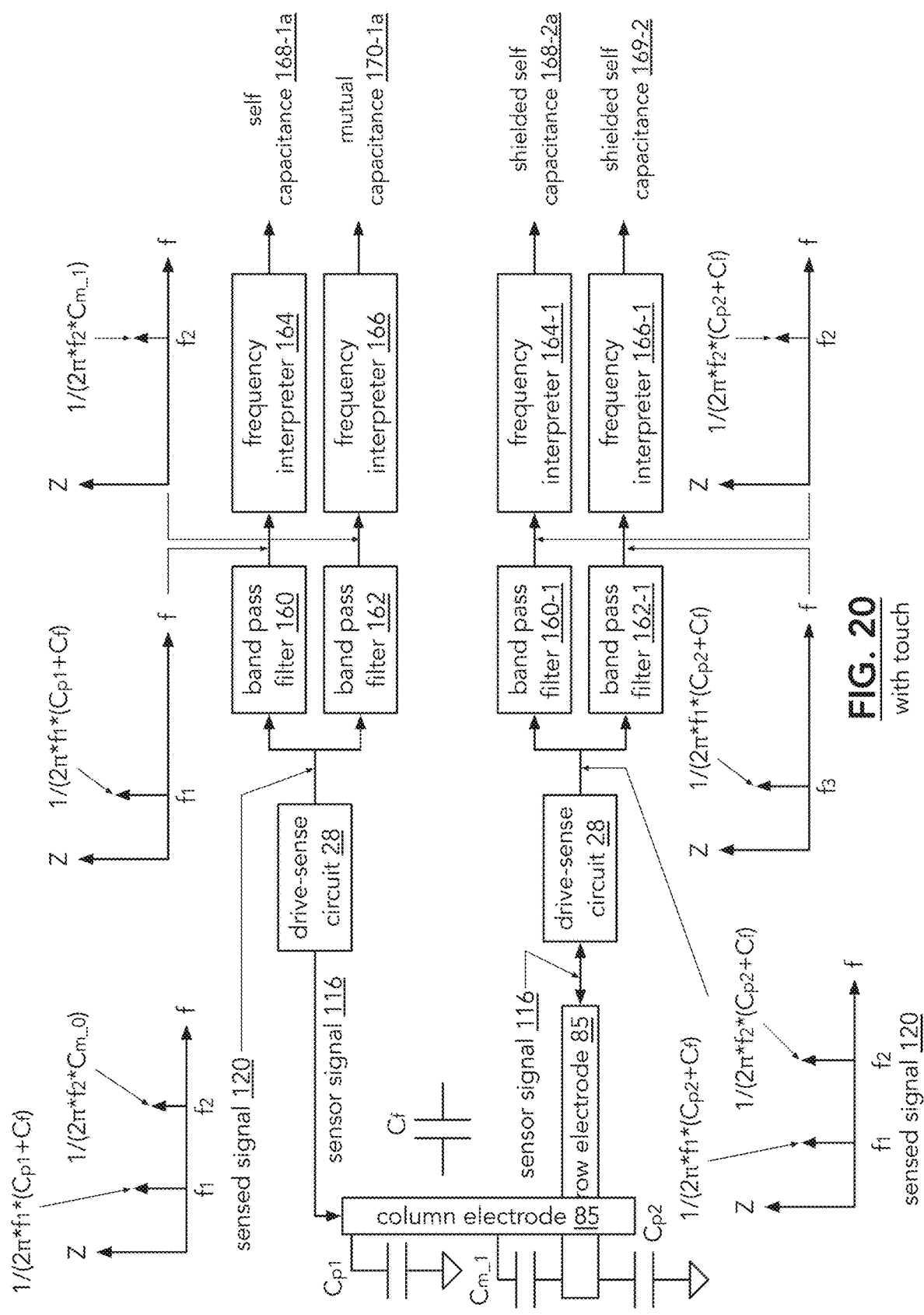
Figure 21:
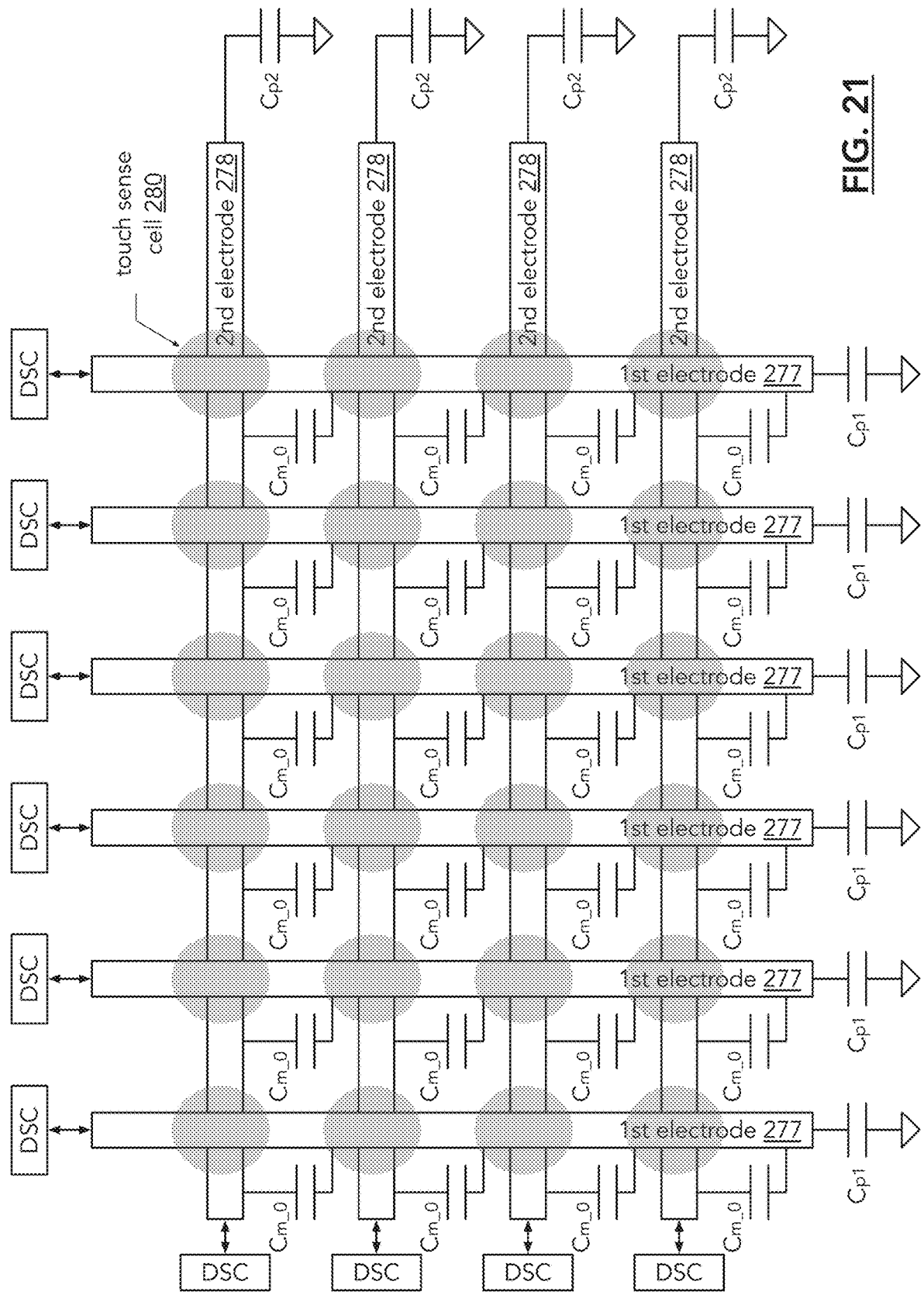
Figure 22:
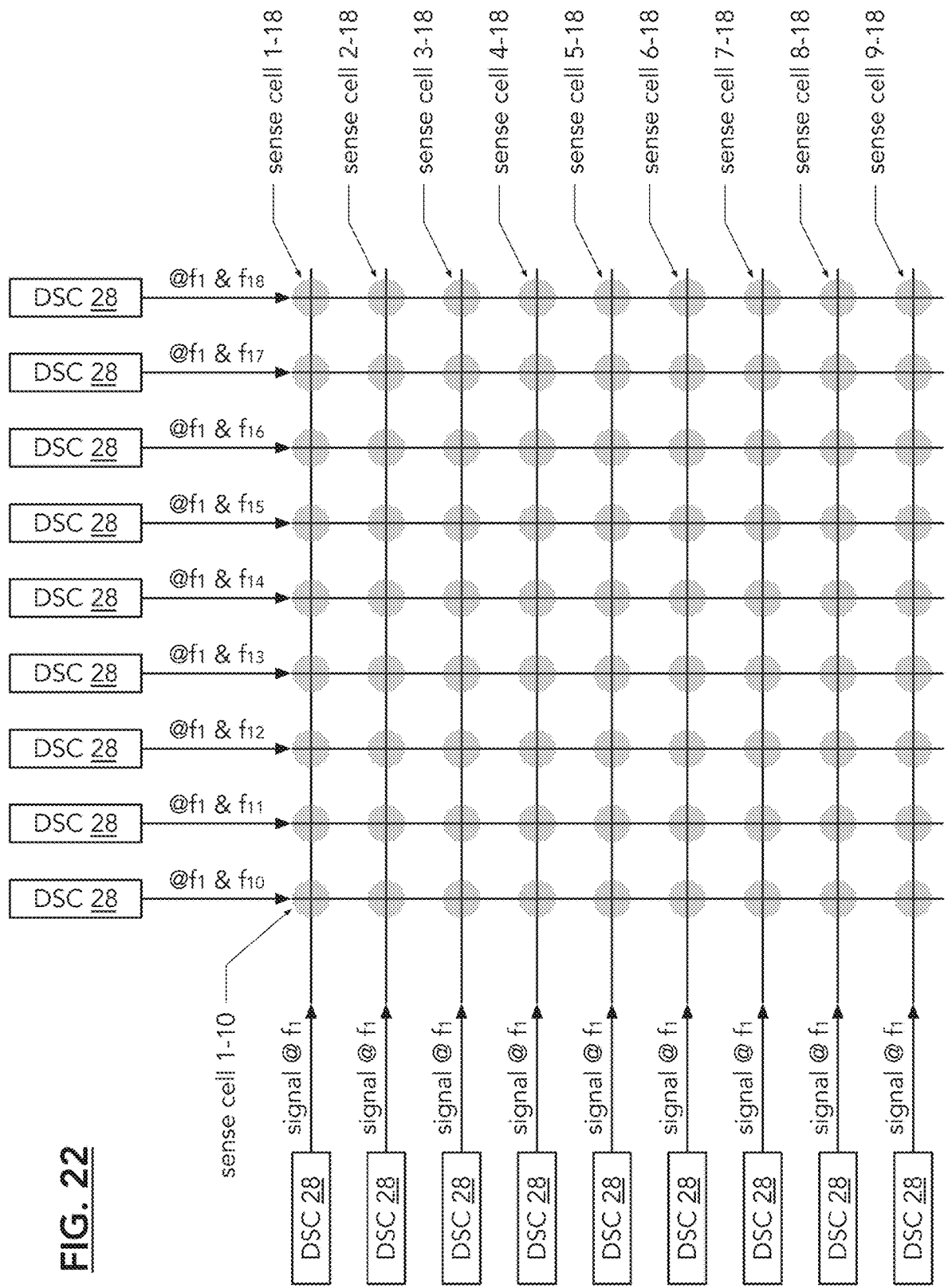
Figure 23C:
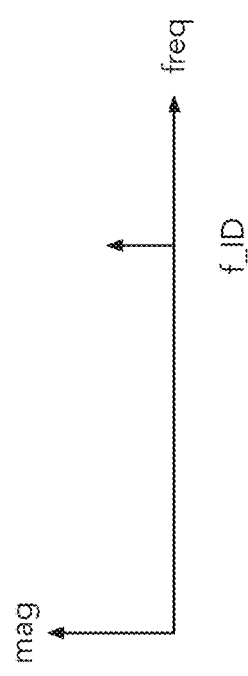
Figure 23D:
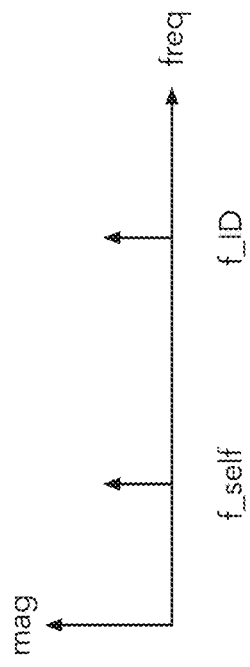
Figure 23E:
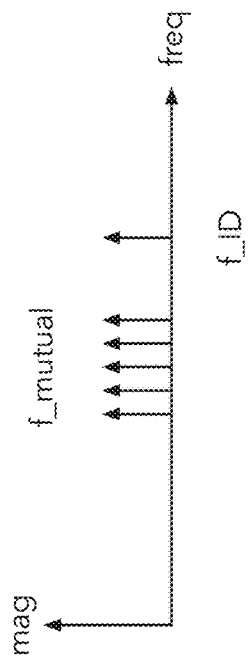
Figure 23A:
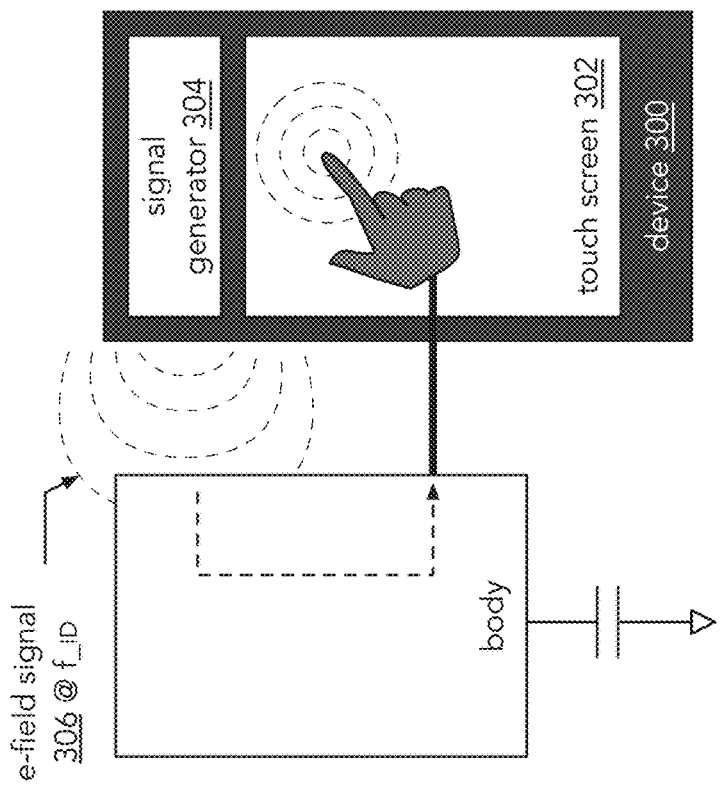
Figure 23B:
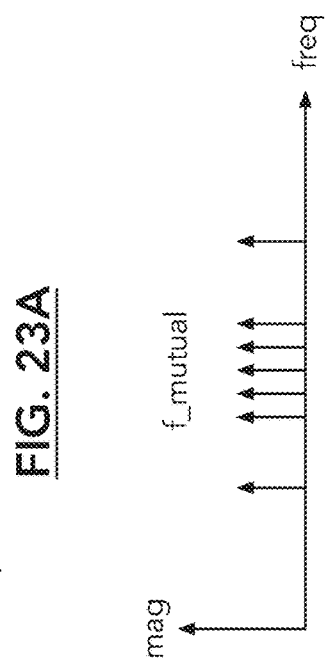
Figure 23F:
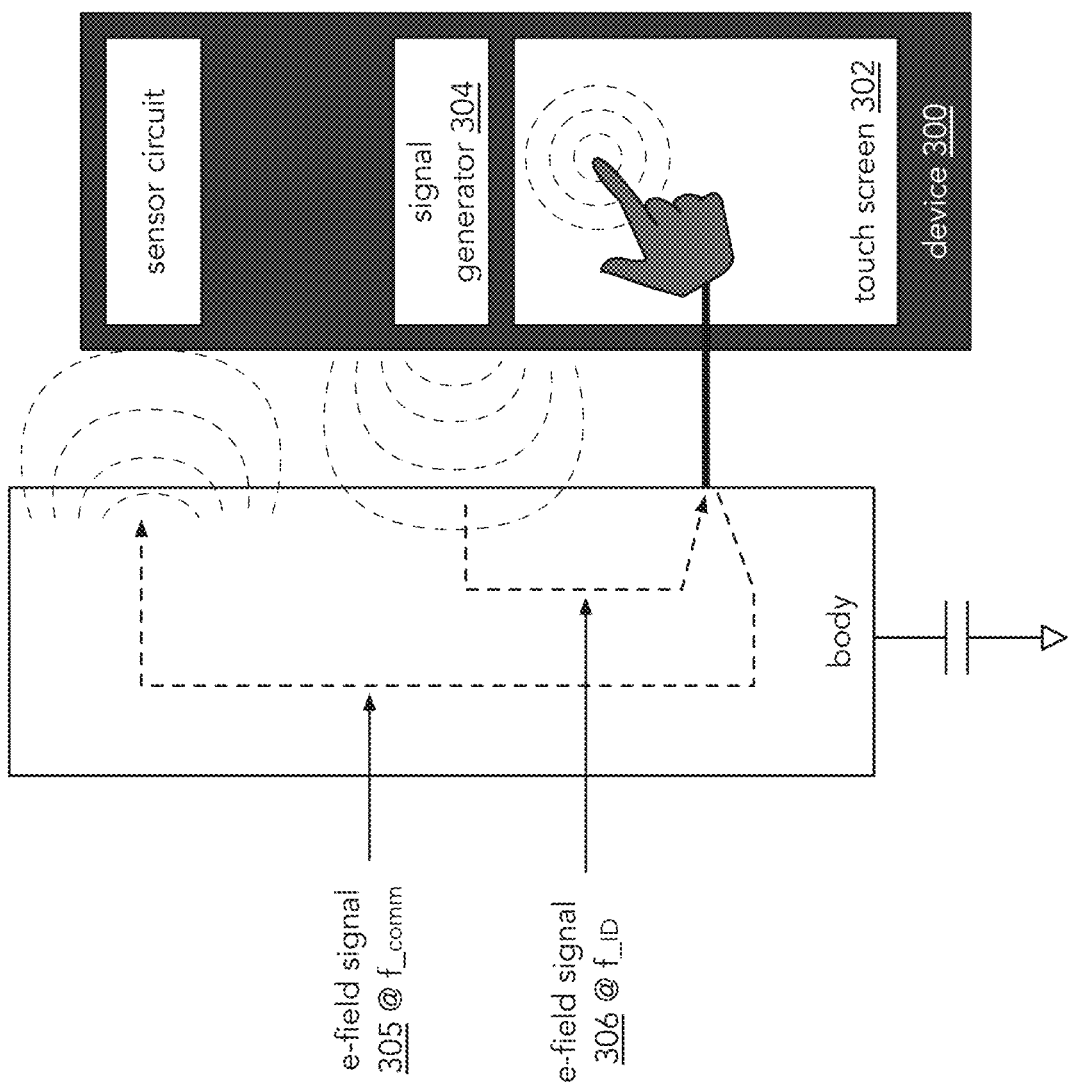
Figure 24A:
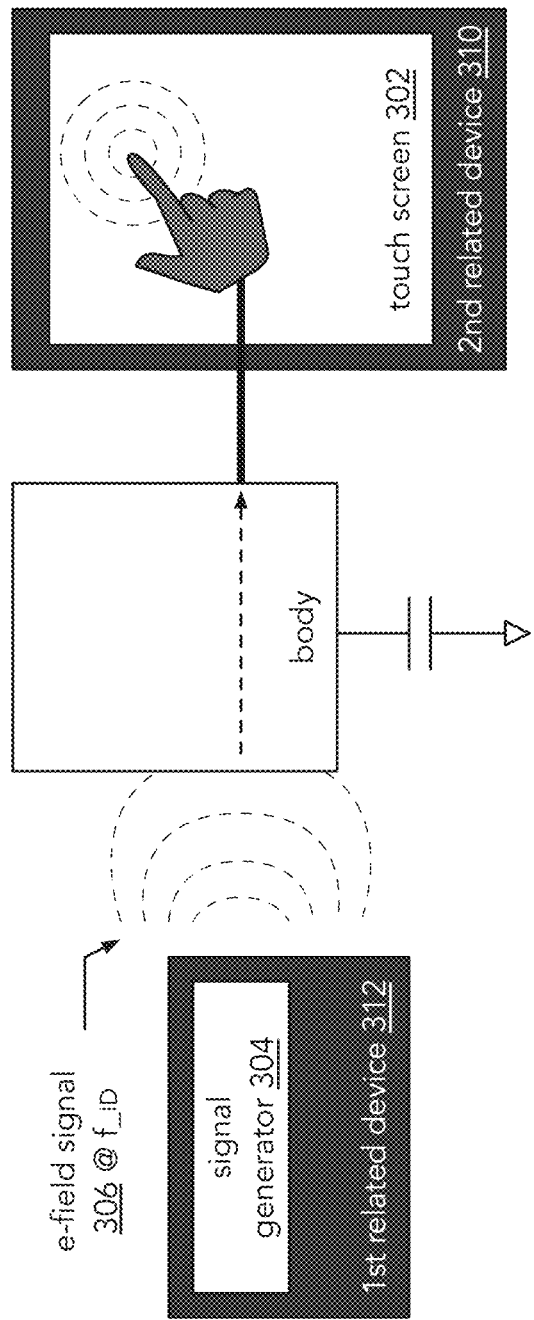
Figure 24B:
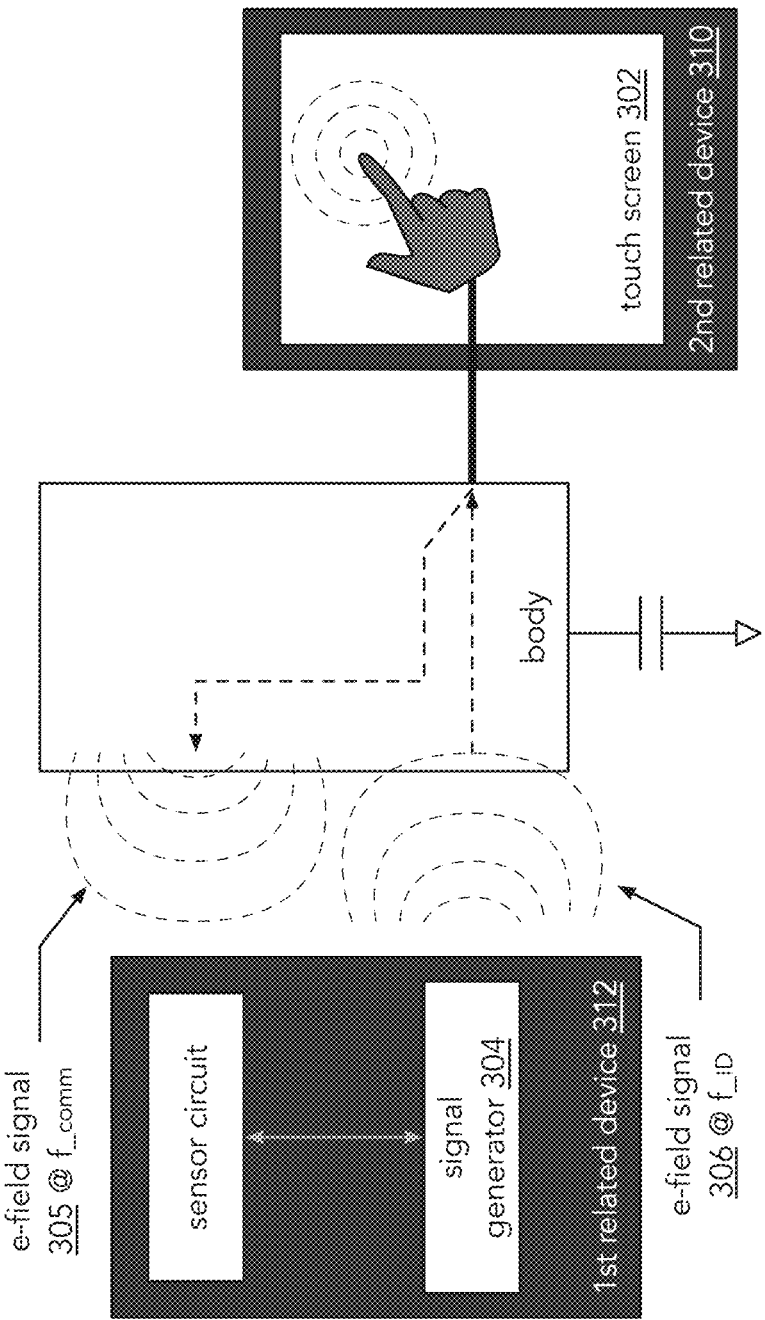
Figure 24C:
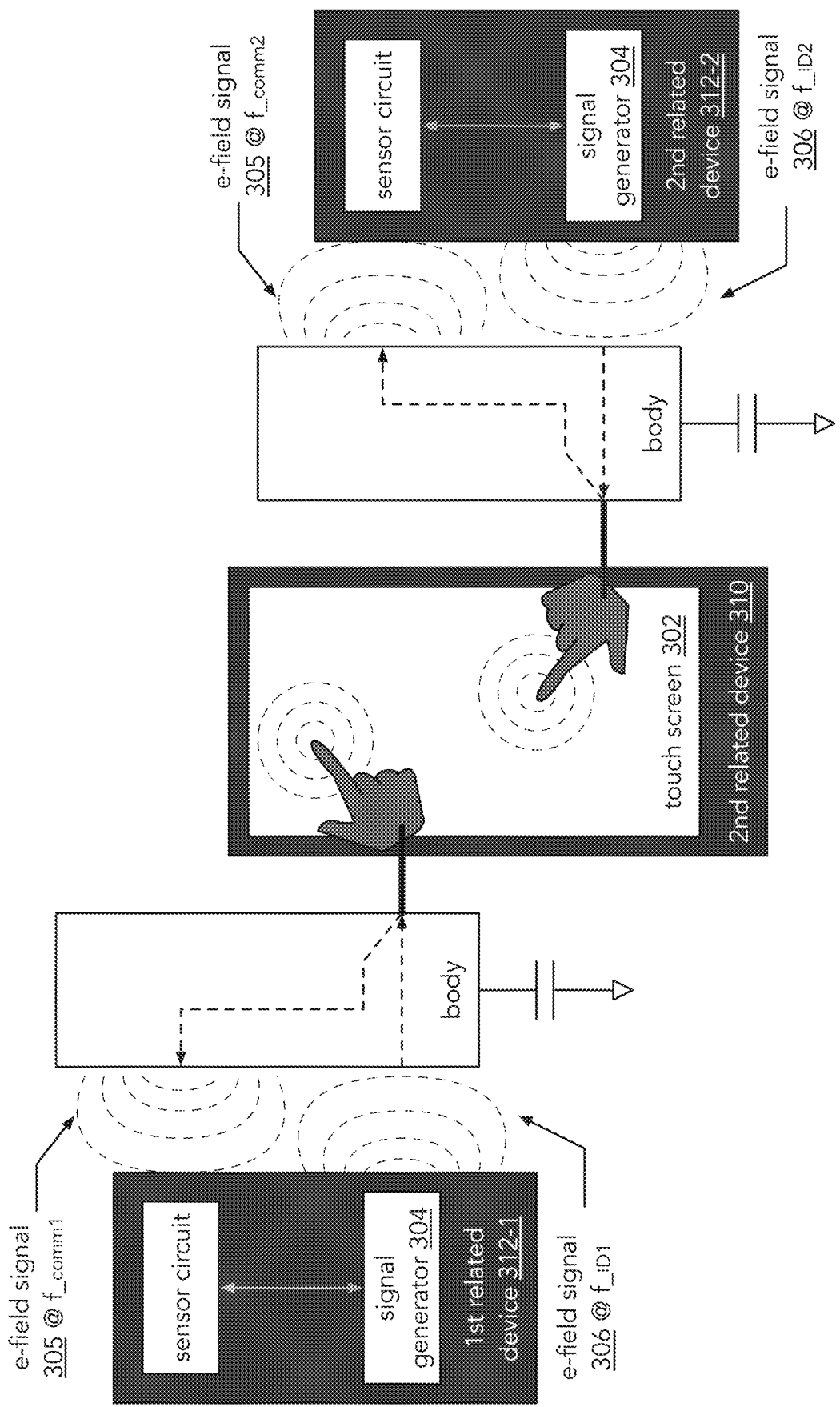
Figure 25:
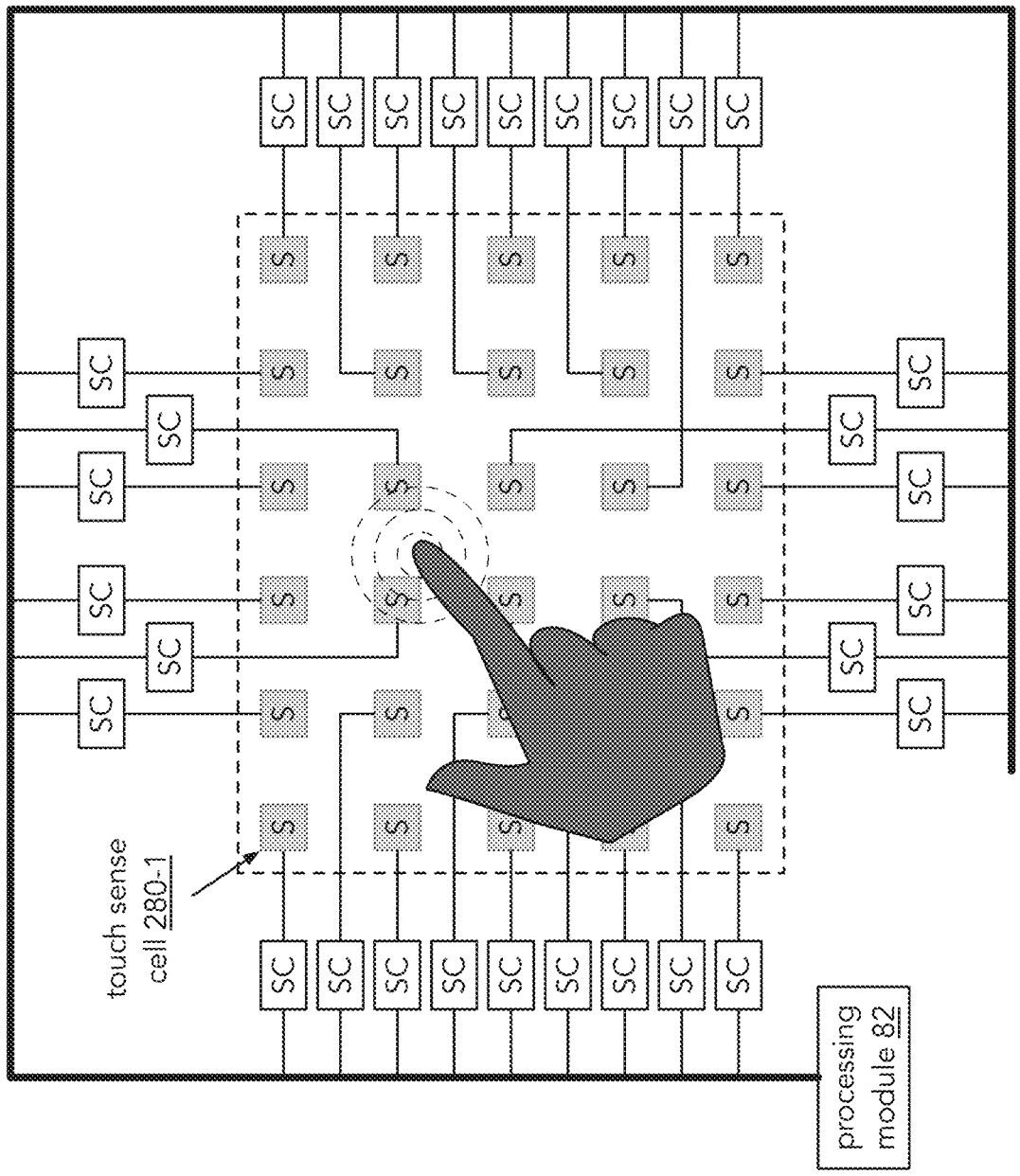
Figure 26A:
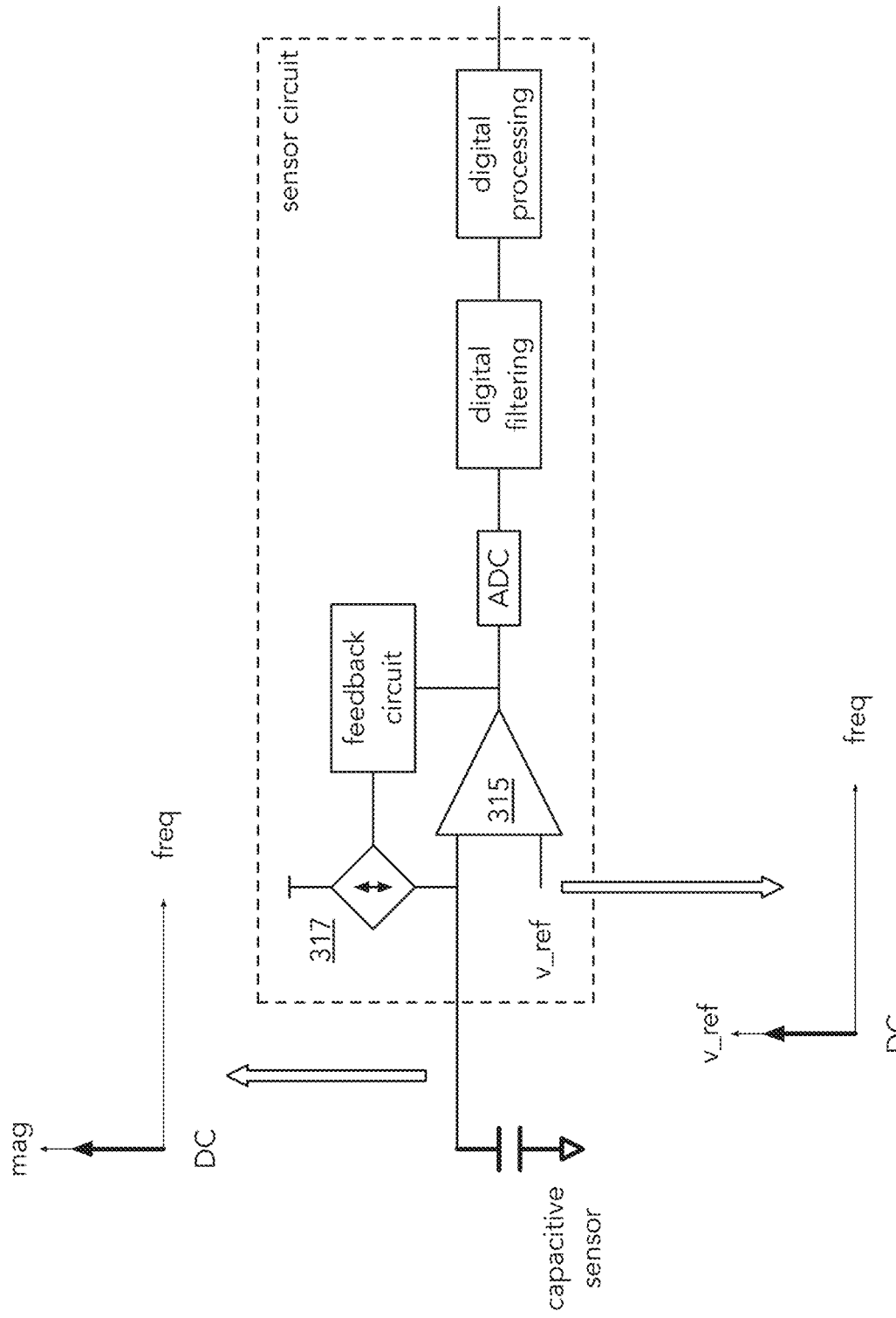
Figure 26B:
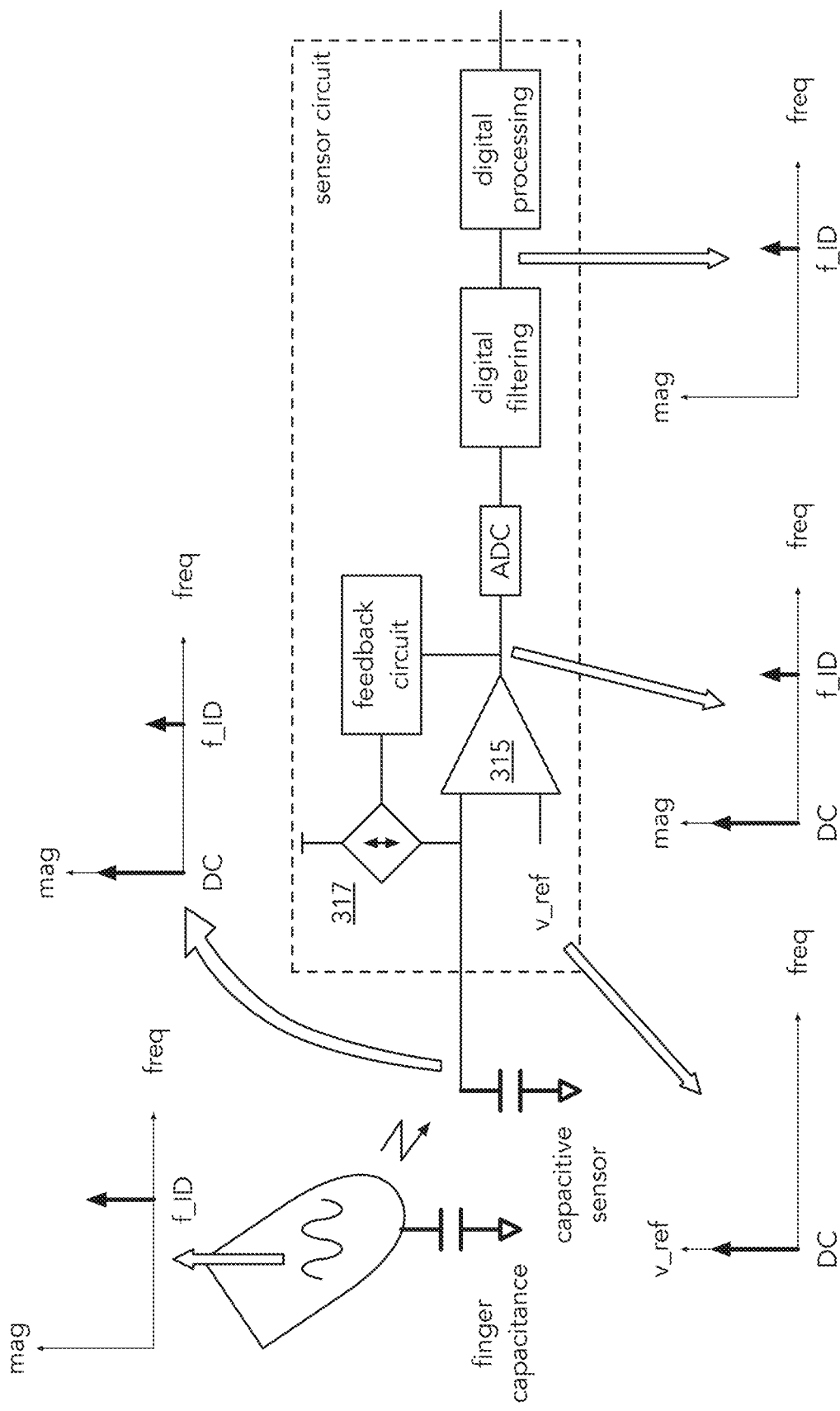
Figure 27A:
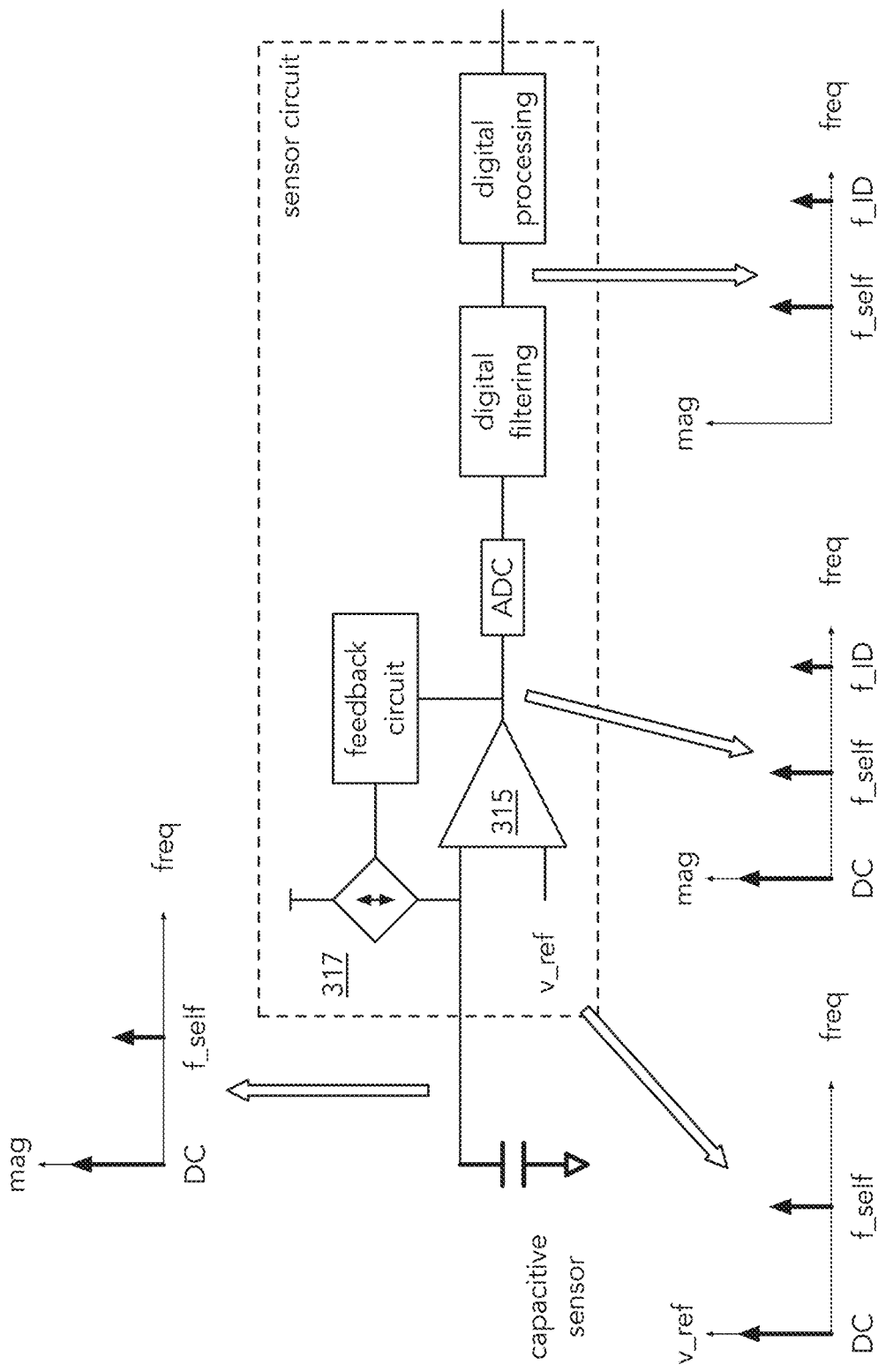
Figure 27B:
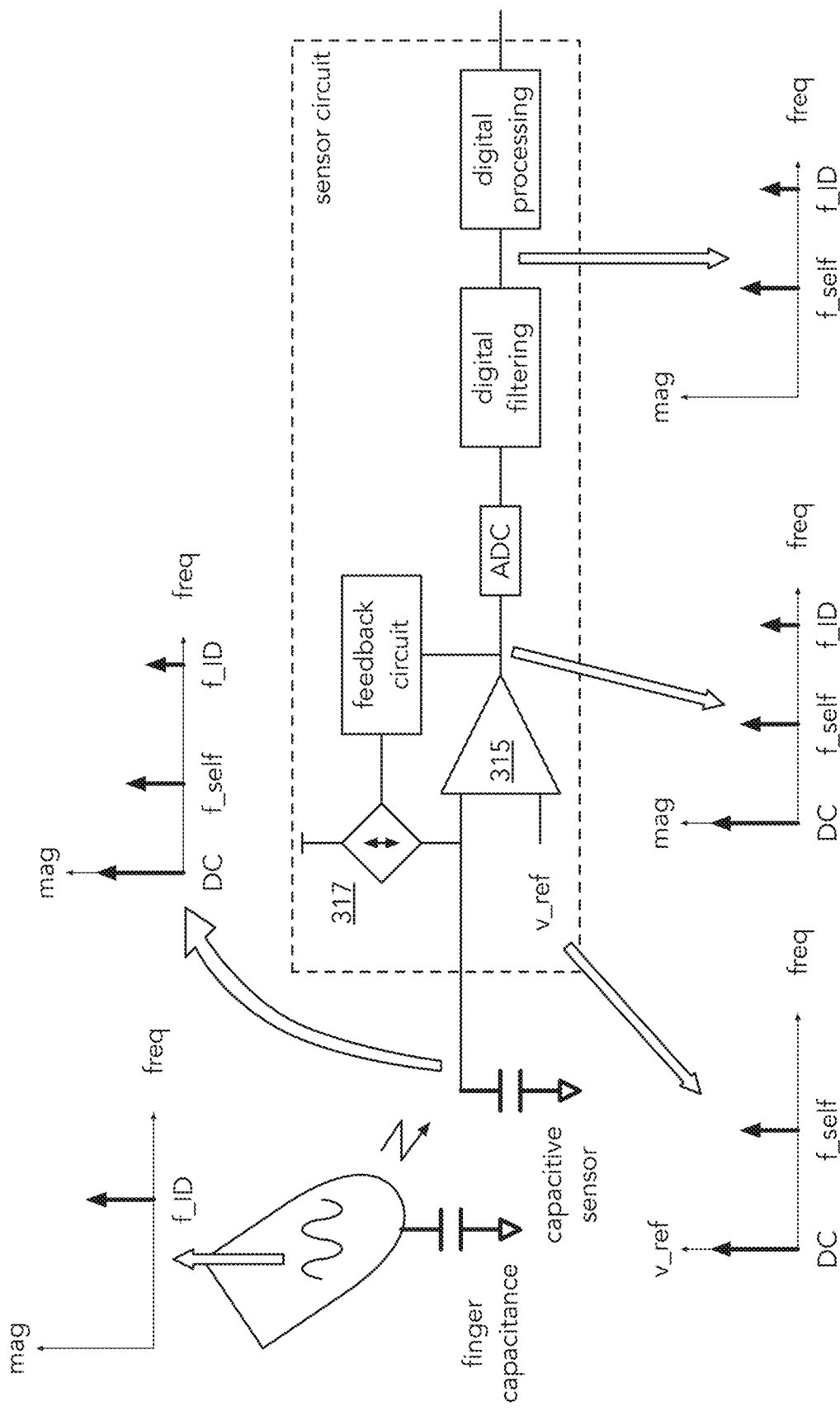
Figure 29:
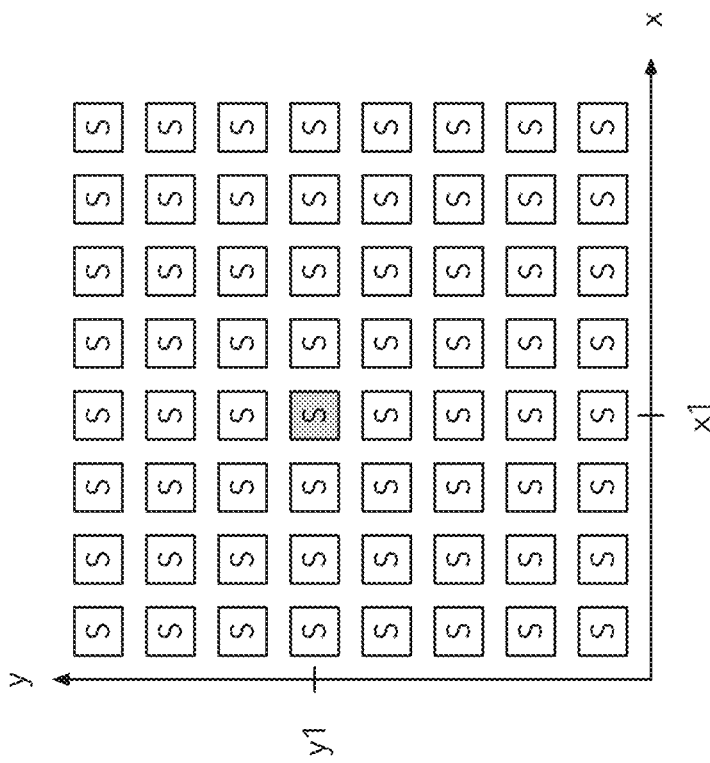
Figure 28:
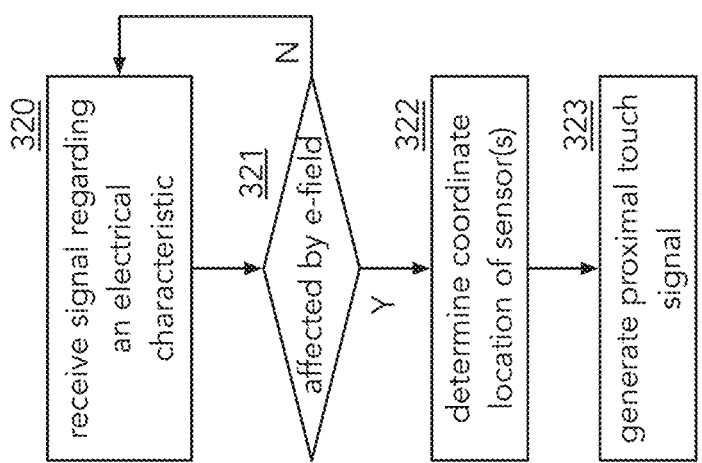
Figure 30B:
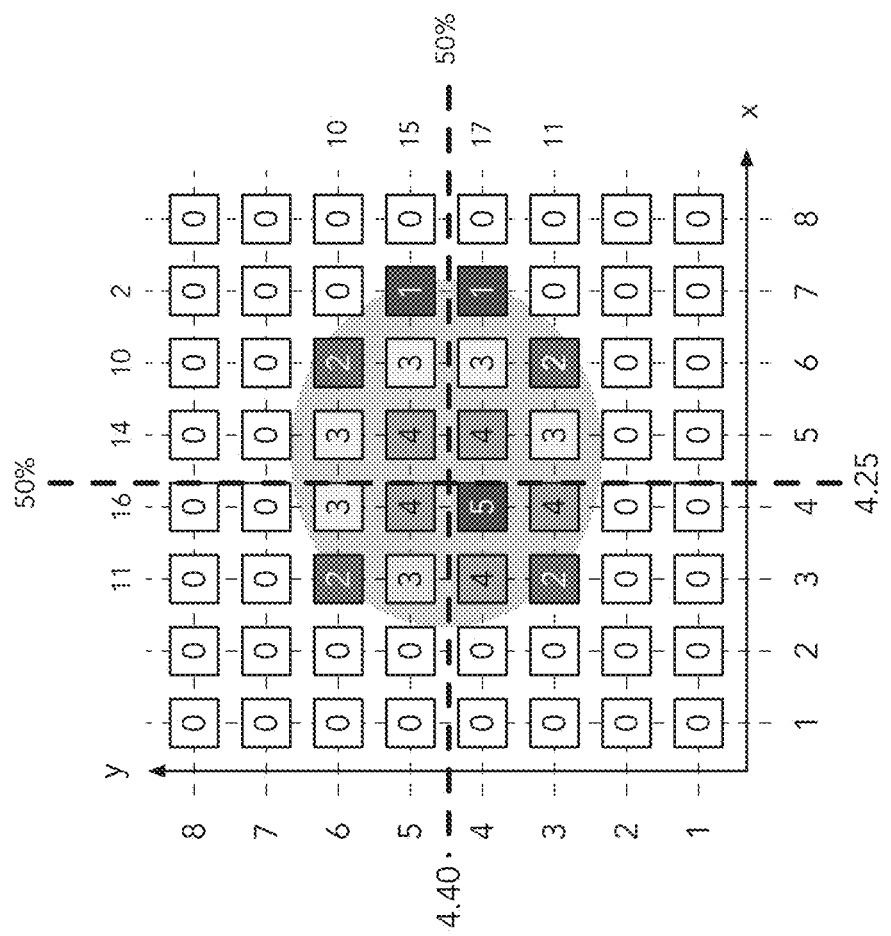
Figure 30A:
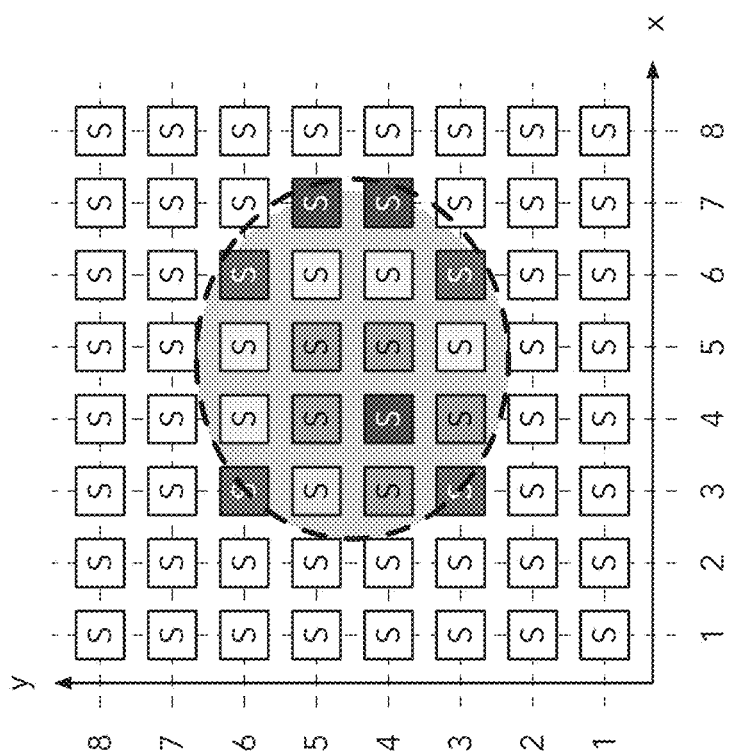
Figure 31B:
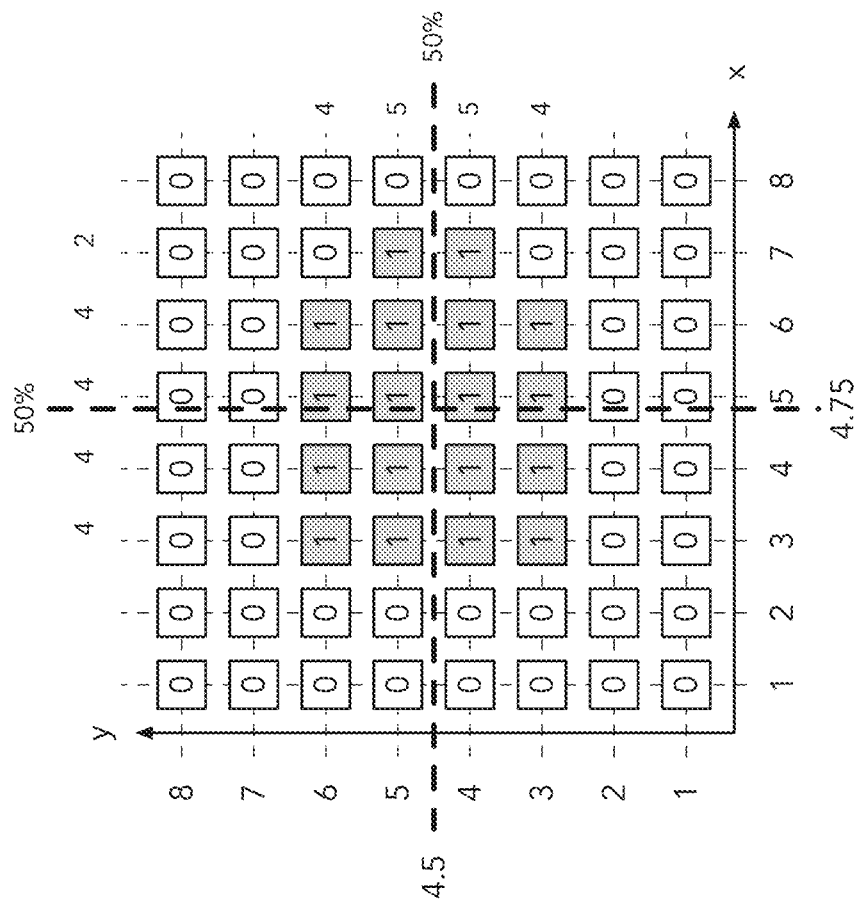
Figure 31A:
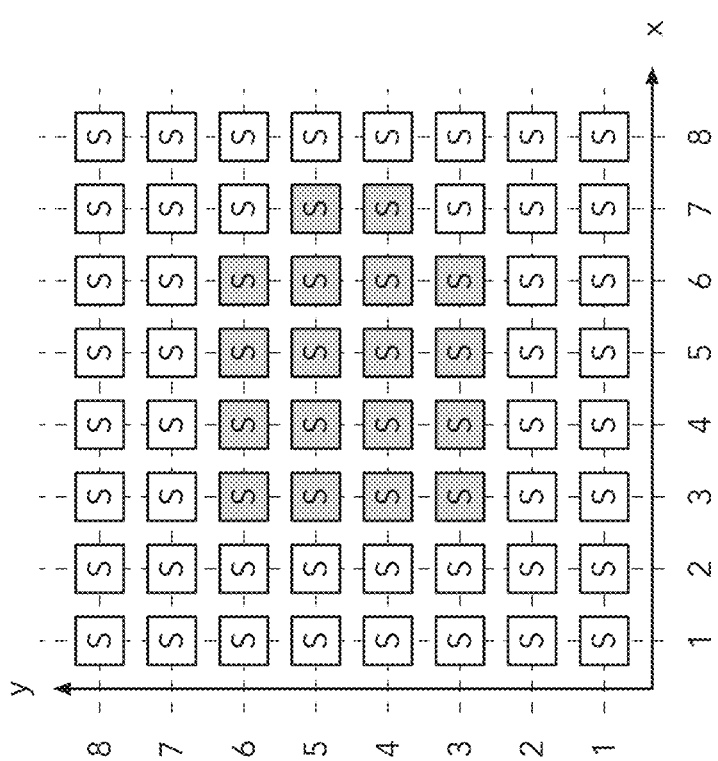
Figure 32:
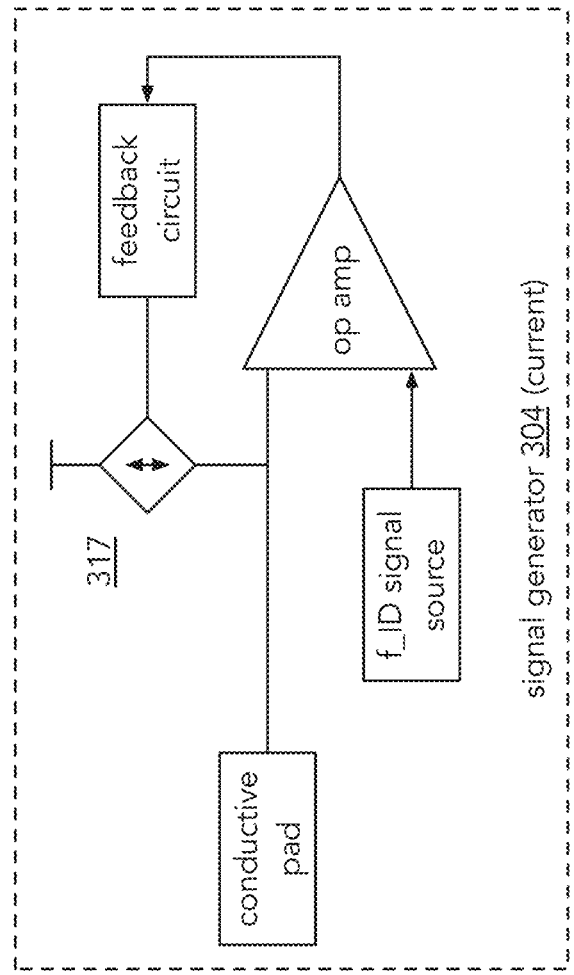
Figure 33:
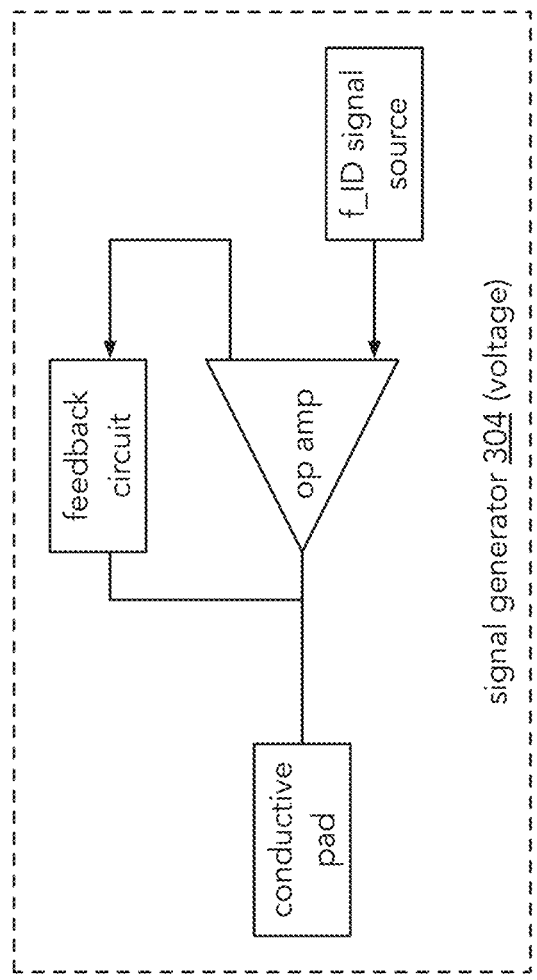
Figure 34:
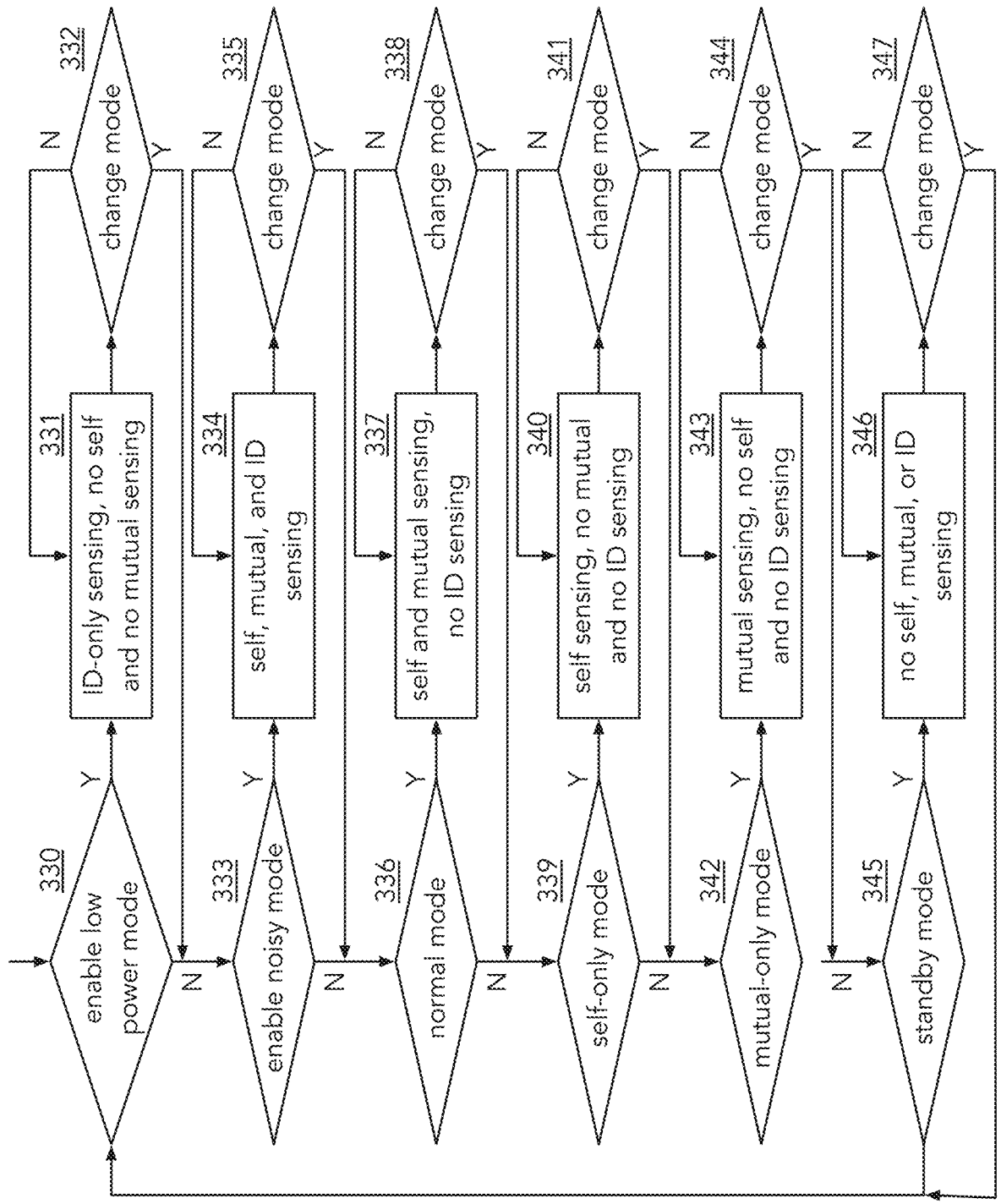
Figure 35:
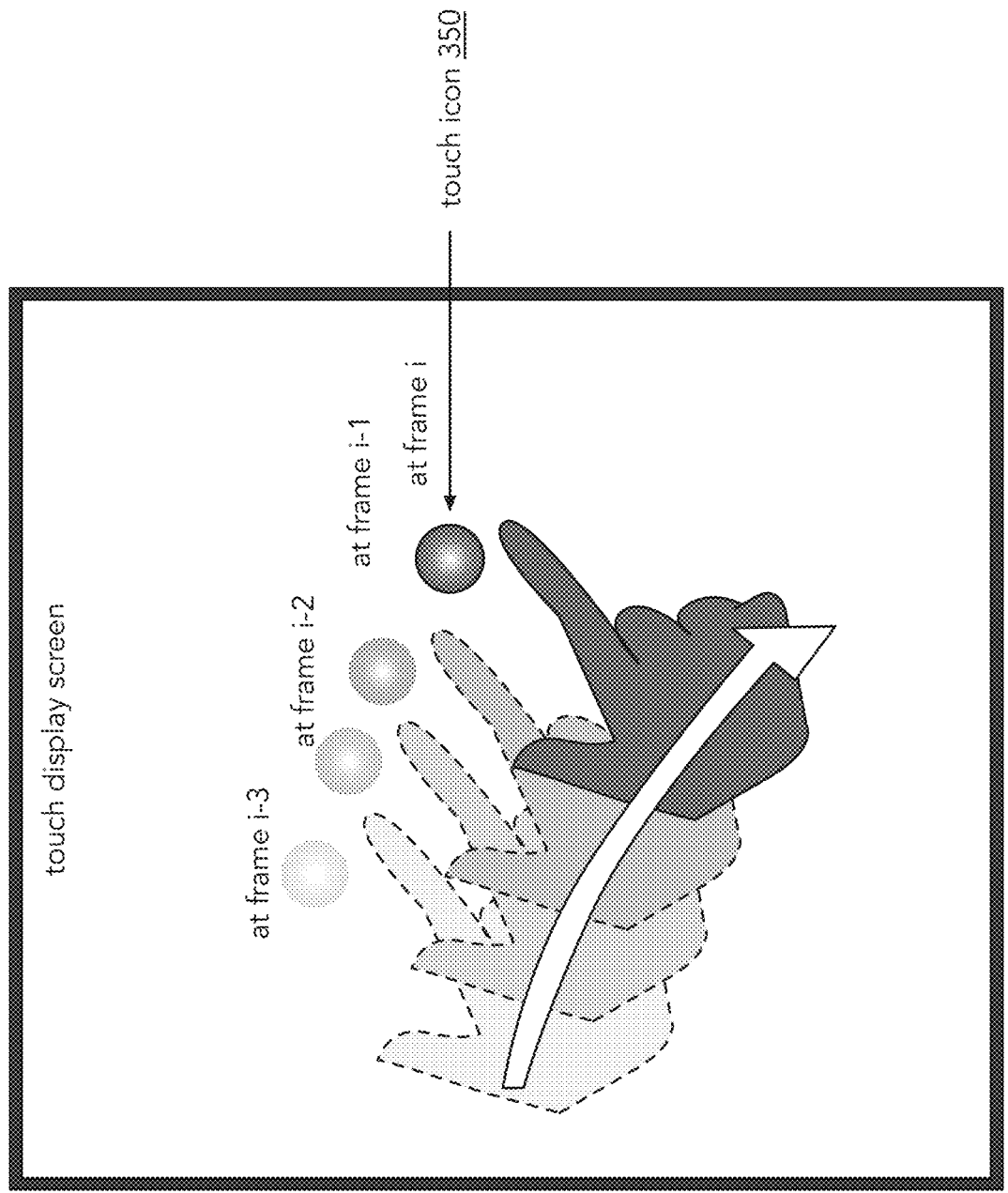
Figure 36:
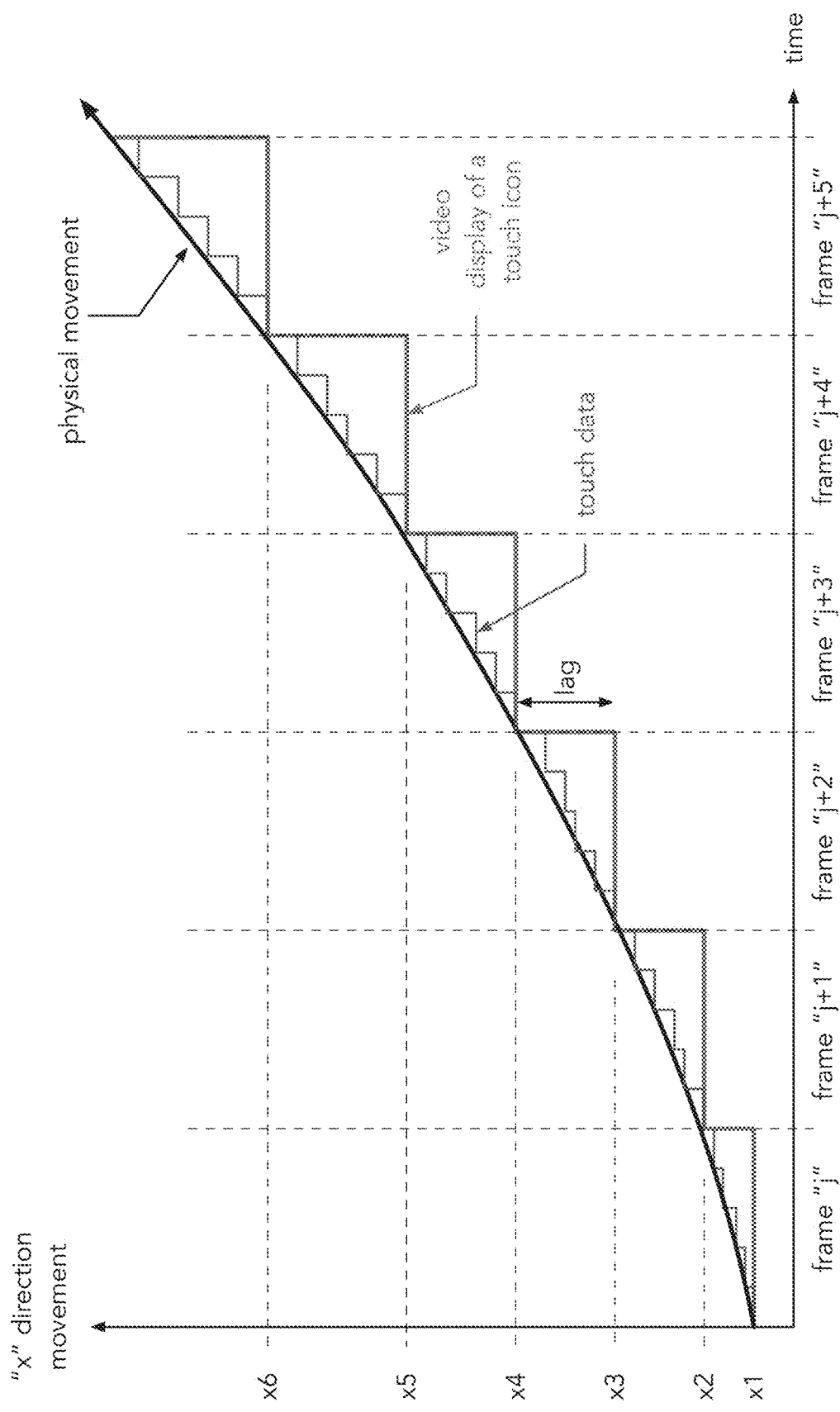
Figure 37A:
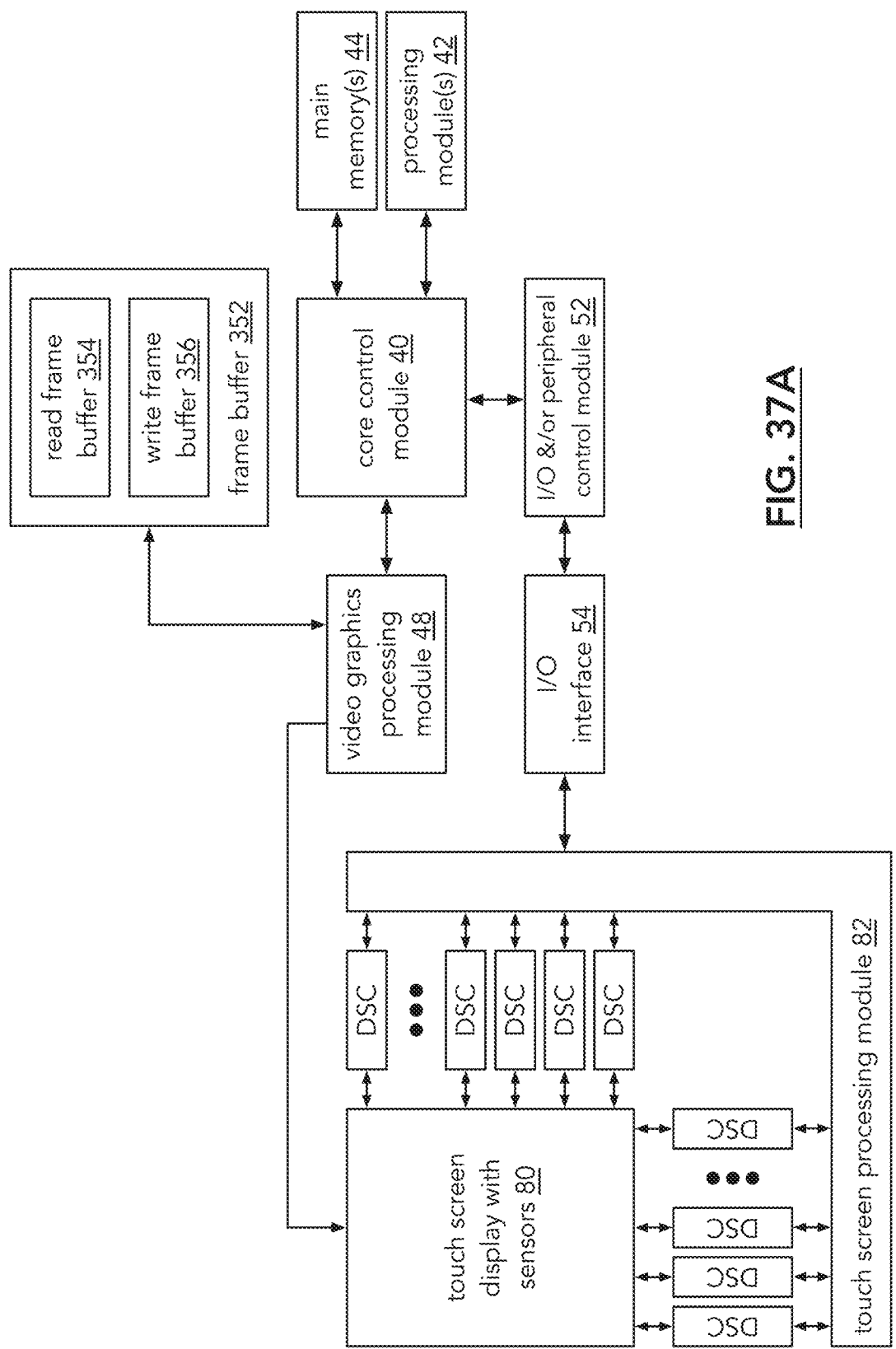
Figure 37B:
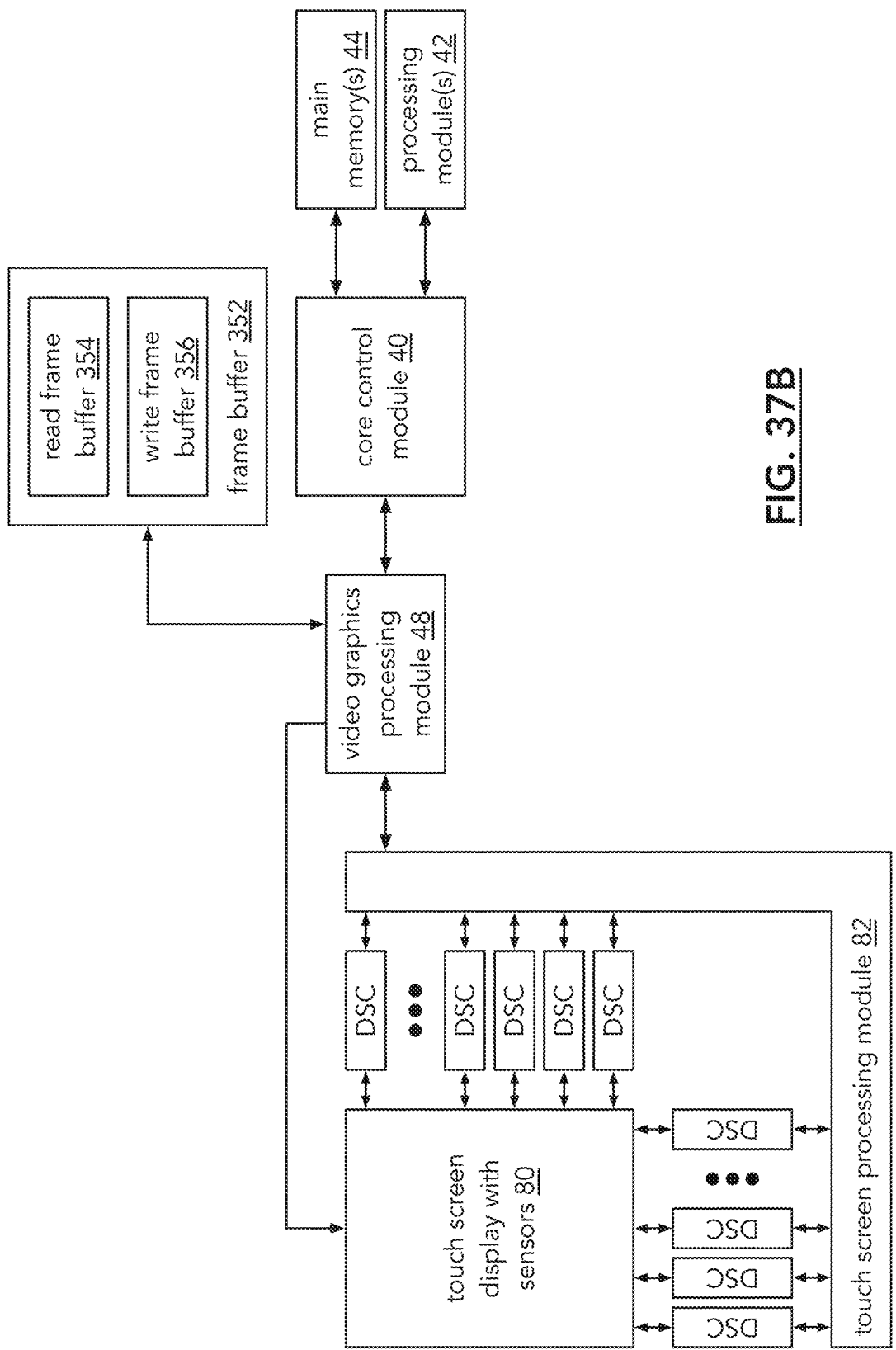
Figure 38:
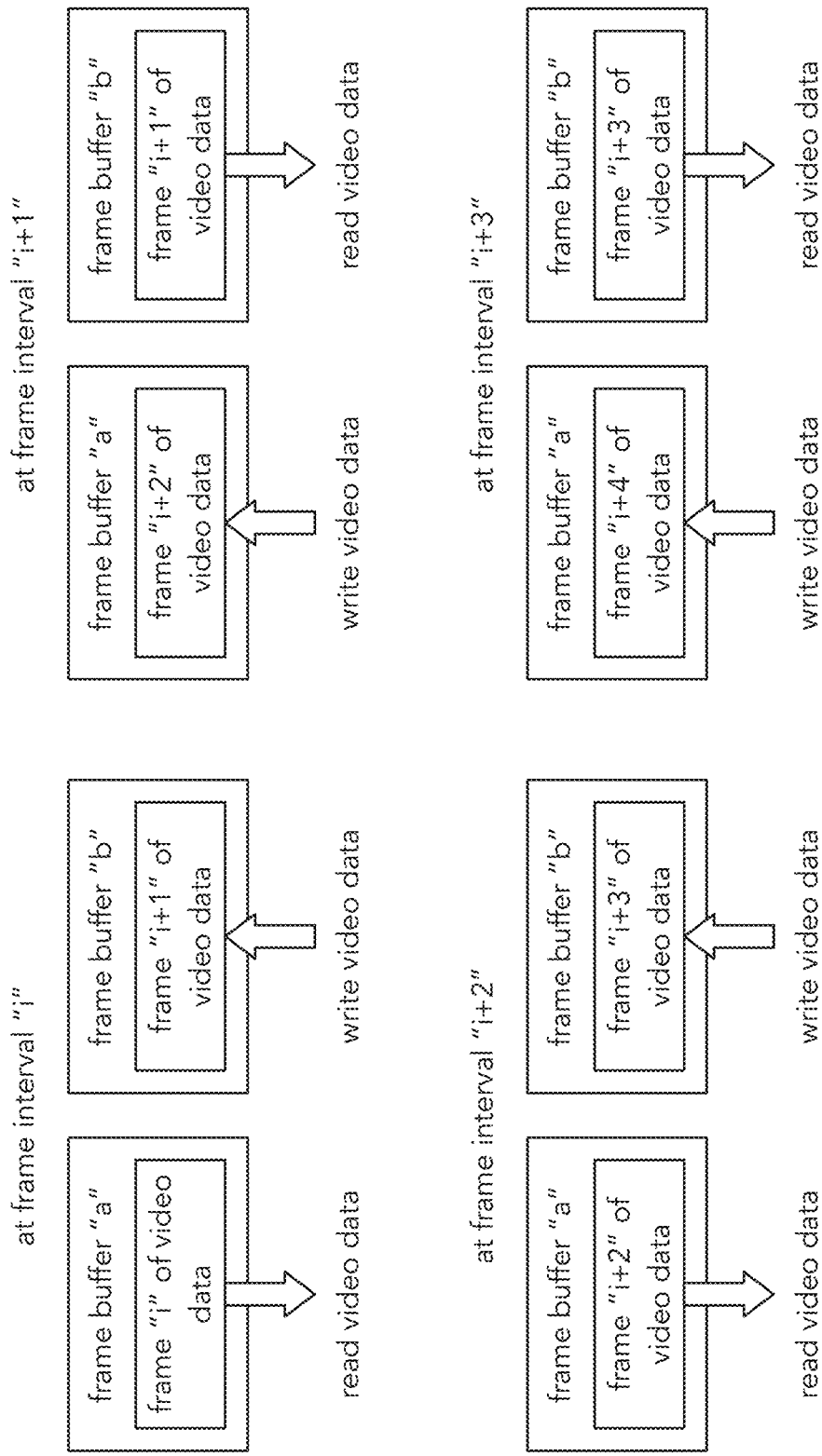
Figure 39:
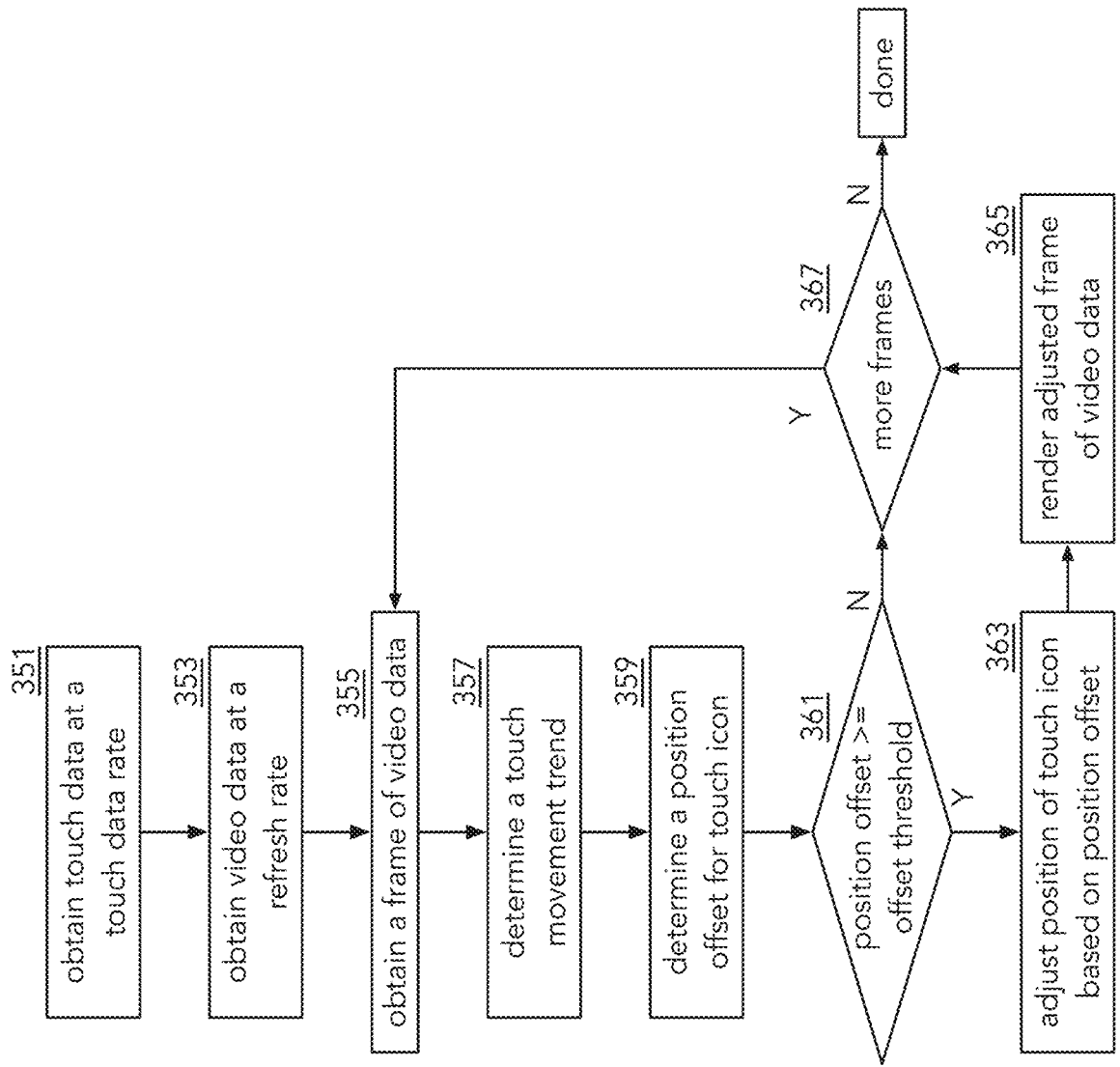
Figure 40:
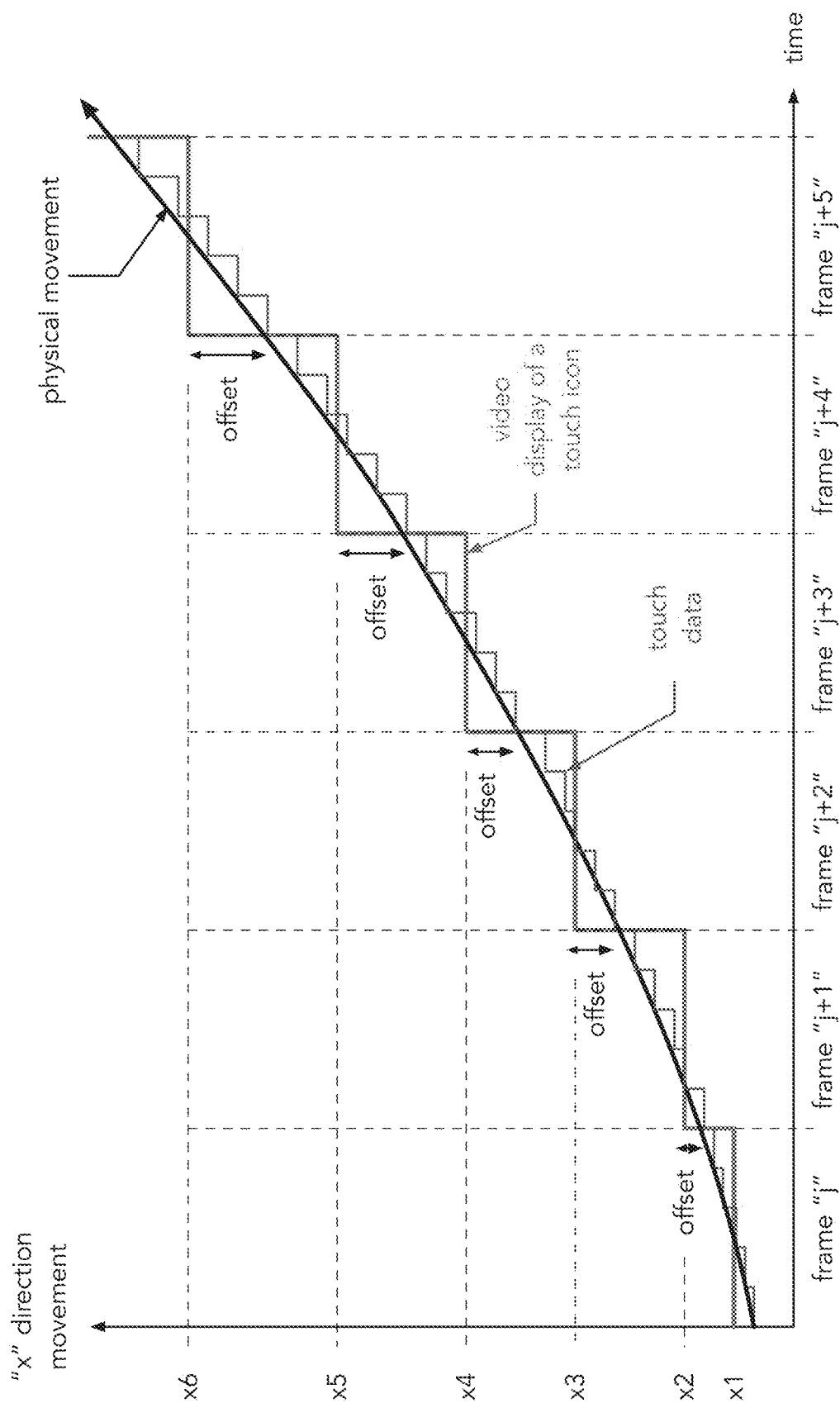
Figure 41:
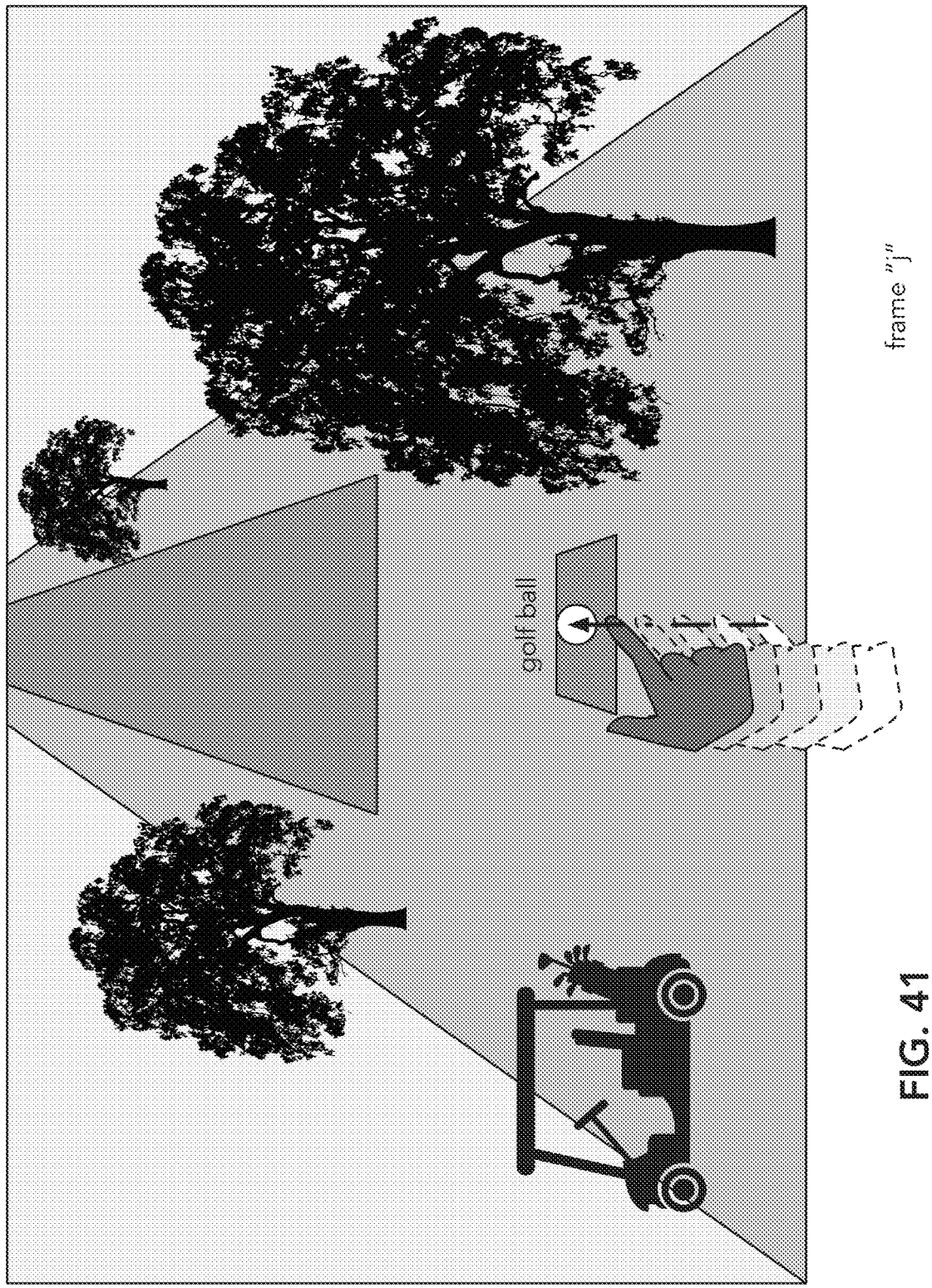
Figure 42:
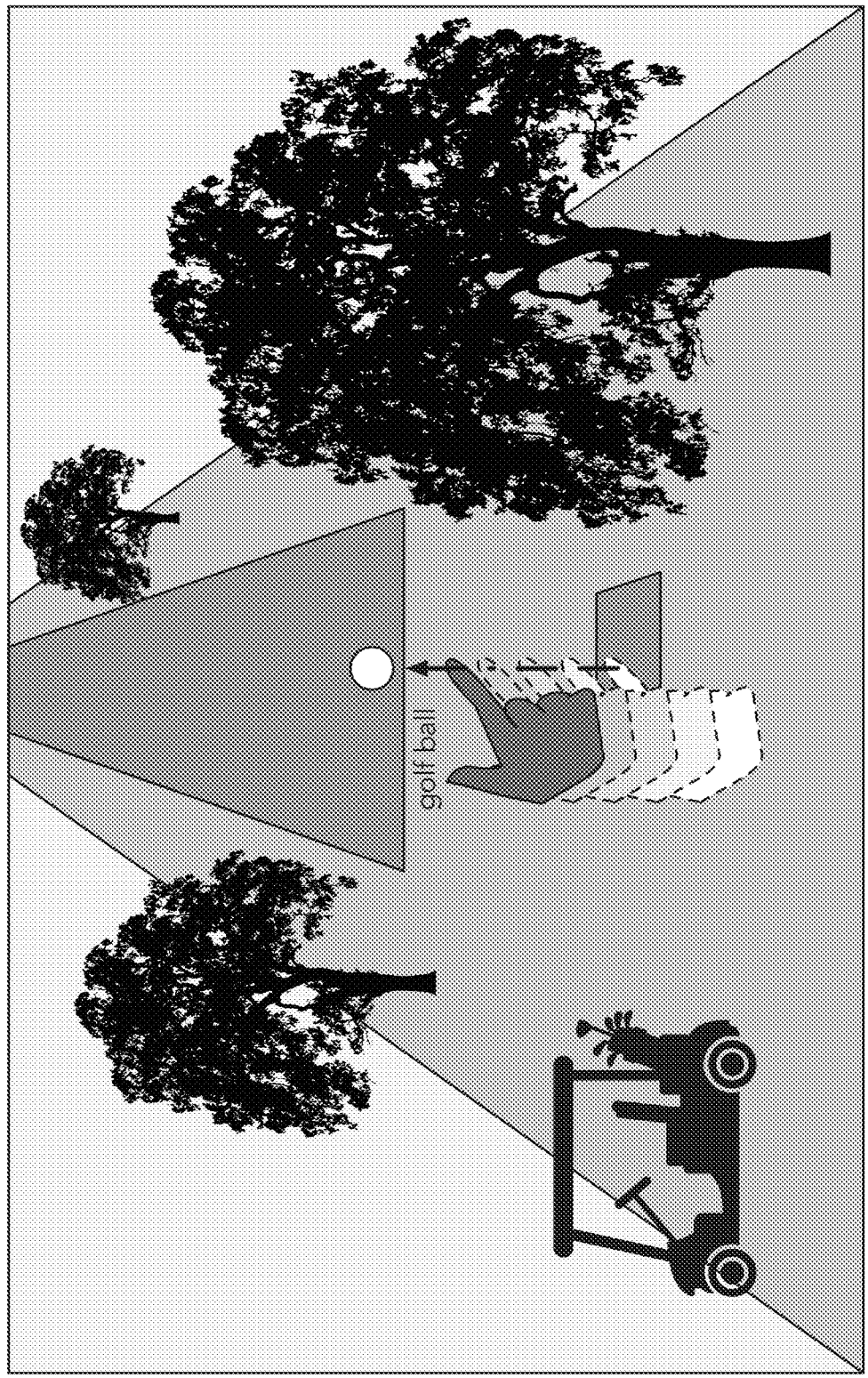
Figure 43:
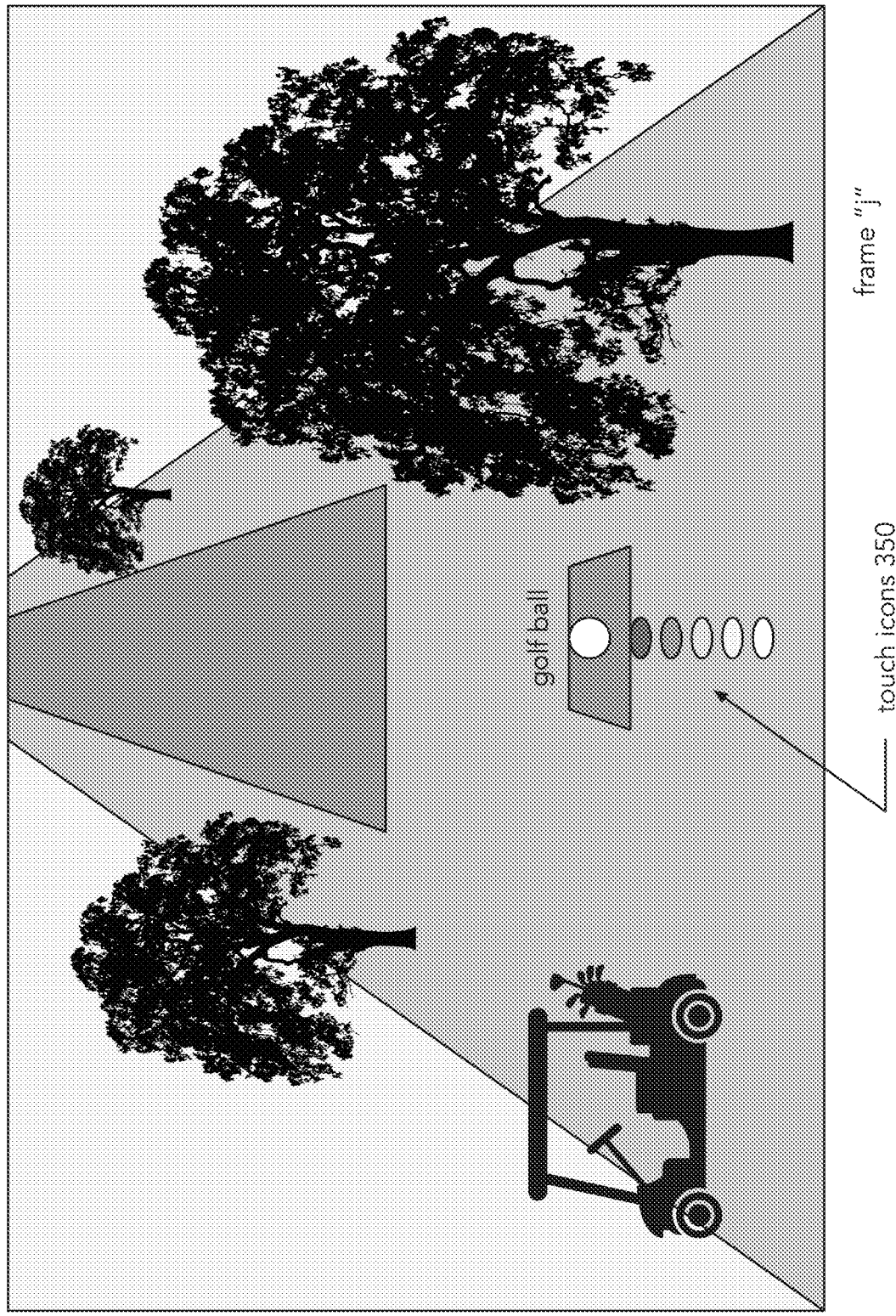
Figure 44:
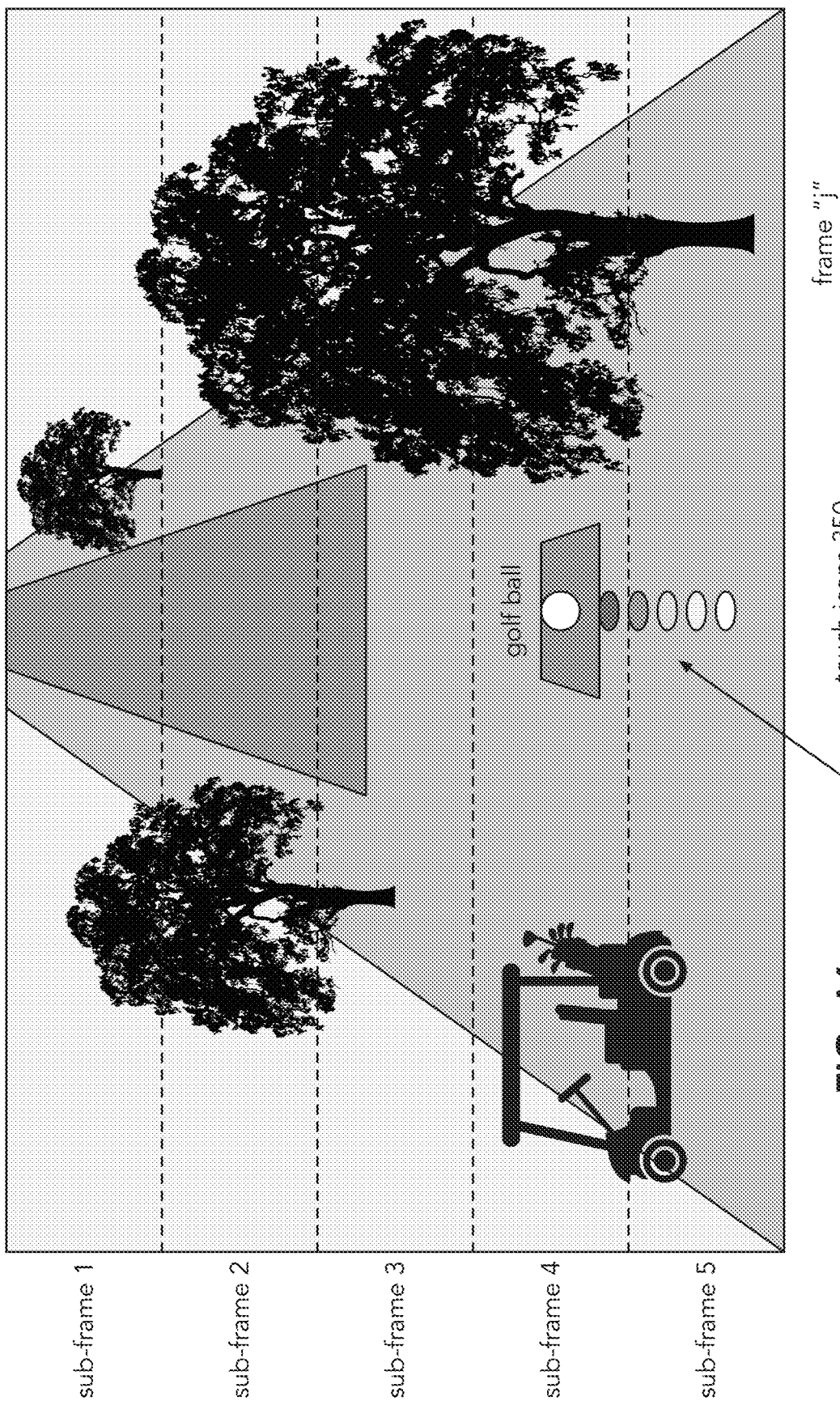
Figure 46:
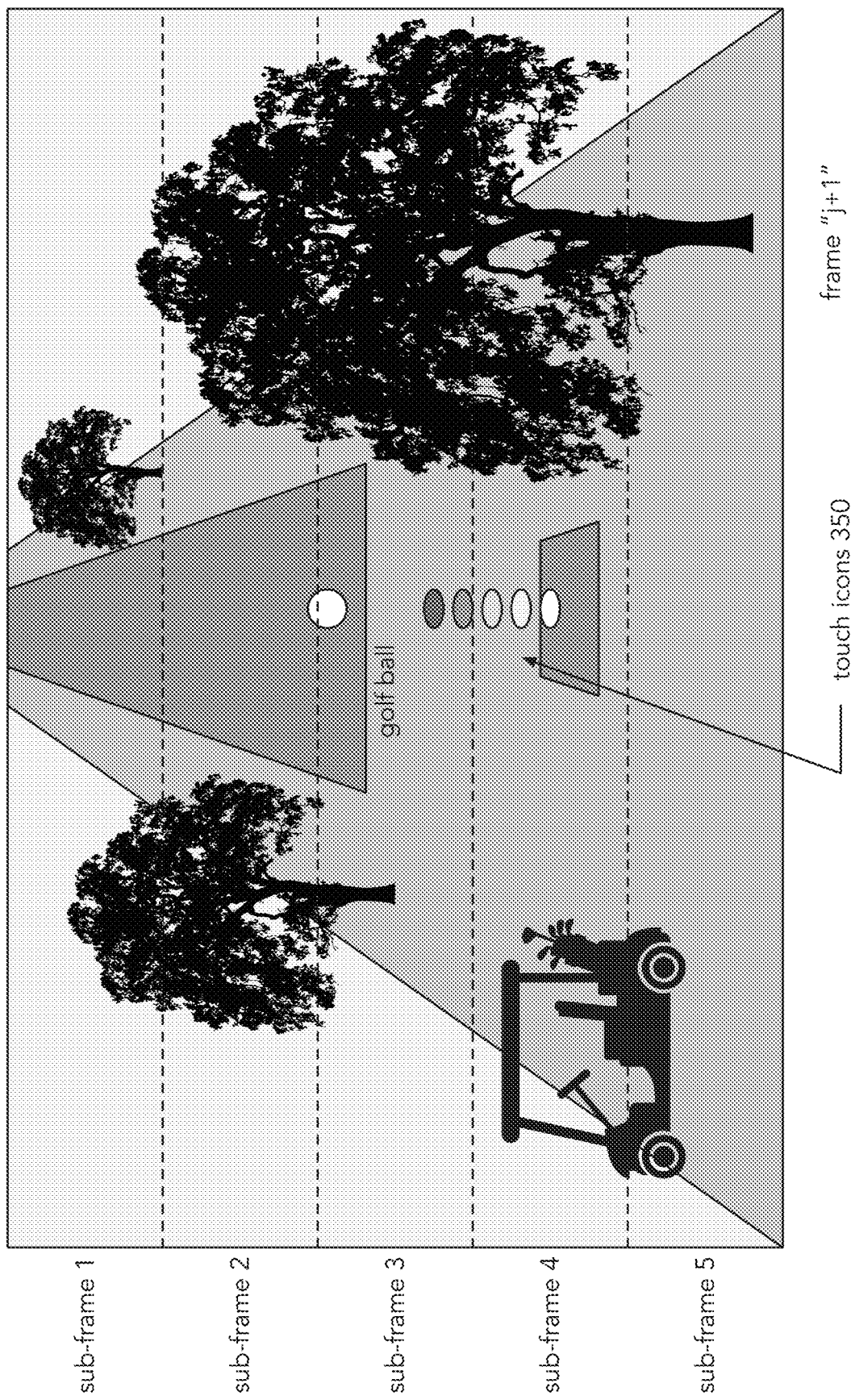
Figure 51D:
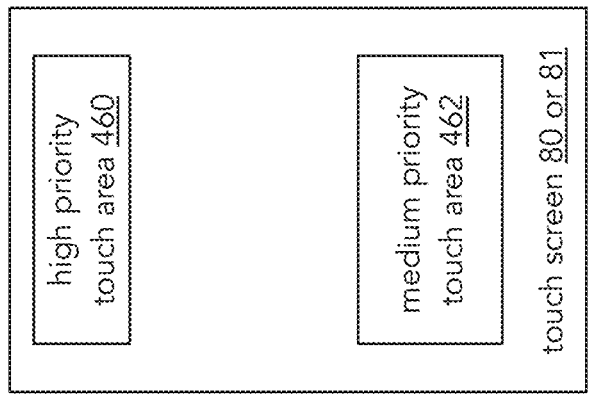
Figure 51C:
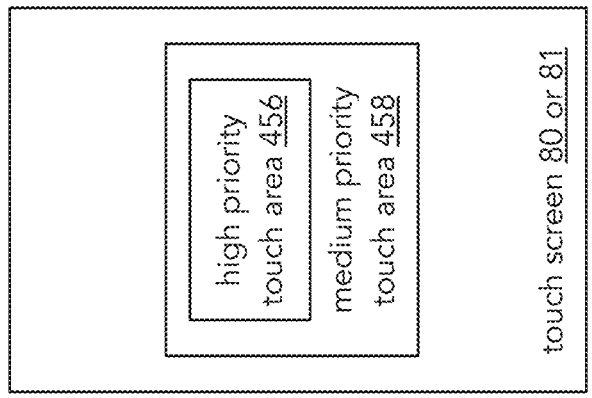
Figure 51B:
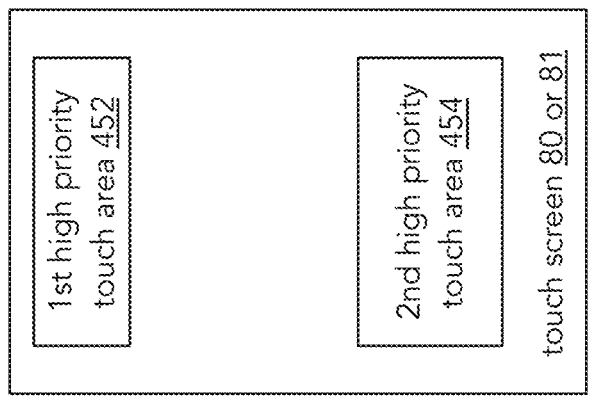
Figure 51A:
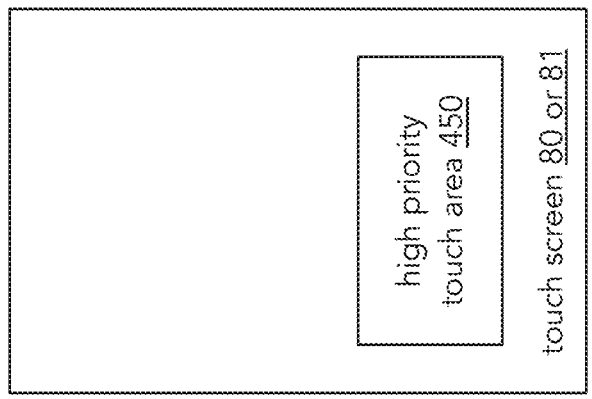
Figure 52:
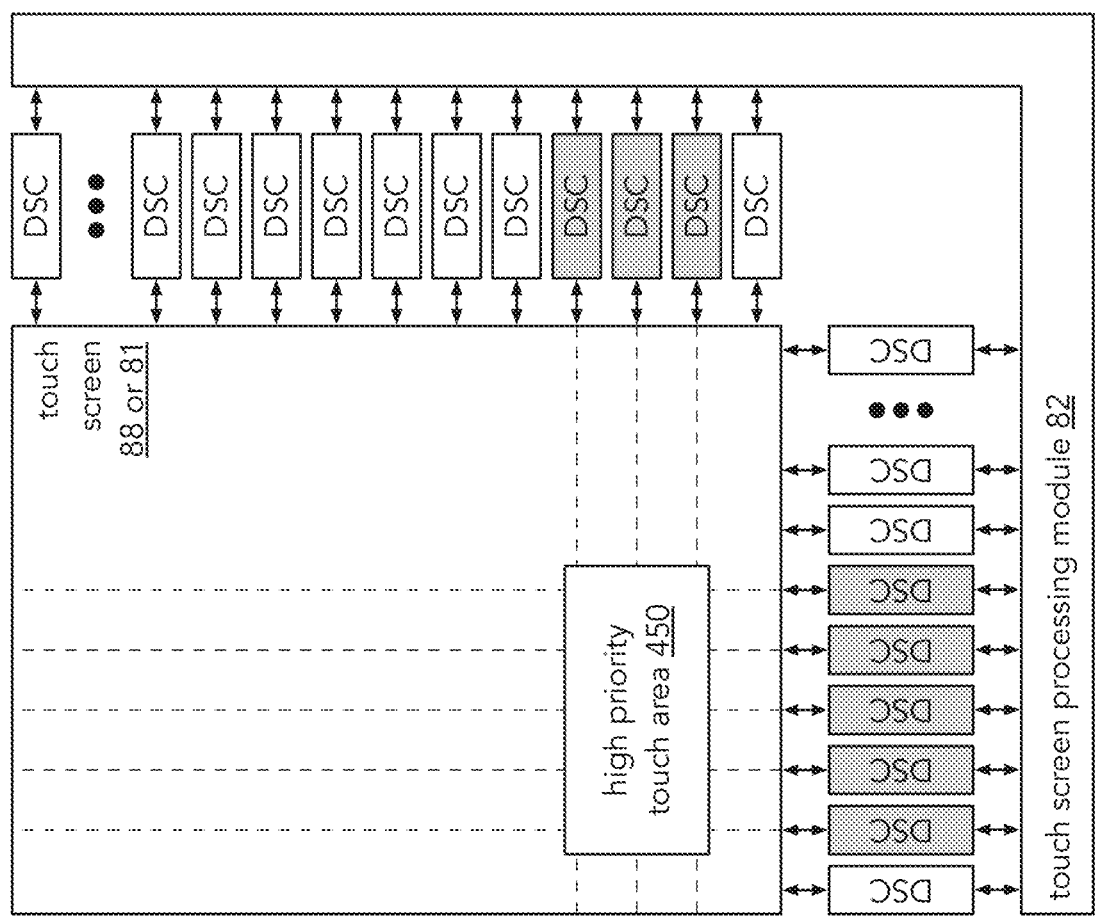
Figure 53:
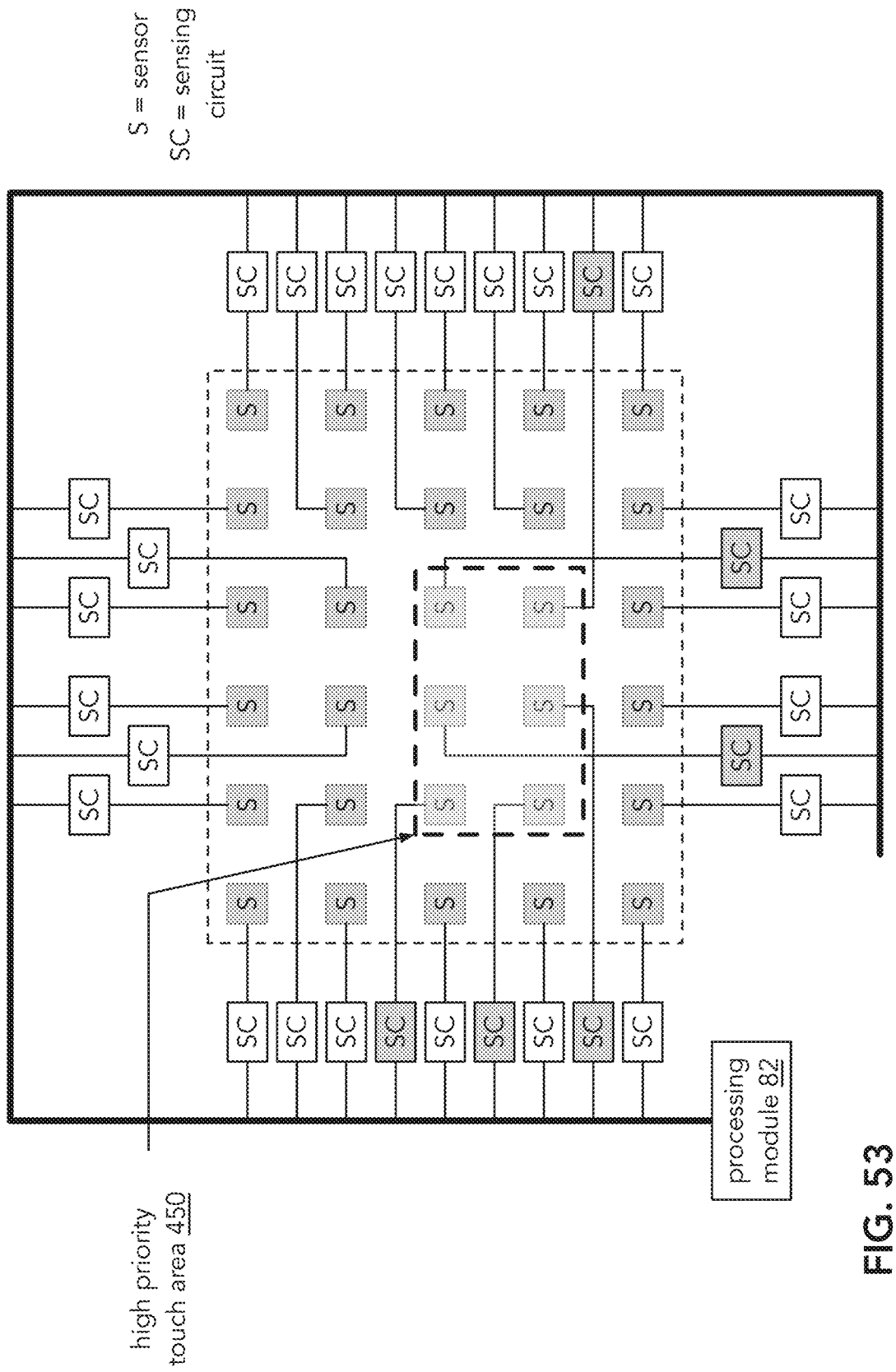
Figure 54:
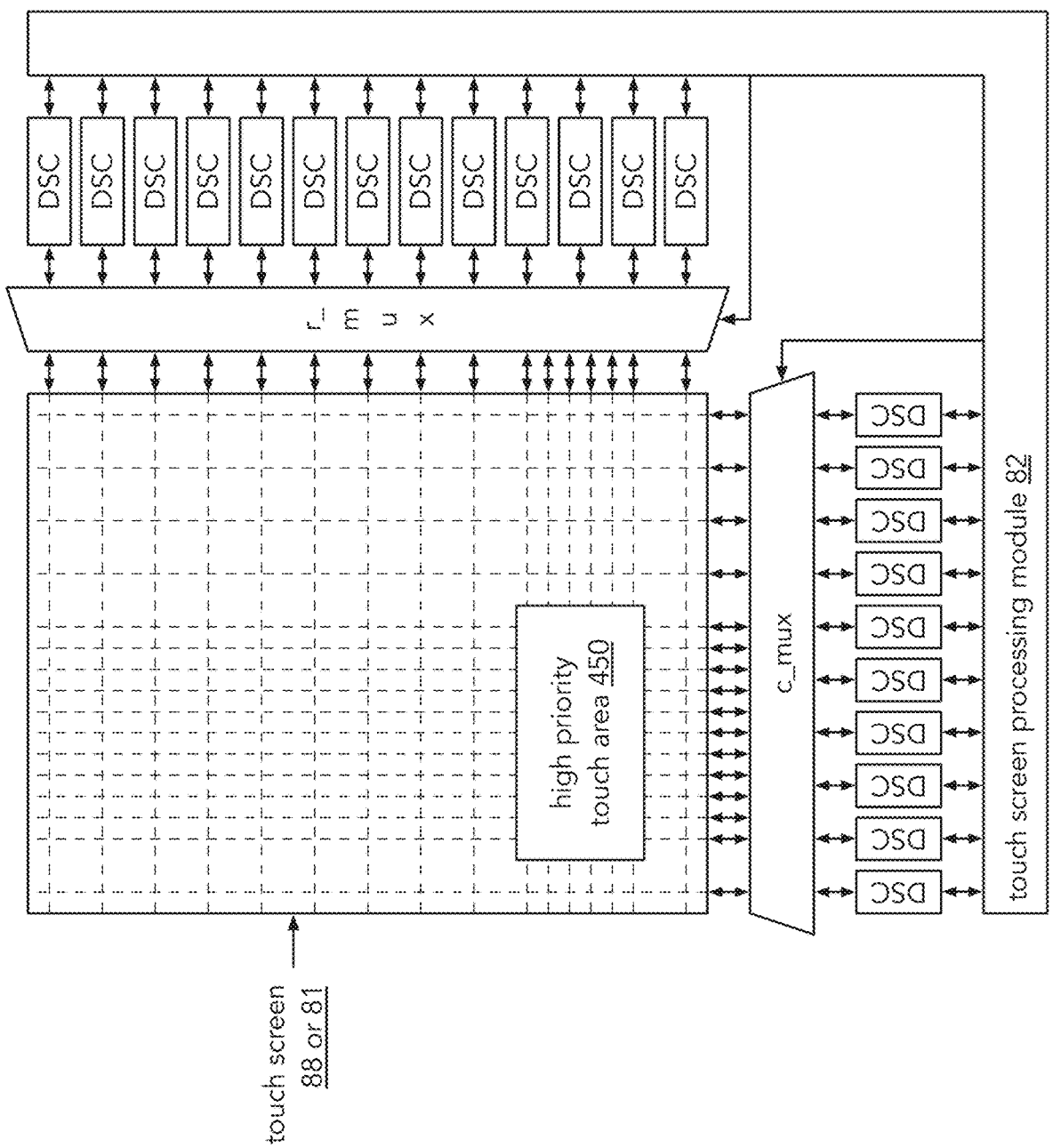
Figure 55C:
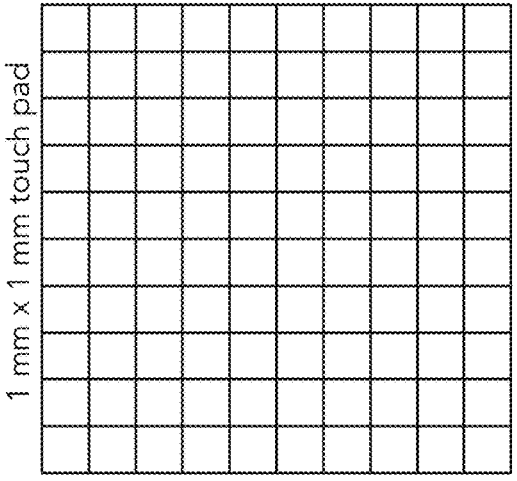
Figure 55B:
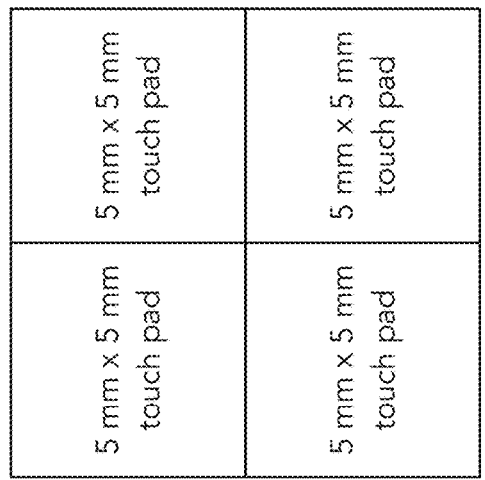
Figure 55A:
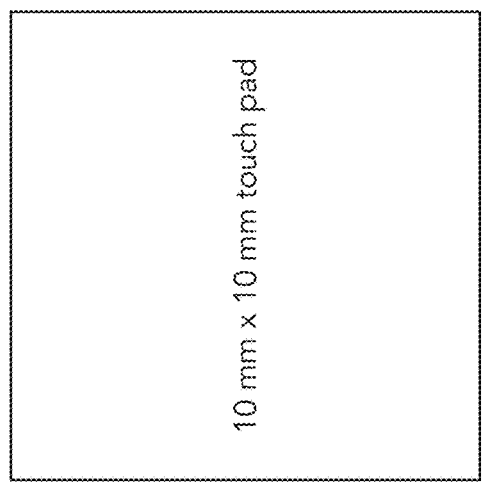
Figure 55E:
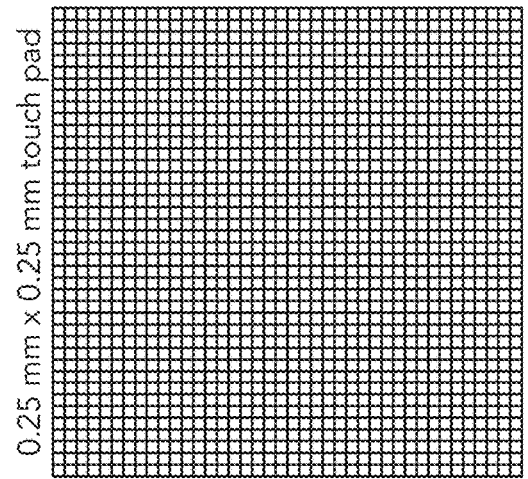
Figure 55D:
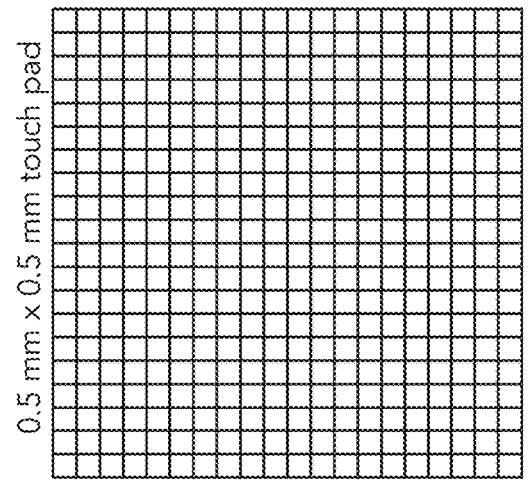
Figure 56A:
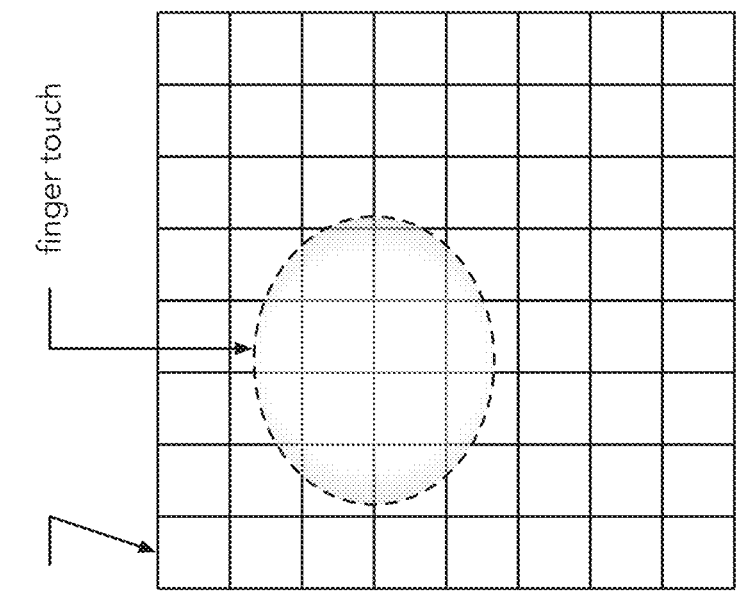
Figure 56B:
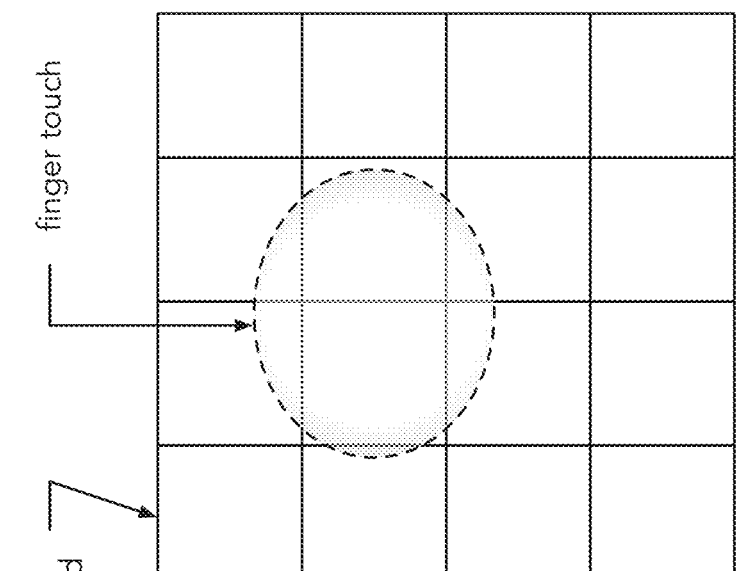
Figure 58:
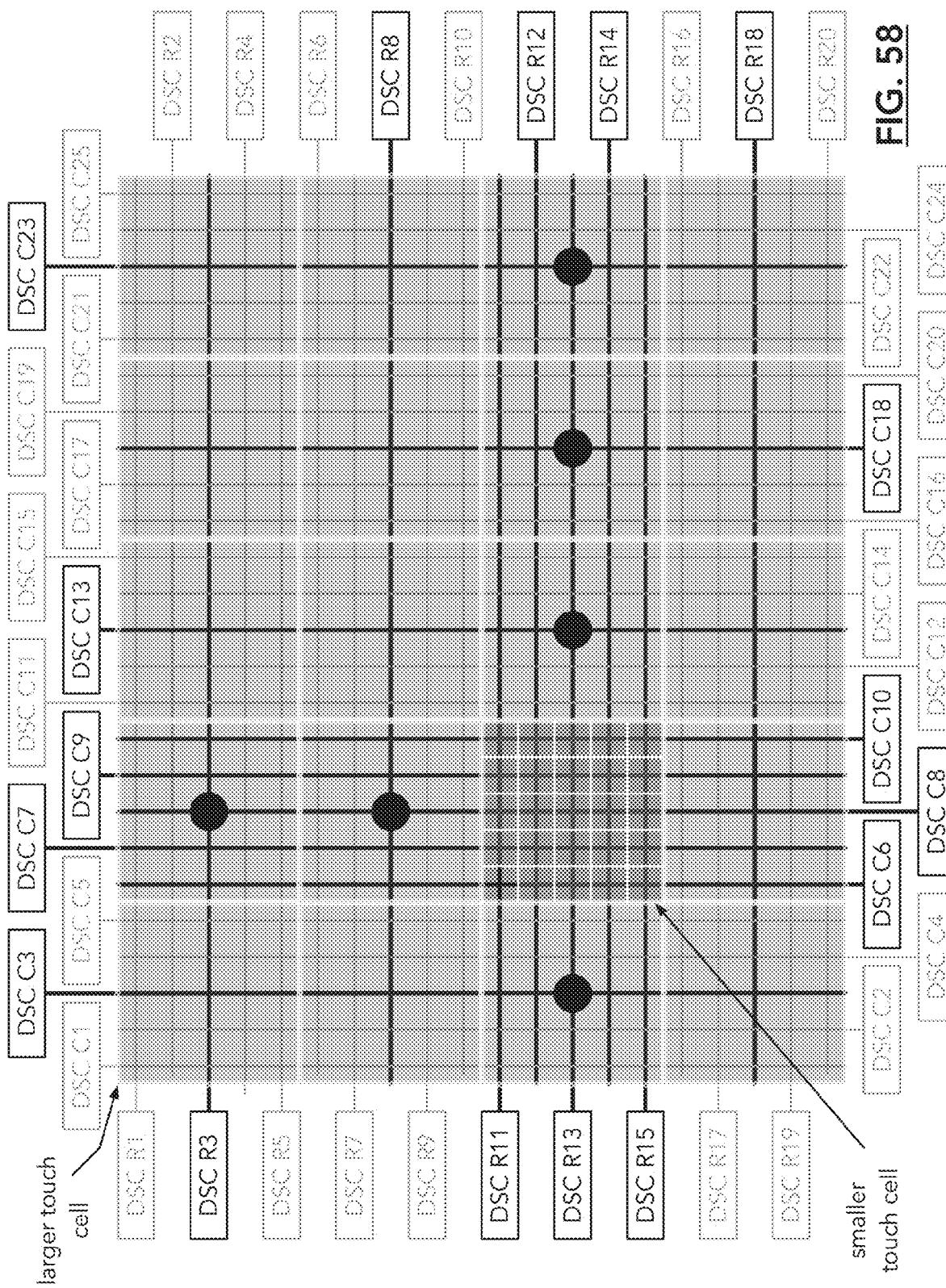
Figure 59:
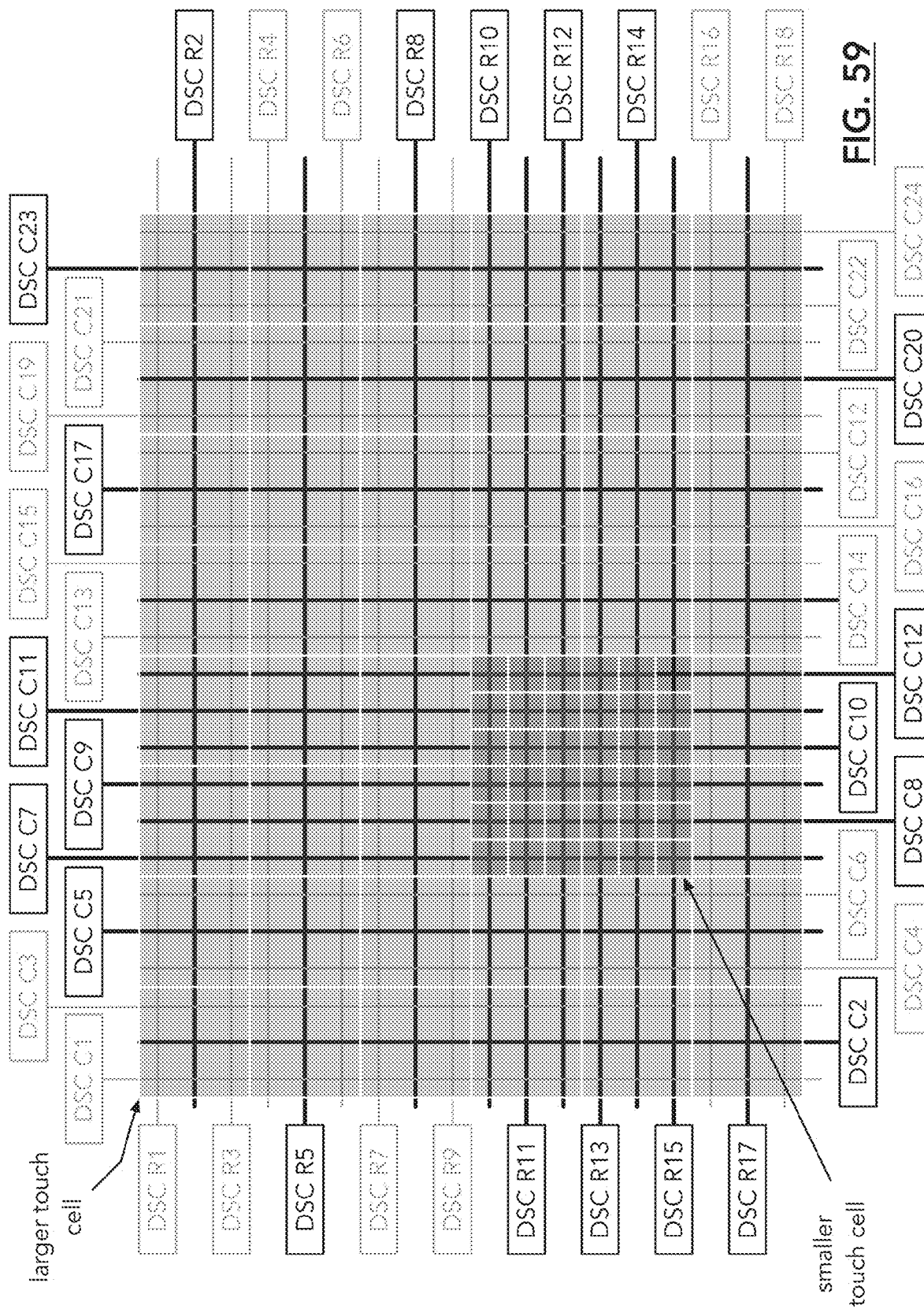
Figure 60:
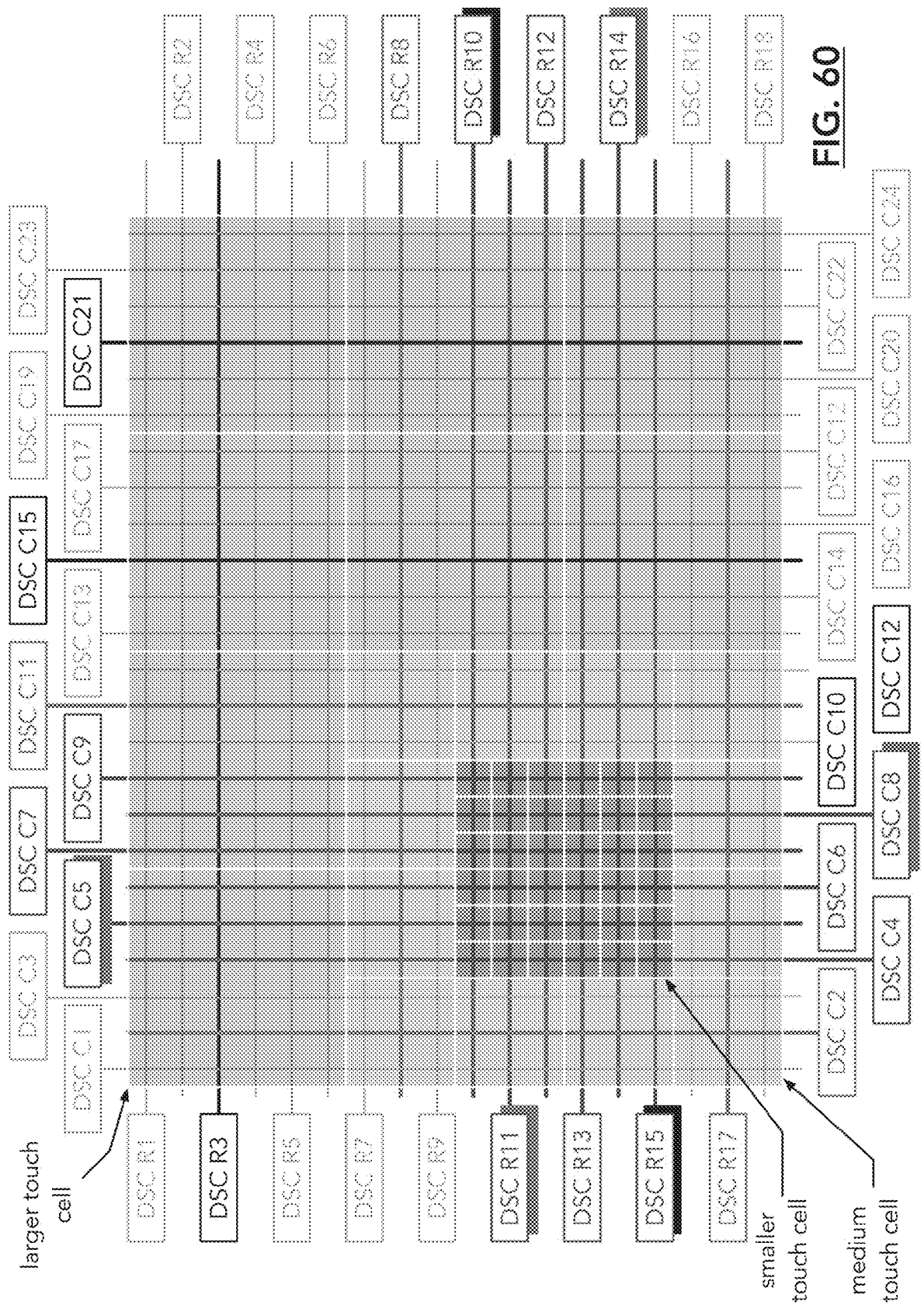
Figure 63:
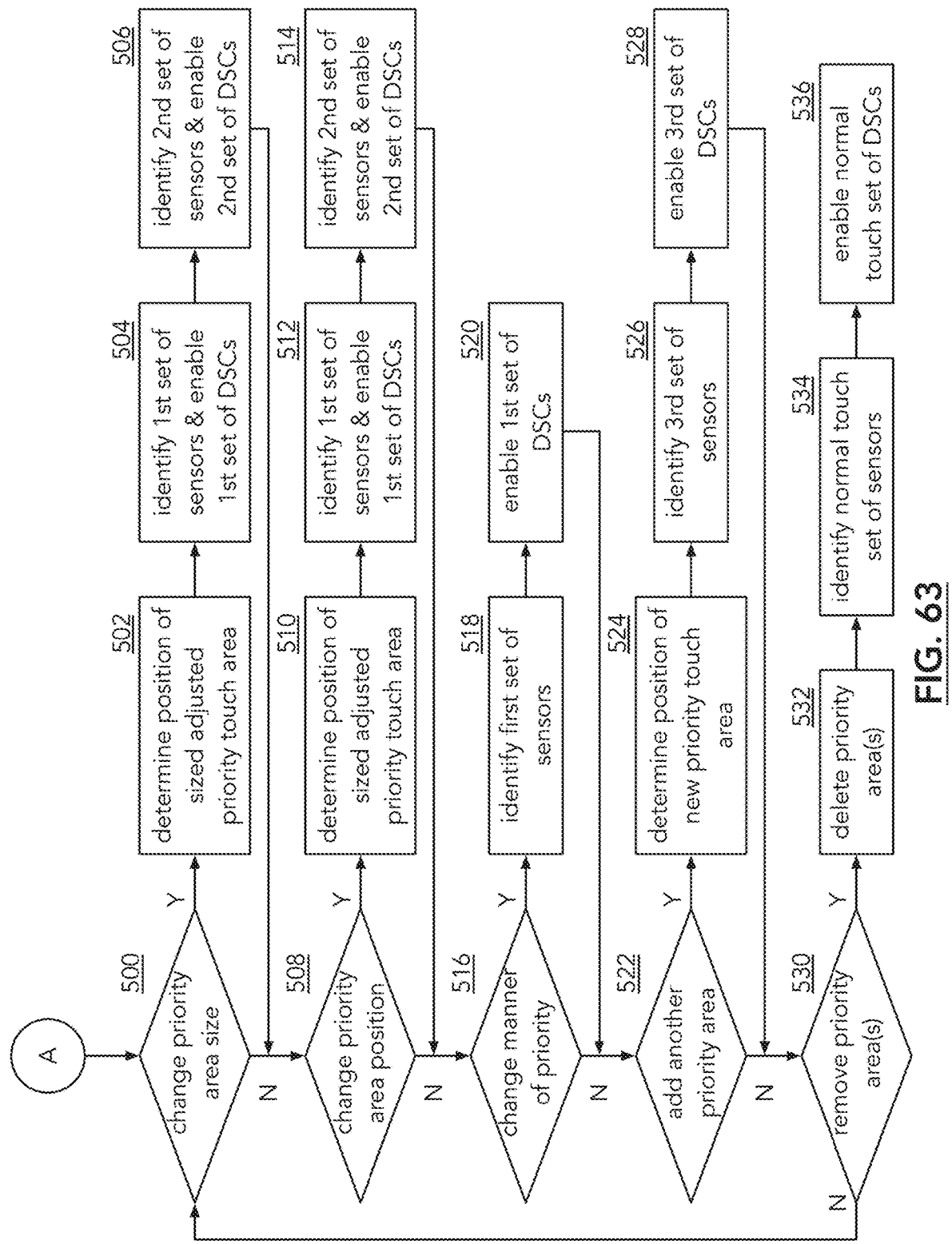

FIG. 9G1 is a schematic block diagram of an example of sub-pixel electrodes coupled together to form sensor cells;

FIG. 9G2 is a schematic block diagram of another example of sub-pixel electrodes coupled together to form sensor cells;

FIG. 9G3 is a schematic block diagram of another example of sub-pixel electrodes coupled together to form sensor cells;

FIG. 9H is a schematic block diagram of an example of a segmented common ground plane forming row electrodes and column electrodes of a touch screen sensor;

FIG. 9I is a schematic block diagram of another example of sub-pixel electrodes coupled together to form row and column electrodes of a touch screen sensor;

FIG. 9J is a cross section schematic block diagram of an example of a touch screen display with on-cell touch sensors;

FIG. 10A is a cross section schematic block diagram of an example of_self-capacitance with no-touch on a touch screen display;

FIG. 10B is a cross section schematic block diagram of an example of_self-capacitance with a touch on a touch screen display;

FIG. 11A is a cross section schematic block diagram of an example of_self-capacitance and mutual capacitance with no-touch on a touch screen display;

FIG. 11B is a cross section schematic block diagram of an example of_self-capacitance and mutual capacitance with a touch on a touch screen display;

FIG. 12 is a cross section schematic block diagram of an example of an OLED pixel of a touch screen display;

FIG. 13 is an example graph that plots condition verses capacitance for an electrode of a touch screen display;

FIG. 14 is an example graph that plots impedance verses frequency for an electrode of a touch screen display;

FIG. 15 is a time domain example graph that plots magnitude verses time for an analog reference signal;

FIG. 16 is a frequency domain example graph that plots magnitude verses frequency for an analog reference signal;

FIG. 17 is a schematic block diagram of an example of a first drive sense circuit coupled to a first electrode and a second drive sense circuit coupled to a second electrode without a touch proximal to the electrodes;

FIG. 18 is a schematic block diagram of an example of a first drive sense circuit coupled to a first electrode and a second drive sense circuit coupled to a second electrode with a finger touch proximal to the electrodes;

FIG. 19 is a schematic block diagram of a few drive sense circuits and a portion of the touch screen processing module of a touch screen display without a finger touch;

FIG. 20 is a schematic block diagram of a finger touch example of a few drive sense circuits and a portion of the touch screen processing module of a touch screen display;

FIG. 21 is a schematic block diagram of an embodiment of a plurality of electrodes creating a plurality of touch sense cells;

FIG. 22 is a schematic block diagram of an example of frequency dividing for reference signals for drive-sense circuits of a touch screen display;

FIG. 23A is a schematic block diagram of an example of a device including a signal generator for touch sensing;

FIG. 23B is a diagram of an example of a device and a signal generator using an identifying frequency, a self-capacitance frequency, and one or more mutual capacitance frequencies for touch sensing;

FIG. 23C is a diagram of an example of a device and a signal generator using an identifying frequency for touch sensing;

FIG. 23D is a diagram of an example of a device and a signal generator using an identifying frequency and a self-capacitance frequency for touch sensing;

FIG. 23E is a diagram of an example of a device and a signal generator using an identifying frequency and one or more mutual capacitance frequencies for touch sensing;

FIG. 23F is a schematic block diagram of an example of a device including a signal generator and a sensor circuit for touch sensing;

FIG. 24A is a schematic block diagram of an example of a device communicating with another device having a signal generator via a body for touch sensing;

FIG. 24B is a schematic block diagram of an example of a device communicating with another device having a signal generator and a sensor circuit via a body for touch sensing;

FIG. 24C is a schematic block diagram of an example of a device communicating with two devices, each having a signal generator and a sensor circuit;

FIG. 25 is a schematic block diagram of an embodiment of a touch controller for touch sensing via a body;

FIG. 26A is a schematic block diagram of an example of operation of a sensor circuit of a touch controller;

FIG. 26B is a schematic block diagram of another example of operation of a sensor circuit of a touch controller;

FIG. 27A is a schematic block diagram of another example of operation of a sensor circuit of a touch controller;

FIG. 27B is a schematic block diagram of another example of operation of a sensor circuit of a touch controller;

FIG. 28 is a logic diagram of an example of a method for touch sensing via a body;

FIG. 29 is a schematic block diagram of an example of a single sensor being affected by a touch signal via a body;

FIGS. 30A and 30B are a schematic block diagram of an example of multiple sensors being affected by a touch signal via a body;

FIGS. 31A and 31B are a schematic block diagram of another example of multiple sensors being affected by a touch signal via a body;

FIG. 32 is a schematic block diagram of an embodiment of a signal generator;

FIG. 33 is a schematic block diagram of another embodiment of a signal generator;

FIG. 34 is a logic diagram of an example of a method for various modes of touch sensing via a body;

FIG. 35 is a schematic block diagram of an example of multiple touch data samples per frame of video data;

FIG. 36 is a diagram of an example of multiple frames of video data, where, within each frame, there are multiple touch data samples;

FIG. 37A is a schematic block diagram of an embodiment of video processing circuitry of a device that renders video data and touch data;

FIG. 37B is a schematic block diagram of another embodiment of video processing circuitry of a device that renders video data and touch data;

FIG. 38 is a schematic block diagram of an example of reading from and writing to a frame buffer;

FIG. 39 is a logic diagram of an example of a method of processing video data and touch data;

FIG. 40 is a diagram of an example of multiple frames of video data with rendering of touch data being offset based on multiple touch data samples;

FIG. 41 is a schematic block diagram of an example of a frame of video data for a video game that includes multiple touch data samples;

FIG. 42 is a schematic block diagram of an example of another frame of video data for the video game that includes multiple touch data samples;

FIG. 43 is a schematic block diagram of an example of a frame of video data for a video game that includes touch icons corresponding to multiple touch data samples;

FIG. 44 is a schematic block diagram of an example of dividing a frame of video data for a video game into sub-frames;

FIGS. 45A through 45E are schematic block diagrams of an example of rendering sub-frames of video data with touch icons;

FIG. 46 is a schematic block diagram of an example of dividing another frame of video data for a video game into sub-frames;

FIGS. 47A through 47E are schematic block diagrams of an example of rendering sub-frames of video data with touch icons;

FIG. 48 is a logic diagram of an example of a method of rendering frames of video data on a sub-frame level;

FIG. 49A is a logic diagram of a further example of a method of rendering frames of video data on a sub-frame level;

FIG. 49B is a logic diagram of a further example of a method of rendering frames of video data on a sub-frame level;

FIG. 49C is a logic diagram of a further example of a method of rendering frames of video data on a sub-frame level;

FIG. 50A is a logic diagram of an example of a method of rendering frames of video data on a sub-frame level with a higher refresh rate for touch icons and a touch affected video window;

FIG. 50B is a logic diagram of a further example of a method of rendering frames of video data on a sub-frame level with a higher refresh rate for touch icons and a touch affected video window;

FIG. 51A is a schematic block diagram of an example of touch screen including a priority touch area;

FIG. 51B is a schematic block diagram of an example of touch screen including multiple priority touch areas;

FIG. 51C is a schematic block diagram of another example of touch screen including multiple priority touch areas;

FIG. 51D is a schematic block diagram of another example of touch screen including multiple priority touch areas;

FIG. 52 is a schematic block diagram of an embodiment of a touch screen having a priority touch area;

FIG. 53 is a schematic block diagram of another embodiment of a touch screen having a priority touch area;

FIG. 54 is a schematic block diagram of another embodiment of a touch screen having a priority touch area;

FIG. 55A is a schematic block diagram of an example of multiple touch sense pads of a particular size of at least a second a touch screen;

FIG. 55B is a schematic block diagram of another example of multiple touch sense pads of a particular size of at least a second a touch screen;

FIG. 55C is a schematic block diagram of another example of multiple touch sense pads of a particular size of at least a second a touch screen;

FIG. 55D is a schematic block diagram of another example of multiple touch sense pads of a particular size of at least a second a touch screen;

FIG. 55E is a schematic block diagram of another example of multiple touch sense pads of a particular size of at least a second a touch screen;

FIG. 56A is a schematic block diagram of an example of multiple touch pads being proximally touched by a finger;

FIG. 56B is a schematic block diagram of another example of multiple touch pads being proximally touched by a finger;

FIG. 57 is a schematic block diagram of an example of high resolution touch area for use for fingerprint detection;

FIG. 58 is a schematic block diagram of an example of a priority touch area and a non-priority touch area;

FIG. 59 is a schematic block diagram of another example of a priority touch area and a non-priority touch area;

FIG. 60 is a schematic block diagram of another example of a priority touch area and a non-priority touch area;

FIG. 61 is a logic diagram of an example of method of processing a priority touch area and a non-priority touch area;

FIG. 62 is a logic diagram of a further example of method of processing a priority touch area and a non-priority touch area; and FIG. 63 is a logic diagram of a further example of method of processing a priority touch area and a non-priority touch area.

DETAILED DESCRIPTION OF THE INVENTION

FIG. 1 is a schematic block diagram of an embodiment of a communication system 10 that includes a plurality of computing. devices 12-10, one or more servers 22, one or more databases 24, one or more networks 26, a plurality of drive-sense circuits 28, a plurality of sensors 30, and a plurality of actuators 32. Computing devices 12 includes a touch screen 16 with sensors and drive-sensor circuits and computing devices 18 include a touch & tactic screen 20 that includes sensors, actuators, and drive-sense circuits.

A sensor 30 functions to convert a physical input into an electrical output and/or an optical output. The physical input of a sensor may be one of a variety of physical input conditions. For example, the physical condition includes one or more of, but is not limited to, acoustic waves (e.g., amplitude, phase, polarization, spectrum, and/or wave velocity); a biological and/or chemical condition (e.g., fluid concentration, level, composition, etc.); an electric condition (e.g., charge, voltage, current, conductivity, permittivity, eclectic field, which includes amplitude, phase, and/or polarization); a magnetic condition (e.g., flux, permeability, magnetic field, which amplitude, phase, and/or polarization); an optical condition (e.g., refractive index, reflectivity, absorption, etc.); a thermal condition (e.g., temperature, flux, specific heat, thermal conductivity, etc.); and a mechanical condition (e.g., position, velocity, acceleration, force, strain, stress, pressure, torque, etc.). For example, piezoelectric sensor converts force or pressure into an eclectic signal. As another example, a microphone converts audible acoustic waves into electrical signals.

There are a variety of types of sensors to sense the various types of physical conditions. Sensor types include, but are not limited to, capacitor sensors, inductive sensors, accelerometers, piezoelectric sensors, light sensors, magnetic field sensors, ultrasonic sensors, temperature sensors, infrared (IR) sensors, touch sensors, proximity sensors, pressure sensors, level sensors, smoke sensors, and gas sensors. In many ways, sensors function as the interface between the physical world and the digital world by converting real world conditions into digital signals that are then processed by computing devices for a vast number of applications including, but not limited to, medical applications, production automation applications, home environment control, public safety, and so on.

The various types of sensors have a variety of sensor characteristics that are factors in providing power to the sensors, receiving signals from the sensors, and/or interpreting the signals from the sensors. The sensor characteristics include resistance, reactance, power requirements, sensitivity, range, stability, repeatability, linearity, error, response time, and/or frequency response. For example, the resistance, reactance, and/or power requirements are factors in determining drive circuit requirements. As another example, sensitivity, stability, and/or linear are factors for interpreting the measure of the physical condition based on the received electrical and/or optical signal (e.g., measure of temperature, pressure, etc.).

An actuator 32 converts an electrical input into a physical output. The physical output of an actuator may be one of a variety of physical output conditions. For example, the physical output condition includes one or more of, but is not limited to, acoustic waves (e.g., amplitude, phase, polarization, spectrum, and/or wave velocity); a magnetic condition (e.g., flux, permeability, magnetic field, which amplitude, phase, and/or polarization); a thermal condition (e.g., temperature, flux, specific heat, thermal conductivity, etc.); and a mechanical condition (e.g., position, velocity, acceleration, force, strain, stress, pressure, torque, etc.). As an example, a piezoelectric actuator converts voltage into force or pressure. As another example, a speaker converts electrical signals into audible acoustic waves.

An actuator 32 may be one of a variety of actuators. For example, an actuator 32 is one of a comb drive, a digital micro-mirror device, an electric motor, an electroactive polymer, a hydraulic cylinder, a piezoelectric actuator, a pneumatic actuator, a screw jack, a servomechanism, a solenoid, a stepper motor, a shape-memory allow, a thermal bimorph, and a hydraulic actuator.

The various types of actuators have a variety of actuators characteristics that are factors in providing power to the actuator and sending signals to the actuators for desired performance. The actuator characteristics include resistance, reactance, power requirements, sensitivity, range, stability, repeatability, linearity, error, response time, and/or frequency response. For example, the resistance, reactance, and power requirements are factors in determining drive circuit requirements. As another example, sensitivity, stability, and/or linear are factors for generating the signaling to send to the actuator to obtain the desired physical output condition.

The computing devices 12, 14, and 18 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. The computing devices 12, 14, and 18 will be discussed in greater detail with reference to one or more of FIGS. 2-4.

A server 22 is a special type of computing device that is optimized for processing large amounts of data requests in parallel. A server 22 includes similar components to that of the computing devices 12, 14, and/or 18 with more robust processing modules, more main memory, and/or more hard drive memory (e.g., solid state, hard drives, etc.). Further, a server 22 is typically accessed remotely; as such it does not generally include user input devices and/or user output devices. In addition, a server may be a standalone separate computing device and/or may be a cloud computing device.

A database 24 is a special type of computing device that is optimized for large scale data storage and retrieval. A database 24 includes similar components to that of the computing devices 12, 14, and/or 18 with more hard drive memory (e.g., solid state, hard drives, etc.) and potentially with more processing modules and/or main memory. Further, a database 24 is typically accessed remotely; as such it does not generally include user input devices and/or user output devices. In addition, a database 24 may be a stand-alone separate computing device and/or may be a cloud computing device.

The network 26 includes one more local area networks (LAN) and/or one or more wide area networks WAN), which may be a public network and/or a private network. A LAN may be a wireless-LAN (e.g., Wi-Fi access point, Bluetooth, ZigBee, etc.) and/or a wired network (e.g., Firewire, Ethernet, etc.). A WAN may be a wired and/or wireless WAN. For example, a LAN may be a personal home or business's wireless network and a WAN is the Internet, cellular telephone infrastructure, and/or satellite communication infrastructure.

In an example of operation, computing device 12-1 communicates with a plurality of drive-sense circuits 28, which, in turn, communicate with a plurality of sensors 30. The sensors 30 and/or the drive-sense circuits 28 are within the computing device 12-1 and/or external to it. For example, the sensors 30 may be external to the computing device 12-1 and the drive-sense circuits are within the computing device 12-1. As another example, both the sensors 30 and the drive-sense circuits 28 are external to the computing device 12-1. When the drive-sense circuits 28 are external to the computing device, they are coupled to the computing device 12-1 via wired and/or wireless communication links as will be discussed in greater detail with reference to one or more of FIGS. 5A-5C.

The computing device 12-1 communicates with the drive-sense circuits 28 to; (a) turn them on, (b) obtain data from the sensors (individually and/or collectively), (c) instruct the drive sense circuit on how to communicate the sensed data to the computing device 12-1, (d) provide signaling attributes (e.g., DC level, AC level, frequency, power level, regulated current signal, regulated voltage signal, regulation of an impedance, frequency patterns for various sensors, different frequencies for different sensing applications, etc.) to use with the sensors, and/or (e) provide other commands and/or instructions.

As a specific example, the sensors 30 are distributed along a pipeline to measure flow rate and/or pressure within a section of the pipeline. The drive-sense circuits 28 have their own power source (e.g., battery, power supply, etc.) and are proximally located to their respective sensors 30. At desired time intervals (milliseconds, seconds, minutes, hours, etc.), the drive-sense circuits 28 provide a regulated source signal or a power signal to the sensors 30. An electrical characteristic of the sensor 30 affects the regulated source signal or power signal, which is reflective of the condition (e.g., the flow rate and/or the pressure) that sensor is sensing.

The drive-sense circuits 28 detect the effects on the regulated source signal or power signals as a result of the electrical characteristics of the sensors. The drive-sense circuits 28 then generate signals representative of change to the regulated source signal or power signal based on the detected effects on the power signals. The changes to the regulated source signals or power signals are representative of the conditions being sensed by the sensors 30.

The drive-sense circuits 28 provide the representative signals of the conditions to the computing device 12-1. A representative signal may be an analog signal or a digital signal. In either case, the computing device 12-1 interprets the representative signals to determine the pressure and/or flow rate at each sensor location along the pipeline. The computing device may then provide this information to the server 22, the database 24, and/or to another computing device for storing and/or further processing.

As another example of operation, computing device 12-2 is coupled to a drive-sense circuit 28, which is, in turn, coupled to a senor 30. The sensor 30 and/or the drive-sense circuit 28 may be internal and/or external to the computing device 12-2. In this example, the sensor 30 is sensing a condition that is particular to the computing device 12-2. For example, the sensor 30 may be a temperature sensor, an ambient light sensor, an ambient noise sensor, etc. As described above, when instructed by the computing device 12-2 (which may be a default setting for continuous sensing or at regular intervals), the drive-sense circuit 28 provides the regulated source signal or power signal to the sensor 30 and detects an effect to the regulated source signal or power signal based on an electrical characteristic of the sensor. The drive-sense circuit generates a representative signal of the affect and sends it to the computing device 12-2.

In another example of operation, computing device 12-3 is coupled to a plurality of drive-sense circuits 28 that are coupled to a plurality of sensors 30 and is coupled to a plurality of drive-sense circuits 28 that are coupled to a plurality of actuators 32. The generally functionality of the drive-sense circuits 28 coupled to the sensors 30 in accordance with the above description.

Since an actuator 32 is essentially an inverse of a sensor in that an actuator converts an electrical signal into a physical condition, while a sensor converts a physical condition into an electrical signal, the drive-sense circuits 28 can be used to power actuators 32. Thus, in this example, the computing device 12-3 provides actuation signals to the drive-sense circuits 28 for the actuators 32. The drive-sense circuits modulate the actuation signals on to power signals or regulated control signals, which are provided to the actuators 32. The actuators 32 are powered from the power signals or regulated control signals and produce the desired physical condition from the modulated actuation signals.

As another example of operation, computing device 12-*x* is coupled to a drive-sense circuit 28 that is coupled to a sensor 30 and is coupled to a drive-sense circuit 28 that is coupled to an actuator 32. In this example, the sensor 30 and the actuator 32 are for use by the computing device 12-*x*. For example, the sensor 30 may be a piezoelectric microphone and the actuator 32 may be a piezoelectric speaker.

FIG. 2 is a schematic block diagram of an embodiment of a computing device 12 (e.g., any one of 12-1 through 12-*x*). The computing device 12 includes a touch screen 16, a core control module 40, one or more processing modules 42, one or more main memories 44, cache memory 46, a video graphics processing module 48, a display 50, an Input-Output (I/O) peripheral control module 52, one or more input interface modules 56, one or more output interface modules 58, one or more network interface modules 60, and one or more memory interface modules 62. A processing module 42 is described in greater detail at the end of the detailed description of the invention section and, in an alternative embodiment, has a direction connection to the main memory 44. In an alternate embodiment, the core control module 40 and the I/O and/or peripheral control module 52 are one module, such as a chipset, a quick path interconnect (QPI), and/or an ultra-path interconnect (UPI).

The touch screen 16 includes a touch screen display 80, a plurality of sensors 30, a plurality of drive-sense circuits (DSC), and a touch screen processing module 82. In general, the sensors (e.g., electrodes, capacitor sensing cells, capacitor sensors, inductive sensor, etc.) detect a proximal touch of the screen. For example, when one or more fingers touches the screen, capacitance of sensors proximal to the touch(es) are affected (e.g., impedance changes). The drive-sense circuits (DSC) coupled to the affected sensors detect the change and provide a representation of the change to the touch screen processing module 82, which may be a separate processing module or integrated into the processing module 42.

The touch screen processing module 82 processes the representative signals from the drive-sense circuits (DSC) to determine the location of the touch(es). This information is inputted to the processing module 42 for processing as an input. For example, a touch represents a selection of a button on screen, a scroll function, a zoom in-out function, etc.

Each of the main memories 44 includes one or more Random Access Memory (RAM) integrated circuits, or chips. For example, a main memory 44 includes four DDR4 ($4^{th}$ generation of double data rate) RAM chips, each running at a rate of 2,400 MHz. In general, the main memory 44 stores data and operational instructions most relevant for the processing module 42. For example, the core control module 40 coordinates the transfer of data and/or operational instructions from the main memory 44 and the memory 64-66. The data and/or operational instructions retrieve from memory 64-66 are the data and/or operational instructions requested by the processing module or will most likely be needed by the processing module. When the processing module is done with the data and/or operational instructions in main memory, the core control module 40 coordinates sending updated data to the memory 64-66 for storage.

The memory 64-66 includes one or more hard drives, one or more solid state memory chips, and/or one or more other large capacity storage devices that, in comparison to cache memory and main memory devices, is/are relatively inexpensive with respect to cost per amount of data stored. The memory 64-66 is coupled to the core control module 40 via the I/O and/or peripheral control module 52 and via one or more memory interface modules 62. In an embodiment, the I/O and/or peripheral control module 52 includes one or more Peripheral Component Interface (PCI) buses to which peripheral components connect to the core control module 40. A memory interface module 62 includes a software driver and a hardware connector for coupling a memory device to the I/O and/or peripheral control module 52. For example, a memory interface 62 is in accordance with a Serial Advanced Technology Attachment (SATA) port.

The core control module 40 coordinates data communications between the processing module(s) 42 and the network(s) 26 via the I/O and/or peripheral control module 52, the network interface module(s) 60, and a network card 68 or 70. A network card 68 or 70 includes a wireless communication unit or a wired communication unit. A wireless communication unit includes a wireless local area network (WLAN) communication device, a cellular communication device, a Bluetooth device, and/or a ZigBee communication device. A wired communication unit includes a Gigabit LAN connection, a Firewire connection, and/or a proprietary computer wired connection. A network interface module 60 includes a software driver and a hardware connector for coupling the network card to the I/O and/or peripheral control module 52. For example, the network interface module 60 is in accordance with one or more versions of IEEE 802.11, cellular telephone protocols, 10/100/1000 Gigabit LAN protocols, etc.

The core control module 40 coordinates data communications between the processing module(s) 42 and input device(s) 72 via the input interface module(s) 56 and the I/O and/or peripheral control module 52. An input device 72 includes a keypad, a keyboard, control switches, a touchpad, a microphone, a camera, etc. An input interface module 56 includes a software driver and a hardware connector for coupling an input device to the I/O and/or peripheral control module 52. In an embodiment, an input interface module 56 is in accordance with one or more Universal Serial Bus (USB) protocols.

The core control module 40 coordinates data communications between the processing module(s) 42 and output device(s) 74 via the output interface module(s) 58 and the I/O and/or peripheral control module 52. An output device 74 includes a speaker, etc. An output interface module 58 includes a software driver and a hardware connector for coupling an output device to the I/O and/or peripheral control module 52. In an embodiment, an output interface module 56 is in accordance with one or more audio codec protocols.

The processing module 42 communicates directly with a video graphics processing module 48 to display data on the display 50. The display 50 includes an LED (light emitting diode) display, an LCD (liquid crystal display), and/or other type of display technology. The display has a resolution, an aspect ratio, and other features that affect the quality of the display. The video graphics processing module 48 receives data from the processing module 42, processes the data to produce rendered data in accordance with the characteristics of the display, and provides the rendered data to the display 50.

Figure 2A:
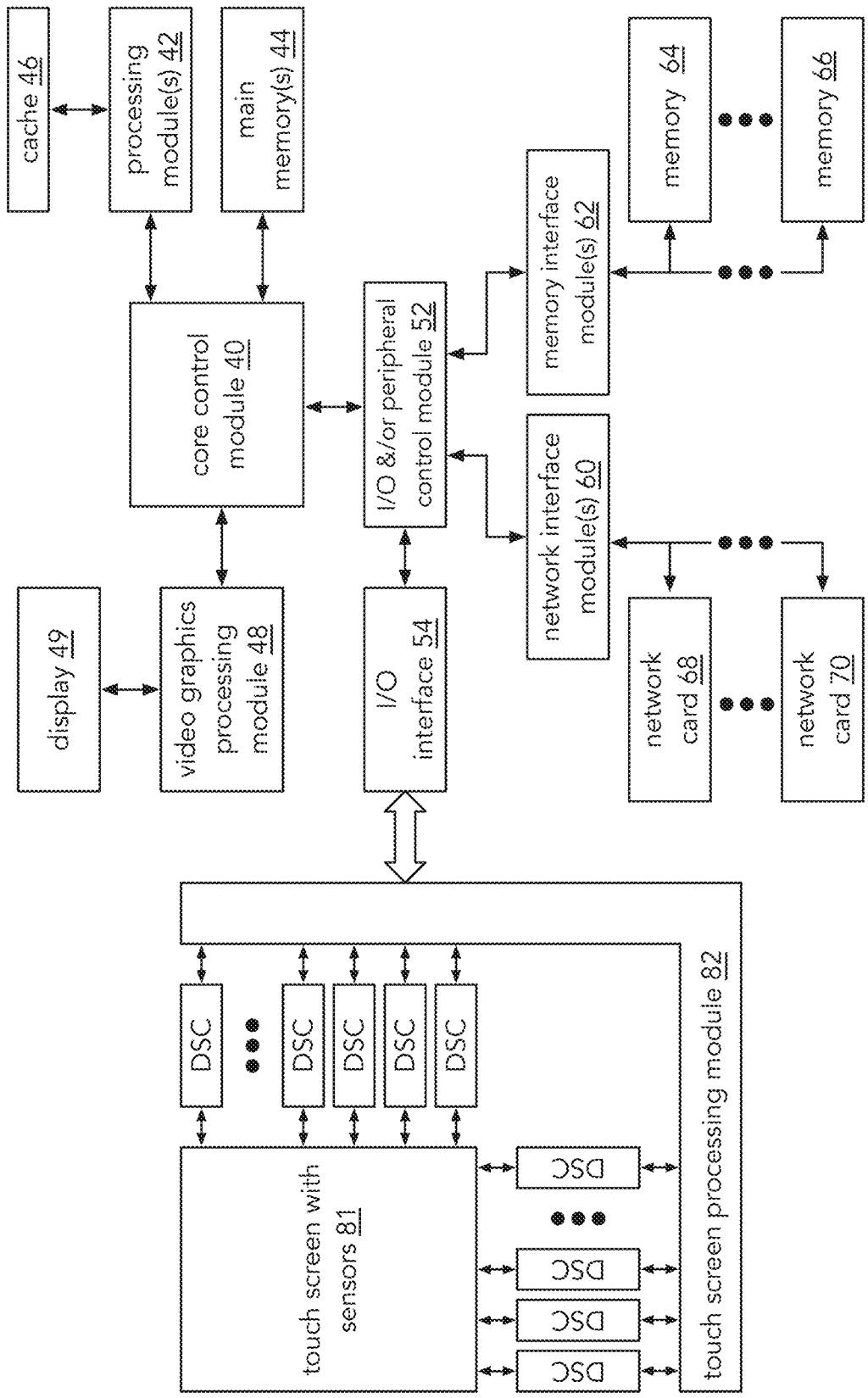

FIG. 2A is a schematic block diagram of an embodiment of a computing device 12 (e.g., any one of 12-1 through 12-x). The computing device 12 includes a touch screen with sensors 81, a core control module 40, one or more processing modules 42, one or more main memories 44, cache memory 46, a video graphics processing module 48, a display 49, an Input-Output (I/O) peripheral control module 52, one or more input interface modules 56, one or more output interface modules 58, one or more network interface modules 60, and one or more memory interface modules 62. A processing module 42 is described in greater detail at the end of the detailed description of the invention section and, in an alternative embodiment, has a direction connection to the main memory 44. In an alternate embodiment, the core control module 40 and the I/O and/or peripheral control module 52 are one module, such as a chipset, a quick path interconnect (QPI), and/or an ultra-path interconnect (UPI).

The touch screen with sensors 81 includes a plurality of sensors 30, a plurality of drive-sense circuits (DSC), and a touch screen processing module 82. In general, the sensors (e.g., electrodes, capacitor sensing cells, capacitor sensors, inductive sensor, etc.) detect a proximal touch of the screen. For example, when one or more fingers touches the screen, capacitance of sensors proximal to the touch(es) are affected (e.g., impedance changes). The drive-sense circuits (DSC) coupled to the affected sensors detect the change and provide a representation of the change to the touch screen processing module 82, which may be a separate processing module or integrated into the processing module 42.

The touch screen processing module 82 processes the representative signals from the drive-sense circuits (DSC) to determine the location of the touch(es). This information is inputted to the processing module 42 for processing as an input. For example, a touch represents a selection of a button on screen, a scroll function, a zoom in-out function, etc.

Each of the main memories 44 includes one or more Random Access Memory (RAM) integrated circuits, or chips. For example, a main memory 44 includes four DDR4 ($4^{th}$ generation of double data rate) RAM chips, each running at a rate of 2,400 MHz. In general, the main memory 44 stores data and operational instructions most relevant for the processing module 42. For example, the core control module 40 coordinates the transfer of data and/or operational instructions from the main memory 44 and the memory 64-66. The data and/or operational instructions retrieve from memory 64-66 are the data and/or operational instructions requested by the processing module or will most likely be needed by the processing module. When the processing module is done with the data and/or operational instructions in main memory, the core control module 40 coordinates sending updated data to the memory 64-66 for storage.

The memory 64-66 includes one or more hard drives, one or more solid state memory chips, and/or one or more other large capacity storage devices that, in comparison to cache memory and main memory devices, is/are relatively inexpensive with respect to cost per amount of data stored. The memory 64-66 is coupled to the core control module 40 via the I/O and/or peripheral control module 52 and via one or more memory interface modules 62. In an embodiment, the I/O and/or peripheral control module 52 includes one or more Peripheral Component Interface (PCI) buses to which peripheral components connect to the core control module 40. A memory interface module 62 includes a software driver and a hardware connector for coupling a memory device to the I/O and/or peripheral control module 52. For example, a memory interface 62 is in accordance with a Serial Advanced Technology Attachment (SATA) port.

The core control module 40 coordinates data communications between the processing module(s) 42 and the network(s) 26 via the I/O and/or peripheral control module 52, the network interface module(s) 60, and a network card 68 or 70. A network card 68 or 70 includes a wireless communication unit or a wired communication unit. A wireless communication unit includes a wireless local area network (WLAN) communication device, a cellular communication device, a Bluetooth device, and/or a ZigBee communication device. A wired communication unit includes a Gigabit LAN connection, a Firewire connection, and/or a proprietary computer wired connection. A network interface module 60 includes a software driver and a hardware connector for coupling the network card to the I/O and/or peripheral control module 52. For example, the network interface module 60 is in accordance with one or more versions of IEEE 802.11, cellular telephone protocols, 10/100/1000 Gigabit LAN protocols, etc.

The core control module 40 coordinates data communications between the processing module(s) 42 and input device(s) 72 via the input interface module(s) 56 and the I/O and/or peripheral control module 52. An input device 72 includes a keypad, a keyboard, control switches, a touchpad, a microphone, a camera, etc. An input interface module 56 includes a software driver and a hardware connector for coupling an input device to the I/O and/or peripheral control module 52. In an embodiment, an input interface module 56 is in accordance with one or more Universal Serial Bus (USB) protocols.

The core control module 40 coordinates data communications between the processing module(s) 42 and output device(s) 74 via the output interface module(s) 58 and the I/O and/or peripheral control module 52. An output device 74 includes a speaker, etc. An output interface module 58 includes a software driver and a hardware connector for coupling an output device to the I/O and/or peripheral control module 52. In an embodiment, an output interface module 56 is in accordance with one or more audio codec protocols.

The processing module 42 communicates directly with a video graphics processing module 48 to display data on the display 49. The display 49 includes an LED (light emitting diode) display, an LCD (liquid crystal display), and/or other type of display technology. The display has a resolution, an aspect ratio, and other features that affect the quality of the display. The video graphics processing module 48 receives data from the processing module 42, processes the data to produce rendered data in accordance with the characteristics of the display, and provides the rendered data to the display 50.

FIG. 3 is a schematic block diagram of another embodiment of a computing device 18 that includes a core control module 40, one or more processing modules 42, one or more main memories 44, cache memory 46, a video graphics processing module 48, a touch and tactile screen 20, an Input-Output (I/O) peripheral control module 52, one or more input interface modules 56, one or more output interface modules 58, one or more network interface modules 60, and one or more memory interface modules 62. The touch and tactile screen 20 includes a touch and tactile screen display 90, a plurality of sensors 30, a plurality of actuators 32, a plurality of drive-sense circuits (DSC), a touch screen processing module 82, and a tactile screen processing module 92.

Computing device 18 operates similarly to computing device 14 of FIG. 2 with the addition of a tactile aspect to the screen 20 as an output device. The tactile portion of the screen 20 includes the plurality of actuators (e.g., piezoelectric transducers to create vibrations, solenoids to create movement, etc.) to provide a tactile feel to the screen 20. To do so, the processing module creates tactile data, which is provided to the appropriate drive-sense circuits (DSC) via the tactile screen processing module 92, which may be a stand-alone processing module or integrated into processing module 42. The drive-sense circuits (DSC) convert the tactile data into drive-actuate signals and provide them to the appropriate actuators to create the desired tactile feel on the screen 20.

Figure 4:
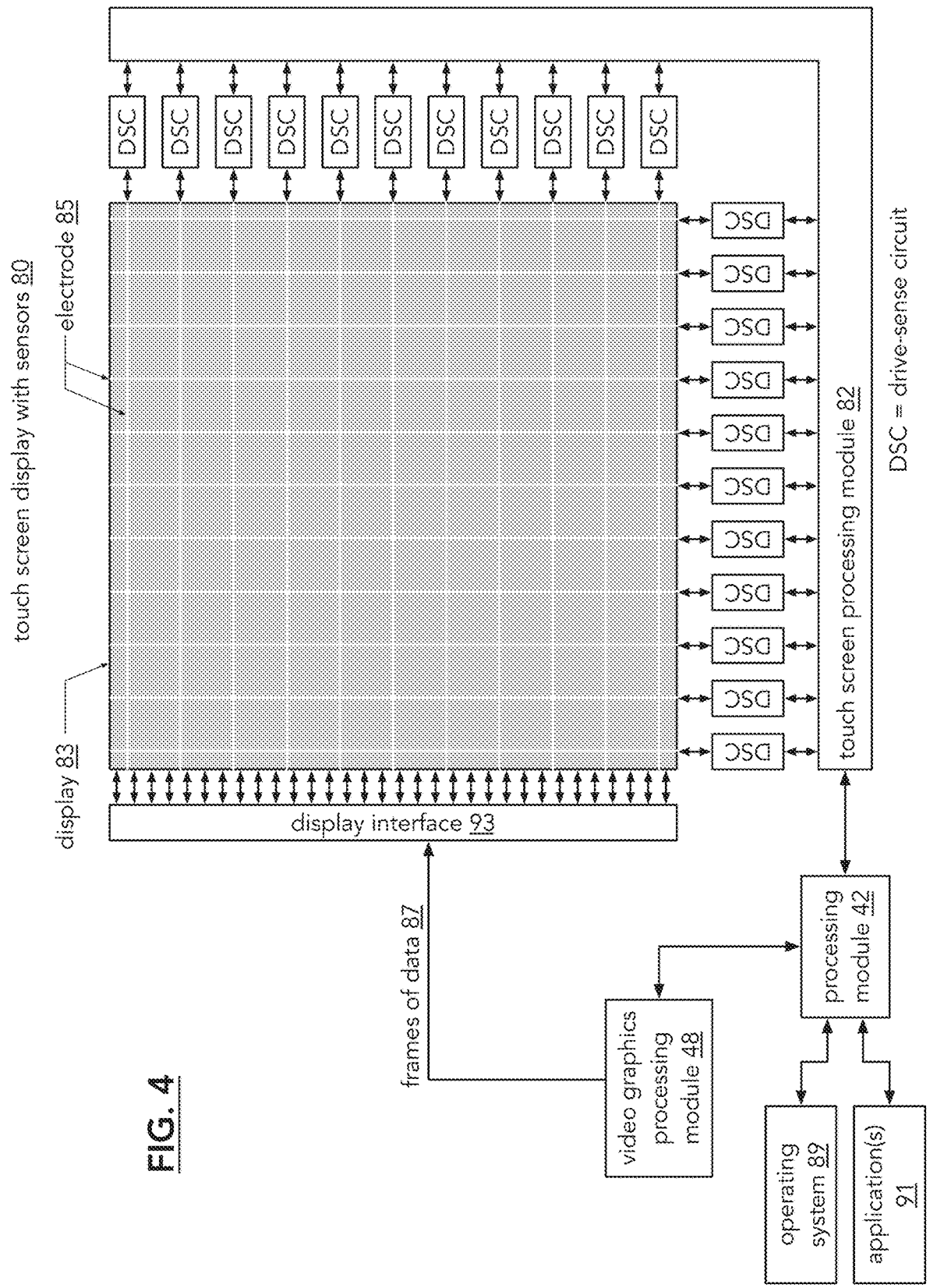
FIG. 4 is a schematic block diagram of an embodiment of a touch screen display.

FIG. 4 is a schematic block diagram of an embodiment of a touch screen display 80 that includes a plurality of drive-sense circuits (DSC), a touch screen processing module 82, a display 83, and a plurality of electrodes 85. The touch screen display 80 is coupled to a processing module 42, a video graphics processing module 48, and a display interface 93, which are components of a computing device (e.g., 14-18), an interactive display, or other device that includes a touch screen display. An interactive display functions to provide users with an interactive experience (e.g., touch the screen to obtain information, be entertained, etc.). For example, a store provides interactive displays for customers to find certain products, to obtain coupons, to enter contests, etc.

There are a variety of other devices that include a touch screen display. For example, a vending machine includes a touch screen display to select and/or pay for an item. As another example of a device having a touch screen display is an Automated Teller Machine (ATM). As yet another example, an automobile includes a touch screen display for entertainment media control, navigation, climate control, etc.

The touch screen display 80 includes a large display 83 that has a resolution equal to or greater than full high-definition (HD), an aspect ratio of a set of aspect ratios, and a screen size equal to or greater than thirty-two inches. The following table lists various combinations of resolution, aspect ratio, and screen size for the display 83, but it's not an exhaustive list.

| Resolution | Width (lines) | Height (lines) | pixel aspect ratio | screen aspect ratio | screen size (inches) |
| --- | --- | --- | --- | --- | --- |
| HD (high definition) | 1280 | 720 | 1:1 | 16:9 | 32, 40, 43, 50, 55, 60, 65, 70, 75, &/or >80 |
| Full HD | 1920 | 1080 | 1:1 | 16:9 | 32, 40, 43, 50, 55, 60, 65, 70, 75, &/or >80 |
| HD | 960 | 720 | 4:3 | 16:9 | 32, 40, 43, 50, 55, 60, 65, 70, 75, &/or >80 |
| HD | 1440 | 1080 | 4:3 | 16:9 | 32, 40, 43, 50, 55, 60, 65, 70, 75, &/or >80 |
| HD | 1280 | 1080 | 3:2 | 16:9 | 32, 40, 43, 50, 55, 60, 65, 70, 75, &/or >80 |
| QHD (quad HD) | 2560 | 1440 | 1:1 | 16:9 | 32, 40, 43, 50, 55, 60, 65, 70, 75, &/or >80 |
| UHD (Ultra HD) or 4K | 3840 | 2160 | 1:1 | 16:9 | 32, 40, 43, 50, 55, 60, 65, 70, 75, &/or >80 |
| 8K | 7680 | 4320 | 1:1 | 16:9 | 32, 40, 43, 50, 55, 60, 65, 70, 75, &/or >80 |
| HD and above | 1280->=7680 | 720->=4320 | 1:1, 2:3, etc. | 2:3 | 50, 55, 60, 65, 70, 75, &/or >80 |

The display 83 is one of a variety of types of displays that is operable to render frames of data into visible images. For example, the display is one or more of: a light emitting diode (LED) display, an electroluminescent display (ELD), a plasma display panel (PDP), a liquid crystal display (LCD), an LCD high performance addressing (HPA) display, an LCD thin film transistor (TFT) display, an organic light emitting diode (OLED) display, a digital light processing (DLP) display, a surface conductive electron emitter (SED) display, a field emission display (FED), a laser TV display, a carbon nanotubes display, a quantum dot display, an interferometric modulator display (IMOD), and a digital microshutter display (DMS). The display is active in a full display mode or a multiplexed display mode (i.e., only part of the display is active at a time).

The display 83 further includes integrated electrodes 85 that provide the sensors for the touch sense part of the touch screen display. The electrodes 85 are distributed throughout the display area or where touch screen functionality is desired. For example, a first group of the electrodes are arranged in rows and a second group of electrodes are arranged in columns. As will be discussed in greater detail with reference to one or more of FIGS. 9-12, the row electrodes are separated from the column electrodes by a dielectric material.

The electrodes 85 are comprised of a transparent conductive material and are in-cell or on-cell with respect to layers of the display. For example, a conductive trace is placed in-cell or on-cell of a layer of the touch screen display. The transparent conductive material, which is substantially transparent and has negligible effect on video quality of the display with respect to the human eye. For instance, an electrode is constructed from one or more of: Indium Tin Oxide, Graphene, Carbon Nanotubes, Thin Metal Films, Silver Nanowires Hybrid Materials, Aluminum-doped Zinc Oxide (AZO), Amorphous Indium-Zinc Oxide, Gallium-doped Zinc Oxide (GZO), and poly polystyrene sulfonate (PEDOT).

In an example of operation, the processing module 42 is executing an operating system application 89 and one or more user applications 91. The user applications 91 includes, but is not limited to, a video playback application, a spreadsheet application, a word processing application, a computer aided drawing application, a photo display application, an image processing application, a database application, etc. While executing an application 91, the processing module generates data for display (e.g., video data, image data, text data, etc.). The processing module 42 sends the data to the video graphics processing module 48, which converts the data into frames of video 87.

The video graphics processing module 48 sends the frames of video 87 (e.g., frames of a video file, refresh rate for a word processing document, a series of images, etc.) to the display interface 93. The display interface 93 provides the frames of video to the display 83, which renders the frames of video into visible images.

While the display 83 is rendering the frames of video into visible images, the drive-sense circuits (DSC) provide sensor signals to the electrodes 85. When the screen is touched, capacitance of the electrodes 85 proximal to the touch (i.e., directly or close by) is changed. The DSCs detect the capacitance change for effected electrodes and provide the detected change to the touch screen processing module 82.

The touch screen processing module 82 processes the capacitance change of the effected electrodes to determine one or more specific locations of touch and provides this information to the processing module 42. Processing module 42 processes the one or more specific locations of touch to determine if an operation of the application is to be altered. For example, the touch is indicative of a pause command, a fast forward command, a reverse command, an increase volume command, a decrease volume command, a stop command, a select command, a delete command, etc.

Figure 5:
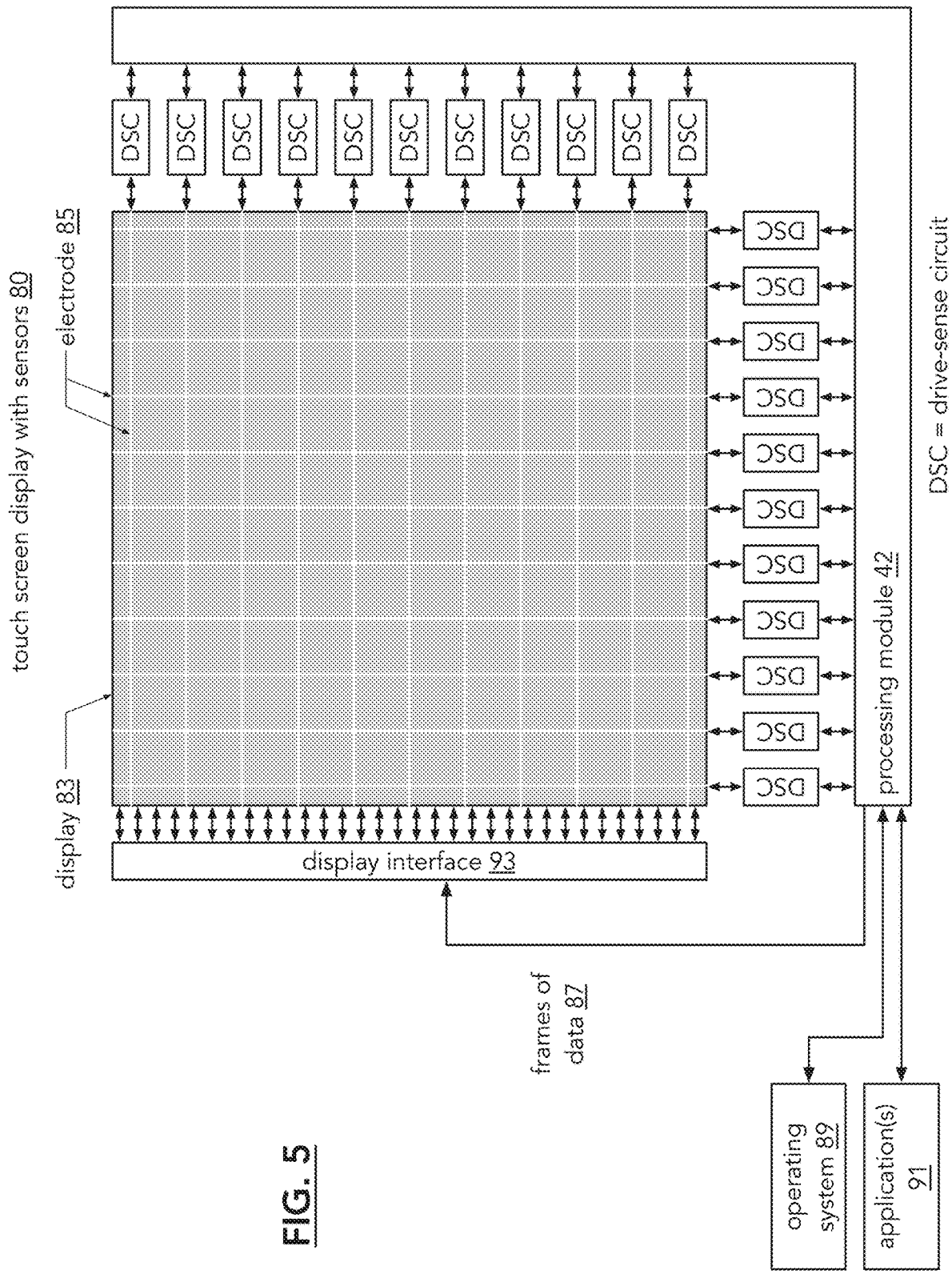
FIG. 5 is a schematic block diagram of another embodiment of a touch screen display.

FIG. 5 is a schematic block diagram of another embodiment of a touch screen display 80 that includes a plurality of drive-sense circuits (DSC), the processing module 42, a display 83, and a plurality of electrodes 85. The processing module 42 is executing an operating system 89 and one or more user applications 91 to produce frames of data 87. The processing module 42 provides the frames of data 87 to the display interface 93. The touch screen display 80 operates similarly to the touch screen display 80 of FIG. 4 with the above noted differences.

Figure 6:
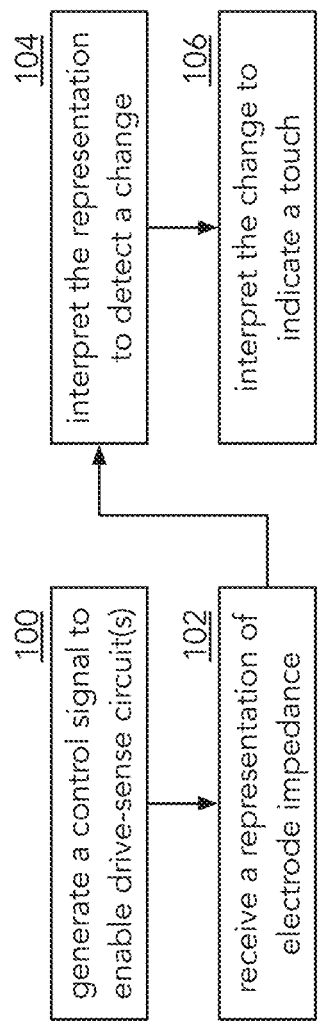
FIG. 6 is a logic diagram of an embodiment of a method for sensing a touch on a touch screen display.

FIG. 6 is a logic diagram of an embodiment of a method for sensing a touch on a touch screen display that is executed by one or more processing modules (e.g., 42, 82, and/or 48 of the previous figures). The method begins at step 100 where the processing module generate a control signal (e.g., power enable, operation enable, etc.) to enable a drive-sense circuit to monitor the sensor signal on the electrode. The processing module generates additional control signals to enable other drive-sense circuits to monitor their respective sensor signals. In an example, the processing module enables all of the drive-sense circuits for continuous sensing for touches of the screen. In another example, the processing module enables a first group of drive-sense circuits coupled to a first group of row electrodes and enables a second group of drive-sense circuits coupled to a second group of column electrodes.

The method continues at step 102 where the processing module receives a representation of the impedance on the electrode from a drive-sense circuit. In general, the drive-sense circuit provides a drive signal to the electrode. The impedance of the electrode affects the drive signal. The effect on the drive signal is interpreted by the drive-sense circuit to produce the representation of the impedance of the electrode. The processing module does this with each activated drive-sense circuit in serial, in parallel, or in a serial-parallel manner.

The method continues at step 104 where the processing module interprets the representation of the impedance on the electrode to detect a change in the impedance of the electrode. A change in the impedance is indicative of a touch. For example, an increase in self-capacitance (e.g., the capacitance of the electrode with respect to a reference (e.g., ground, etc.)) is indicative of a touch on the electrode. As another example, a decrease in mutual capacitance (e.g., the capacitance between a row electrode and a column electrode) is also indicative of a touch near the electrodes. The processing module does this for each representation of the impedance of the electrode it receives. Note that the representation of the impedance is a digital value, an analog signal, an impedance value, and/or any other analog or digital way of representing a sensor's impedance.

The method continues at step 106 where the processing module interprets the change in the impedance to indicate a touch of the touch screen display in an area corresponding to the electrode. For each change in impedance detected, the processing module indicates a touch. Further processing may be done to determine if the touch is a desired touch or an undesired touch. Such further processing will be discussed in greater detail with reference to one or more of FIGS. 33-35.

Figure 7:
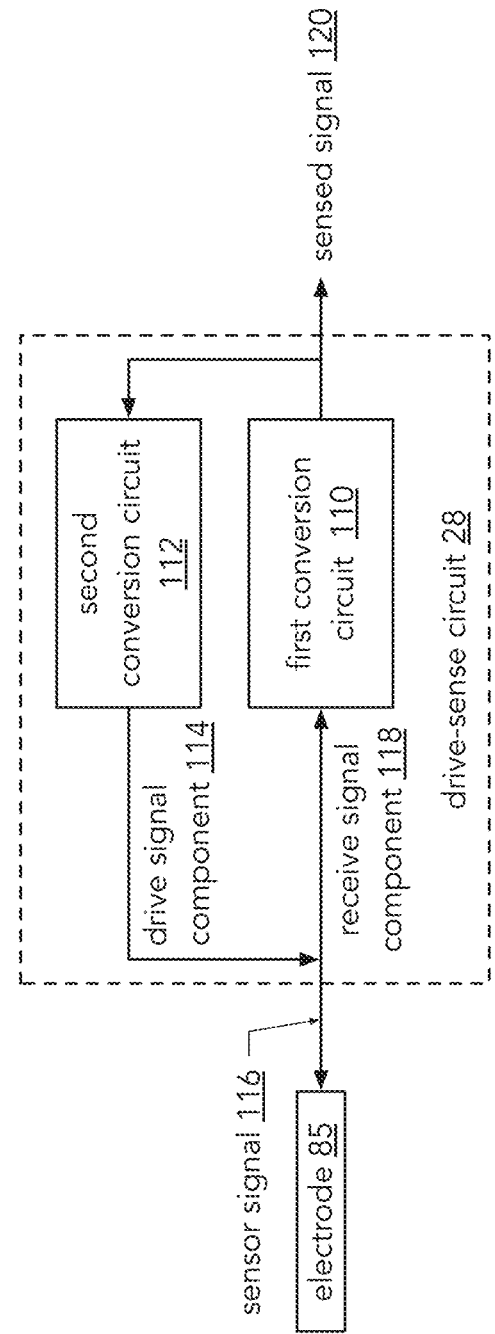
FIG. 7 is a schematic block diagram of an embodiment of a drive sense circuit.

FIG. 7 is a schematic block diagram of an embodiment of a drive sense circuit 28 that includes a first conversion circuit 110 and a second conversion circuit 112. The first conversion circuit 110 converts a sensor signal 116 into a sensed signal 120. The second conversion circuit 112 generates the drive signal component 114 from the sensed signal 112. As an example, the first conversion circuit 110 functions to keep the sensor signal 116 substantially constant (e.g., substantially matching a reference signal) by creating the sensed signal 120 to correspond to changes in a receive signal component 118 of the sensor signal. The second conversion circuit 112 functions to generate a drive signal component 114 of the sensor signal based on the sensed signal 120 to substantially compensate for changes in the receive signal component 118 such that the sensor signal 116 remains substantially constant.

In an example, the drive signal 116 is provided to the electrode 85 as a regulated current signal. The regulated current (I) signal in combination with the impedance (Z) of the electrode creates an electrode voltage (V), where $V=I*Z$. As the impedance (Z) of electrode changes, the regulated current (I) signal is adjusted to keep the electrode voltage (V) substantially unchanged. To regulate the current signal, the first conversion circuit 110 adjusts the sensed signal 120 based on the receive signal component 118, which is indicative of the impedance of the electrode and change thereof. The second conversion circuit 112 adjusts the regulated current based on the changes to the sensed signal 120.

As another example, the drive signal 116 is provided to the electrode 85 as a regulated voltage signal. The regulated voltage (V) signal in combination with the impedance (Z) of the electrode creates an electrode current (I), where I=V/Z. As the impedance (Z) of electrode changes, the regulated voltage (V) signal is adjusted to keep the electrode current (I) substantially unchanged. To regulate the voltage signal, the first conversion circuit 110 adjusts the sensed signal 120 based on the receive signal component 118, which is indicative of the impedance of the electrode and change thereof. The second conversion circuit 112 adjusts the regulated voltage based on the changes to the sensed signal 120.

Figure 8:
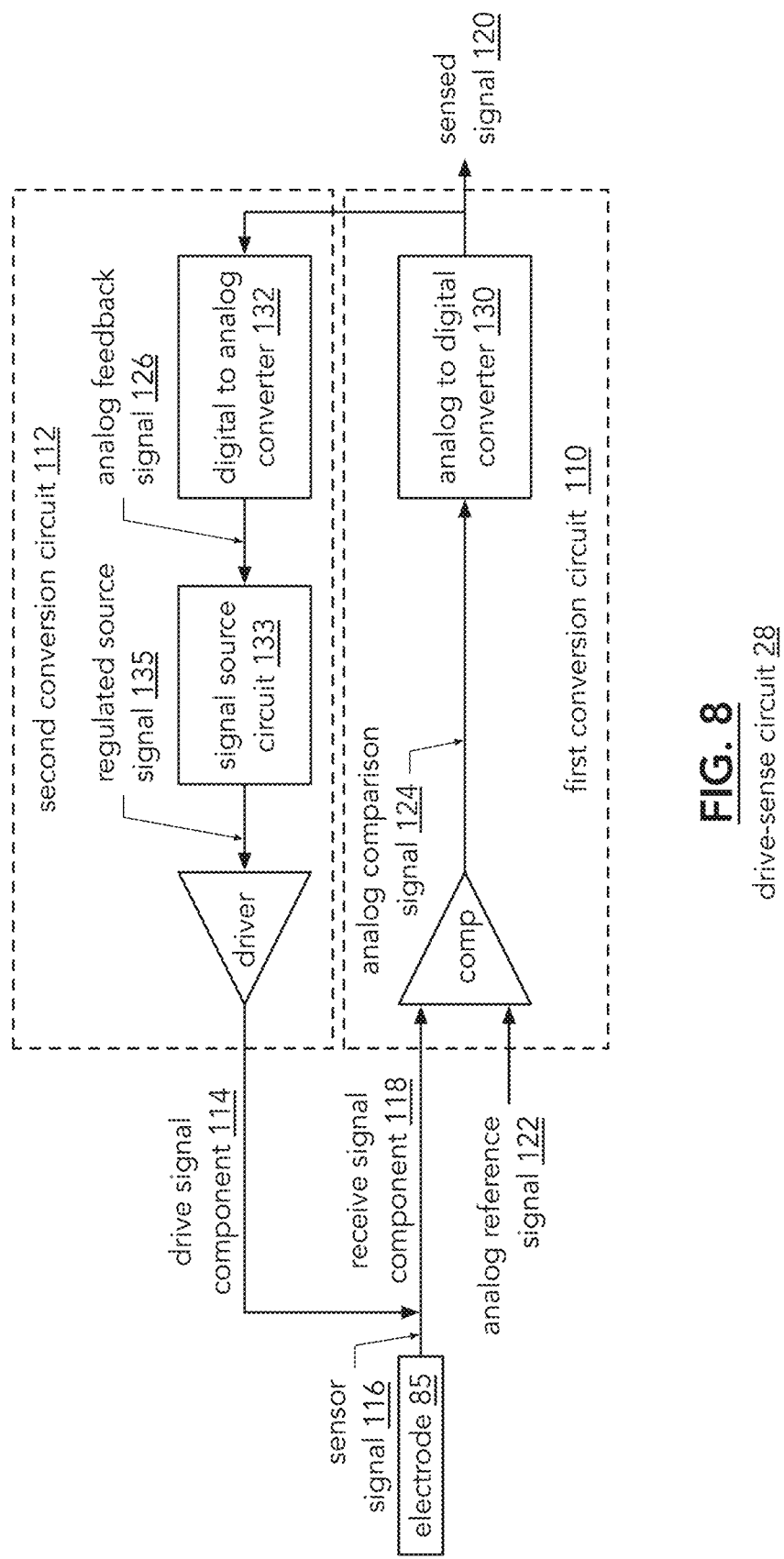
FIG. 8 is a schematic block diagram of another embodiment of a drive sense circuit.

FIG. 8 is a schematic block diagram of another embodiment of a drive sense circuit 28 that includes a first conversion circuit 110 and a second conversion circuit 112. The first conversion circuit 110 includes a comparator (comp) and an analog to digital converter 130. The second conversion circuit 112 includes a digital to analog converter 132, a signal source circuit 133, and a driver.

In an example of operation, the comparator compares the sensor signal 116 to an analog reference signal 122 to produce an analog comparison signal 124. The analog reference signal 124 includes a DC component and an oscillating component. As such, the sensor signal 116 will have a substantially matching DC component and oscillating component. An example of an analog reference signal 122 will be described in greater detail with reference to FIG. 15.

The analog to digital converter 130 converts the analog comparison signal 124 into the sensed signal 120. The analog to digital converter (ADC) 130 may be implemented in a variety of ways. For example, the (ADC) 130 is one of: a flash ADC, a successive approximation ADC, a ramp-compare ADC, a Wilkinson ADC, an integrating ADC, a delta encoded ADC, and/or a sigma-delta ADC. The digital to analog converter (DAC) 214 may be a sigma-delta DAC, a pulse width modulator DAC, a binary weighted DAC, a successive approximation DAC, and/or a thermometer-coded DAC.

The digital to analog converter (DAC) 132 converts the sensed signal 120 into an analog feedback signal 126. The signal source circuit 133 (e.g., a dependent current source, a linear regulator, a DC-DC power supply, etc.) generates a regulated source signal 135 (e.g., a regulated current signal or a regulated voltage signal) based on the analog feedback signal 126. The driver increases power of the regulated source signal 135 to produce the drive signal component 114.

FIG. 9A is a cross section schematic block diagram of an example of a touch screen display 83 with in-cell touch sensors, which includes lighting layers 77 and display with integrated touch sensing layers 79. The lighting layers 77 include a light distributing layer 87, a light guide layer 85, a prism film layer 83, and a defusing film layer 81. The display with integrated touch sensing layers 79 include a rear polarizing film layer 105, a glass layer 103, a rear transparent electrode layer with thin film transistors 101 (which may be two or more separate layers), a liquid crystal layer (e.g., a rubber polymer layer with spacers) 99, a front electrode layer with thin film transistors 97, a color mask layer 95, a glass layer 93, and a front polarizing film layer 91. Note that one or more protective layers may be applied over the polarizing film layer 91.

In an example of operation, a row of LEDs (light emitted diodes) projects light into the light distributing player 87, which projects the light towards the light guide 85. The light guide includes a plurality of holes that let's some light components pass at differing angles. The prism film layer 83 increases perpendicularity of the light components, which are then defused by the defusing film layer 81 to provide a substantially even back lighting for the display with integrated touch sense layers 79.

The two polarizing film layers 105 and 91 are orientated to block the light (i.e., provide black light). The front and rear electrode layers 97 and 101 provide an electric field at a sub-pixel level to orientate liquid crystals in the liquid crystal layer 99 to twist the light. When the electric field is off, or is very low, the liquid crystals are orientated in a first manner (e.g., end-to-end) that does not twist the light, thus, for the sub-pixel, the two polarizing film layers 105 and 91 are blocking the light. As the electric field is increased, the orientation of the liquid crystals change such that the two polarizing film layers 105 and 91 pass the light (e.g., white light). When the liquid crystals are in a second orientation (e.g., side by side), intensity of the light is at its highest point.

The color mask layer 95 includes three sub-pixel color masks (red, green, and blue) for each pixel of the display, which includes a plurality of pixels (e.g., 1440×1080). As the electric field produced by electrodes change the orientations of the liquid crystals at the sub-pixel level, the light is twisted to produce varying sub-pixel brightness. The sub-pixel light passes through its corresponding sub-pixel color mask to produce a color component for the pixel. The varying brightness of the three sub-pixel colors (red, green, and blue), collectively produce a single color to the human eye. For example, a blue shirt has a 12% red component, a 20% green component, and 55% blue component.

The in-cell touch sense functionality uses the existing layers of the display layers 79 to provide capacitance-based sensors. For instance, one or more of the transparent front and rear electrode layers 97 and 101 are used to provide row electrodes and column electrodes. Various examples of creating row and column electrodes from one or more of the transparent front and rear electrode layers 97 and 101 is discussed in some of the subsequent figures.

FIG. 9B is a schematic block diagram of an example of a transparent electrode layer 97 and/or 101 with thin film transistors (TFT). Sub-pixel electrodes are formed on the transparent electrode layer and each sub-pixel electrode is coupled to a thin film transistor (TFT). Three sub-pixels (R-red, G-green, and B-blue) form a pixel. The gates of the TFTs associated with a row of sub-electrodes are coupled to a common gate line. In this example, each of the four rows has its own gate line. The drains (or sources) of the TFTs associated with a column of sub-electrodes are coupled to a common R, B, or G data line. The sources (or drains) of the TFTs are coupled to its corresponding sub-electrode.

In an example of operation, one gate line is activated at a time and RGB data for each pixel of the corresponding row is placed on the RGB data lines. At the next time interval, another gate line is activated and the RGB data for the pixels of that row is placed on the RGB data lines. For 1080 rows and a refresh rate of 60 Hz, each row is activated for about 15 microseconds each time it is activated, which is 60 times per second. When the sub-pixels of a row are not activated, the liquid crystal layer holds at least some of the charge to keep an orientation of the liquid crystals.

FIG. 9C is a schematic block diagram of an example of a pixel with three sub-pixels (R-red, G-green, and B-blue). In this example, the front sub-pixel electrodes are formed in the front transparent conductor layer 97 and the rear sub-pixel electrodes are formed in the rear transparent conductor layer 101. Each front and rear sub-pixel electrode is coupled to a corresponding thin film transistor. The thin film transistors coupled to the top sub-pixel electrodes are coupled to a front (f) gate line and to front R, G, and B data lines. The thin film transistors coupled to the bottom sub-pixel electrodes are coupled to a rear (f) gate line and to rear R, G, and B data lines.

To create an electric field between related sub-pixel electrodes, a differential gate signal is applied to the front and rear gate lines and differential R, G, and B data signals are applied to the front and rear R, G, and B data lines. For example, for the red (R) sub-pixel, the thin film transistors are activated by the signal on the gate lines. The electric field created by the red sub-pixel electrodes is depending on the front and rear Red data signals. As a specific example, a large differential voltage creates a large electric field, which twists the light towards maximum light passing and increases the red component of the pixel.

The gate lines and data lines are non-transparent wires (e.g., copper) that are positioned between the sub-pixel electrodes such that they are hidden from human sight. The non-transparent wires may be on the same layer as the sub-pixel electrodes or on different layers and coupled using vias.

FIG. 9D is a schematic block diagram of another example of a pixel with three sub-pixels (R-red, G-green, and B-blue). In this example, the front sub-pixel electrodes are formed in the front transparent conductor layer 97 and the rear sub-pixel electrodes are formed in the rear transparent conductor layer 101. Each front sub-pixel electrode is coupled to a corresponding thin film transistor. The thin film transistors coupled to the top sub-pixel electrodes are coupled to a front (f) gate line and to front R, G, and B data lines. Each rear sub-pixel electrode is coupled to a common voltage reference (e.g., ground, which may be a common ground plane or a segmented common ground plane (e.g., separate ground planes coupled together to form a common ground plane)).

To create an electric field between related sub-pixel electrodes, a single-ended gate signal is applied to the front gate lines and a single-ended R, G, and B data signals are applied to the front R, G, and B data lines. For example, for the red (R) sub-pixel, the thin film transistors are activated by the signal on the gate lines. The electric field created by the red sub-pixel electrodes is depending on the front red data signals.

FIG. 9E is a schematic block diagram of an example of sub-pixel electrodes of the front or back electrode layer 97 or 101 coupled together to form row electrodes of a touch screen sensor. In this example, 3 rows of sub-pixel electrodes are coupled together by conductors (e.g., wires, metal traces, vias, etc.) to form one row electrode, which is coupled to a drive sense circuit (DSC) 28. More or less rows of sub-pixel electrodes may be coupled together to form a row electrode.

FIG. 9F is a schematic block diagram of an example of sub-pixel electrodes front or back electrode layer 97 or 101 coupled together to form column electrodes of a touch screen sensor. In this example, 9 columns of sub-pixel electrodes are coupled together by conductors (e.g., wires, metal traces, vias, etc.) to form one column electrode, which is coupled to a drive sense circuit (DSC) 28. More or less columns of sub-pixel electrodes may be coupled together to form a column electrode.

With respect to FIGS. 9E and 9F, the row electrodes may be formed on one of the transparent conductor layers 97 or 101 and the column electrodes are formed on the other. In this instance, differential signaling is used for display functionality of sub-pixel electrodes and a common mode voltage is used for touch sensing on the row and column electrodes. This allows for concurrent display and touch sensing operations with negligible adverse effect on display operation.

FIG. 9G is a schematic block diagram of an example of sub-pixel electrodes coupled together to form row electrodes and column electrodes of a touch screen sensor on one of the transparent conductive layers 97 or 101. In this example, 5×5 sub-pixel electrodes are coupled together to form a square (or diamond, depending on orientation), or other geometric shape. The 5 by 5 squares are then cross coupled together to form a row electrode or a column electrode.

In this example, white sub-pixel sub-electrodes with a grey background are grouped to form a row electrode for touch sensing and the grey sub-pixels with the white background are grouped to form a column electrode. Each row electrode and column electrode is coupled to a drive sense circuit (DSC) 28. As shown, the row and column electrodes for touch sensing are diagonal. Note that the geometric shape of the row and column electrodes may be of a different configuration (e.g., zig-zag pattern, lines, etc.) and that the number of sub-pixel electrodes per square (or other shape) may include more or less than 25.

FIG. 9G1 is a schematic block diagram of another example of sub-pixel electrodes of an OLED display or of an LCD display coupled together to form touch sense cells. In this example, the sub-pixel electrodes (3 per pixel) of 12 pixels (2 columns and 6 rows of pixels) are coupled together to form one touch sense cell. The touch sense cell may be a plate of a standalone capacitive sensor or coupled to other touch sense cells to form an electrode.

FIG. 9G2 is a schematic block diagram of another example of sub-pixel electrodes of an OLED display or of an LCD display providing touch sense cells. In this example, each sub-pixel electrode is a touch sense cell. The touch sense cell may be a plate of a standalone capacitive sensor or coupled to other touch sense cells to form an electrode.

FIG. 9G3 is a schematic block diagram of another example of sub-pixel electrodes of an OLED display or of an LCD display coupled together to form touch sense cells. In this example, the sub-pixel electrodes (3 per pixel) of 1 pixel are coupled together to form one touch sense cell. The touch sense cell may be a plate of a standalone capacitive sensor or coupled to other touch sense cells to form an electrode.

FIG. 9H is a schematic block diagram of an example of a segmented common ground plane forming row electrodes and column electrodes of a touch screen sensor on the rear transparent conductive layer 101. In this instance, each square (or other shape) corresponds to a segment of a common ground plane that services a group of sub-pixel electrodes on the front transparent layer 97. The squares (or other shape) are coupled together to form row electrodes and column electrodes. The white segmented common ground planes are coupled together to form column electrodes and the grey segmented common ground planes are coupled together to form row electrodes. By implementing the on-cell touch screen row and column electrodes in the common ground plane, display and touch sense functionalities may be concurrently executed with negligible adverse effects on the display functionality.

FIG. 9I is a schematic block diagram of another example of sub-pixel electrodes coupled together to form row and column electrodes of a touch screen sensor. In this example, a sub-pixel is represented as a capacitor, with the top plate being implemented in the front ITO layer 97 and the bottom plate being implemented in the back ITO layer 101, which is implemented as a common ground plan. The thin film transistors are represented as switches. In this example, 3×3 sub-pixel electrodes on the rear ITO layer are coupled together to form a portion of a row electrode for touch sensing or a column electrode for touch sensing. With each of the drive sense circuits 28 injecting a common signal for self-capacitance sensing, the common signal has negligible adverse effects on the display operation of the sub-pixels.

FIG. 9J is a cross section schematic block diagram of an example of a touch screen display 83-1 with on-cell touch sensors, which includes lighting layers 77 and display with integrated touch sensing layers 79. The lighting layers 77 include a light distributing layer 87, a light guide layer 85, a prism film layer 83, and a defusing film layer 81. The display with integrated touch sensing layers 79 include a rear polarizing film layer 105, a glass layer 103, a rear transparent electrode layer with thin film transistors 101 (which may be two or more separate layers), a liquid crystal layer (e.g., a rubber polymer layer with spacers) 99, a front electrode layer with thin film transistors 97, a color mask layer 95, a glass layer 93, a transparent touch layer 107, and a front polarizing film layer 91. Note that one or more protective layers may be applied over the polarizing film layer 91.

The lighting layer 77 and the display with integrated touch sensing layer 79-1 function as described with reference to FIG. 9A for generating a display. A difference lies in how on-cell touch sensing of this embodiment in comparison to the in-cell touch sensing of FIG. 9A. In particular, this embodiment includes an extra transparent conductive layer 107 to provide, or assist, with capacitive-based touch sensing. For example, the extra transparent conductive layer 107 includes row and column electrodes as shown in FIG. 9H. As another example, the extra transparent conductive layer 107 includes row electrodes or column electrodes and another one of the conductive layers 97 or 101 includes the other electrodes (e.g., column electrodes if the extra transparent layer includes row electrodes).

FIG. 10A is a cross section schematic block diagram of a touch screen display 80 without a touch of a finger or a pen. The cross section is taken parallel to a column electrode 85-c and a perpendicular to a row electrode 85-r. The column electrode 85-c is positioned between two dielectric layers 140 and 142. Alternatively, the column electrode 85-c is in the second dielectric layer 142. The row electrode 85-r is positioned in the second dielectric layer 142. Alternatively, the row electrode 85-r is positioned between the dielectric layer 142 and the display substrate 144. As another alternative, the row and column electrodes are in the same layer. In one or more embodiments, the row and column electrodes are formed as discussed in one or more of FIGS. 9A-9J.

Each electrode 85 has a self-capacitance, which corresponds to a parasitic capacitance created by the electrode with respect to other conductors in the display (e.g., ground, conductive layer(s), and/or one or more other electrodes). For example, row electrode 85-r has a parasitic capacitance $C_{p2}$ and column electrode 85-c has a parasitic capacitance $C_{p1}$. Note that each electrode includes a resistance component and, as such, produces a distributed R-C circuit. The longer the electrode, the greater the impedance of the distributed R-C circuit. For simplicity of illustration the distributed R-C circuit of an electrode will be represented as a single parasitic capacitance.

As shown, the touch screen display 80 includes a plurality of layers 140-144. Each illustrated layer may itself include one or more layers. For example, dielectric layer 140 includes a surface protective film, a glass protective film, and/or one or more pressure sensitive adhesive (PSA) layers. As another example, the second dielectric layer 142 includes a glass cover, a polyester (PET) film, a support plate (glass or plastic) to support, or embed, one or more of the electrodes 85-c and 85-r, a base plate (glass, plastic, or PET), and one or more PSA layers. As yet another example, the display substrate 144 includes one or more LCD layers, a back-light layer, one or more reflector layers, one or more polarizing layers, and/or one or more PSA layers.

FIG. 10B is a cross section schematic block diagram of a touch screen display 80, which is the same as in FIG. 9. This figure further includes a finger touch, which changes the self-capacitance of the electrodes. In essence, a finger touch creates a parallel capacitance with the parasitic self-capacitances. For example, the self-capacitance of the column electrode 85-c is $C_{p1}$ (parasitic capacitance)+$C_{f1}$ (finger capacitance) and the self-capacitance of the row electrode 85-r is $C_{p1}$+$C_{f2}$. As such, the finger capacitance increases the self-capacitance of the electrodes, which decreases the impedance for a given frequency. The change in impedance of the self-capacitance is detectable by a corresponding drive sense circuit and is subsequently processed to indicate a screen touch.

FIG. 11A is a cross section schematic block diagram of a touch screen display 80, which is the same as in FIG. 9. This figure further includes a mutual capacitance ($C_{m\_0}$) between the electrodes when a touch is not present.

FIG. 11B is a cross section schematic block diagram of a touch screen display 80, which is the same as in FIG. 9. This figure further includes a mutual capacitance ($C_{m\_1}$) between the electrodes when a touch is present. In this example, the finger capacitance is effectively in series with the mutual capacitance, which decreasing capacitance of the mutual capacitance. As the capacitance decreases for a given frequency, the impedance increases. The change in impedance of the mutual-capacitance is detectable by a corresponding drive sense circuit and is subsequently processed to indicate a screen touch. Note that, depending on the various properties (e.g., thicknesses, dielectric constants, electrode sizes, electrode spacing, etc.) of the touch screen display, the parasitic capacitances, the mutual capacitances, and/or the finger capacitance are in the range of a few pico-Farads to tens of nano-Farads. In equation form, the capacitance (C) equals:

$$C = \epsilon \frac{A}{d}$$

where A is plate area, E is the dielectric constant(s), and d is the distance between the plates.

FIG. 12 is a cross-section diagram of a pixel of an OLED display. The pixel includes a metal cathode, an electron transport layer, a red organic emitter, a green organic emitter, a blue organic emitter, a hole injection layer, an anode, and a glass substrate. The anode and/or the cathode of each of the sub-pixels (red, green, blue) may be used to form a touch sense cell or a portion of a touch sense cell.

FIG. 13 is an example graph that plots condition verses capacitance for an electrode of a touch screen display. As shown, the mutual capacitance decreases with a touch and the self-capacitance increases with a touch. Note that the mutual capacitance and self-capacitance for a no-touch condition are shown to be about the same. This is done merely for ease of illustration. In practice, the mutual capacitance and self-capacitance may or may not be about the same capacitance based on the various properties of the touch screen display discussed above.

FIG. 14 is an example graph that plots impedance verses frequency for an electrode of a touch screen display. Since the impedance of an electrode is primarily based on its capacitance (self and/or mutual), as the frequency increases for a fixed capacitance, the impedance decreases based on $1/2\pi fC$, where f is the frequency and C is the capacitance.

FIG. 15 is a time domain example graph that plots magnitude verses time for an analog reference signal 122. As discussed with reference to FIG. 8, the analog reference signal 122 (e.g., a current signal or a voltage signal) is inputted to a comparator and is compared to the sensor signal 116. The feedback loop of the drive sense circuit 28 functions to keep the senor signal 116 substantially matching the analog reference signal 122. As such, the sensor signal 116 will have a similar waveform to that of the analog reference signal 122.

In an example, the analog reference signal 122 includes a DC component 121 and/or one or more oscillating components 123. The DC component 121 is a DC voltage in the range of a few hundred milli-volts to tens of volts or more. The oscillating component 123 includes a sinusoidal signal, a square wave signal, a triangular wave signal, a multiple level signal (e.g., has varying magnitude over time with respect to the DC component), and/or a polygonal signal (e.g., has a symmetrical or asymmetrical polygonal shape with respect to the DC component).

In another example, the frequency of the oscillating component 123 may vary so that it can be tuned to the impedance of the sensor and/or to be off-set in frequency from other sensor signals in a system. For example, a capacitance sensor's impedance decreases with frequency. As such, if the frequency of the oscillating component is too high with respect to the capacitance, the capacitor looks like a short and variances in capacitances will be missed. Similarly, if the frequency of the oscillating component is too low with respect to the capacitance, the capacitor looks like an open and variances in capacitances will be missed.

FIG. 16 is a frequency domain example graph that plots magnitude verses frequency for an analog reference signal 122. As shown, the analog reference signal 122 includes the DC component 121 at DC (e.g., 0 Hz or near 0 Hz), a first oscillating component 123-1 at a first frequency ($f_1$), and a second oscillating component 123-2 at a second frequency ($f_2$). In an example, the DC component is used to measure resistance of an electrode (if desired), the first oscillating component 123-1 is used to measure the impedance of self-capacitance, and the second oscillating component 123-2 is used to measure the impedance of mutual-capacitance. Note that the second frequency may be greater than the first frequency.

FIG. 17 is a schematic block diagram of an example of a first drive sense circuit 28-1 coupled to a first electrode 85-c and a second drive sense circuit 28-2 coupled to a second electrode 85-r without a touch proximal to the electrodes. Each of the drive sense circuits include a comparator, an analog to digital converter (ADC) 130, a digital to analog converter (DAC) 132, a signal source circuit 133, and a driver. The functionality of this embodiment of a drive sense circuit was described with reference to FIG. 8. For additional embodiments of a drive sense circuit see pending patent application entitled, "Drive Sense Circuit with Drive-Sense Line" having a filing date of Aug. 27, 2018, and an application number of Ser. No. 16/113,379.

As an example, a first reference signal 122-1 (e.g., analog or digital) is provided to the first drive sense circuit 28-1 and a second reference signal 122-2 (e.g., analog or digital) is provided to the second drive sense circu9it 28-2. The first reference signal includes a DC component and/or an oscillating at frequency $f_1$. The second reference signal includes a DC component and/or two oscillating components: the first at frequency $f_1$ and the second at frequency $f_2$.

The first drive sense circuit 28-1 generates a sensor signal 116 based on the reference signal 122-1 and provides the sensor signal to the column electrode 85-c. The second drive sense circuit generates another sensor signal 116 based on the reference signal 122-2 and provides the sensor signal to the column electrode.

In response to the sensor signals being applied to the electrodes, the first drive sense circuit 28-1 generates a first sensed signal 120-1, which includes a component at frequency $f_1$ and a component a frequency $f_2$. The component at frequency $f_1$ corresponds to the self-capacitance of the column electrode 85-c and the component a frequency $f_2$ corresponds to the mutual capacitance between the row and column electrodes 85-c and 85-r. The self-capacitance is expressed as $1/(2\pi f_1 C_{p1})$ and the mutual capacitance is expressed as $1/(2\pi f_2 C_{m\_0})$.

Also, in response to the sensor signals being applied to the electrodes, the second drive sense circuit 28-1 generates a second sensed signal 120-2, which includes a component at frequency $f_1$ and a component a frequency $f_2$. The component at frequency $f_1$ corresponds to a shielded self-capacitance of the row electrode 85-r and the component a frequency $f_2$ corresponds to an unshielded self-capacitance of the row electrode 85-r. The shielded self-capacitance of the row electrode is expressed as $1/2\pi f_1 C_{p2}$) and the unshielded self-capacitance of the row electrode is expressed as $1/2\pi f_2 C_{p2}$).

With each active drive sense circuit using the same frequency for self-capacitance (e.g., $f_1$), the row and column electrodes are at the same potential, which substantially eliminates cross-coupling between the electrodes. This provides a shielded (i.e., low noise) self-capacitance measurement for the active drive sense circuits. In this example, with the second drive sense circuit transmitting the second frequency component, it has a second frequency component in its sensed signal, but is primarily based on the row electrode's self-capacitance with some cross coupling from other electrodes carrying signals at different frequencies. The cross coupling of signals at other frequencies injects unwanted noise into this self-capacitance measurement and hence it is referred to as unshielded.

FIG. 18 is a schematic block diagram of an example of a first drive sense circuit 28-1 coupled to a first electrode 85-c and a second drive sense circuit 28-2 coupled to a second electrode 85-r with a finger touch proximal to the electrodes. This example is similar to the one of FIG. 17 with the difference being a finger touch proximal to the electrodes (e.g., a touch that shadows the intersection of the electrodes or is physically close to the intersection of the electrodes). With the finger touch, the self-capacitance and the mutual capacitance of the electrodes are changed.

In this example, the impedance of the self-capacitance at $f_1$ of the column electrode 85-$c$ now includes the effect of the finger capacitance. As such, the impedance of the self-capacitance of the column electrode equals $1/(2\pi f_1*(C_{p1}+C_{f1}))$, which is included the sensed signal 120-1. The second frequency component at $f_2$ corresponds to the impedance of the mutual-capacitance at $f_2$, which includes the effect of the finger capacitance. As such, the impedance of the mutual capacitance equals $1/(2\pi f_2 C_{m\_1})$, where $C_{m\_1}=(C_{m\_0}*C_{f1})/(C_{m\_0}+C_{f1})$.

Continuing with this example, the first frequency component at $f_1$ of the second sensed signal 120-2 corresponds to the impedance of the shielded self-capacitance of the row electrode 85-$r$ at $f_1$, which is affected by the finger capacitance. As such, the impedance of the capacitance of the row electrode 85-$r$ equals $1/(2\pi f_1*(C_{p2}+C_{f2}))$. The second frequency component at $f_2$ of the second sensed signal 120-2 corresponds to the impedance of the unshielded self-capacitance at $f_2$, which includes the effect of the finger capacitance and is equal to $1/(2\pi f_2*(C_{p2}+C_{f2}))$.

FIG. 19 is a schematic block diagram of a touchless example of a few drive sense circuits 28 and a portion of the touch screen processing module 82 of a touch screen display 80. The portion of the processing module 82 includes band pass filters 160, 162, 160-1, & 160-2, self-frequency interpreters 164 & 164-1, and 166 & 166-1. As previously discussed, a first drive sense circuit is coupled to column electrode 85$c$ and a second drive sense circuit is coupled to a row electrode 85$r$.

The drive sense circuits provide sensor signals 116 to their respective electrodes 85 and produce therefrom respective sensed signals 120. The first sensed signal 120-1 includes a first frequency component at $f_1$ that corresponds to the self-capacitance of the column electrode 85$c$ and a second frequency component at $f_2$ that corresponds to the mutual capacitance of the column electrode 85$c$. The second sensed signal 120-2 includes a first frequency component at $f_1$ that corresponds to the shielded self-capacitance of the row electrode 85$r$ and/or a second frequency component at $f_2$ that corresponds to the unshielded self-capacitance of the row electrode 85$r$. In an embodiment, the sensed signals 120 are frequency domain digital signals.

The first bandpass filter 160 passes (i.e., substantially unattenuated) signals in a bandpass region (e.g., tens of Hertz to hundreds of thousands of Hertz, or more) centered about frequency $f_1$ and attenuates signals outside of the bandpass region. As such, the first bandpass filter 160 passes the portion of the sensed signal 120-1 that corresponds to the self-capacitance of the column electrode 85$c$. In an embodiment, the sensed signal 116 is a digital signal, thus, the first bandpass filter 160 is a digital filter such as a cascaded integrated comb (CIC) filter, a finite impulse response (FIR) filter, an infinite impulse response (IIR) filter, a Butterworth filter, a Chebyshev filter, an elliptic filter, etc.

The frequency interpreter 164 receives the first bandpass filter sensed signal and interprets it to render a self-capacitance value 168-1 for the column electrode. As an example, the frequency interpreter 164 is a processing module, or portion thereof, that executes a function to convert the first bandpass filter sensed signal into the self-capacitance value 168-1, which is an actual capacitance value, a relative capacitance value (e.g., in a range of 0-100), or a difference capacitance value (e.g., is the difference between a default capacitance value and a sensed capacitance value). As another example, the frequency interpreter 164 is a look up table where the first bandpass filter sensed signal is an index for the table.

The second bandpass filter 162 passes, substantially unattenuated, signals in a second bandpass region (e.g., tens of Hertz to hundreds of thousands of Hertz, or more) centered about frequency $f_2$ and attenuates signals outside of the bandpass region. As such, the second bandpass filter 160 passes the portion of the sensed signal 120-1 that corresponds to the mutual-capacitance of the column electrode 85$c$ and the row electrode 85$r$. In an embodiment, the sensed signal 116 is a digital signal, thus, the second bandpass filter 162 is a digital filter such as a cascaded integrated comb (CIC) filter, a finite impulse response (FIR) filter, an infinite impulse response (IIR) filter, a Butterworth filter, a Chebyshev filter, an elliptic filter, etc.

The frequency interpreter 166 receives the second bandpass filter sensed signal and interprets it to render a mutual-capacitance value 170-1. As an example, the frequency interpreter 166 is a processing module, or portion thereof, that executes a function to convert the second bandpass filter sensed signal into the mutual-capacitance value 170-1, which is an actual capacitance value, a relative capacitance value (e.g., in a range of 0-100), and/or a difference capacitance value (e.g., is the difference between a default capacitance value and a sensed capacitance value). As another example, the frequency interpreter 166 is a look up table where the first bandpass filter sensed signal is an index for the table.

For the row electrode 85$r$, the drive-sense circuit 28 produces a second sensed signal 120-2, which includes a shielded self-capacitance component and/or an unshielded self-capacitance component. The third bandpass filter 160-1 is similar to the first bandpass filter 160 and, as such passes signals in a bandpass region centered about frequency $f_1$ and attenuates signals outside of the bandpass region. In this example, the third bandpass filter 160-1 passes the portion of the second sensed signal 120-2 that corresponds to the shielded self-capacitance of the row electrode 85$r$.

The frequency interpreter 164-1 receives the second bandpass filter sensed signal and interprets it to render a second and shielded self-capacitance value 168-2 for the row electrode. The frequency interpreter 164-1 may be implemented similarly to the first frequency interpreter 164 or an integrated portion thereof. In an embodiment, the second self-capacitance value 168-2 is an actual capacitance value, a relative capacitance value (e.g., in a range of 0-100), or a difference capacitance value (e.g., is the difference between a default capacitance value and a sensed capacitance value).

The fourth bandpass filter 162-2, if included, is similar to the second bandpass filter 162. As such, it passes, substantially unattenuated, signals in a bandpass region centered about frequency $f_2$ and attenuates signals outside of the bandpass region. In this example, the fourth bandpass filter 162-2 passes the portion of the second sensed signal 120-2 that corresponds to the unshielded self-capacitance of the row electrode 85$r$.

The frequency interpreter 166-1, if included, receives the fourth bandpass filter sensed signal and interprets it to render an unshielded self-capacitance value 168-2. The frequency interpreter 166-1 may be implemented similarly to the first frequency interpreter 166 or an integrated portion thereof. In an embodiment, the unshielded self-capacitance value 170-2 is an actual capacitance value, a relative capacitance value (e.g., in a range of 0-100), or a difference capacitance value (e.g., is the difference between a default capacitance value and a sensed capacitance value). Note that the unshielded self-capacitance may be ignored, thus band pass filter 162-1 and frequency interpreter 166-1 may be omitted.

FIG. 20 is a schematic block diagram of a finger touch example of a few drive sense circuits and a portion of the touch screen processing module of a touch screen display that is similar to FIG. 22, with the difference being a finger touch as represented by the finger capacitance Cf. In this example, the self-capacitance and mutual capacitance of each electrode is effected by the finger capacitance.

The effected self-capacitance of the column electrode 85*c* is processed by the first bandpass filter 160 and the frequency interpreter 164 to produce a self-capacitance value 168-1*a*. The mutual capacitance of the column electrode 85*c* and row electrode is processed by the second bandpass filter 162 and the frequency interpreter 166 to produce a mutual-capacitance value 170-1*a*.

The effected shielded self-capacitance of the row electrode 85*r* is processed by the third bandpass filter 160-1 and the frequency interpreter 164-1 to produce a self-capacitance value 168-2*a*. The effected unshielded self-capacitance of the row electrode 85*r* is processed by the fourth bandpass filter 162-1 and the frequency interpreter 166-1 to produce an unshielded self-capacitance value 170-2*a*.

FIG. 21 is a schematic block diagram of an embodiment of a plurality of electrodes creating a plurality of touch sense cells 280 within a display. In this embodiment, a few second electrodes 278 are perpendicular and on a different layer of the display than a few of the first electrodes 277. For each crossing of a first electrode and a second electrode, a touch sense cell 280 is created. At each touch sense cell 280, a mutual capacitance ($C_{m\_0}$) is created between the crossing electrodes. Each electrode also includes a self-capacitance ($C_p$), which is shown as a single parasitic capacitance, but, in some instances, is a distributed R-C circuit.

A drive sense circuit (DSC) is coupled to a corresponding one of the electrodes. The drive sense circuits (DSC) provides sensor signals to the electrodes and determines the loading on the sensors signals of the electrodes. When no touch is present, each touch cell 280 will have a similar mutual capacitance and each electrode of a similar length will have a similar self-capacitance. When a touch is applied on or near a touch sense cell 280, the mutual capacitance of the cell will decrease (creating an increased impedance) and the self-capacitances of the electrodes creating the touch sense cell will increase (creating a decreased impedance). Between these impedance changes, the processing module can detect the location of a touch, or touches.

FIG. 22 is a schematic block diagram of an example of frequency dividing for reference signals for drive-sense circuits 28 of a touch screen display. In this example, a few row electrodes and a few column electrodes are shown. Each electrode is coupled to a drive sense circuit (DSC) 28. The crossover of a row electrode with a column electrode creates a sense cell. In this example, there are nine row electrodes and nine column electrodes, creating 81 sense cells. To allow for simultaneous self-capacitance sensing and mutual sensing of the electrodes, the drive sense circuits use different frequencies to simulate the electrodes.

For self-capacitance, all of the drive sense circuits use the $f_1$ frequency component. This creates near zero potential difference between the electrodes, thereby eliminating cross coupling between the electrodes. In this manner, the self-capacitance measurements made by the drive sense circuits are effectively shielded (i.e., low noise, yielding a high signal to noise ratio).

For mutual capacitance, the column electrodes also transmit a frequency component at another frequency. For example, the first column DSC 28 transmits it signal with frequency components at f1 and at f10; the second column DSC 28 transmits it signal with frequency components at f1 and at f11; the third column DSC 28 transmits it signal with frequency components at f1 and at f12; and so on. The additional frequency components (f10-f18) allow the row DSCs 28 to determine mutual capacitance at the sense cells.

For example, the first row DSC 28 senses its self-capacitance via its transmitted signal with the f1 frequency component and determines the mutual capacitance of the sense cells 1-10, 1-11, 1-12, 1-13, 1-14, 1-15, 1-16, 1-17, and 1-18. As a specific example, for sense cell 1-10, the first row DSC 28 determines the mutual capacitance between the first row electrode and the first column electrode based on the frequency f10; determines the mutual capacitance between the first row electrode and the second column electrode based on the frequency f11; determines the mutual capacitance between the first row electrode and the third column electrode based on the frequency f12; and so on.

FIG. 23A is a schematic block diagram of an example of a device 300 that includes a touch screen 302 and a signal generator 304. In an embodiment, the device 300 is a computing device 12; in another embodiment, device 300 is a computing device 14; and, in another embodiment, the device is a computing entity that includes one or more computing devices operating in a cooperative manner.

When a body of a user of the device 300 is touching or is close to touching (e.g., within tens of centimeters), an electric field signal 306, which is generated by the signal generate 306, is coupled through the body to a finger of the user. When the finger is touching or is close to touching (e.g., within tens of centimeters), the circuitry of the touch screen 302 detects the electric field signal 306.

The signal generator 304 generates a sinusoidal signal at a particular frequency ($f_{\_ID}$), which may range of a few KHz to tens of MHz, which it provides to a conductive pad. The conductive pad is a strip of conductive material (e.g., a conductive metal (e.g., copper, gold, etc.), a conductive film (e.g., ITO (indium tin oxide)), and/or material that conducts electricity) that is part of the signal generator and/or part of the device. The conductive pad is positioned near the surface of the device 300 such that, when a user is using the device, the body of the user touches or nearly touches the conductive pad.

With the body proximal to the conductive pad (touching or close to it), the signal (i.e., the e-field signal) is coupled into the body. The body, which acts like a capacitor, conducts the signal to the touch screen 302. The circuitry of the touch screen 302 (e.g., the circuitry of FIG. 2, 2A, 3, 4, and/or 5) receives the signal via the touch and determines the location of the touch as previously described.

The circuitry of the touch screen can use the e-field signal, a self-capacitance signal, and/or mutual capacitance signals to detect the location of the touch. As shown in FIG. 23B, the device uses signals at various frequencies (e.g., the identifying frequency of the e-field signal), a self-capacitance frequency, and one or more mutual capacitance frequencies) to determine the position of the touch or near touch. The frequencies of the various signals are within a frequency band of a few KHz to tens of MHz. The frequency of each signal is spaced at a few hundred Hz to tens of KHz, depending on the sensitivity of the digital filtered and/or desired frequency separation of the signals. The ordering of the signals within the frequency band can be varied as desired. For example, the identifying frequency is the lowest frequency in the frequency band or is in the middle of the frequency band.

FIG. 23C is a diagram of an example of the device 300 using one signal; the e-field signal at the identifying frequency. In this instance, the touch screen 302 is in a passive sense mode (i.e., the drive sense circuits of the touch screen are not providing an oscillating signal component to their corresponding sensors; the drive sense circuits are tuned to sense for the presence of the e-field signal).

FIG. 23D is a diagram of an example of the device 300 using two sets of signals: one having the identifying frequency and the other having the self-capacitance frequency. In this instance, the drive sense circuits provide an oscillating signal component at the self-capacitance frequency to their corresponding sensors and sense the self-capacitance frequency and for the identifying frequency.

FIG. 23E is a diagram of an example of the device 300 using two sets of signals. The first signal having the identifying frequency and the second set (e.g., one or more) having mutual capacitance frequencies. In this instance, a drive sense circuit provides an oscillating signal component at a mutual-capacitance frequency to its corresponding sensor and sense for the identifying frequency. Another drive sense circuit senses for the mutual capacitance frequency and for the identifying frequency.

FIG. 23F is a diagram of an example of the device 300 using a minimum of two bi-directional signals though the body. The first signal includes a transmitted mutual and self-capacitance frequency pair picked up by the body from the "signal generator 304" e-field signal area, (user proximity to a seat, dash, door, ceiling, handheld device, . . . etc.) which is transmitted to the panel at the user touch and decoded at the RX-Columns to determine the X-direction on the panel. At the user touch point, a second signal including a received mutual and self-capacitance frequency pair picked up from the TX-Row panel sensor mutual and self-output frequencies would be transmitted back through the user's body back to a sensor circuit. When the second signal is decoded, the TX-Row is used to determine the Y-direction on the panel. With this method the mutual and self-frequencies are used to determine the touch points, which will permit multiple users with multiple touch points simultaneously.

FIG. 24A is a schematic block diagram of an example of a second related device 310 communicating with a first related device 312. The first related device 312 includes the signal generator 304 and the second related device 310 includes the touch screen 302. For example, the first device 312 is a FOB or other small token-like device and the second related device 310 is a cell phone. As another example, the first related device 312 is a form of identification (e.g., driver's license, passport, etc.) and the second related device is a kiosk with a touch screen (e.g., ATM, boarding pass machine, etc.).

In this embodiment, the second related device 310 can be programmed to not accept touch input controls unless it detects a signal having the identifying frequency, which is generated by the signal generator. The second related device 310 can communicate through the body to the first related device 312 and instruct it to change the identifying frequency or some other command. For example, the second related device instructs the first related device to use a specific frequency for the identifying frequency for the next twenty minutes; the next time the first related device is used; or other scenarios.

FIG. 24B is a schematic block diagram of an example of a second related device 310 communicating with a first related device 312. The first related device includes the signal generator 304 and a sensor circuit. As discussed with reference to FIG. 24A, the signal generator generates an ID signal, which is transmitted through the body and detected by the touch circuit circuitry of device 310.

Device 310 generates a communication signal at a particular frequency (f comm) that is transmitted via the body the sensor circuit of the first device 312. The communication signal is usable in a variety of ways. For example, the communication signal is used to verify that the identifying signal was sent by the first device. As a specific example, the sensor circuit identifies the communication signal and provides a representation of it to the signal generator. The signal generator generates the ID signal to include an indication of the communication signal was received.

FIG. 24C is a schematic block diagram of an example of a second related device 310 communicating with a first related device 312-1 and a second related device 312-2. In this example, each related device using a unique frequency for the ID signal such that the devices can be distinguished by the device 310 with the touch screen 302. This allows multiple users of the device 310 to touch the screen 302 and be uniquely identified.

FIG. 25 is a schematic block diagram of an embodiment of the circuitry of the touch screen 302 (e.g., a touch screen controller and sensors of a touch screen). The circuitry includes the processing module 82, a plurality of sensing circuits (SC), and a plurality of sensors (S). The sensors are touch sense cells and maybe implemented in a variety of ways. For example, the touch sense cells are standalone capacitive sensors. As another example, the touch sense cells are formed by electrodes (e.g., self-capacitance sensing) and intersections thereof (e.g., mutual-capacitance sensing).

The sensors (S) are arranged in a geometric pattern (e.g., rows and columns, concentric rings; etc.) in accordance with a coordinate system (e.g., Cartesian or Polar). The sensing circuits, which, in an embodiment, are drive sense circuits, sense an electrical characteristic (e.g., voltage, current, impedance, capacitance, operand of a capacitance equation, etc.) of the sensors. The sensing circuits provide the sensed electrical characteristic to the processing module 82. The processing module 82 interprets the sensed electrical characteristics to determine the presence of a touch or near touch.

When a finger is touching or near touching the touch screen and the body is conducting an e-field signal, the sensors in the vicinity of the touch will be affected. Examples of sensing the e-field signal transmitted via the body are described with reference to one or more of FIGS. 26A, 26B, 27A, and 27B.

FIG. 26A is a schematic block diagram of an example of operation of a sensor circuit of a touch controller. The sensor circuit includes an operational amplifier 315, an analog to digital converter (ADC), a digital filtering circuit, a digital processing circuit, a feedback circuit, and a dependent current source 317. In this example, the voltage reference signal (v_ref) provided to the op-amp 315 only includes a DC component. As such, the sensor circuit provides a DC voltage to the capacitive sensor and charges it to the DC voltage level of v_ref.

Once the capacitance sensor is charged to the DC voltage, the sensor circuit provides essentially zero current to the capacitive sensor. To achieve this, the output of the op-amp is at AC ground, which is converted into a digital value via the ADC. In this instance, the digital value is zero (or other digital value to represent AC ground), which represents the magnitude and frequency of the output of the op-amp.

In this mode, the sampling rate can be substantially reduced (e.g., from 300 Hz to 10 Hz or less). By reducing the sampling rate and with zero output current, the sensor circuit is consuming very little power (e.g., in the nano Watts to micro Watts range). When a finger approaches the capacitive sensor, the sensor circuit begins to sense the ID frequency emitted by the finger as shown in FIG. 26B.

FIG. 26B is a schematic block diagram of a further example of operation of the sensor circuit of FIG. 26A. With the finger in physical proximity of the capacitive sensor, the capacitance of the body is coupled in parallel to the capacitive sensor. The sinusoidal signal at frequency f_ID is coupled to the capacitive sensor. To maintain the reference voltage (v_ref) on the capacitive sensor, the op-amp 315 adjusts the dependent current source 317.

The output of the op-amp includes a component at frequency f_ID and it still includes the DC component from v-ref. The ADC converts output of the op-amp into a digital signal that includes the DC component and the f_ID component. The digital filtering circuit bandpass filters the digital signal to pass the digital f_ID component. The digital processing circuit processes the digital f_ID component to produce a signal that indicates the sensing of the f_ID signal by the corresponding capacitive sensor.

FIG. 27A is a schematic block diagram of another example of operation of the sensor circuit of FIG. 26A. In this example, the voltage reference v_ref includes an oscillating component at a self-capacitance frequency f_self.

The output of the op-amp includes a component at frequency f_self and it includes the DC component from v-ref. The ADC converts output of the op-amp into a digital signal that includes the DC component and the f_self component. The digital filtering circuit bandpass filters the digital signal to pass the digital f_self component. The digital processing circuit processes the digital f_self component to produce a signal that indicates an electrical characteristic (e.g., impendence, capacitance, etc.) the capacitive sensor when no touch is nearby.

FIG. 27B is a schematic block diagram of another example of operation of a sensor circuit of FIG. 26A. In this example, the voltage reference v_ref includes an oscillating component at a self-capacitance frequency f_self. In addition, a finger in physical proximity of the capacitive sensor, which couples the capacitance of the body in parallel to the capacitive sensor. The sinusoidal signal at frequency f_ID emitted from the finger is coupled to the capacitive sensor.

The output of the op-amp includes a component at frequency f_self, a component at f_ID, and it includes the DC component from v-ref. The ADC converts output of the op-amp into a digital signal that includes the DC component, the f_self component, and the f_ID component. The digital filtering circuit bandpass filters the digital signal to pass the digital f_self component and the digital f_ID component. The digital processing circuit processes the digital f_self component to produce a signal that indicates an electrical characteristic (e.g., impendence, capacitance, etc.) the capacitive sensor when a touch is nearby. The processing circuit also processes the digital f_ID signal to indicate the detection of the f_ID digital emitted from the finger.

FIG. 28 is a logic diagram of an example of a method for touch sensing via a body. The method begins at step 320 where a processing module (e.g., 42, 81, 82, etc.) of a computing device receives, from a sensor circuit, a signal regarding the electrical characteristic of a sensor. The method continue at step 321 where the processing determines whether the signal indicates detection an f_ID signal emitted by a finger. If not, the method repeats at step 320.

If yes, the method continues at step 322 where the processing module determines a coordinate location of the sensor. The method continues at step 323 where the processing module generate a proximal touch signal (touch or hover) that includes the coordinate location of the sensor. Examples of determining the coordinate location of a touch or near touch are provided with reference to one or more of FIGS. 29-31.

FIG. 29 is a schematic block diagram of an example of a single sensor being affected by a touch signal via a body. In this example, a plurality of touch sense cells (S) are arranged in rows and columns and mapped to a Cartesian coordinate system. The single sensor that detected the e-field signal from the body (e.g., from the finger) is gray highlighted and is at position (x1, y1).

FIG. 30A is a schematic block diagram of an example of multiple sensors being affected by a touch signal via a body. In this example, multiple touch sense cells (e.g., individual sensors and/or intersections of electrodes) detect the e-field signal from the body. In this example, a heat map is generated based on the signal strength of the detected e-field. Red indicates the highest signal strength (e.g., over a signal strength threshold (e.g., a few micro voltages to a few milli volts)); orange indicates the next highest signal strength; yellow indicates the next highest signal strength; green indicates the next highest signal strength; blue indicates the next highest signal strength; and white indicates no signal detected.

The location of the touch sense cells that detected the signal is weighted based on the heat map (e.g., 0 for white, 1 for blue, 2 for green, 3 for yellow, 4 for orange, and 5 for red). Using the weighted locations, the center of the touch is calculated.

FIG. 30B illustrates the weighted touch sense cells and the resulting x, y center position of the touch. For each row and each column, the weighted touch sense cell values are added together. For the x-direction, the center of the touch corresponds to the 50% mark of the sum of the weighted touch sense cell values of the columns. For the y-direction, the center of the touch corresponds to the 50% mark of the sum of the weighted touch sense cell values of the rows. In this example, the x center value is 4.25 and the y center value is 4.40.

FIG. 31A is a schematic block diagram of another example of multiple sensors being affected by a touch signal via a body. In this example, multiple touch sense cells (e.g., individual sensors and/or intersections of electrodes) detect the e-field signal from the body. In this example, each cell that detected the e-field signal is given a value of 1 and each cell that did not tech the e-field signal is given a value of 0.

FIG. 31B illustrates the weighted touch sense cells and the resulting x, y center position of the touch. For each row and each column, the weighted touch sense cell values are added together. For the x-direction, the center of the touch corresponds to the 50% mark of the sum of the weighted touch sense cell values of the columns. For the y-direction, the center of the touch corresponds to the 50% mark of the sum of the weighted touch sense cell values of the rows. In this example, the x center value is 4.75 and the y center value is 4.50.

FIG. 32 is a schematic block diagram of an embodiment of a signal generator 304 that includes an op amp, a feedback circuit, a dependent current source 317, a conductive pad, and a signal source that produces a reference signal at the identifying frequency (f_ID). In this embodiment, the dependent current source 317 provides a current to the conductive pad in accordance with a load on the conductive pad (e.g., the capacitance of the body) and the reference voltage signal produced by the signal source.

FIG. 33 is a schematic block diagram of another embodiment of a signal generator 304 that includes an op amp, a feedback circuit, a conductive pad, and a signal source that produces a reference signal at the identifying frequency (f_ID). In this embodiment, the op amp provides a voltage to the conductive pad in accordance with the reference voltage signal produced by the signal source.

FIG. 34 is a logic diagram of an example of a method for various modes of touch sensing via a body that is executable by a processing module of a device. The method begins at step 330 where the processing module determines whether to enable a low power touch sense mode. For example, the processing module enables the low power mode when the device is not actively receiving a touch input. As another example, the processing module enables the low power mode when the battery level drops below a threshold (e.g., less than 50% charged). As yet another example, the processing module enables the low power mode a default setting, which is automatically enabled when the device is turned on, when the device awakes from a sleep mode or standby mode, or when the display of the device is not active.

If the processing module enables the low power mode, the method continues to step 331 where the processing device enables and ID only sensing mode. In this mode, the touch controller is enabled to detect the e-field signal emitted from the body but does not sense for self-capacitance and does not sense for mutual capacitance. As such, the drive sense circuits of the touch controller function as described with reference to FIGS. 26A and 26B. The method continues at step 332 where the processing determines whether it will change the touch screen mode. If not, the method repeats at step 331. If the processing module is changing the mode, the method continues at step 333.

At step 333 the processing module determines whether to enable a noisy mode. For example, the processing module enables the noisy mode when the device is receiving interfering signals (e.g., signals from other devices, broadcast signals, etc.). As another example, the processing module enables the noise mode when the device is displaying video content.

If the processing module enables the noisy mode, the method continues at step 334 the processing module enables self-capacitance detection, mutual-capacitance detection, e-field signal detection. As such, some of the drive sense circuits use a voltage reference signal that includes a self-capacitance signal and a mutual capacitance signal, while other use a voltage reference signal that includes the self-capacitance signal. The latter drive sense circuits sense self-capacitance, mutual capacitance, and sense for the e-field signal. The former drive sense circuit sense for self-capacitance and for the e-field signal.

The method continues at step 335 where the processing determines whether it will change the touch screen mode. If not, the method repeats at step 334. If the processing module is changing the mode, the method continues at step 336.

At step 336 the processing module determines when the enable a normal mode. If yes, the method continues at step 337 where the processing module enable self-capacitance detection and mutual-capacitance detection but does not enable e-field signal detection. The method continues at step 338 where the processing determines whether it will change the touch screen mode. If not, the method repeats at step 337. If the processing module is changing the mode, the method continues at step 339.

At step 339 the processing module determines when the enable a self-capacitance only mode. If yes, the method continues at step 340 where the processing module enable self-capacitance detection but does not enable e-field signal detection and does not enable mutual-capacitance detection. The method continues at step 341 where the processing determines whether it will change the touch screen mode. If not, the method repeats at step 340. If the processing module is changing the mode, the method continues at step 342.

At step 342 the processing module determines when the enable a mutual-capacitance only mode. If yes, the method continues at step 343 where the processing module enable mutual-capacitance detection but does not enable e-field signal detection and does not enable self-capacitance detection. The method continues at step 344 where the processing determines whether it will change the touch screen mode. If not, the method repeats at step 343. If the processing module is changing the mode, the method continues at step 345.

At step 345 the processing module determines when the enable a standby mode. If yes, the method continues at step 346 where the processing module does not enable mutual-capacitance detection, does not enable e-field signal detection, and does not enable self-capacitance detection. The method continues at step 347 where the processing determines whether it will change the touch screen mode. If not, the method repeats at step 346. If the processing module is changing the mode, the method repeats at step 330.

FIG. 35 is a schematic block diagram of an example of multiple touch data samples per frame of video data as a hand moves across a touch screen. For a frame of video data, a processing module associated with the touch screen renders a touch icon 350 based on the multiple touch data samples. This example includes four sequential frames of video data: frame i, frame ii1, frame i-2, and frame i-3, where frame i is the most recent frame.

When a touch is detected on the touch display screen (e.g., frame i-3), depending on a hand's movement (e.g., speed and direction), and refresh rate of the screen (e.g., 60 Hz), the rendering of the touch icon 350 visually lags behind the physical position of the touch. With multiple touch data samples per frame, the visual lag between the touch icon and the physical movement can be substantially reduced (e.g., by 50%, or more, or less).

FIG. 36 is a diagram of an example of multiple frames of video data containing multiple touch data samples per frame. The blue line represents a touch icon displayed in the frames of video data; the black line represents physical movement of a touch or near touch; and the red line represents touch data samples. The vertical axis corresponds to movement of the touch in the x-direction and the horizontal axis represents time (each frame interval corresponds to 1 over the refresh rate and one frame of video data is rendered during one frame interval). Similar diagrams can be done for y-direction movement and/or z-direction movement. Frames of video data (e.g., j through j+5) are displayed where, within each frame, there are five touch data samples.

As an example, frames of video data are being displayed at 60 Hz and the five touch data samples within each frame of video data (e.g., j through j+5) are sampling at a rate of 300 Hz. The physical movement of touch facilitating the touch data samples, is moving at a speed where the physical movement is leading the rendered video data resulting in lag between a rendered touch icon and the physical movement. Lag between a rendered touch icon and the physical movement, is described with greater detail in FIG. 40.

FIG. 37A is a schematic block diagram of an embodiment of video processing circuitry of a device that renders video data and touch data. The video processing circuitry of the device operates as previously discussed in FIG. 2, with the addition of a frame buffer 352, which can be part of the main memory (e.g., RAM), a separate memory bank of the video graphics processing module 48, and/or a stand-alone memory. The frame buffer 352 includes a read frame buffer 354 and a write frame buffer 356. The write frame buffer 356 stores data that will be rendered on a touch screen display 80 in the next frame of video data and the read frame buffer stores data that is current frame of video data being rendered on the display 80. The processing module 42 and/or the video graphics processing module 48, are operable to read from, and/or write to, the frame buffer 352.

For example, the video graphics processing module 48 reads data from the read frame buffer to render a current frame of video data on the display 80. At the same time, the video graphics processing module and/or the processing module 42 write data into the write frame buffer for the next frame of video data. When the next frame of data becomes the current frame of video data, the read and write frame buffers switch roles. For instance, the write frame buffer now becomes the read frame buffer, and the read frame buffer now becomes the write frame buffer.

For a frame of video data, the touch screen processing module generates touch data samples when a touch or near touch is detected. When the touch or near touch is to be rendered as a touch icon, the touch screen processing module 82 provides the touch data samples (e.g., five samples per frame, or more, or less) or it provides a touch icon to the video graphics processing module 48 and/or the processing module 42 via the I/O interface 54, the I/O and/or peripheral control module 52, and the core control module 40.

If the touch screen processing module 82 provides the touch data samples, the video graphics processing module 48 and/or the processing module 42 determine the display location of the touches, or near touches, and generates a touch icon to represent a touch, or near touch. The processing module updates the write frame buffer with the touch icon (e.g., for the next frame to be rendered). For example, the touch icon corresponds to one of the touch data samples and its display location. As another example, the processing module 42 and/or 48 determines an offset between the physical movement of the touch and the touch icon based on the multiple touch data samples per frame. The processing module adjusts the location in the frame of video data based on the offset. This will be discussed in greater detail with reference to one or more subsequent figures.

As another example, the processing module adjusts the read frame buffer as a frame of video data is currently read from the buffer for rendering. In this example, the frame is divided into a number of sub-frames (e.g., the number corresponds to the oversampling rate of the touch data with respect to the display's refresh rate). As a sub-frame is rendered, the rendering includes rendering a corresponding touch icon. This is described in greater detail with reference to one or more subsequent figures.

FIG. 37B is a schematic block diagram of another embodiment of video processing circuitry of a device that is similar to the embodiment of FIG. 37A. In this embodiment, the I/O interface 54 and the I/O and/or peripheral control module 52 are omitted. As such, the touch screen processing module 82 communicates with the processing module 42 and/or with the video graphics processing module 48 via the core control module 40.

FIG. 38 is a schematic block diagram of an example of reading from and writing to a frame buffer for four frames of video data (e.g., frames i through i+3). At frame interval i, frame buffer "a" is the read frame buffer as video data is read from it for rendering on the display. Also, during frame interval i, frame buffer "b" is the write frame buffer as the next frame of video data is being written into it.

Subsequently, in frame interval i+1, frame buffer "a" and frame buffer "b" effectively switch roles, where frame buffer "b" is now the read frame buffer and frame buffer "a" is the write frame buffer. In this frame interval, frame i+1 is being read from the buffer "a" for rendering on the display and the next frame i+2 is being written into buffer "b". This swapping of roles continues as long as there are frames of video data to be rendered.

FIG. 39 is a logic diagram of an example of a method for adjusting touch data (e.g., a plurality of touch data samples) on a video screen. The method begins at step 351 where a processing module (e.g., processing module 42, 48, and/or 82) obtains (e.g., receives, generates, creates, reads, looks up, etc.) touch data at a touch data rate.

The method continues at step 353 where the processing module obtains video data at a refresh rate. The touch data rate is greater than the refresh rate. As an example, the refresh rate is 60 Hz, and the touch data rate is 300 Hz (e.g., 5× oversampling of the touch data versus the video data). For example, with a 5× touch data oversampling with respect to the video refresh rate, there are five touch data samples per frame of video data.

The method continues at step 355 where the processing module obtains a frame of video data (e.g., reads from the frame buffer) for rendering on a display. The method continues at step 357 where the processing module, for the frame of video data, determines a touch movement trend based on the touch data. As an example, a frame of video data includes five touch data samples. For a linear estimate of the touch movement trend, two of the touch data samples are mapped to a coordinate system (e.g., Cartesian or Polar) of the touch screen display. For a non-linear estimate, three or more of the five touch data samples are mapped to the coordinate system of the touch screen display.

As a further example, the processing module determines an x-direction touch movement trend based on x-direction movement of the touch data samples that are mapped to the coordinate system. The example further includes the processing module determines a y-direction touch movement trend based on y-direction movement of the touch data samples that are mapped to the coordinate system. As a further example or in furtherance of the present example, the processing module determines a z-direction touch movement trend based on z-direction movement of the touch data samples that are mapped to the coordinate system.

As another example, the processing module determines a frame-to-frame movement trend between a first frame of video data and the frame of video data based on touch data samples obtained for at least a portion of the first frame of video data and at least a portion of the frame of video data. In this instance, the movement trend of the touch data spans two or more frames of video data.

The method continues at step 359 where the processing module determines a position offset (e.g., an x-offset; a y-offset, and/or a z-offset) for a touch icon (e.g., a video representation of the touch data). For example, the processing module determines the position offset by mathematically modeling a change in direction and/or a change in speed of the coordinate positioning of the touch data samples of a frame of video data. The mathematical modeling includes one or more of an average of the touch data, a median of the touch data, and a derivative of the touch data regarding the frame of video data.

The method continues at step 361 where the processing module determines whether the position offset is greater than or equal to an offset threshold. For example, if the position offset is small (e.g., less than a few millimeters), the lag between physical movement of a touch and the visual representation of the touch (e.g., the touch icon) will be negligible perceptible by the user. As such, there is no need to offset the touch icon in the frame of video data.

When the position offset is less than the offset threshold, the method continues at step 367 where the processing module determines whether there are more frame of video data to be rendered (e.g., displayed). If so, the method repeats at step 355. If not, the method is done.

When, however, the position offset exceeds the threshold, (e.g., the lag between the physical movement of the touch and the touch icon will be perceptible by the user), the method continues at step 363. At step 363, the processing module adjusts the position of the touch icon within the frame of video data based on the position offset to produce an adjusted frame of video data. The method continues at step 365 where the processing module renders the adjusted frame of video data. The method then repeats at step 367.

FIG. 40 shows an example of a series of frames of video data (e.g., j through j+5). The blue line represents a touch icon displayed in the frames of video data; the black line represents physical movement of a touch; and the red line represents touch data samples. The vertical axis corresponds to movement of the touch in the x-direction and the horizontal axis represents time (each frame interval corresponds to 1 over the refresh rate and one frame of video data is rendered during one frame interval). Similar diagrams can be done for y-direction movement and/or z-direction movement.

For frame "j", which is rendered in the first frame interval, the touch icon (blue line) is rendered at x-position x1. Since this is the first frame interval in the example, there is no touch data samples from one or more previous frames, which can be used to produce a position offset. During the interval for frame "j", five touch data samples (red line) of the physical movement (black line) are taken.

The five touch data samples are mapped to x positions and an x-movement trend is determine therefrom. In this example, the rate of movement in the x-direction is increasing in speed (e.g., greater distance per frame interval). The x-movement trend determined during the frame interval for frame "j" is used to determine a position offset for the rendered of the touch icon (blue line) during the frame interval for frame "j+1".

At the beginning of the frame interval for frame "j+1", the position of the touch icon (blue line) in the frame of video data for frame "j+1" is adjusted based on the offset. For the duration of the frame interval for frame "j+1", the touch icon is rendered at x-position x2. Note that, at the beginning of the frame interval for frame "j+1", the physical movement of the touch is lagging behind the rendered touch icon and by the end of the frame interval, the physical movement of the touch is leading the rendered touch icon.

During the interval for frame "j+1", five more touch data samples (red line) of the physical movement (black line) are taken. The five new touch data samples are mapped to x positions and an x-movement trend is determine therefrom. The x-movement trend could further be determined by incorporation one or more of the touch data samples of the preceding frame interval. The x-movement trend determined during the frame interval for frame "j+1" is used to determine a position offset for the rendered of the touch icon (blue line) during the frame interval for frame "j+2".

This process continues for each frame of video for which a touch icon is to be displayed. By using the position offset, the lead-lag relationship between the physical touch and the rendered touch icon is reduced. For example, if the refresh rate is 60 Hz, the touch sample rate is 300 Hz, and the physical movement of the touch is at 2 miles-per-hour, the touch moves about 1.5 cm during a frame interval (2 mph=2.94 feet-per-second; at 60 Hz, 0.049 feet per frame interval, which is 1.5 cm per frame interval). As such, the visual touch icon would lag the physical touch by up to 1.5 cm. With the position offset, the lag can be reduced by 50% or more.

FIG. 41 is a schematic block diagram of an example of a frame of video data for a video game that includes multiple touch data samples. In this video game example, the finger is used to hit a golf ball. The speed and direction of the finger on the touch screen determine the distance and travel path of the golf ball after simulated contact. In this example, for each frame of video data of the video game, the touch controller creates five touch data samples (five is just an example, there could be more or less touch data samples per frame of video data).

In this example video frame, the finger has not yet made virtual contact with the golf ball. The touch controller has produced five touch data samples based on sensing the touch or near touch of the finger on the touch screen display.

FIG. 42 is a schematic block diagram of an example of another frame of video data for the video game that includes multiple touch data samples. In this example video frame, the finger has just made virtual contact with the golf ball and the golf ball is moving towards the virtual fairway. The touch controller has produced five touch data samples based on sensing the touch or near touch of the finger on the touch screen display.

FIG. 43 is a schematic block diagram of an example of the frame of video data of FIG. 42. In this figure, the five touch data samples are rendered as five touch icons 350. A touch icon may be graphically rendered in a variety of ways. For example, the touch icon is a video rendered of a finger. As another example, the touch icon is a circle or an ellipse. As yet another example, the touch icon is a golf club.

To render the five touch icons with the frame of video data, the touch controller provides the touch data samples to the video controller. The video controller generates the touch icons from the touch data samples and updates the read frame buffer as the touch icons are generated. FIG. 44 and FIGS. 45A through 45E illustrate an example of rendering the touch icons, where rendering refers to providing video data to the display and enabling a corresponding gate line of the display for visual presentation of the video data.

FIG. 44 is a schematic block diagram of an example of dividing a frame of video data for a video game into sub-frames. The number of sub-frames per frame corresponds to the oversampling rate of the touch data in comparison to the refresh rate of the display. In this example, the frame of video data of FIG. 41 is divided into five sub-frames.

FIGS. 45A through 45E are schematic block diagrams of an example of rendering sub-frames of video data with touch icons. For a refresh rate of 60 Hz, a frame of video data is rendered once every $\frac{1}{60}^{th}$ of a second. For a display with 100 lines of pixels, one gate line of the display is enabled for $\frac{1}{100}^{th}$ of $\frac{1}{60}^{th}$ of a second, which is 16.67 micro-seconds, for the frame of video data.

With the display divided into five sub-frames, each sub-frame includes 20 lines of pixels. Sub-frame 1 includes the first 20 lines; sub-frame 2 includes the second 20 lines;

sub-frame 3 includes the third 20 lines; sub-frame 4 includes the fourth 20 lines; and sub-frame 5 includes the fifth 20 lines. As the video controller receives the touch data samples, it renders a corresponding touch icon. The video controller creates (e.g., generates and stores in the frame buffer) a first touch icon from a first touch data sample during the first sub-frame; creates a second touch icon from a second touch data sample during the second sub-frame; creates a third touch icon from a third touch data sample during the third sub-frame; creates a fourth touch icon from a fourth touch data sample during the fourth sub-frame; and creates a fifth touch icon from a fifth touch data sample during the fifth sub-frame.

Figure 45A:
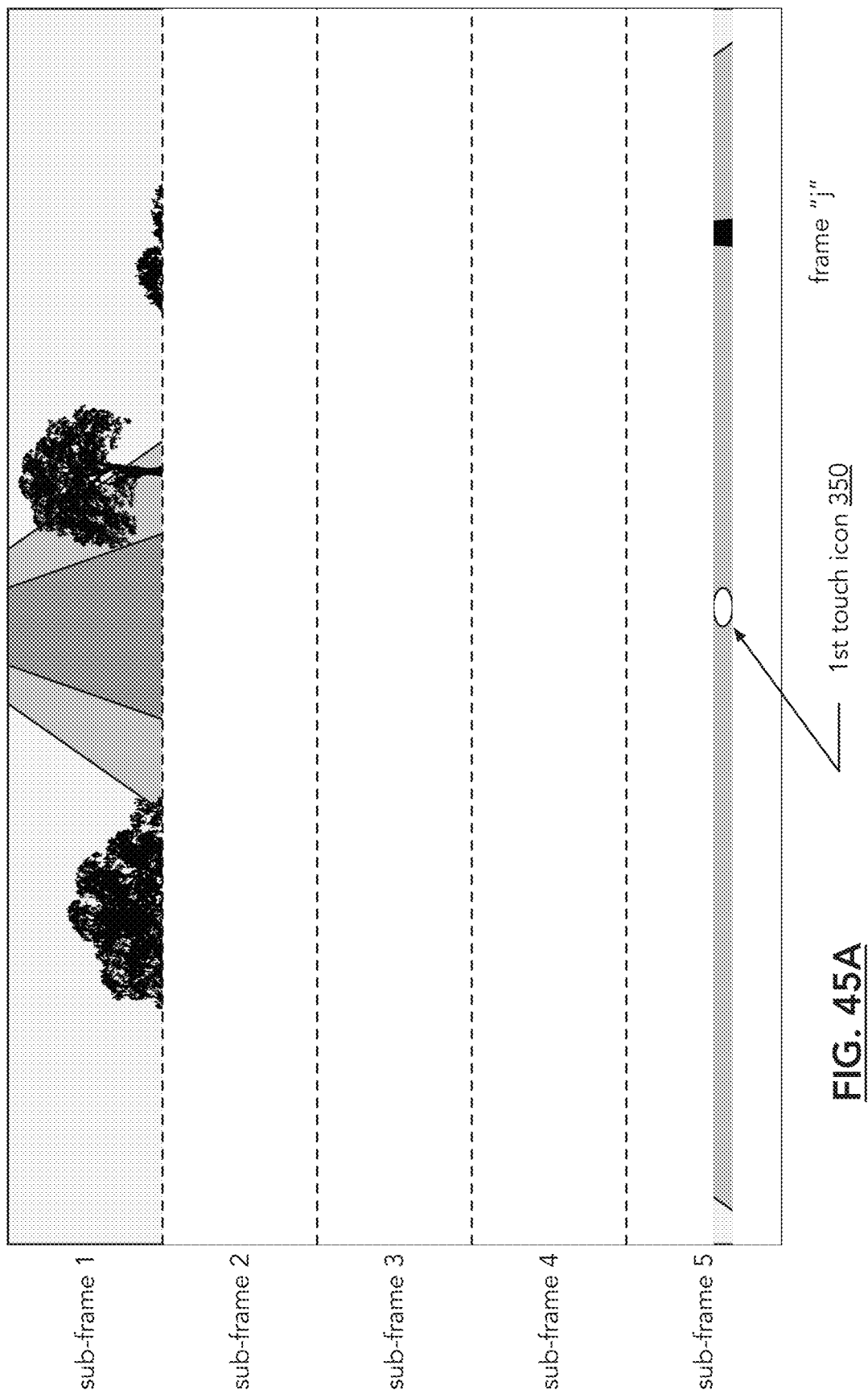
Figure 45B:
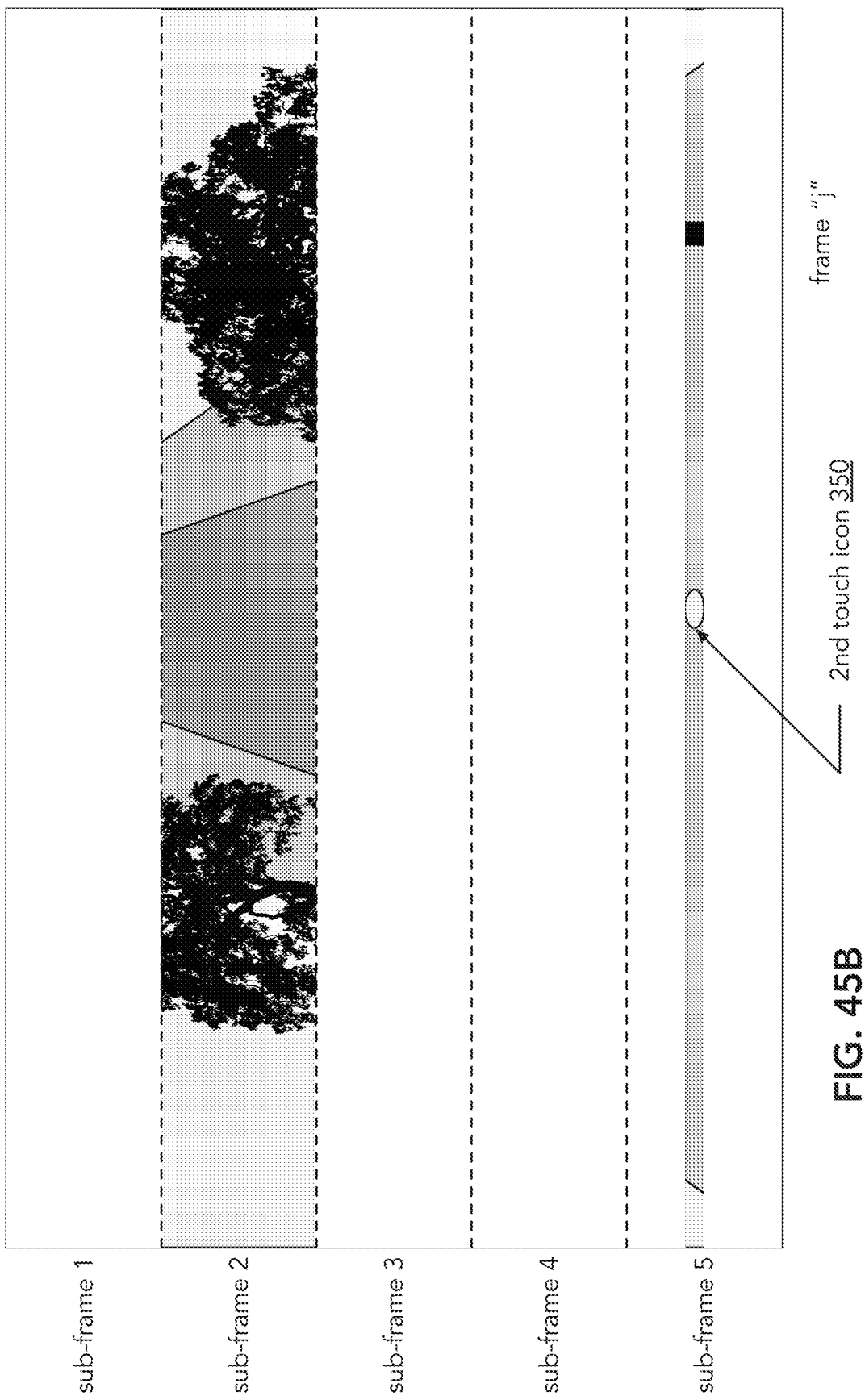
Figure 45C:
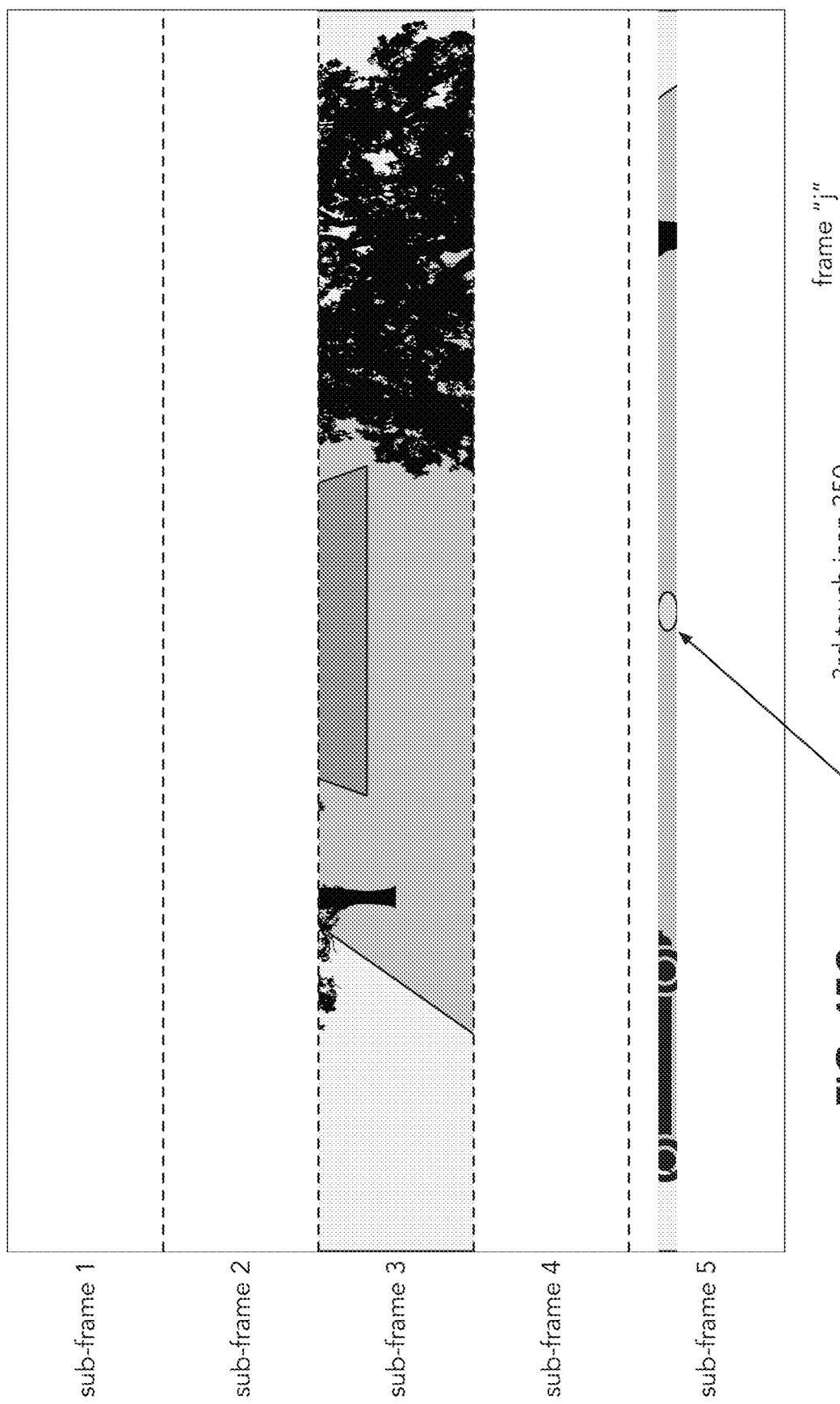
Figure 45D:
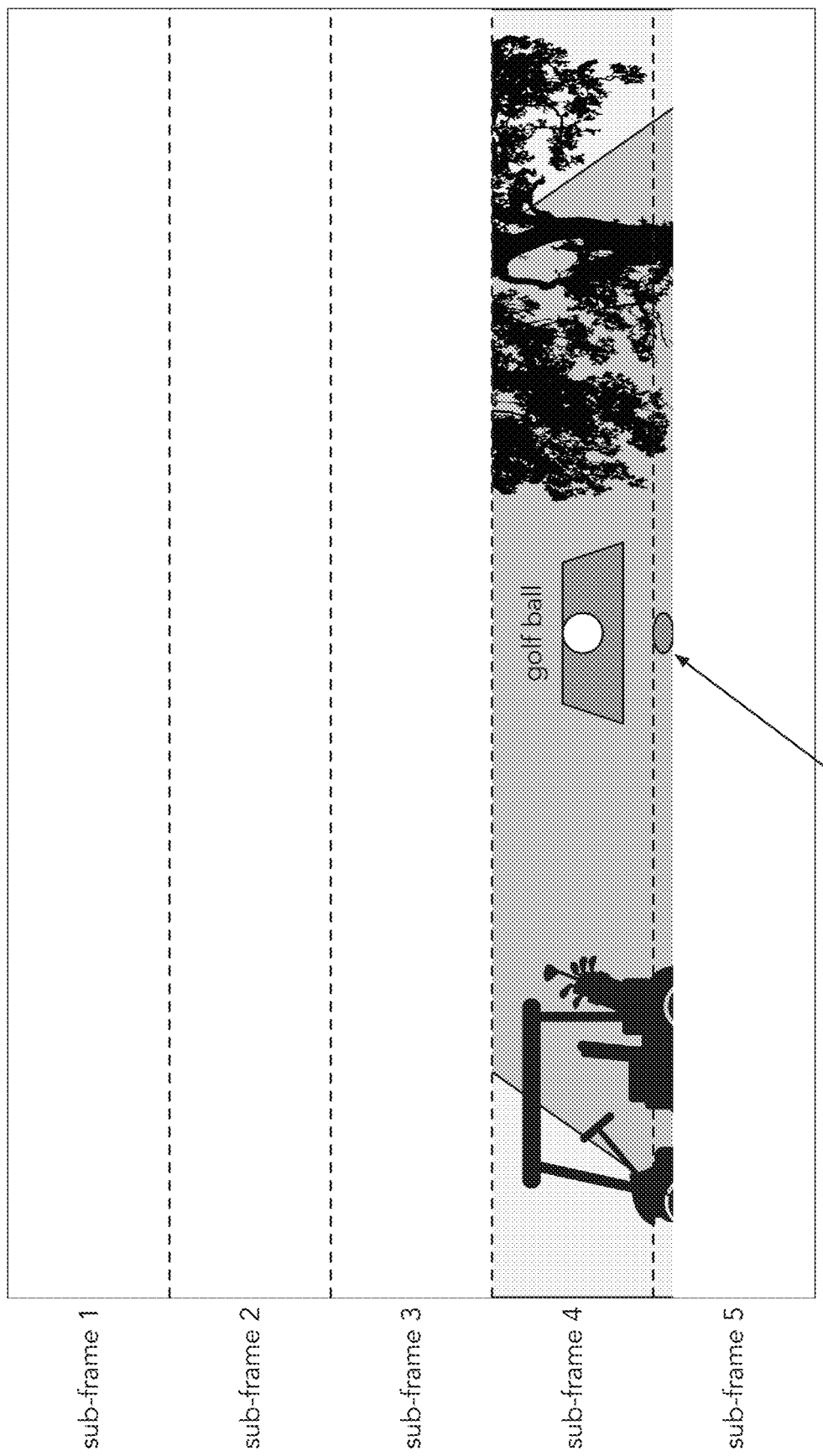
Figure 45E:
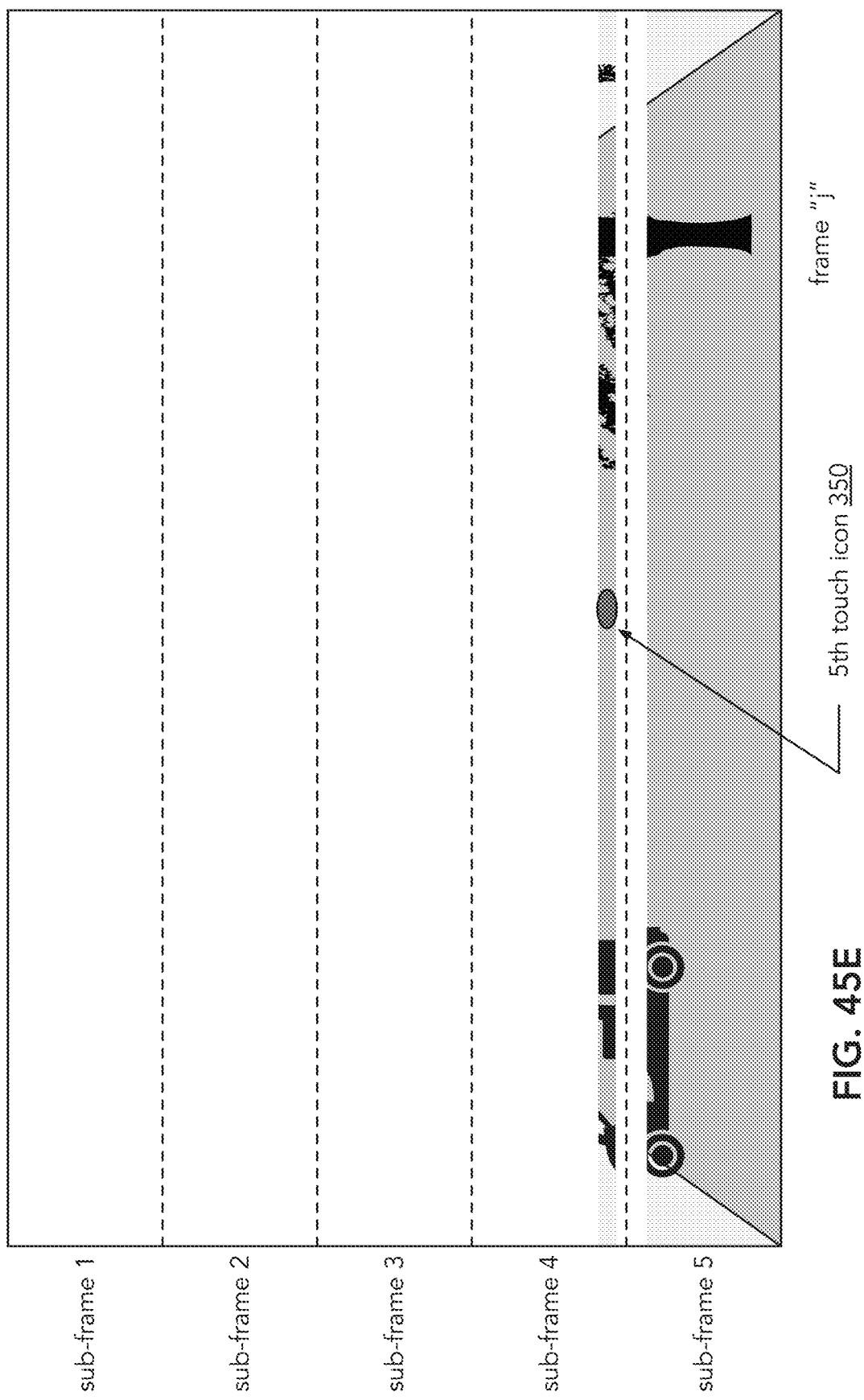

FIG. 45A illustrates the rendering of the first sub-frame and the first touch icon. During the first $\frac{1}{5}^{th}$ of the frame, the 20 gate lines of the first sub-frame are sequentially enabled and then the "x" number of gates lines of the first touch icon are enabled. If "x" equals 5, then 25 gate lines instead of 20 are enabled during the first $\frac{1}{15}^{th}$ of the frame. As such, the duration of a gate line being enabled is less due to enabling the gate lines of the touch icon. In this example, the duration of enabling a gate line is 75% due to the extra five gate lines.

FIGS. 45B through 45E illustrate the rendering of the second sub-frame and the second touch icon; of the third sub-frame and the third touch icon; of the fourth sub-frame and the fourth touch icon; and of the fifth sub-frame and the fifth touch icon. In this manner, the lag of displaying touch icons with respect to the physical touch is substantially reduced, which increases gaming experiences, educational experiences, and most other interactive touch screen experiences.

FIG. 46 is a schematic block diagram of an example of dividing another frame of video data of a video game into sub-frames. The number of sub-frames per frame corresponds to the oversampling rate of the touch data in comparison to the refresh rate of the display. In this example, the frame of video data of FIG. 42 is divided into five sub-frames. In this frame, the golf ball has been virtual hit and it is flying towards the virtual fairway.

FIGS. 47A through 47E are schematic block diagrams of an example of rendering sub-frames of video data with touch icons. In this example, the touch icons are rendered at the touch data rate (e.g., 5 times per frame of video data) and the golf ball (i.e., the touch affected video window) is also rendered at the touch data rate. The video graphics controller generates the moving video window of the golf ball as it generates the touch icon for each sub-frame.

Figure 47A:
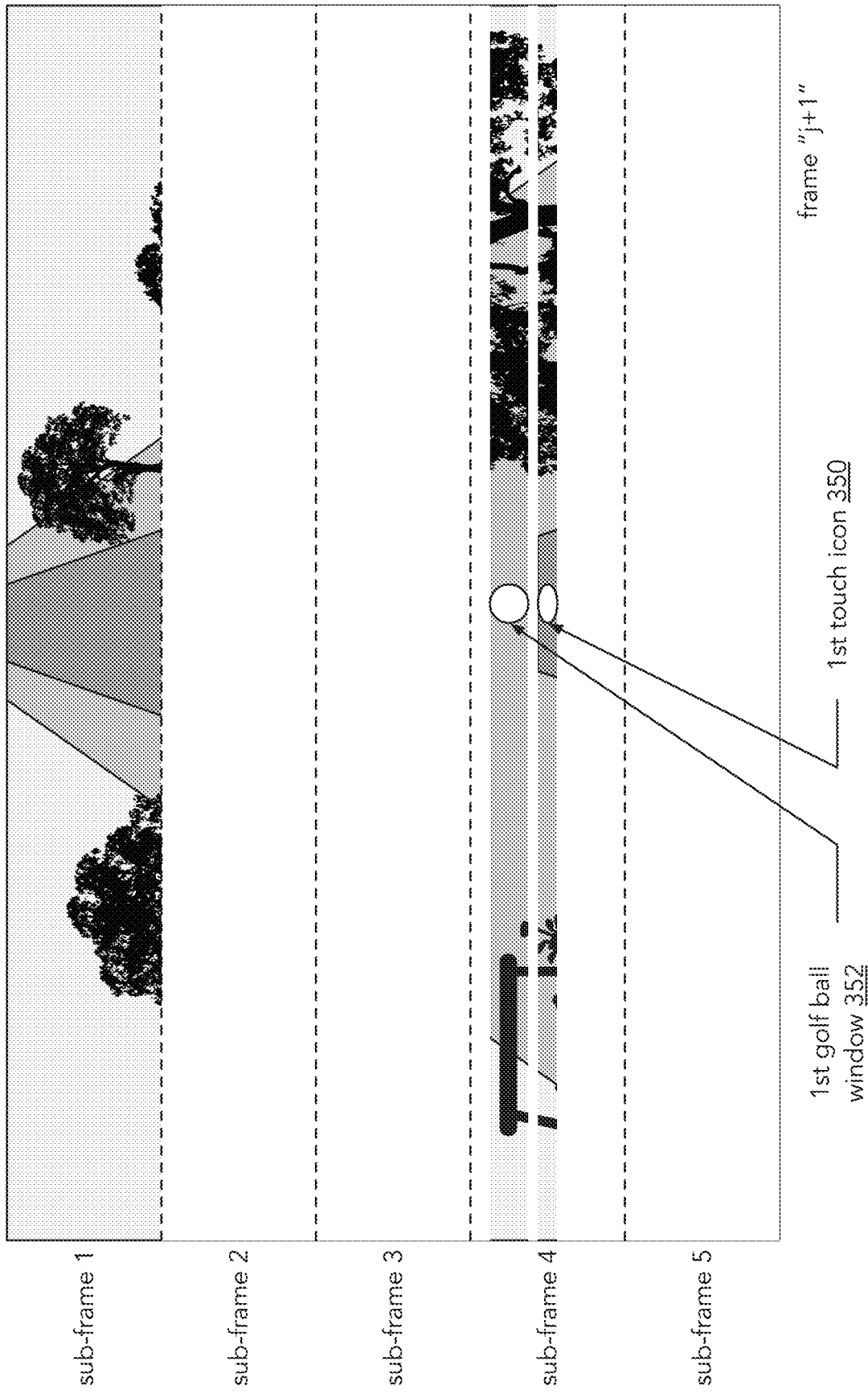
Figure 47B:
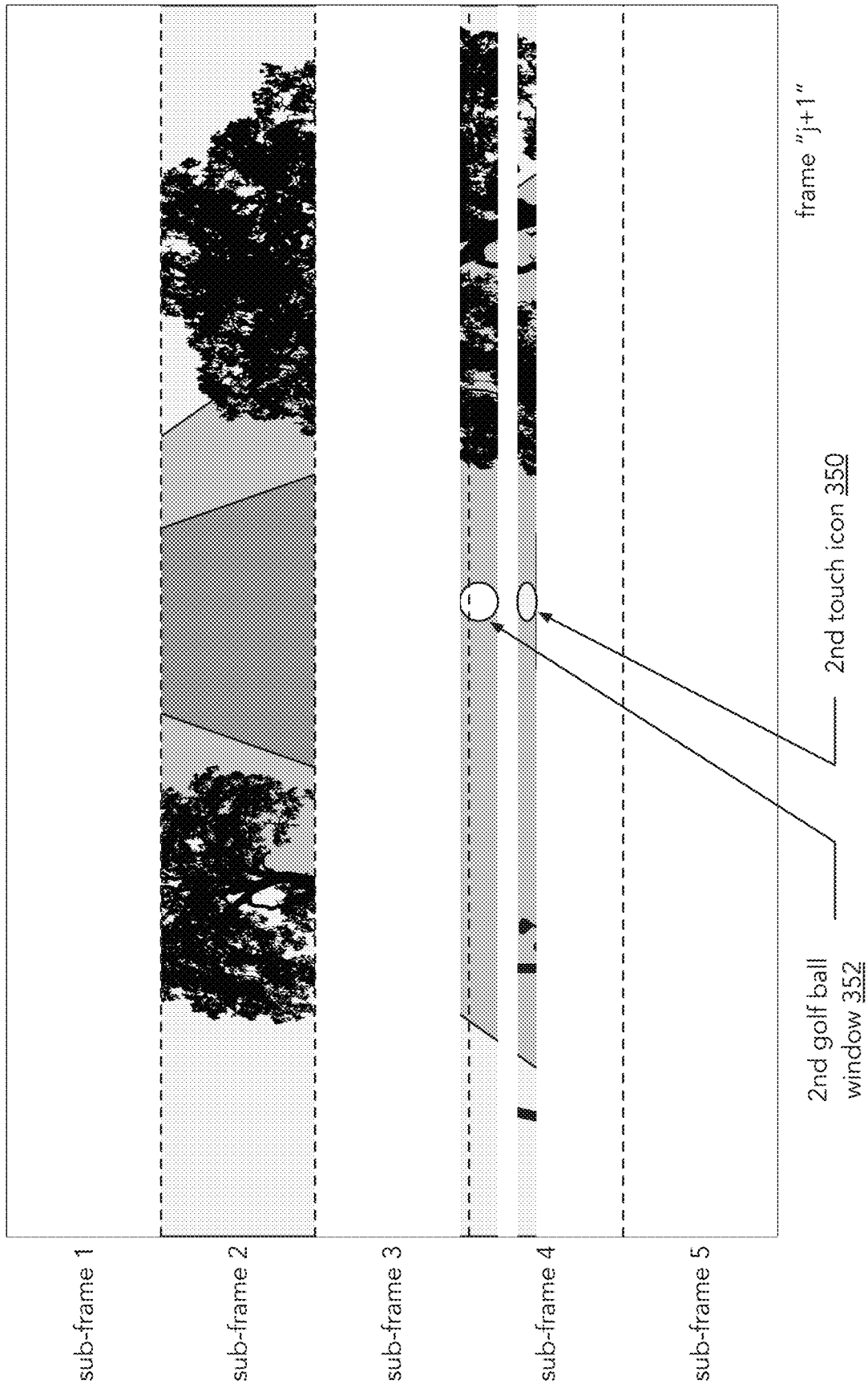

FIG. 47A illustrates the rendering of the first sub-frame, the first touch icon, and the first golf ball video window 352. During the first $\frac{1}{5}^{th}$ of the frame, the 20 gate lines of the first sub-frame are sequentially enabled, then the "x" number of gates lines of the first touch icon are enabled, and then the "y" number of gates lines for the golf ball window. If "x" equals 5 and "y" equals 5, then 30 gate lines instead of 20 are enabled during the first $\frac{1}{5}^{th}$ of the frame. As such, the duration of a gate line being enabled is less due to enabling the gate lines of the touch icon. In this example, the duration of enabling a gate line is 50% due to the extra ten gate lines.

In an alternative embodiment, the touch icon could be omitted from the video frame. In this instance, the golf ball window in rendered at 5× the rate of rendering the rest of the frame. This provides video clarity of the golf ball as it moves on the screen. Such a concept can be used for high velocity video windows of a video data.

Figure 47C:
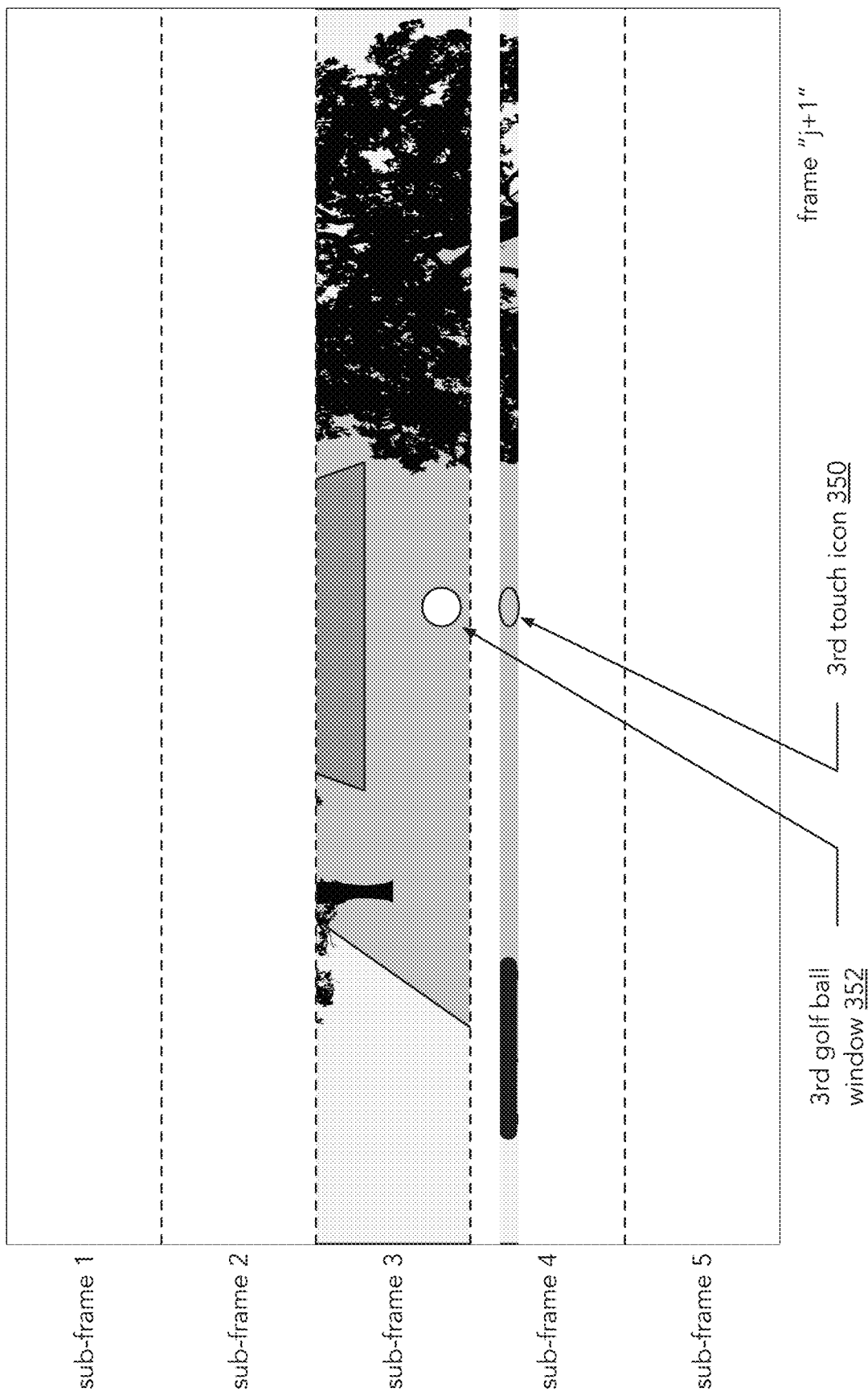
Figure 47E:
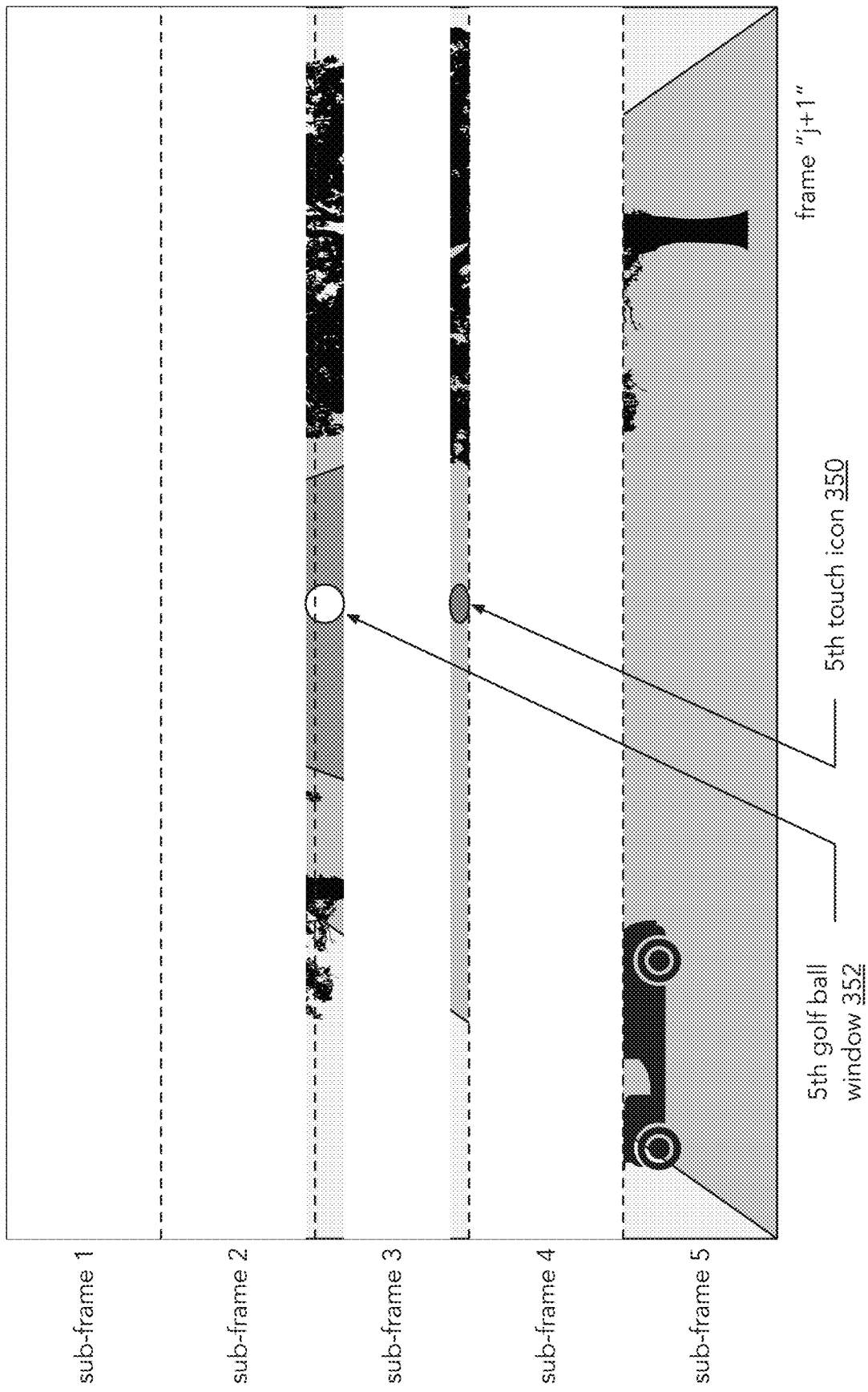

FIG. 47C illustrates the rendering of the third sub-frame, the third touch icon, and the third golf ball video window 352. In this sub-frame, the third golf ball window is completely within the third sub-frame. As such, the gate lines for the third golf ball window only need to be enabled once during the third sub-frame. Thus, only 25 gate lines are enabled during this sub-frame: 20 for the sub-frame and 5 for the touch icon.

FIG. 47D illustrates the rendering of the fourth sub-frame, the fourth touch icon, and the fourth golf ball video window 352. In this sub-frame, the fourth touch icon is completely within the fourth sub-frame. As such, the gate lines for the fourth touch icon only need to be enabled once during the fourth sub-frame. Thus, only 25 gate lines are enabled during this sub-frame: 20 for the sub-frame and 5 for the golf ball window.

FIG. 48 is a logic diagram of an example of a method of rendering frames of video data on a sub-frame level. The method begins at step 360 where a processing module (e.g., 42, 48, and/or 82) obtains touch data (e.g., an actual touch and/or a hover (a near touch)) at a touch data rate. The obtaining of the touch data may be done in a variety of ways. For example, the touch data is created. As another example and/or an extenuation of the preceding example, the touch data is written into a frame buffer as touch icons and subsequently read from the frame buffer.

The method continues at step 362 where the processing module obtains (e.g., generates, writes, and/or reads) video data (e.g., images, graphics, text, etc.) at a refresh rate of a display. The touch data rate is greater than the refresh rate. For example, the touch data rate is a multiple of the refresh rate such that there are multiple touch data samples per frame of video data. As a specific example, the refresh rate is 60 Hz and the touch data rate is 300 Hz, which corresponds to five touch data samples per frame of video data. In an embodiment, the touch data rate is in sync with the refresh rate.

The method continues at step 364 where the processing module divides a frame of video data into multiple sub-frames, where the number of sub-frame corresponds to an oversampling rate of the touch data with respect to the refresh rate. The method continues at step 366 where, for a sub-frame, the processing module renders a first sub-frame of the frame of video data. The method continues at step 368 where, during the sub-frame interval, the processing module renders a touch icon of a first touch data sample of a plurality of touch data samples corresponding to the frame of video data.

When gate lines of the touch icon at least partially overlap with one or more gate lines of the sub-frame of video data, the processing module renders the overlapping gate lines once per sub-frame interval. When the sub-frame and the corresponding touch icon have been rendered, the method continues at step 370 where the processing module determines, for the current frame of video data, whether there is one or more sub-frames to be rendered.

If yes, the method continues at step 372 where the processing module processes the next sub-frame per steps 366 and 368. If there are no more sub-frames, the method continues at step 374 where the processing module determines if there are more frames of video data to process. If yes, the method repeats at step 364. If not, the method is done.

FIG. 49A is a logic diagram of a further example of a method of rendering frames of video data on a sub-frame level; in particular regarding how the processing module divides a frame into sub-frames. The method begins at step 380 where the processing module determines an oversampling rate of the touch data with respect to refresh rate. As a specific example, the refresh rate is 60 Hz and the touch data rate is 300 Hz, which corresponds to an oversampling rate of five.

The method continues at step 382 where the processing module equates the oversampling rate to the number of sub-frames per frame. The method continues at step 384 where the processing module identifies sets of gate lines for the sub-frames. For example, a first set of gate lines for a first sub-frame.

FIG. 49B is a logic diagram of a further example of a method of rendering frames of video data on a sub-frame level; in particular to generating and rendering a touch icon. The method begins at step 390 where the processing module generates a touch icon for a touch data sample rate corresponding to a sub-frame. For example, a first touch icon for a first sub-frame.

The method continues at step 392 where the processing module determines a frame location of the touch icon. For example, the touch data sampling includes coordinates of where the touch screen the touch occurred. The coordinate system of the touch screen at least partially overlays a coordinate system of the video display. As such, the location on the touch screen coordinate system is mapped to the coordinate system of the video display.

The method continues at step 394 where the processing module updates a read frame buffer with the touch icon prior to rendered the gate lines corresponding to the touch icon. Note that the read frame buffer is the frame buffer being currently rendered. The method continues at step 396 where the processing module identifies a set of gate lines corresponding to the video location of the touch icon.

FIG. 49C is a logic diagram of a further example of a method of rendering frames of video data on a sub-frame level; in particular to processing overlapping gate lines of a sub-frame with a corresponding touch icon. The method begins at step 500 where the processing module determines whether the set of gate lines of the touch icon at least partially overlap with the set of gate lines of the corresponding sub-frame.

If not, the method continues at step 402 where the processing module enables to the set of gate lines of the sub-frame to render the video data of the sub-frame and enables the set of gate lines of the touch icon to render the video data of the touch icon. If there is overlap, the method continues at step 404 where the processing module enables non-overlapping gates lines of the sub-frame and of the touch icon and enables the overlapping gate lines once per sub-frame interval.

FIG. 50A is a logic diagram of an example of a method of rendering frames of video data on a sub-frame level with a higher refresh rate for touch icons (e.g., a finger touch) and a touch affected video window (e.g., a golf ball for a golf video game). The method begins at step 410 where the processing module generates a touch icon from a touch data sample of a touch data sample interval. As an example, the touch data rate is 300 Hz, which equates to a ⅟300 second touch data sample interval. The touch data sample include data regarding location of the touch and may further include data regarding the size of the touch and/or data regarding the movement of the touch.

The method continues at step 412 where the processing module determines frame location of the touch icon (e.g., where in the frame of video data the touch icon lies). The method continues at step 414 where the processing module determines frame location of an affected video window. For example, in the video golf game, the finger touch represented the golf club hitting the video rendering of a golf ball.

In this example the finger touch is the touch icon, and the golf ball is the affected video window. Before the golf ball is virtually hit, it is rest at a known location (e.g., the tee box, on the fairway, etc.). Once the golf ball is virtually hit, it's position is moving; the speed and direction are determined based on the speed and direction of the finger movement.

The method continues at step 416 where the processing module update a read buffer with the touch icon and a current position of the affected video window (e.g., the golf ball). The method continues at step 418 where the processing module identifies a set of gate lines for the touch icon, which are activated during the current sub-frame interval. The method continues at step 420 where the processing module identifies a set of gate lines for the affected video window, which are activated during the current sub-frame interval.

FIG. 50B is a logic diagram of a further example of a method of rendering frames of video data on a sub-frame level with a higher refresh rate for touch icons and, in particular, regarding overlapping gate lines during a sub-frame interval. The method begins at step 430 where the processing module determines whether gate lines of the sub-frame, the touch icon, and/or the affected video window have at least one overlapping gate line.

If not, the method continues at step 432 where the processing module enables the gates lines for the sub-frame, the touch icon, and the affected video window. If there is overlap, the method continues at step 434 where the processing module enables the non-overlapping gates lines for the sub-frame, the touch icon, and the affected video window and enables, once for the sub-frame interval, the overlapping gate lines of the sub-frame, the touch icon, and/or the affected video window FIG. 51A is a schematic block diagram of an example of touch screen 80 and/or 81 that includes a priority touch area 450. The size and location of the priority touch area 450 may be fixed, programmable, and/or selectable. In an example, the high priority area 450 is deemed to be high priority because of an increase in touch resolution (e.g., more touch sense cells in the area). In another example or as an extension of the previous example, the high priority area 450 is deemed to be high priority because of data being conveyed in the area and/or as a result of a priority operation of the device (e.g., emergency call, critical function, etc.).

In another example or as an extension of one or more of the previous examples, the high priority area 450 is deemed to be high priority because of increased touch sensitivity. As an example, the touch sensitivity is increased by increasing the signal strength of the drive signal per touch sense cell or electrode. As another example, the touch sensitivity is increased by using of a signal having a unique frequency (e.g., an ID frequency), etc.). As yet another example, the touch sensitivity is increased by using a drive signal with multiple frequency components per touch sense cell or electrode.

The high priority touch area 450 is used for a variety of applications. For example, the high priority touch area is used for biometric identification (e.g., fingerprint). As another example, the high priority touch area is used for increased accuracy of touch (e.g., increase touch accuracy for a touch screen keypad and/or keyboard). As another example, the high priority touch area is used for improved gesture recognition and/or gesture tracking. As yet another example, the high priority touch area is used for a controller of a video game.

FIG. 51B is a schematic block diagram of an example of touch screen 80 and/or 81 that includes multiple priority touch areas. In this example, the touch screen includes a first high priority touch area 452 and a second high priority touch area 454.

FIG. 51C is a schematic block diagram of another example of touch screen 80 and/or 81 that includes multiple priority touch areas. In this example, the touch screen includes a high priority touch area 456 and an at least partially surrounding medium priority touch area 458. In an application, the nest priority touch areas are used for fast moving touch. The touch is desired to be within the high priority section but, if the touch is moving fast enough, it may be detected in the medium priority section, indicating that the size and/or position of the high priority touch sensor area should be adjusted.

FIG. 51D is a schematic block diagram of another example of touch screen 80 and/or 81 that includes multiple priority touch areas. In this example, the touch screen includes a high priority touch area 460 and a separate medium priority touch area 454.

FIG. 52 is a schematic block diagram of an embodiment of a touch screen 80 and/or 81 having a high priority touch area 450. In this embodiment, the touch screen includes a plurality of row electrodes and a plurality of column electrodes. The intersection of a row electrode and a column electrode form a touch sense cell.

The drive sense circuits (DSC) associated with the rows and columns are labeled as a first group of drive sense circuits (e.g., gray shaded boxes). The other drive sense circuits of the non-priority areas of the touch screen are labeled as a second group of drive sense circuits. In one embodiment, there are move electrodes and drive sense circuits of the high priority area than in the other areas of the touch screen. In another embodiment and/or as an extension of the preceding embodiment, the drive sense circuits associated with the high priority area are enabled to detect a signal having a unique identifying frequency (f_ID) and the other drive sense circuits are not enabled to detect the signal at (f_ID).

In another embodiment and/or as an extension of one or more of the preceding embodiments, the drive sense circuits associated with the high priority area have an increased drive signal in comparison to the drive sense circuits associated with the non-priority areas. In another embodiment and/or as an extension of one or more of the preceding embodiments, the drive sense circuits associated with the high priority area have a drive signal that includes multiple frequency component for data gathering at each frequency.

FIG. 53 is a schematic block diagram of another embodiment of a touch screen and/81 having a high priority touch area 450. In this embodiment, the touch screen includes a plurality of individual capacitive sensors (S) coupled to sensing circuits (SC), which, for example, are drive sense circuits. The sensing circuits associated with the sensors in the high priority touch area are labeled as being in the first group (e.g., gray shaded boxes) and the sensing circuits associated with the other sensors are labeled as being in a second group (e.g., white shaded boxes).

FIG. 54 is a schematic block diagram of another embodiment of a touch screen and/or 81 that includes a high priority touch area 450. The touch screen is coupled to a row multiplexer (r_mux) and a column multiplexer (c_mux). The multiplexers are coupled to drive sense circuits (DSC), which are coupled to the touch screen processing module 82.

In this embodiment, the high priority touch area 450 includes a greater density of electrodes (represented by the dash lines) than the other areas of the touch screen. The touch screen control module 82 provides control signals to the multiplexers to couple drive sense circuits (DSC) to active electrodes of the touch screen.

FIG. 55A is a schematic block diagram of an example of a touch sense pad of a particular size of at least a second a touch screen. In this example, the touch sense pad is approximately 10 mm by 10 mm. The touch sense pad is formed by an intersection of a row electrode and a column electrode or a by a stand-alone capacitive sensor. Other sections of the touch screen may have different sized touch sense pads.

FIG. 55B is a schematic block diagram of another example of multiple touch sense pads of a particular size of at least a second a touch screen. In this example, the touch sense pad is approximately 5 mm by 5 mm. With respect to the 10 mm by 10 mm touch sense pad, the 5 by 5 pad has four times the number of pads in the same area, which can be achieved by the intersection of electrodes and/or by the inclusion of capacitive sensors.

FIG. 55C is a schematic block diagram of another example of multiple touch sense pads of a particular size of at least a second a touch screen. In this example, the touch sense pad is approximately 1 mm by 1 mm. With respect to the 5 mm by 5 mm touch sense pad, the 1 by 1 pad has twenty-five times the number of pads in the same area. With respect to the 10 mm by 10 mm touch sense pad, the 1 by 1 pad has one-hundred times the number of pads in the same area.

FIG. 55D is a schematic block diagram of another example of multiple touch sense pads of a particular size of at least a second a touch screen. In this example, the touch sense pad is approximately 0.5 mm by 0.5 mm. With respect to the 1 mm by 1 mm touch sense pad, the 0.5 by 0.5 pad has four times the number of pads in the same area. With respect to the 5 mm by 5 mm touch sense pad, the 0.5 by 0.5 pad has one-hundred times the number of pads in the same area. With respect to the 10 mm by 10 mm touch sense pad, the 0.5 by 0.5 pad has four-hundred times the number of pads in the same area.

FIG. 55E is a schematic block diagram of another example of multiple touch sense pads of a particular size of at least a second a touch screen. In this example, the touch sense pad is approximately 0.25 mm by 0.25 mm. With respect to the 0.5 mm by 0.5 mm touch sense pad, the 0.25 by 0.25 pad has four times the number of pads in the same area. With respect to the 1 mm by 1 mm touch sense pad, the 0.25 by 0.25 pad has sixteen times the number of pads in the same area. With respect to the 5 mm by 5 mm touch sense pad, the 0.25 by 0.25 pad has four-hundred times the number of pads in the same area. With respect to the 10 mm by 10 mm touch sense pad, the 0.25 by 0.25 pad has sixteen-hundred times the number of pads in the same area.

FIG. 56A is a schematic block diagram of an example of multiple touch pads being proximally touched by a finger. In this example, the resolution of the touch screen is 10 mm by 10 mm touch sense pad size. With a finger touch as shown, the center of the touch is determined based on the seven touch sense pads that recognize the touch. With a coarse touch resolution, it is possible that the position of the touch is off with respect to the video being displayed.

FIG. 56B is a schematic block diagram of another example of multiple touch pads being proximally touched by a finger. In this example, the resolution of the touch screen is 5 mm by 5 mm touch sense pad size. With a finger touch as shown, the center of the touch is determined based on the seventeen touch sense pads that recognize the touch. With a bit-finer touch resolution, the possible that the position of the touch is off with respect to the video being displayed is reduced.

FIG. 57 is a schematic block diagram of an example of high resolution touch area for use for fingerprint detection. In this example, the resolution of the touch screen is 0.25 mm by 0.25 mm touch sense pad size (which could be larger or smaller, depending on desired touch resolution). With a finger touch, the ridges and valleys of the fingerprint have different capacitance values that are detected via the high resolution touch screen area.

FIG. 58 is a schematic block diagram of an example of a priority touch area and a non-priority touch area. In this example, at least a portion of a touch screen includes twenty row electrodes and twenty-five column electrodes. The high priority touch area is positioned at rows 11 through 15 and columns 6 through 10. Within the high priority touch area, each drive sense circuit (DSC) is active to sense touches. Active DSCs and corresponding electrodes are shown using a thick black line.

Within the high priority touch area, there are twenty-five smaller touch cell pads; each represented by a red square. In this example, the touch sense cells (or pads) are formed by the intersection of a row electrode and a column electrode.

Outside of the high priority touch area, one in five DSCs and corresponding electrodes are active, which are represented by the thick black lines. The other electrodes and DSCs are not active, which are represented by the thin gray lines. With the configures, the touch cells outside of the high priority touch area are twenty-five times larger than the touch cells within the high priority touch area.

In the areas outside of the high priority touch area, but in a row or column of the high priority touch area, one of the active electrodes and corresponding drive sense circuit (DSC) is used for the touch cell. For example, the second larger touch cell in the first row of larger touch cells includes rows 1 through 5 and columns 6 through 10. In this example, row 3 is enabled and rows 1, 2, 4, and 5 are not enabled. Also in this example, columns 6 through 10 are enabled. For the larger touch cell, only the data from DSC of column 8 will be used to determine touch or no touch of this larger touch cell. The large black dot represents the intersection row and column of the larger touch cell. The same discussion applies to the other larger touch cells that are in line with the high priority touch area.

FIG. 59 is a schematic block diagram of another example of a priority touch area and a non-priority touch area. In this example, at least a portion of a touch screen includes eighteen row electrodes and twenty-four column electrodes. The high priority touch area is positioned at rows 10 through 15 and columns 7 through 12. Within the high priority touch area, each electrode and corresponding drive sense circuit (DSC) are active to sense touches. Active DSCs and corresponding electrodes are shown using a thick black line.

In this example, the non-priority touch cells are nine times larger than a priority touch cell. For the larger touch cells, the center row electrode, center column electrode, and corresponding drive sense circuits are active, as represented by the thick black lines. The other electrodes of the larger touch cells and the corresponding drive sense circuits are inactive, as represented by the thin gray lines.

In the areas outside of the high priority touch area, but in a row or column of the high priority touch area, one of the active electrodes and corresponding drive sense circuit (DSC) is used for the touch cell. For example, the third larger touch cell in the first row of larger touch cells includes rows 1 through 3 and columns 7 through 9. In this example, row 2 is enabled and rows 1 and 3 are not enabled. Also in this example, columns 7 through 9 are enabled. For the larger touch cell, only the data from DSC of column 8 will be used to determine touch or no touch of this larger touch cell.

FIG. 60 is a schematic block diagram of another example of a high priority touch area (e.g., the red boxes), a medium touch priority area (e.g., the light blue boxes), and a non-priority touch area (e.g., the gray boxes). In this example, at least a portion of a touch screen includes eighteen row electrodes and twenty-four column electrodes. The high priority touch area is positioned at rows 10 through 15 and columns 4 through 9. Within the high priority touch area, each electrode and corresponding drive sense circuit (DSC) are active to sense touches. Active DSCs and corresponding electrodes are shown using a thick red line.

The medium priority touch area (e.g., blue boxes) encircles the high priority touch area. Each medium priority touch cell is nine times the size of a high priority touch cell. As such, the center column electrode and center row electrode and their corresponding DSCs of the touch cell are active, as represented by the thick blue lines. Inactive electrodes and DSCs of the medium priority touch cells are represented by thin gray lines. For the medium priority touch area, the electrodes that are active and in common with the high priority touch area (e.g., the red squares), the drive sense circuits of rows 11 and 14 and of columns 5 and 8 are used for the corresponding medium priority touch sense cells.

The non-priority touch area (e.g., gray boxes) at least partially encircles the medium priority touch area (e.g., the blue boxes). Each non-priority touch cell is four times the size of a medium priority touch cell and thirty-six times the size of a high priority touch cell. For the non-priority touch cells, the center column electrode and center row electrode and their corresponding DSCs of the touch cell are active, as represented by the thick black lines. Inactive electrodes and DSCs of the non-priority touch cells are represented by thin gray lines. For the non-priority touch area, the electrodes that are active and in common with the high priority touch area (e.g., the red squares), the drive sense circuits of rows 10 and 15 are used for the corresponding non-priority touch sense cells.

FIG. 61 is a logic diagram of an example of method of processing a priority touch area and a non-priority touch area. The method begins at step 480 where a processing module (e.g., 42 and/or 82) determines position of a priority touch area (e.g., a high priority touch area and/or a medium priority touch area) on a touch screen. The position corresponds to coordinates of touch sense cells that are to support the priority touch area.

The priority touch area may be of a priority for a variety of reasons. For example, the priority touch area corresponds to interactive video content (e.g., a video keypad, a video keyboard, a video game controller, a video joystick, etc.). As another example, the priority touch area corresponds to an input of a device such as on/off, a safety feature, emergency call, etc. As a further example, the priority touch area supports a security function (e.g., biometric recognition, retinal, fingerprint, etc.). As a still further example, the priority touch area is of a priority due to a function of the device such as image capture, video capture, image/video quality adjustments, etc.

Step 480 is further discussed with reference to FIG. 62. At step 490 the processing module determines whether the priority area already exists. If yes, the method continues at step 496 where the processing module determines whether the position of the priority touch area is to be moved. For example, if the priority touch area corresponds to finger movement across the touch screen, the priority touch area will move with the finger touch. As another example, a user of the device selects the position of the priority touch area and where to move it. This can be done via a series of touch commands to establish the desire to have a priority touch area, how the priority is to be achieved, the size of the priority touch area, and the position of the priority touch area. If the priority touch area is not being moved, the method proceeds to step 482 of FIG. 61.

If the priority touch area is to be moved, the method continues at step 498 where the processing module moves the priority touch area. For example, the user performs a cut and paste operation regarding the location of the priority touch area. As part of moving the priority touch area, the user may execute a series of touch commands to resize the priority touch area. For example, touch an icon to resize the priority touch and then drag the circumference of the priority touch area to the desired new size.

The method continues at step 494 where the processing module determines manner of priority. For example, to achieve a higher touch resolution within the priority touch area than outside of the priority touch area, the processing module activates a higher number of sensor per area in the priority touch area than in the non-priority touch area(s). As another example, the processing module increases the touch sampling rate of drive sense circuits (DSC) associated with the sensors with the priority touch area with respect to the touch sampling rate of the DSCs associated with sensors outside of the priority touch area. As a specific example, the touch sample rate for DSCs of the priority touch area is 400 Hz and the touch sample rate for the DSCs of the non-priority area is 200 Hz.

As a further example, the processing module enables the drive sense circuits (DSC) associated with the sensors of the priority touch area to provide a larger drive signal to its sensors than the DSCs associated of the non-priority touch area. As a still further example, the processing module enables the drive sense circuits (DSC) associated with the sensors of the priority touch area to sense for an identifying signal (f_ID) and the DSCs associated of the non-priority touch area are not enabled to sense for the identifying signal.

If, at step 490, the priority touch area does not exist, the method continues at step 492 where the processing module creates the priority touch area based on a default function and/or based on user inputs. After the priority touch area is created, the method continues at step 494, as discussed above. After step 494, the method proceeds to step 482 of FIG. 61.

Returning to the discussion of FIG. 61, the method continues at step 482 where the processing module identifies a first set of sensors for use with the priority touch area. The first set of sensors, which corresponds to touch sense cells, are within the coordinates of the priority touch area. The method continues at step 484 where the processing module enables a first set of drive sense circuits corresponding to the first set of sensors. The manner in which the drives sense circuits are enabled is dependent on the manner in which the priority is achieved was discussed with reference to FIG. 62.

The method continues at step 486 where the processing module identifies a second set of sensors for use outside of the priority area (e.g., in a non-priority touch area). The method continues at step 488 where the processing module enables a second set of drive sense circuits associated with the second set of sensors. The second set of drive sense circuits are enabled to sense an identifying signal (f_ID), self-capacitance of a sensor; and/or mutual capacitance between sensors.

The method continues at step 500 of FIG. 63. At step 500, the processing module determines if the size of the priority touch area is to be changed. If so, the method continues at step 502 where the processing module determines size and position of the priority touch area. As previously discussed, adjusting size and position can be done via a series of user inputs or as part of an automated change in response to a condition, use, and/or operation of the device and/or touch screen.

The method continues at step 504 where the processing module identifies a first group of sensors that support the adjusted priority area and a first group of corresponding drive sense circuits (DSC). In addition, the processing module enables the first group of DSCs in accordance with the manner of establishing priority (e.g., resolution, signal strength, identifying signal, etc.). The method continues at step 506 where the processing module identifies the second group of sensors and corresponding drive sense circuits (DSC) for the non-priority area(s) and enables the DSCs.

If the size is not changed or after step 506, the method continues at step 508 where the processing module determines whether the position of the priority touch area is to be changed. If so, the method continues at step 510 where the processing module determines a new position for the priority touch area. As previously discussed, adjusting position of the priority touch area can be done via a series of user inputs or as part of an automated change in response to a condition, use, and/or operation of the device and/or touch screen.

The method continues at step 512 where the processing module identifies a first group of sensors that support the adjusted priority touch area and a first group of corresponding drive sense circuits (DSC). In addition, the processing module enables the first group of DSCs in accordance with the manner of establishing priority (e.g., resolution, signal strength, identifying signal, etc.). The method continues at step 5514 where the processing module identifies the second group of sensors and corresponding drive sense circuits (DSC) for the non-priority area(s) and enables the DSCs.

If the position is not changed at step 508 or after step 514, the method continues at step 516 where the processing module determines whether the manner of priority is to be changed. If so, the method continues at step 518 where the processing module identifies the first group of sensors that support the adjusted priority touch area. The method continues at step 520 where the processing module identifies a first group of corresponding drive sense circuits (DSC) and enables them in accordance with the new manner of establishing priority (e.g., resolution, signal strength, identifying signal, etc.).

If the manner of priority is not changed at step 516 or after step 520, the method continues at step 522 where the processing module determines whether another priority touch area (high or medium) is to be added. If so, the method continues at step 524 where the processing module determines the position of the new priority touch area. The method continues at step 526 where the processing module identifies a third group of sensors that support the new priority touch area. The method continues at step 528 where the processing module identifies a third group of corresponding drive sense circuits (DSC) and enables them in accordance with the manner of establishing priority (e.g., resolution, signal strength, identifying signal, etc.) for the new priority touch area.

If another priority touch area is not added at step 522 or after step 528, the method continues at step 530 where the processing module determines whether to delete a priority touch area. If not, the method repeats at step 500. If yes, the method continues at step 532 where the processing module deletes the priority area and returns this a normal touch area. The method continues at step 534 where the processing module identifies the first group of sensors that supported the priority touch area as normal sensors. The method continues at step 536 where the processing module identifies a first group of corresponding drive sense circuits (DSC) as normal DSCs and enables them in accordance with normal operating parameters (e.g., a nominal drive signal level, sense for self-capacitance, and/or sense for mutual capacitance).

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provide an industry-accepted tolerance for its corresponding term and/or relativity between items. For some industries, an industry-accepted tolerance is less than one percent and, for other industries, the industry-accepted tolerance is 10 percent or more. Other examples of industry-accepted tolerance range from less than one percent to fifty percent. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%). Some relativity between items may range from a difference of less than a percentage level to a few percent. Other relativity between items may range from a difference of a few percent to magnitude of differences.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", "processing circuitry", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be, or further include, memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing circuitry and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing circuitry and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with one or more other routines. In addition, a flow diagram may include an "end" and/or "continue" indication. The "end" and/or "continue" indications reflect that the steps presented can end as described and shown or optionally be incorporated in or otherwise used in conjunction with one or more other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

While transistors may be shown in one or more of the above-described figure(s) as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid-state memory, a hard drive memory, cloud memory, thumb drive, server memory, computing device memory, and/or other physical medium for storing digital information.

As applicable, one or more functions associated with the methods and/or processes described herein can be implemented via a processing module that operates via the non-human "artificial" intelligence (AI) of a machine. Examples of such AI include machines that operate via anomaly detection techniques, decision trees, association rules, expert systems and other knowledge-based systems, computer vision models, artificial neural networks, convolutional neural networks, support vector machines (SVMs), Bayesian networks, genetic algorithms, feature learning, sparse dictionary learning, preference learning, deep learning and other machine learning techniques that are trained using training data via unsupervised, semi-supervised, supervised and/or reinforcement learning, and/or other AI. The human mind is not equipped to perform such AI techniques, not only due to the complexity of these techniques, but also due to the fact that artificial intelligence, by its very definition—requires "artificial" intelligence—i.e., machine/non-human intelligence.

As applicable, one or more functions associated with the methods and/or processes described herein can be implemented as a large-scale system that is operable to receive, transmit and/or process data on a large-scale. As used herein, a large-scale refers to a large number of data, such as one or more kilobytes, megabytes, gigabytes, terabytes or more of data that are received, transmitted and/or processed. Such receiving, transmitting and/or processing of data cannot practically be performed by the human mind on a large-scale within a reasonable period of time, such as within a second, a millisecond, microsecond, a real-time basis or other high speed required by the machines that generate the data, receive the data, convey the data, store the data and/or use the data.

As applicable, one or more functions associated with the methods and/or processes described herein can require data to be manipulated in different ways within overlapping time spans. The human mind is not equipped to perform such different data manipulations independently, contemporaneously, in parallel, and/or on a coordinated basis within a reasonable period of time, such as within a second, a millisecond, microsecond, a real-time basis or other high speed required by the machines that generate the data, receive the data, convey the data, store the data and/or use the data.

As applicable, one or more functions associated with the methods and/or processes described herein can be implemented in a system that is operable to electronically receive digital data via a wired or wireless communication network and/or to electronically transmit digital data via a wired or wireless communication network. Such receiving and transmitting cannot practically be performed by the human mind because the human mind is not equipped to electronically transmit or receive digital data, let alone to transmit and receive digital data via a wired or wireless communication network.

As applicable, one or more functions associated with the methods and/or processes described herein can be implemented in a system that is operable to electronically store digital data in a memory device. Such storage cannot practically be performed by the human mind because the human mind is not equipped to electronically store digital data.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method comprises:
    obtaining, by a processing module, touch data at a touch data rate;
    obtaining, by the processing module, video data at a refresh rate, wherein the touch data rate is greater than the refresh rate;
    for a frame of the video data:
        determining, by the processing module, a touch movement trend based on the touch data and a frame-to-frame movement trend between a first frame of video data and the frame of video data based on touch data samples obtained between the first frame of video data and the frame of video data;
        determining, by the processing module, a position offset for a graphical representation of the touch data based on the touch movement trend;
        when the position offset exceeds an offset threshold:
            adjusting, by the processing module, a position of the graphical representation of the touch data within the frame of video data based on the position offset to produce an adjusted frame of video data, wherein the position offset is determined by one or more of an average of the touch data and a median of the touch data.

2. The method of claim 1 further comprises:
    rendering, by the processing module, the adjusted frame of the video data.

3. The method of claim 1, wherein the touch data for the frame of video data comprises:
    a plurality of touch data samples.

4. The method of claim 1, wherein the determining the touch movement trend further comprises:
    determining x-direction touch movement trend based on x-direction movement of the touch data; and
    determining y-direction touch movement trend based on y-direction movement of the touch data.

5. The method of claim 4 further comprises:
    determining z-direction touch movement trend based on z-direction movement of the touch data.

6. The method of claim 1, wherein the position offset is determined by one or more of:
    a change in direction of the touch movement trend; and
    a change in speed of the touch movement trend.

7. The method of claim 1, wherein the position offset is further determined by:
    a derivative of the touch data.

8. A computer readable memory device comprises:
    a first memory section that stores operational instructions that, when executed by a processing module, causes the processing module to:
        obtain touch data at a touch data rate;
        obtain video data at a refresh rate, wherein the touch data rate is greater than the refresh rate; and
    a second memory section that stores operational instructions that, when executed by the processing module, causes the processing module to, for a frame of the video data:
        determine a touch movement trend based on the touch data and a frame-to-frame movement trend between a first frame of video data and the frame of video data based on touch data samples obtained between the first frame of video data and the frame of video data;
        determine a position offset for a graphical representation of the touch data based on the touch movement trend; and
        when the position offset exceeds an offset threshold, adjust a position of the graphical representation of the touch data within the frame of video data based on the position offset to produce an adjusted frame of video data, wherein the position offset is determined by one or more of an average of the touch data and a median of the touch data.

9. The computer readable memory device of claim 8 further comprises:
    a third memory section that stores operational instructions that, when executed by the processing module, causes the processing module to:
        render the adjusted frame of the video data.

10. The computer readable memory device of claim 8, wherein the touch data for the frame of video data comprises:
    a plurality of touch data samples.

11. The computer readable memory device of claim 8, wherein the second memory section further stores operational instructions that, when executed by the processing module, causes the processing module to determine the touch movement trend by:
    determining x-direction touch movement trend based on x-direction movement of the touch data; and
    determining y-direction touch movement trend based on y-direction movement of the touch data.

12. The computer readable memory device of claim 11, wherein the second memory section further stores operational instructions that, when executed by the processing module, causes the processing module to determine the touch movement trend by:
    determining z-direction touch movement trend based on z-direction movement of the touch data.

13. The computer readable memory device of claim 8, wherein the second memory section further stores operational instructions that, when executed by the processing module, causes the processing module to determine the position offset by one or more of:
    a change in direction of the touch movement trend; and
    a change in speed of the touch movement trend.

14. The computer readable memory device of claim 8, wherein the second memory section further stores operational instructions that, when executed by the processing module, causes the processing module to further determine the position offset by:

a derivative of the touch data.

* * * * *